Dec. 28, 1965     E. F. BRINKER ETAL     3,226,541
AUTOMATIC CONTROL SYSTEM FOR RAILWAY CLASSIFICATION YARDS
Filed Aug. 12, 1960     57 Sheets-Sheet 1
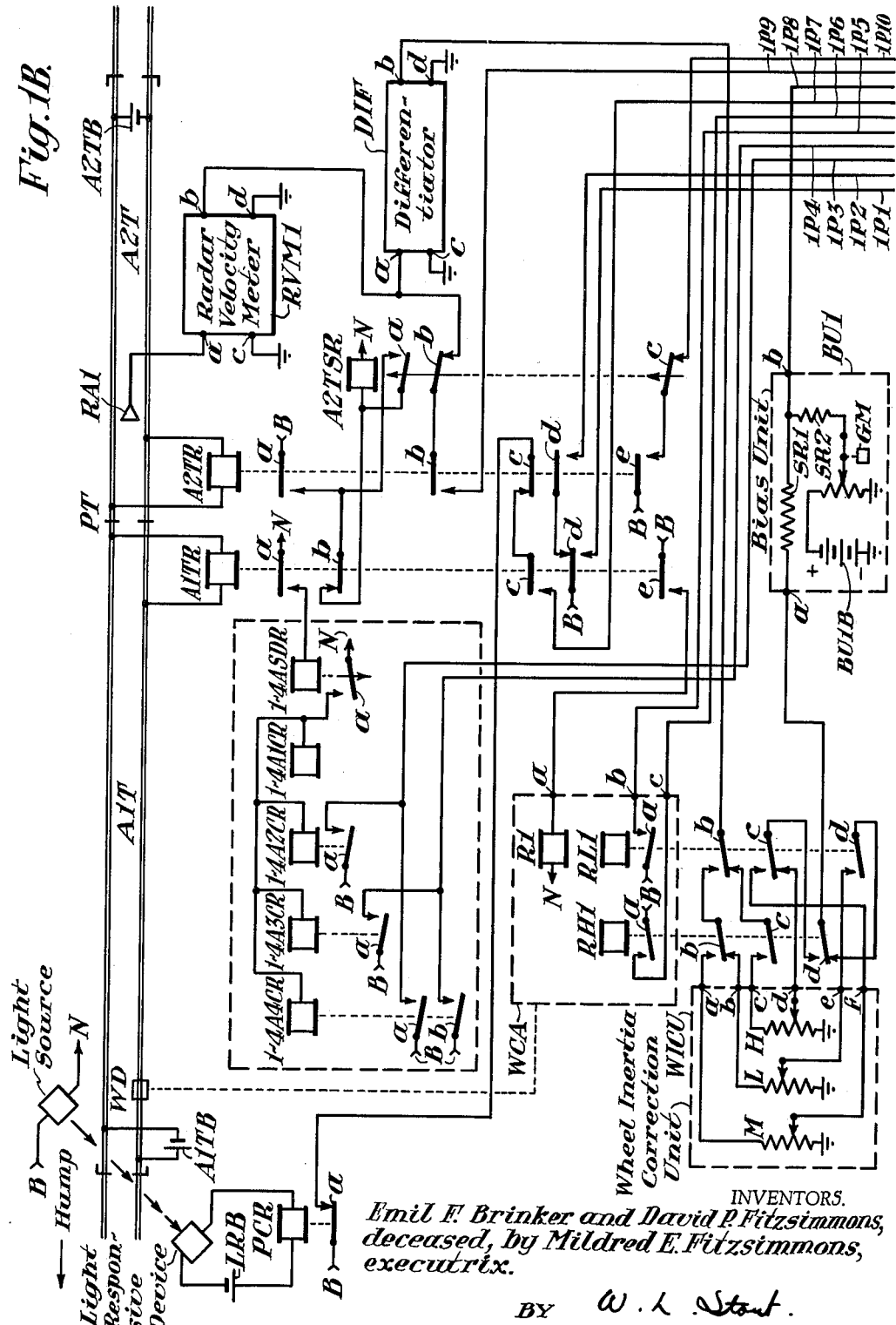
INVENTORS.
*Emil F. Brinker and David P. Fitzsimmons,
deceased, by Mildred E. Fitzsimmons,
executrix.*
BY W. L. Stout.
THEIR ATTORNEY

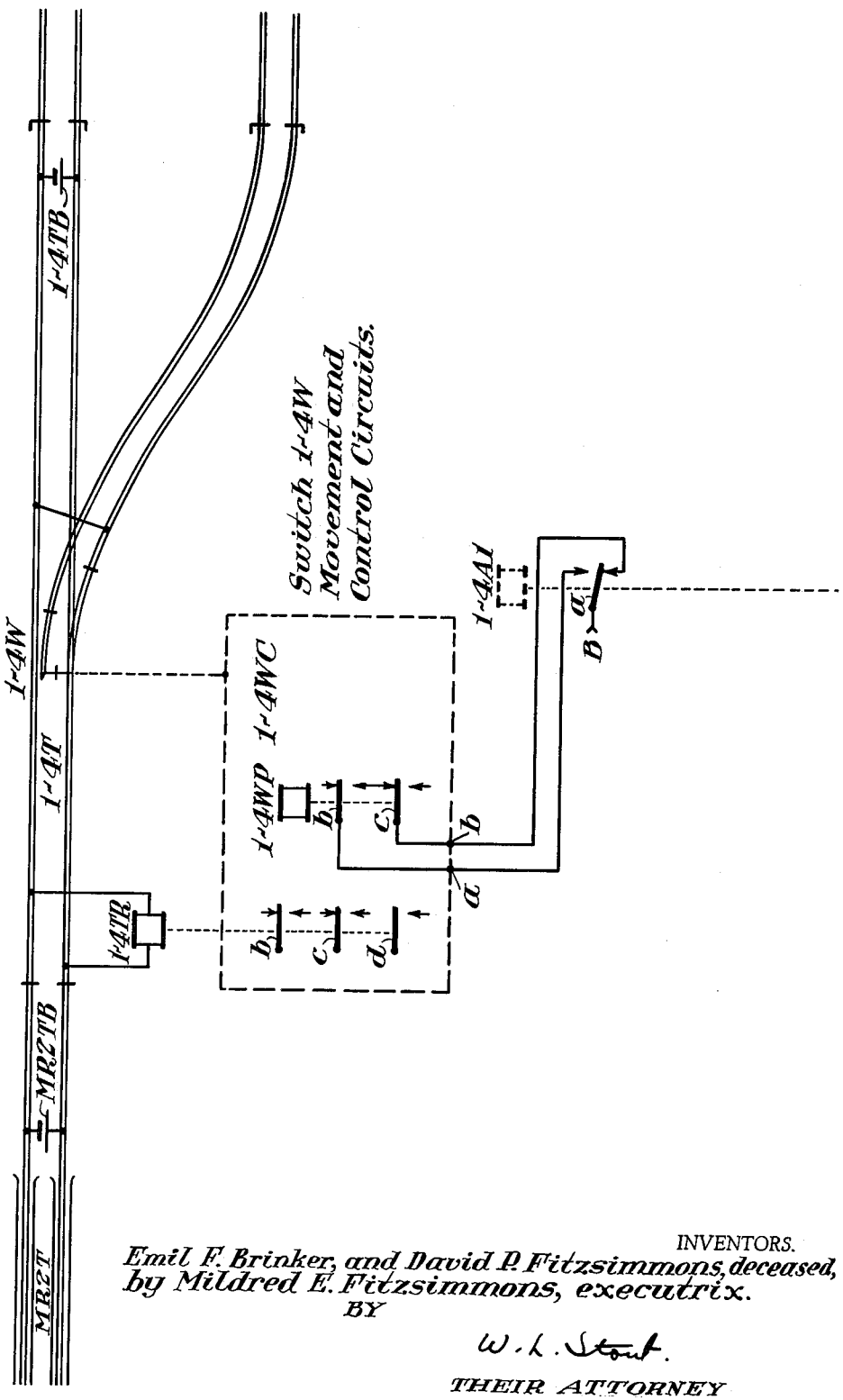

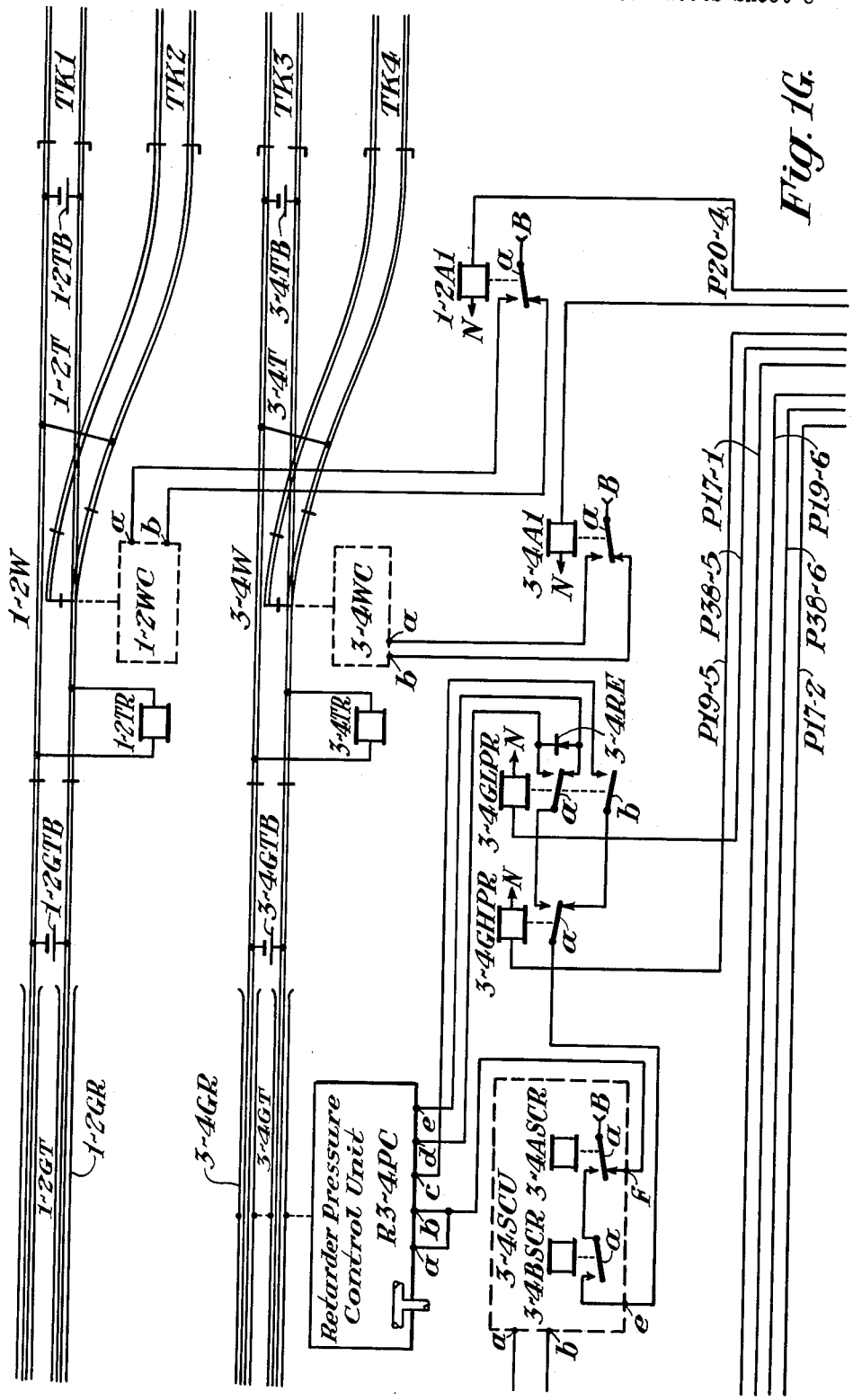

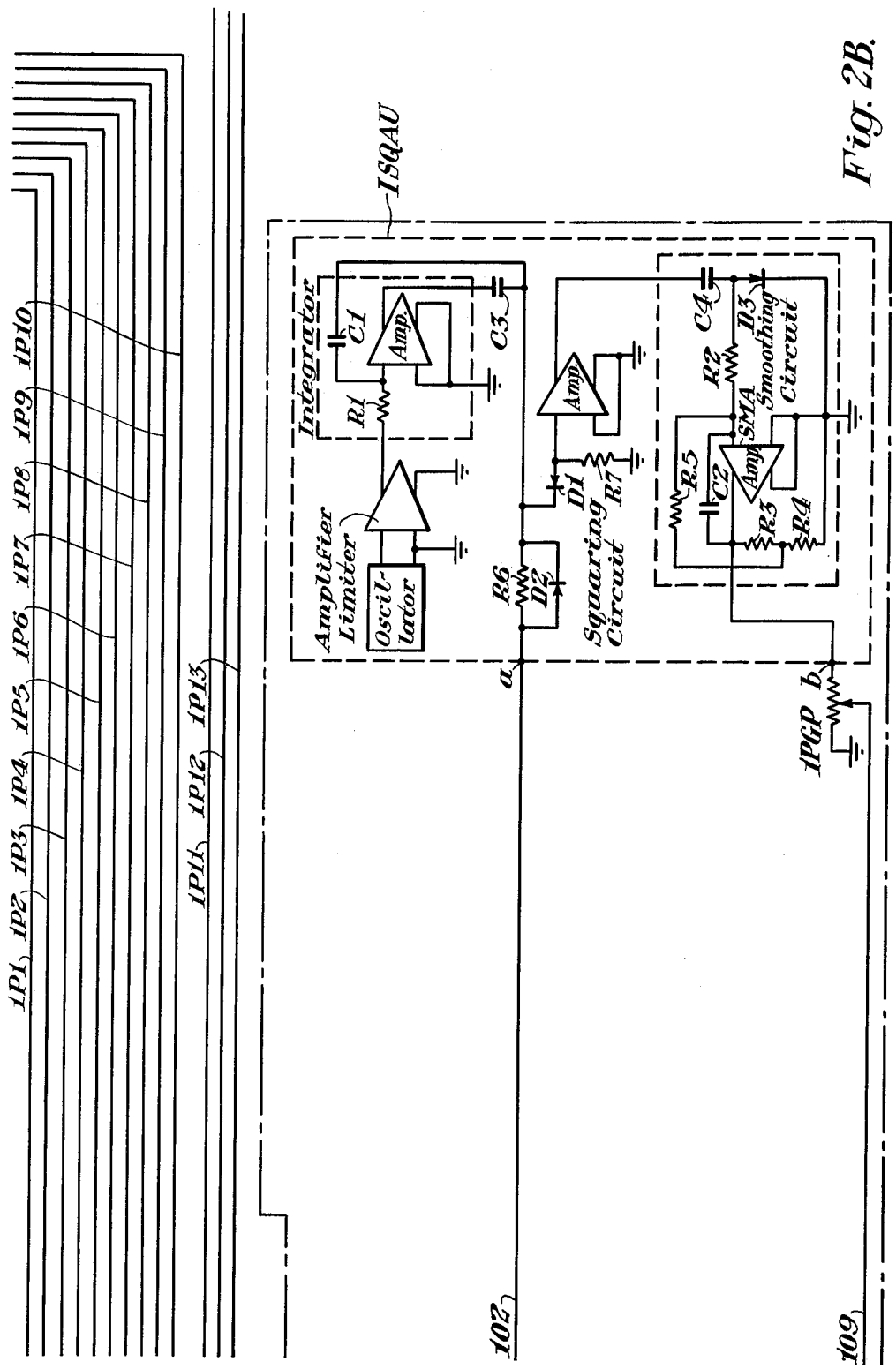

Dec. 28, 1965   E. F. BRINKER ETAL   3,226,541
AUTOMATIC CONTROL SYSTEM FOR RAILWAY CLASSIFICATION YARDS
Filed Aug. 12, 1960   57 Sheets-Sheet 9

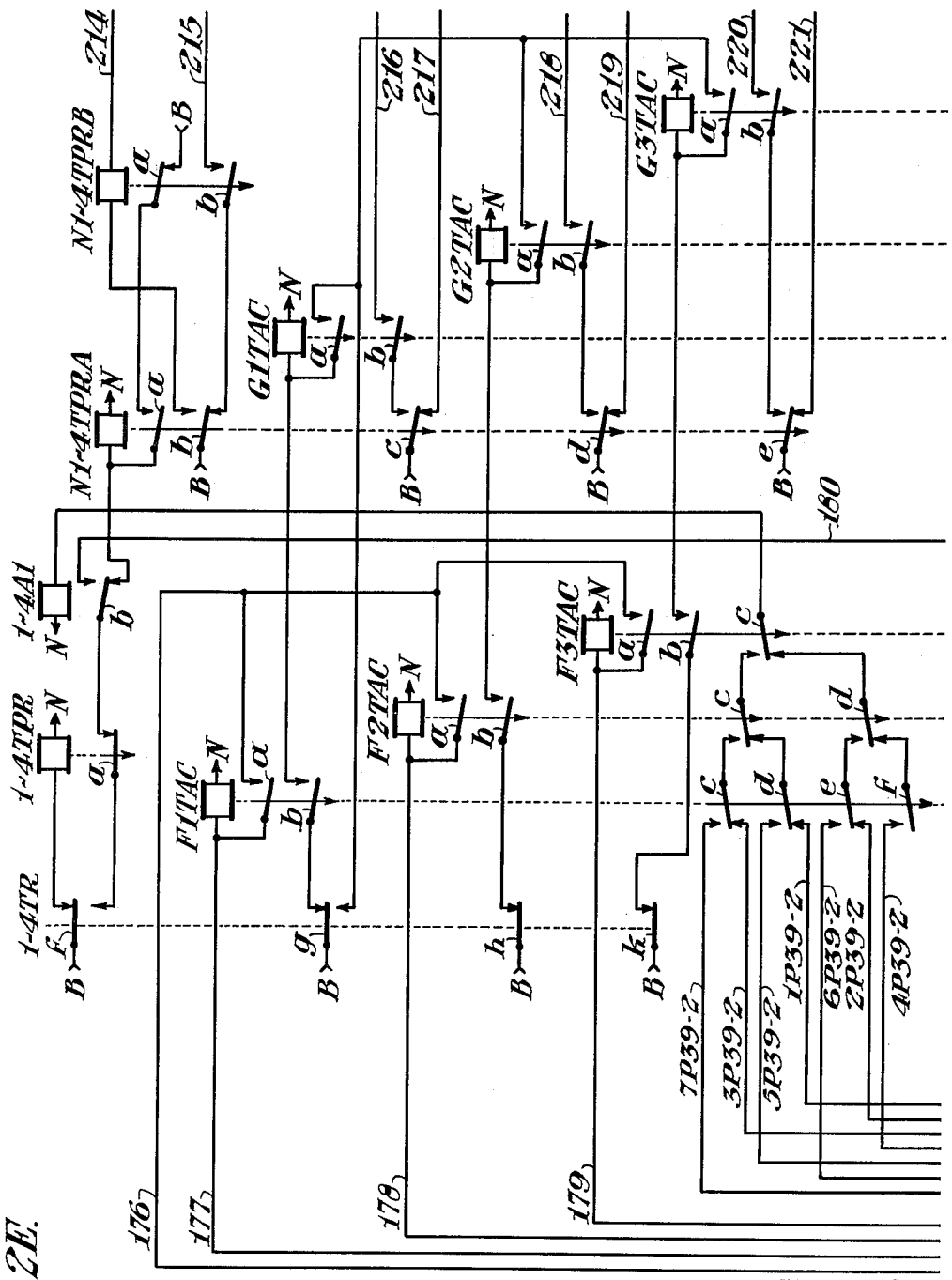

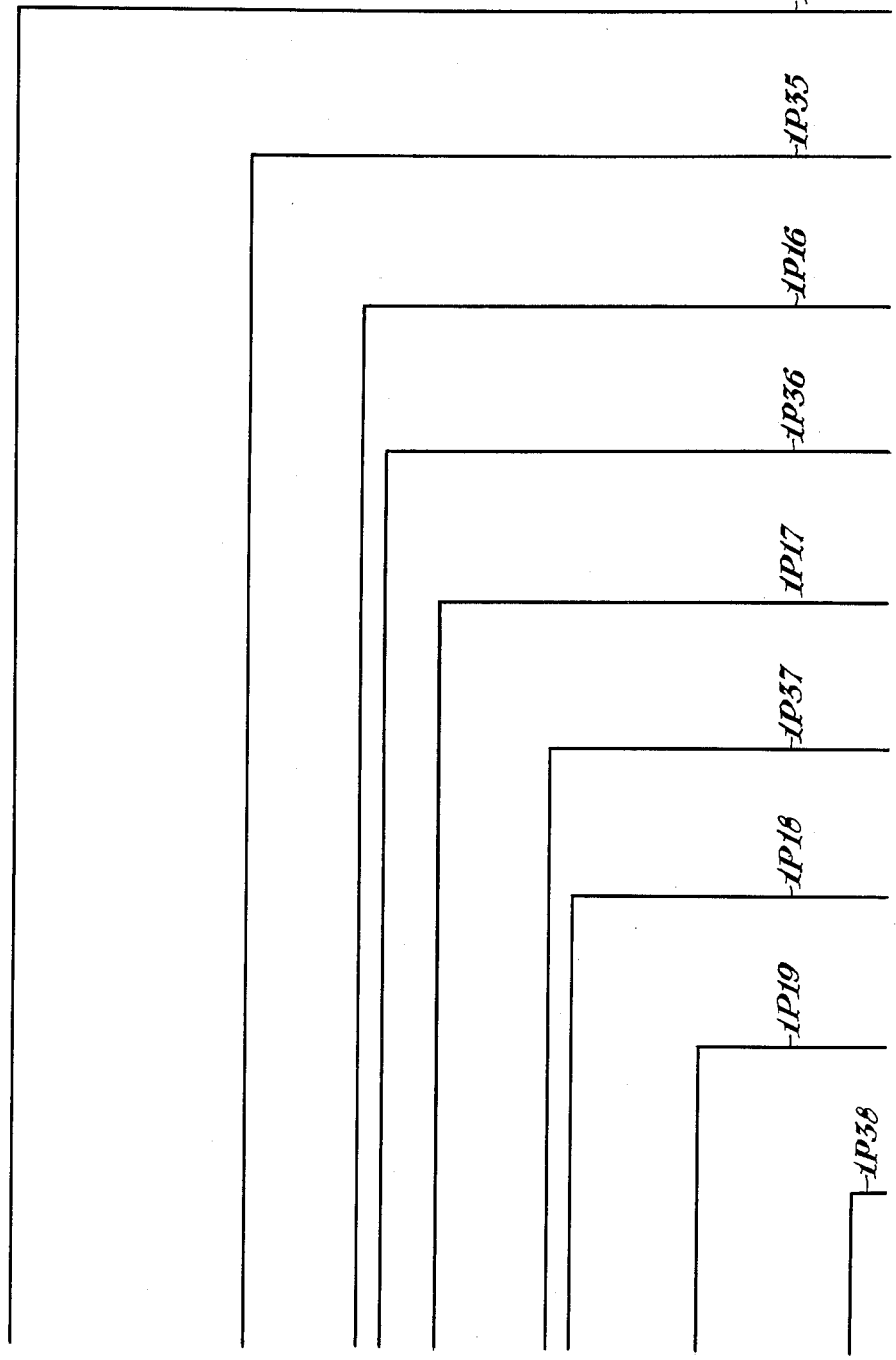

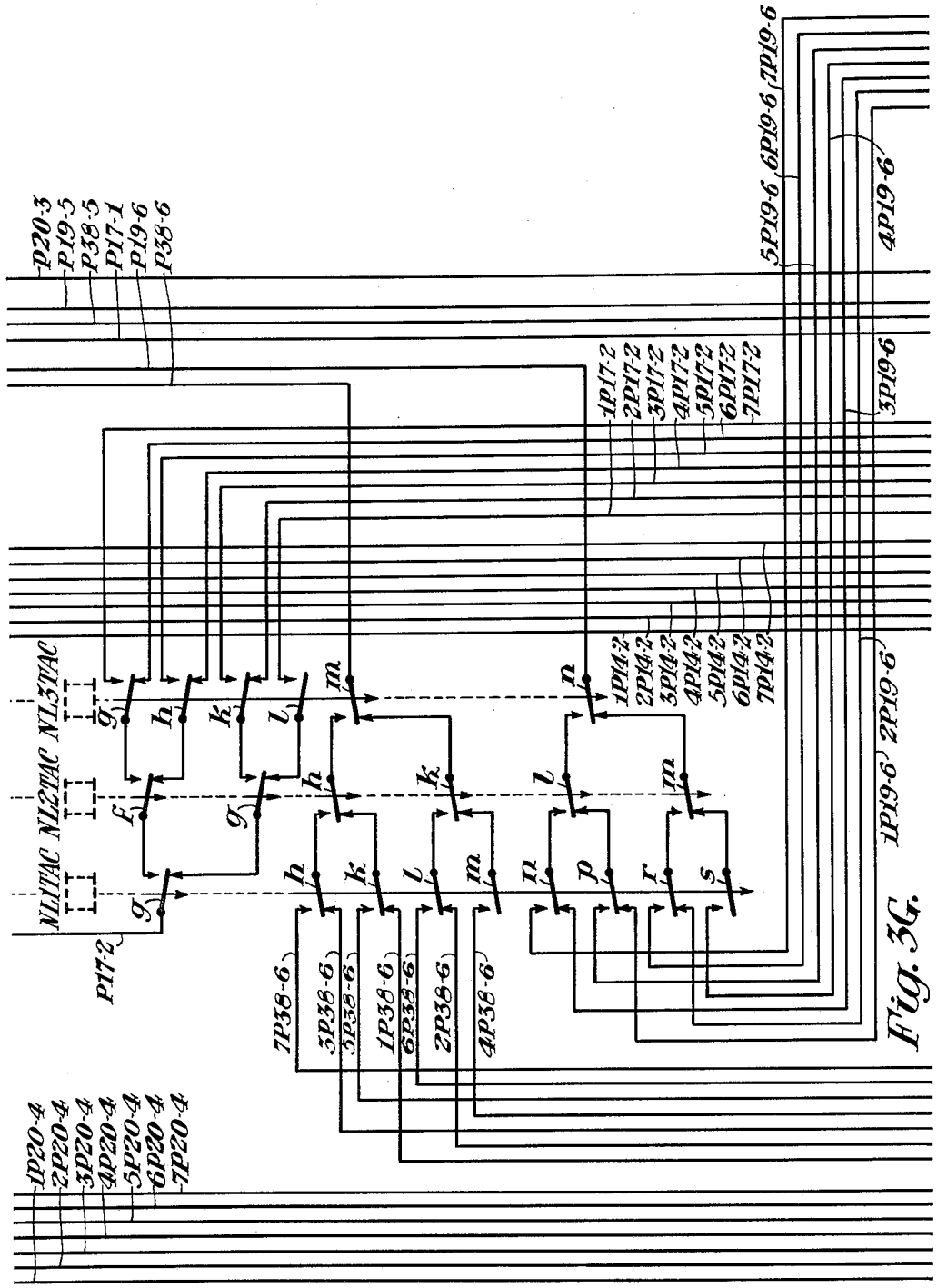

Dec. 28, 1965  E. F. BRINKER ETAL  3,226,541
AUTOMATIC CONTROL SYSTEM FOR RAILWAY CLASSIFICATION YARDS
Filed Aug. 12, 1960  57 Sheets-Sheet 23

INVENTORS.
Emil F. Brinker, and David P. Fitzsimmons,
deceased, by Mildred E. Fitzsimmons, executrix.
BY
W. L. Stout.
THEIR ATTORNEY

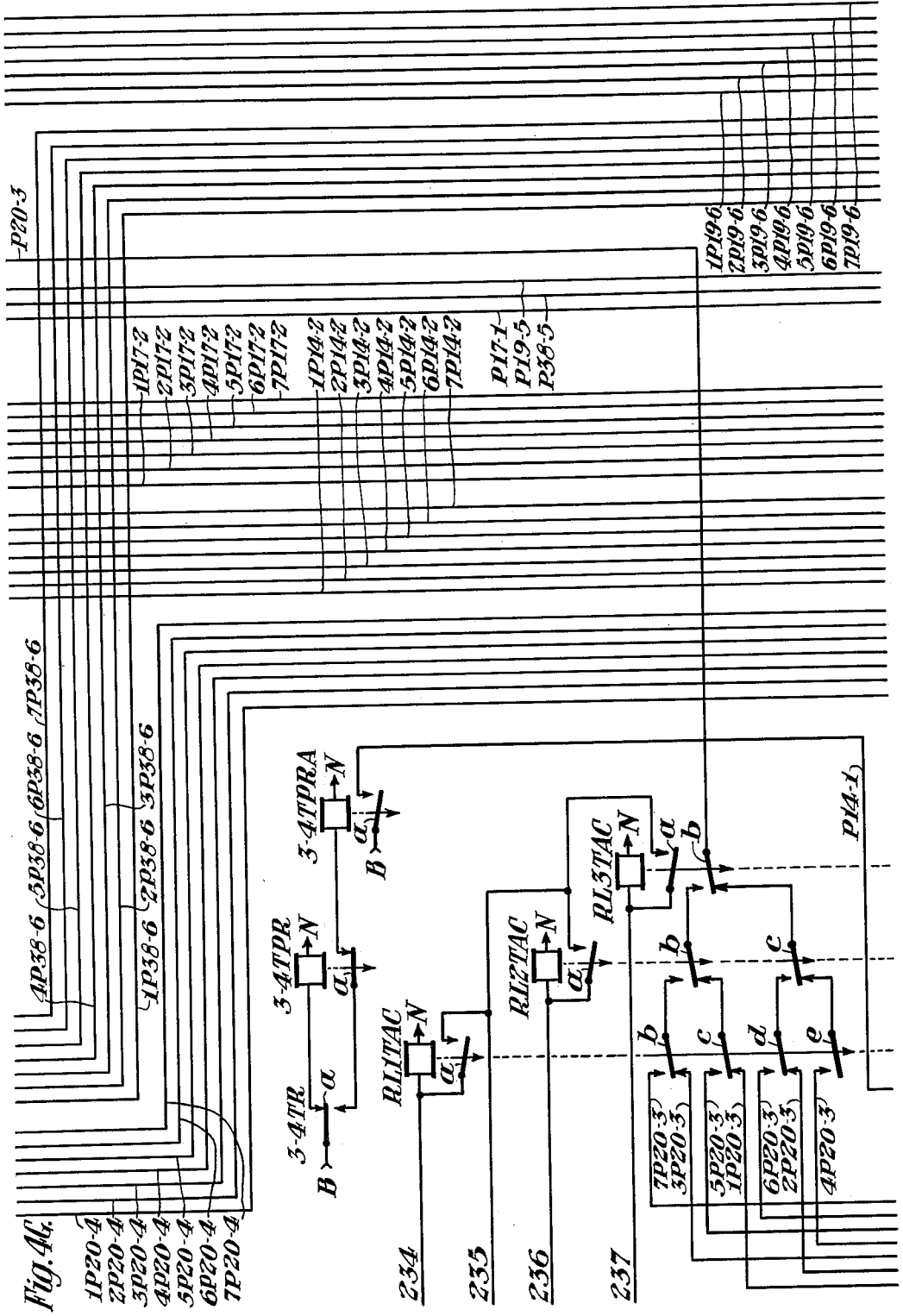

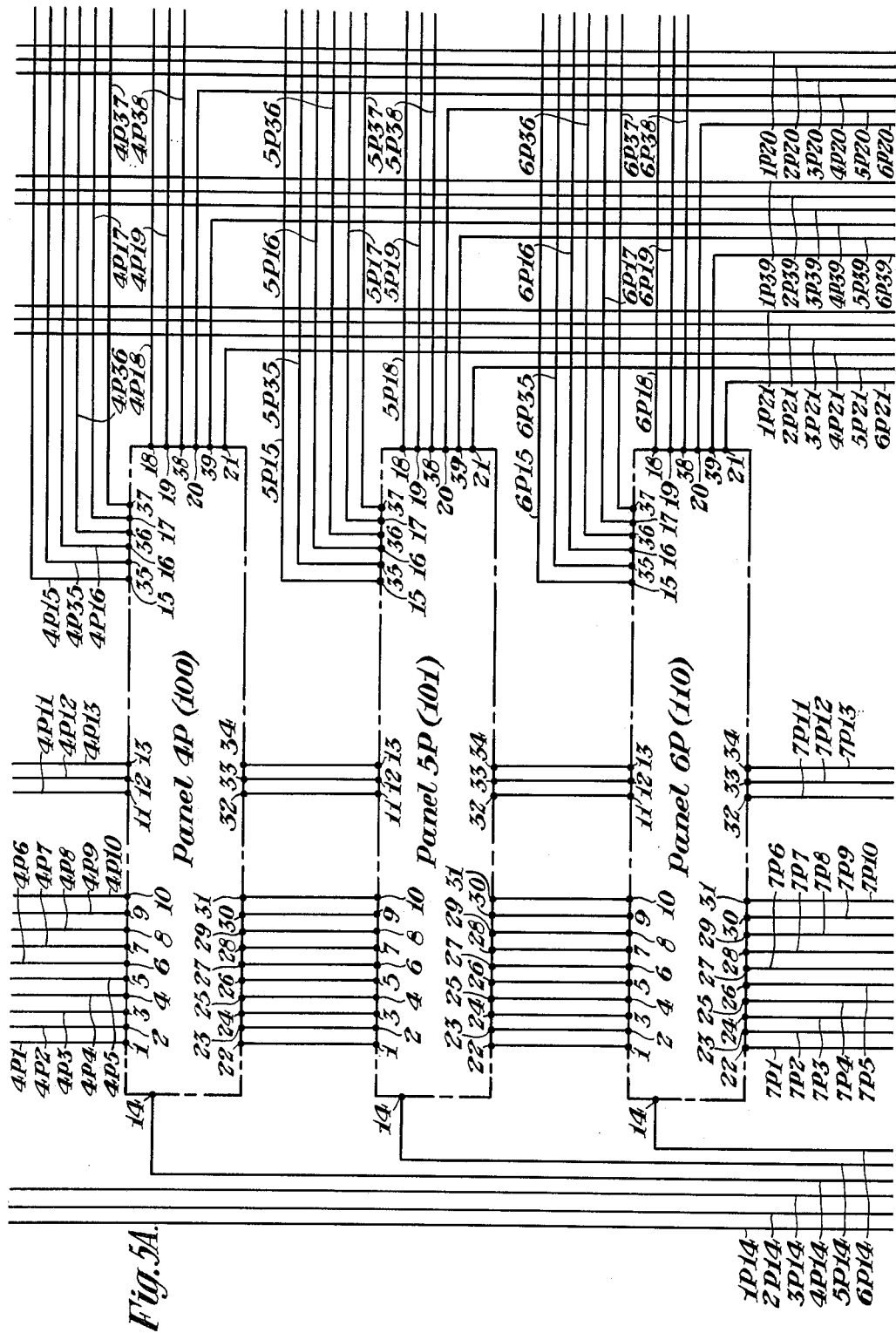

Dec. 28, 1965   E. F. BRINKER ETAL   3,226,541
AUTOMATIC CONTROL SYSTEM FOR RAILWAY CLASSIFICATION YARDS
Filed Aug. 12, 1960
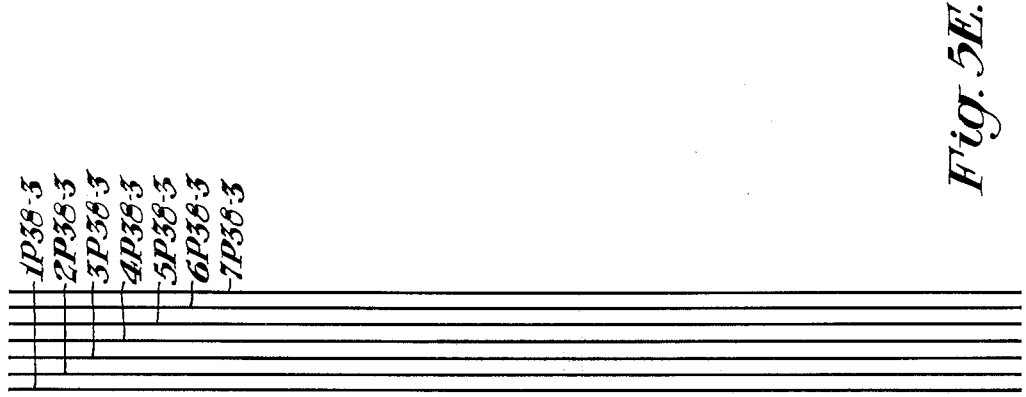
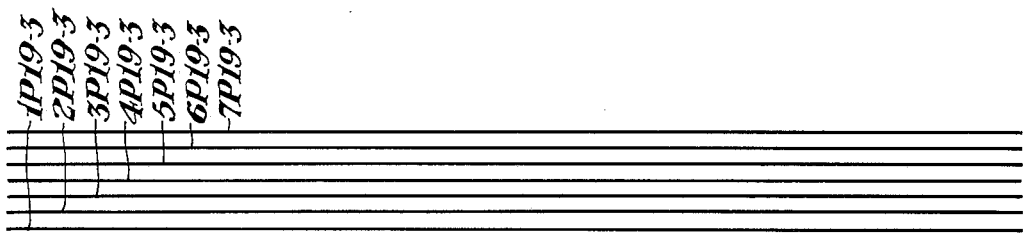
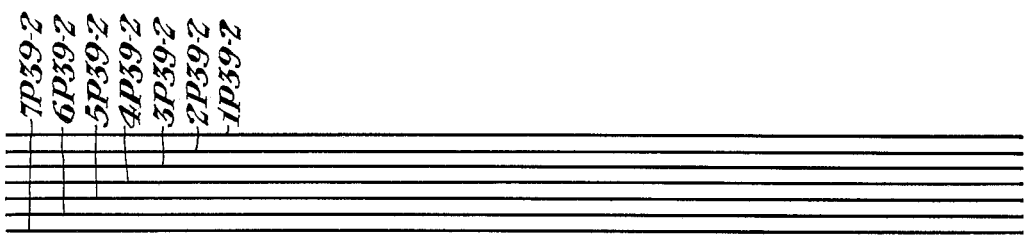
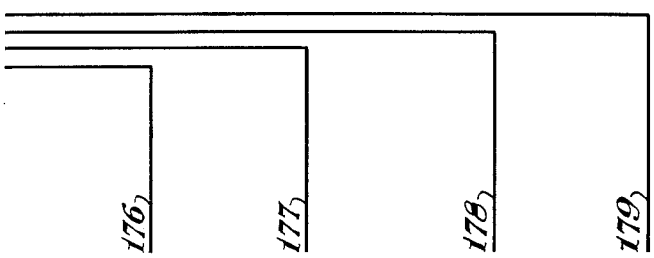
Fig. 5E.

Dec. 28, 1965    E. F. BRINKER ETAL    3,226,541
AUTOMATIC CONTROL SYSTEM FOR RAILWAY CLASSIFICATION YARDS
Filed Aug. 12, 1960    57 Sheets-Sheet 40

Dec. 28, 1965 E. F. BRINKER ETAL 3,226,541
AUTOMATIC CONTROL SYSTEM FOR RAILWAY CLASSIFICATION YARDS
Filed Aug. 12, 1960 57 Sheets-Sheet 41

Dec. 28, 1965     E. F. BRINKER ETAL     3,226,541
AUTOMATIC CONTROL SYSTEM FOR RAILWAY CLASSIFICATION YARDS
Filed Aug. 12, 1960     57 Sheets-Sheet 49

Figure 1C:
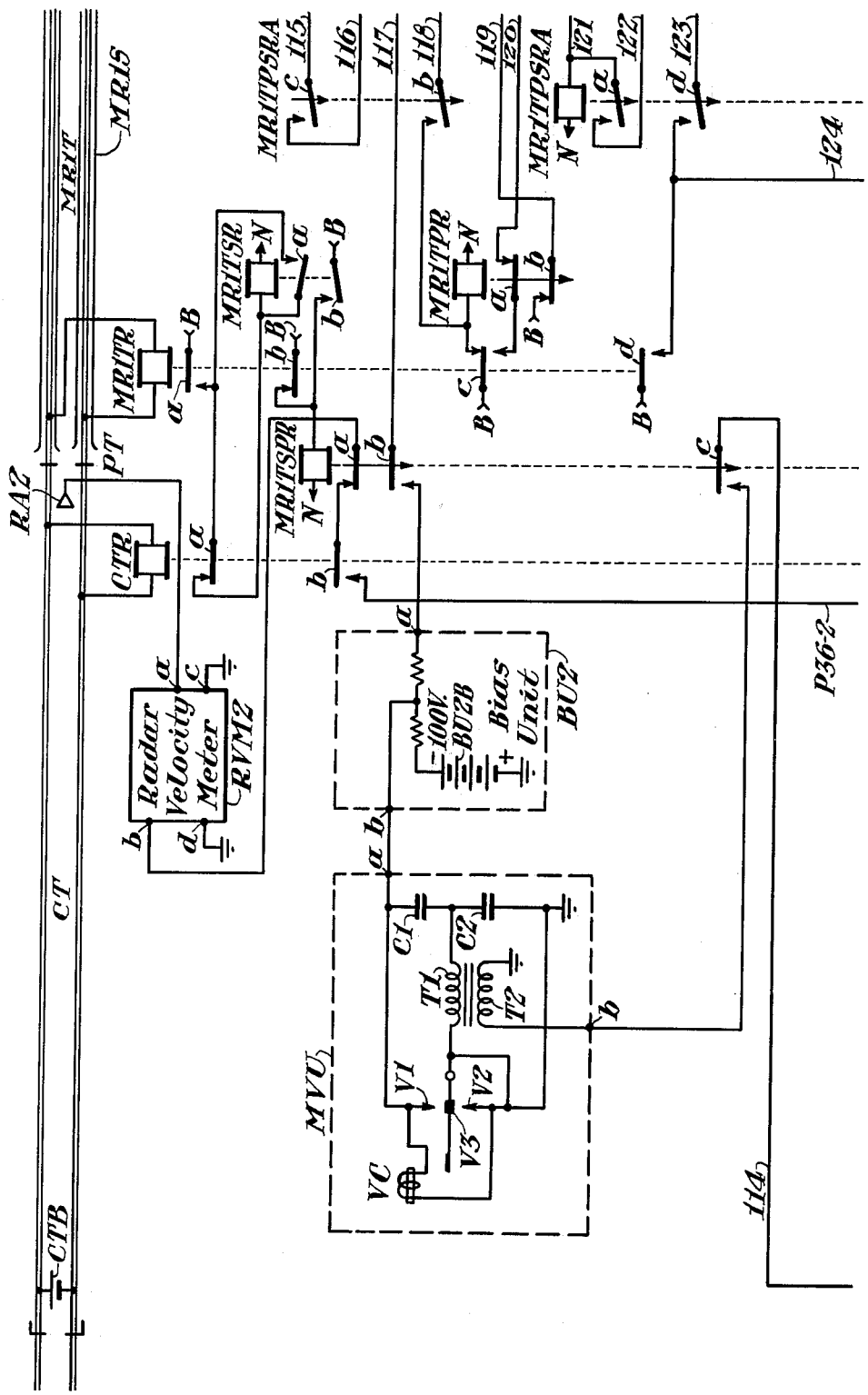
Figure 1D:
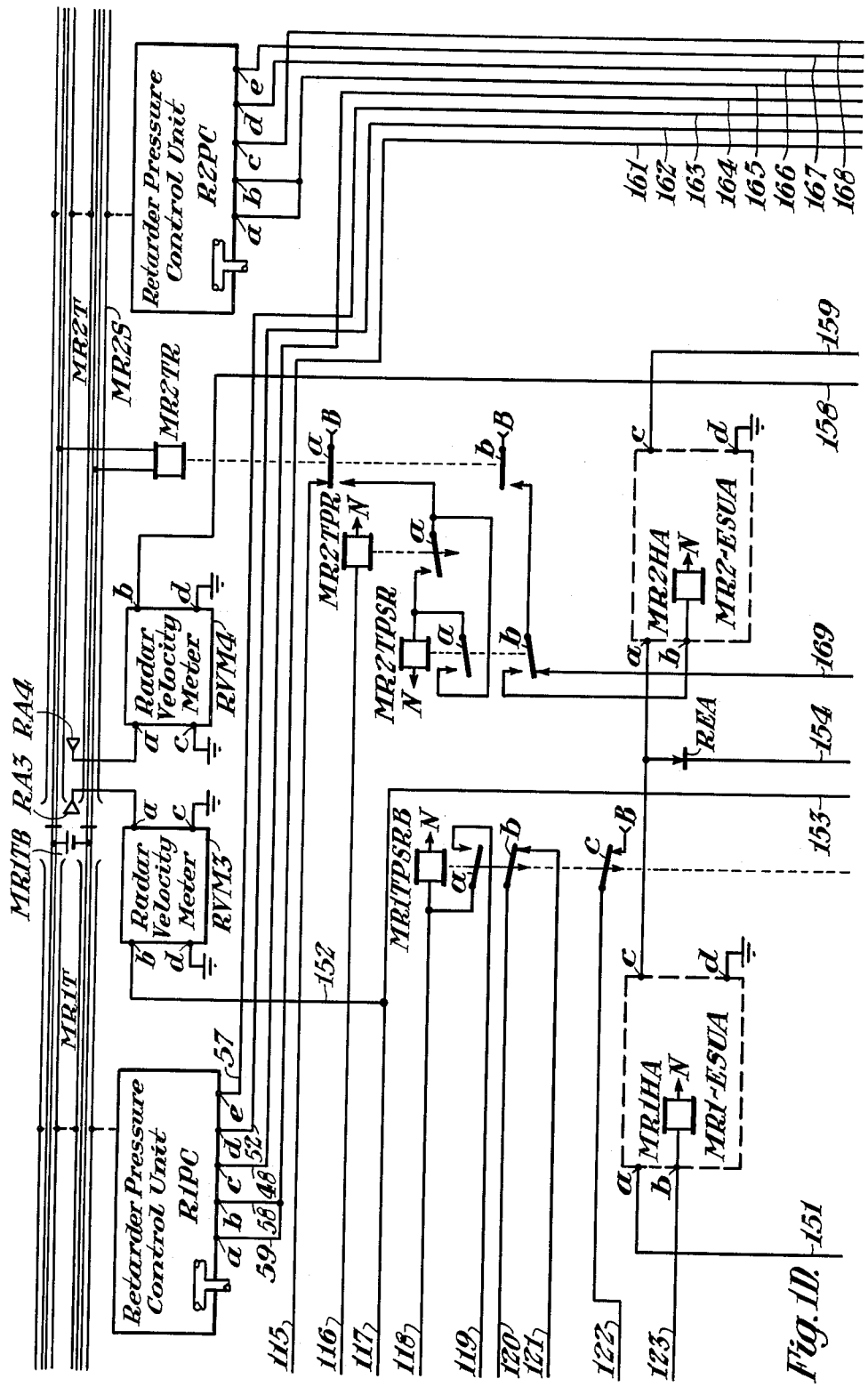
Figure 1F:
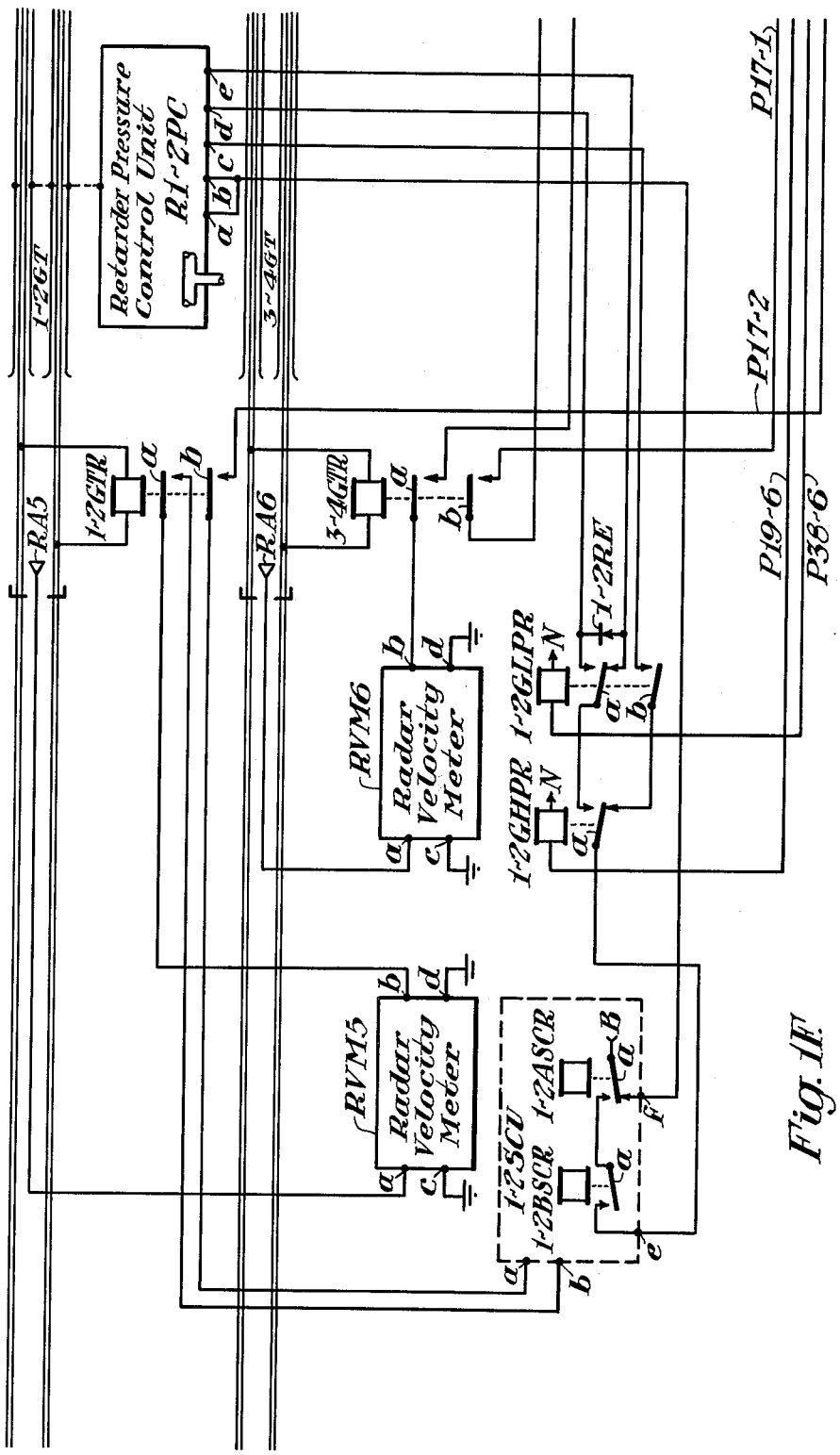
Figure 2A:
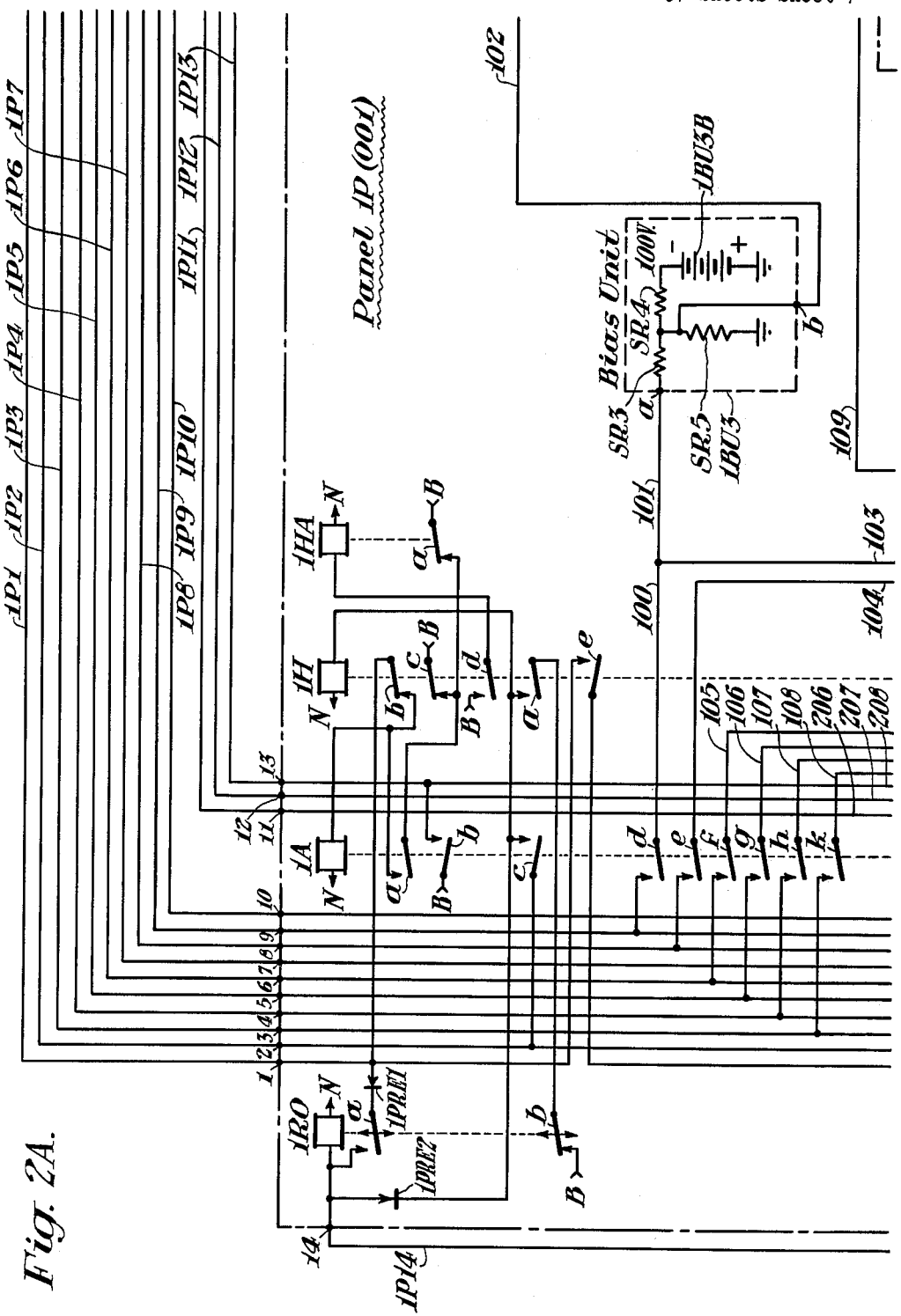
Figure 2C:
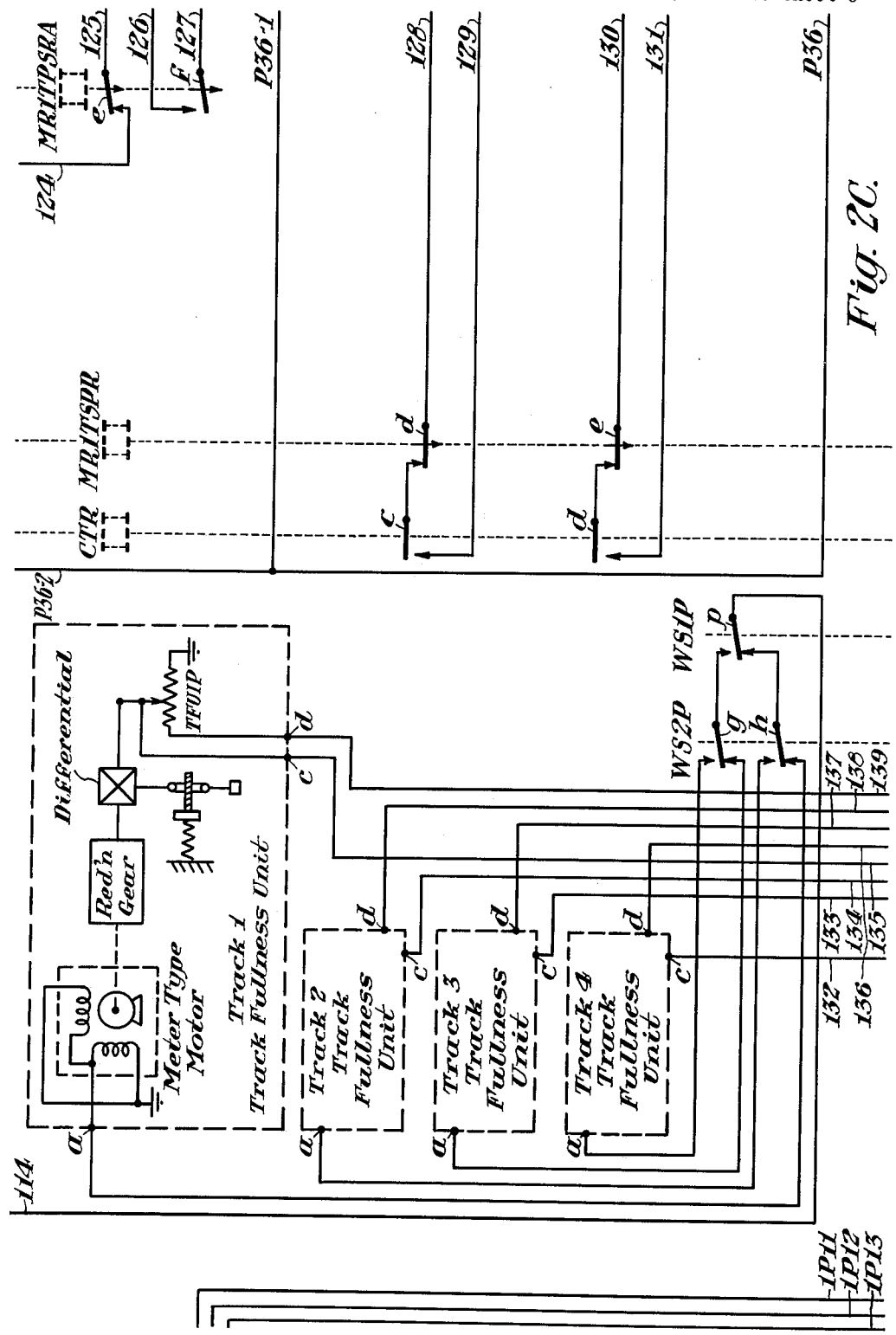
Figure 2D:
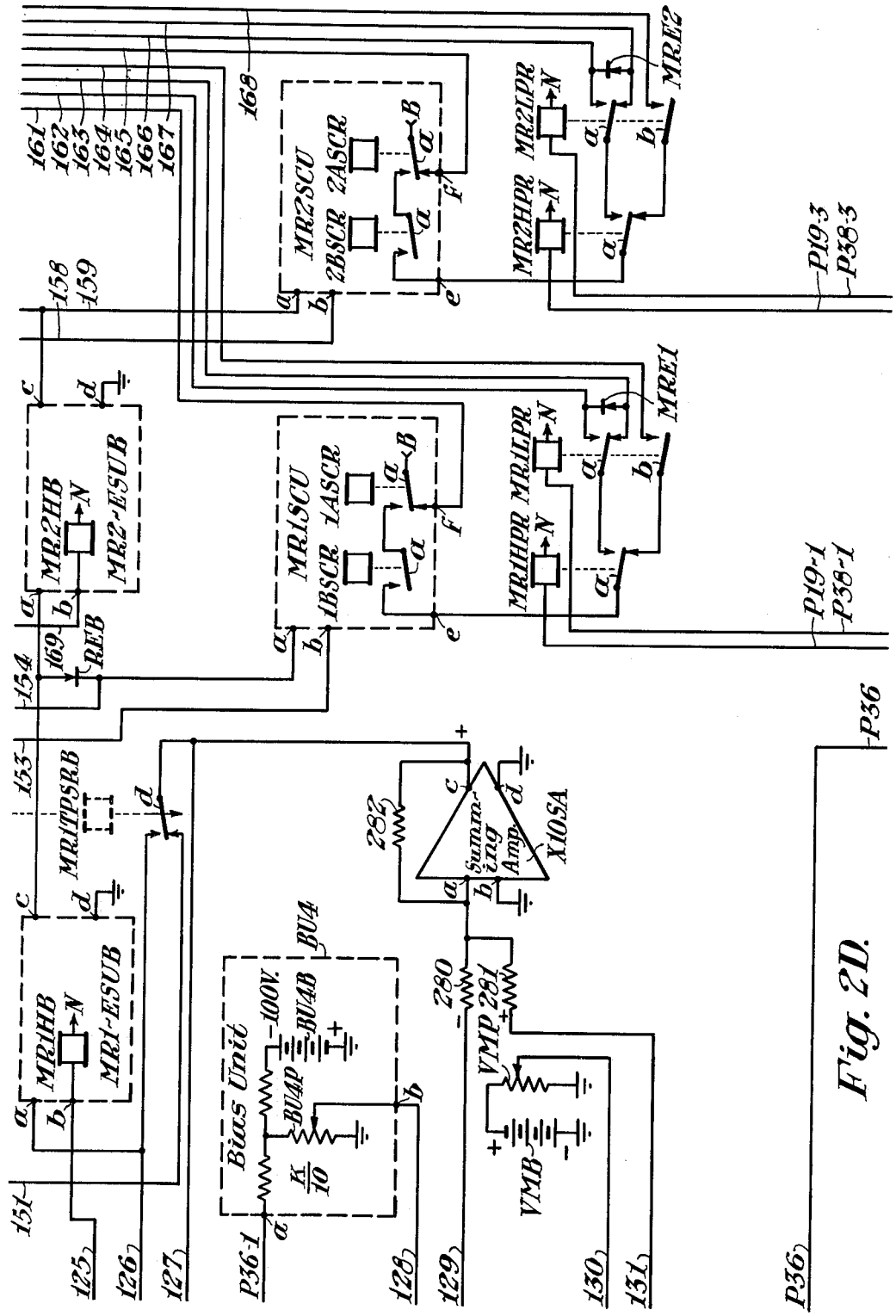
Figure 2F:
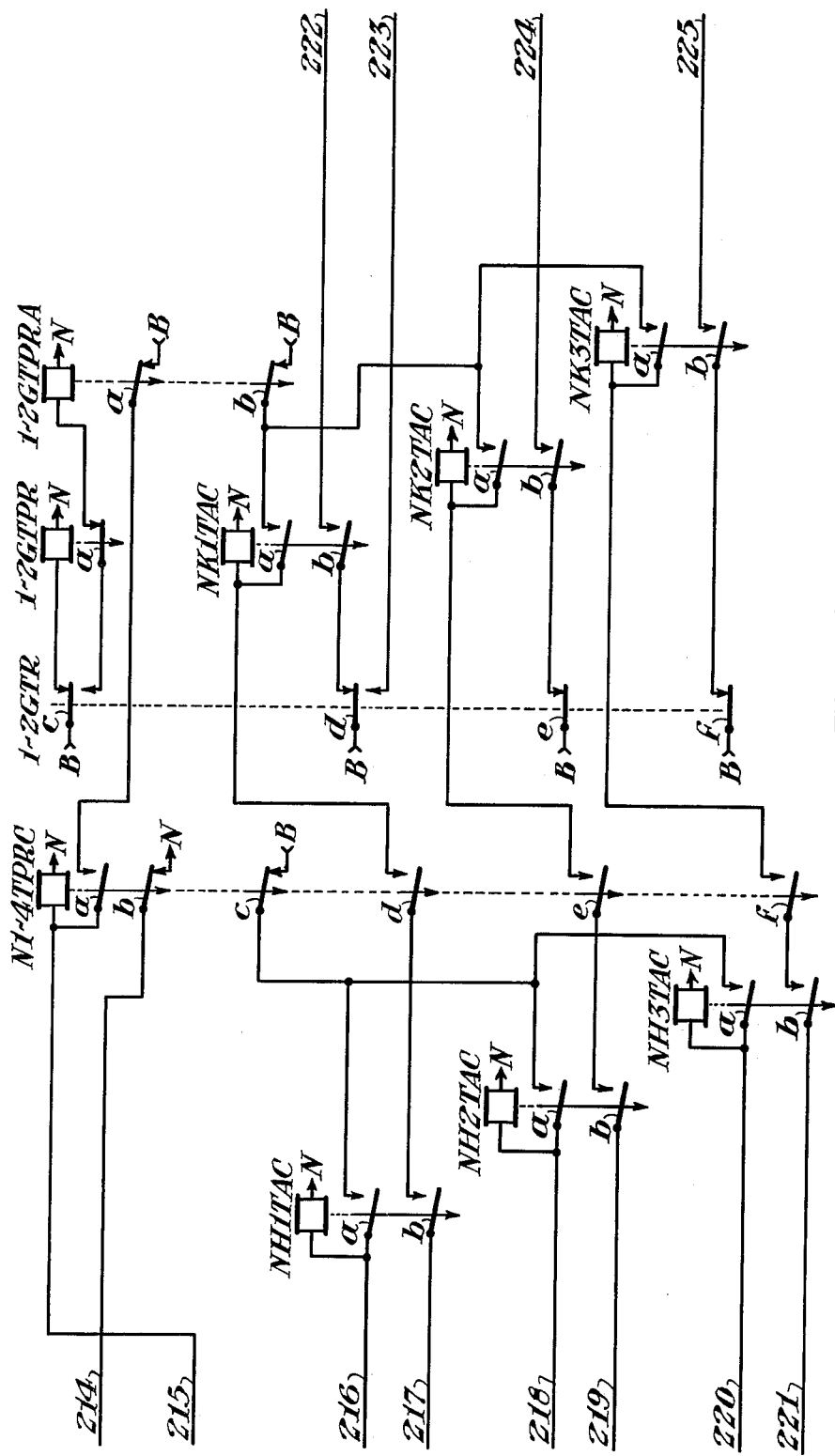
Figure 2G:
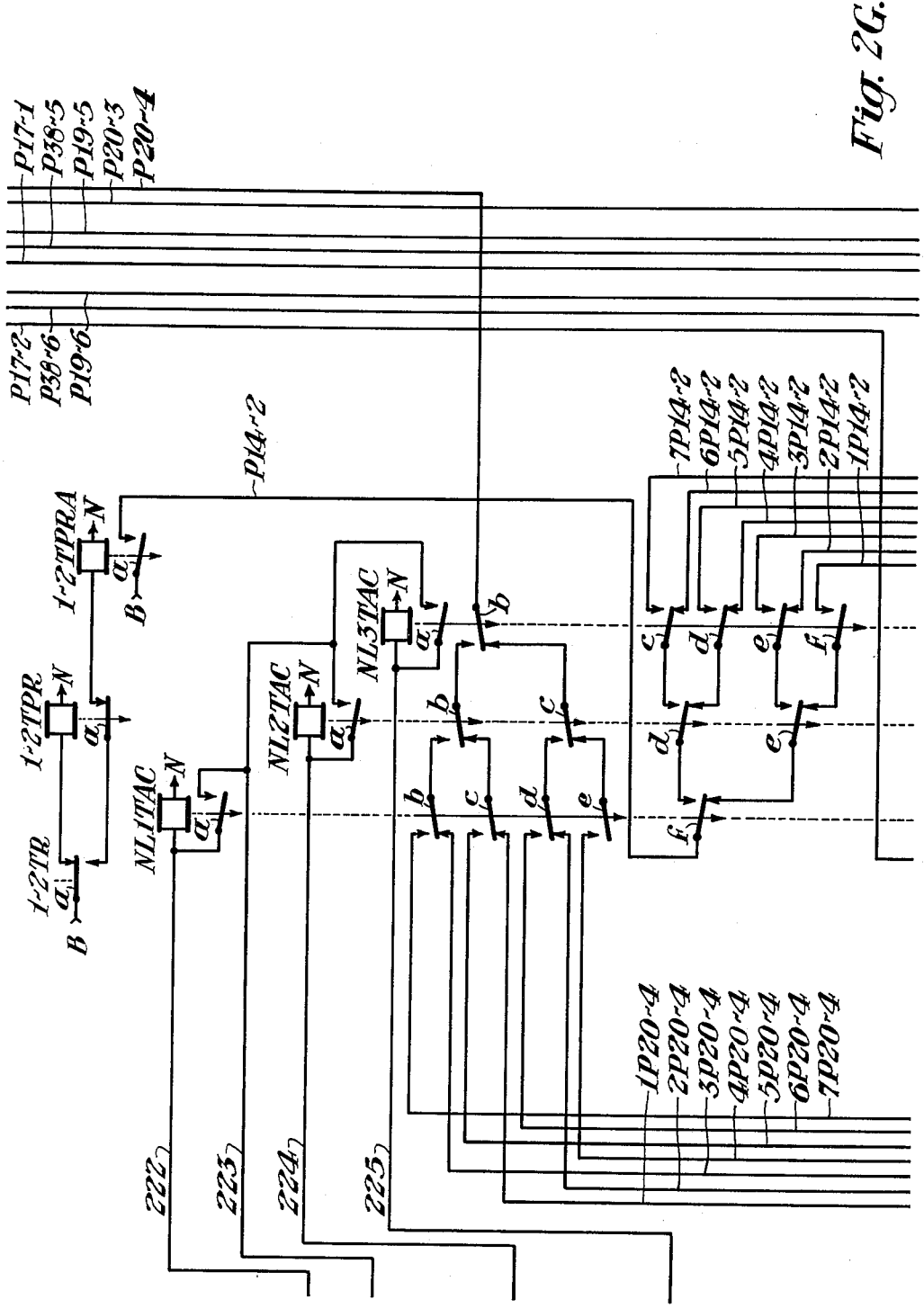
Figure 3A:
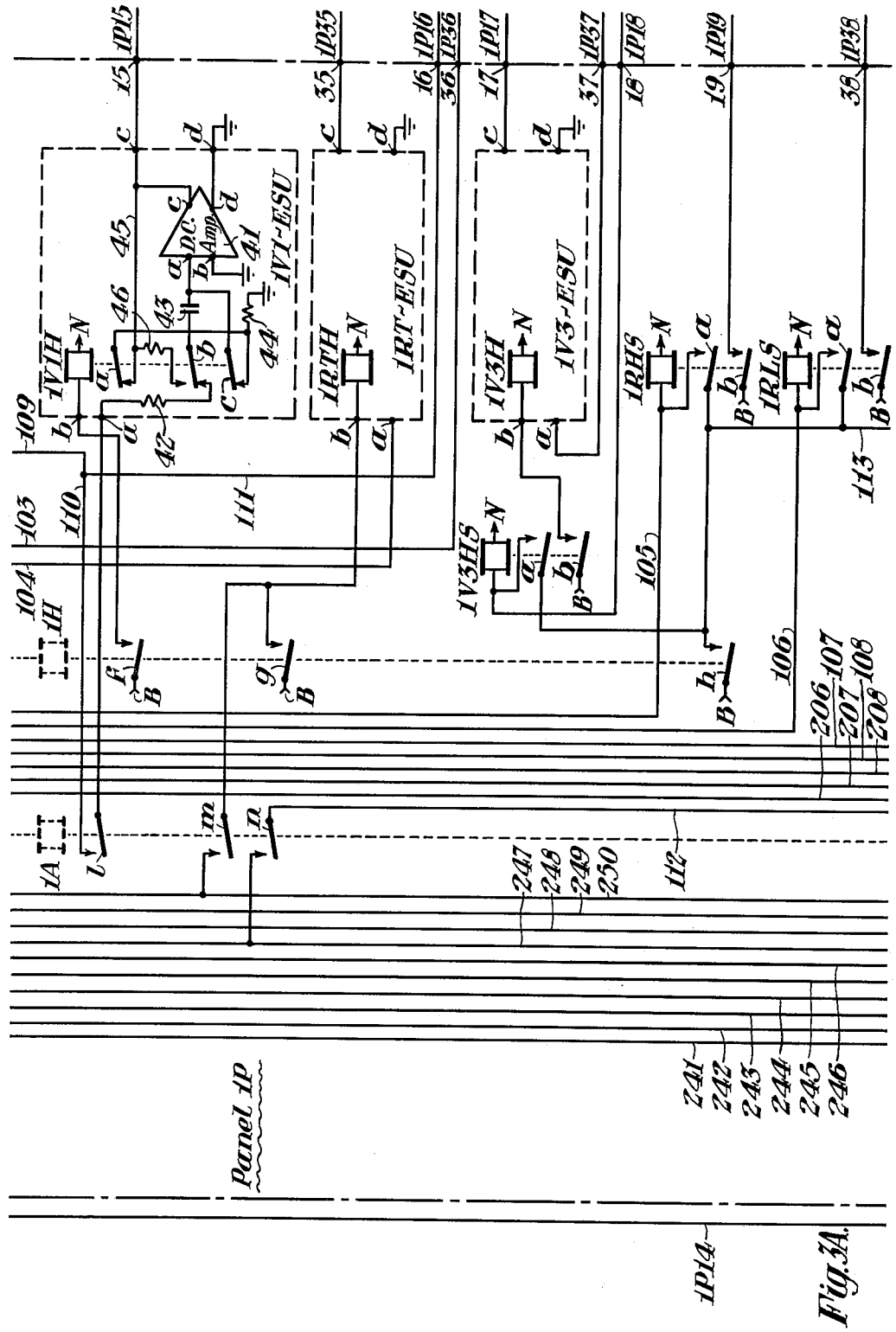
Figure 3C:
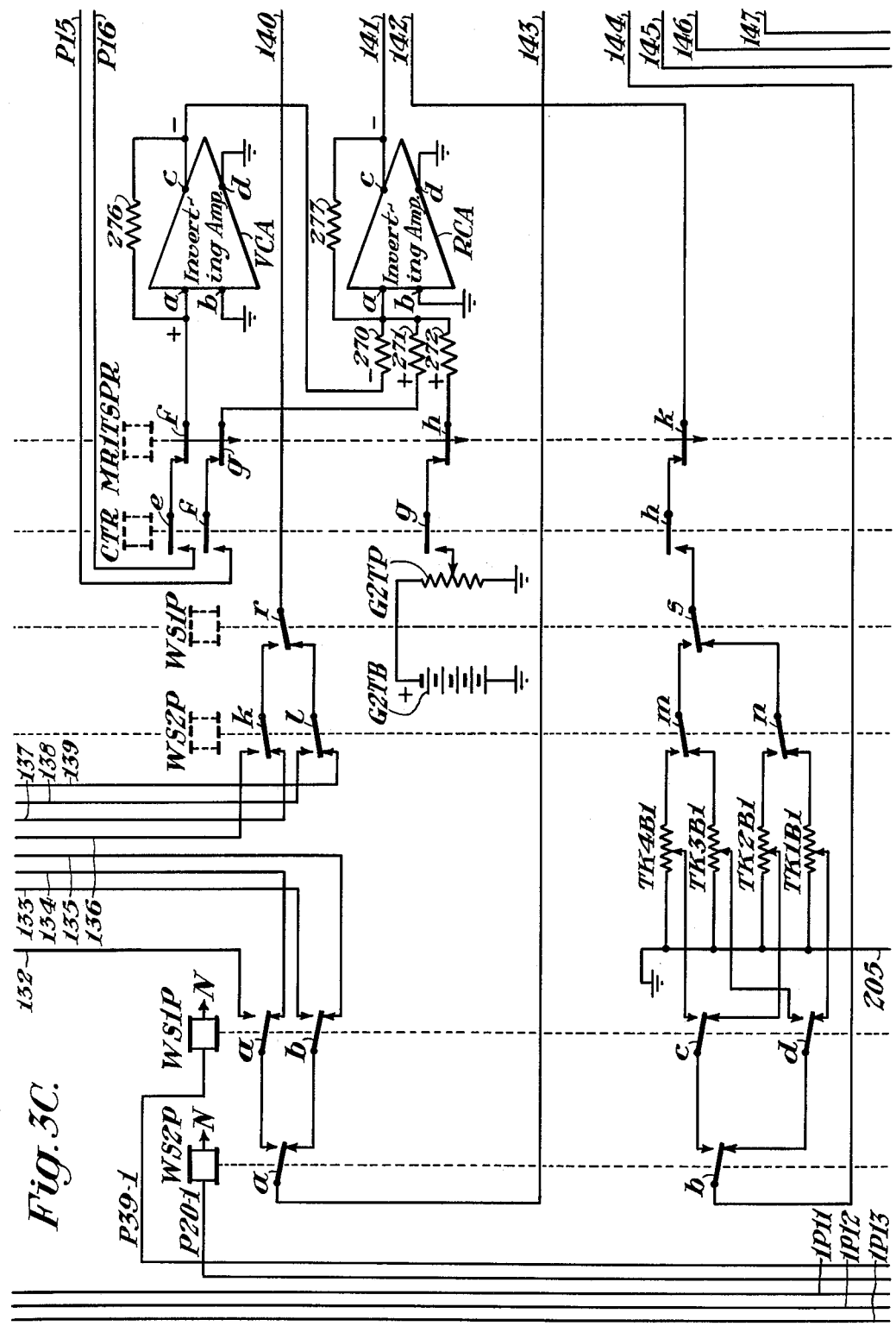
Figure 30:
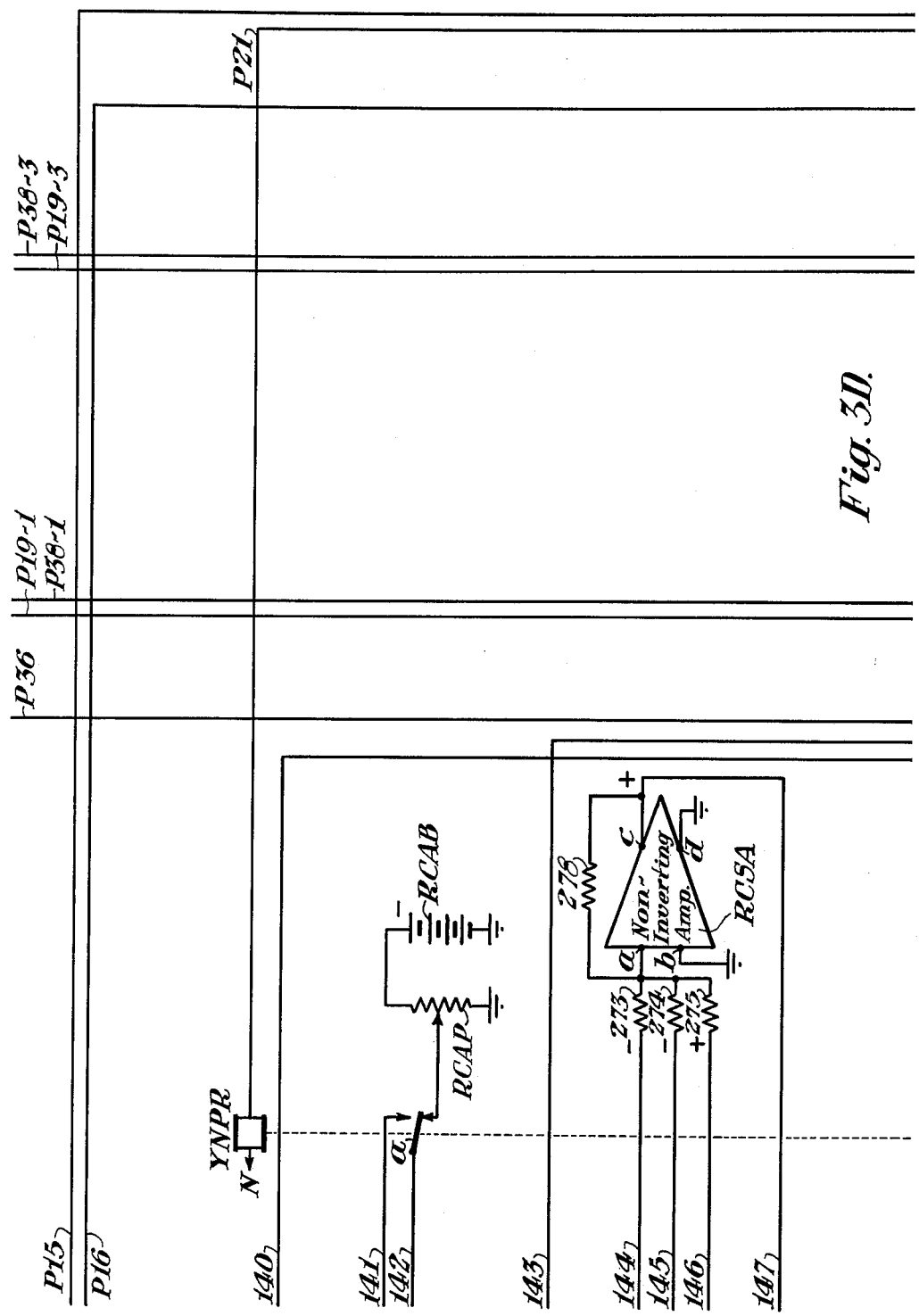
Figure 3E:
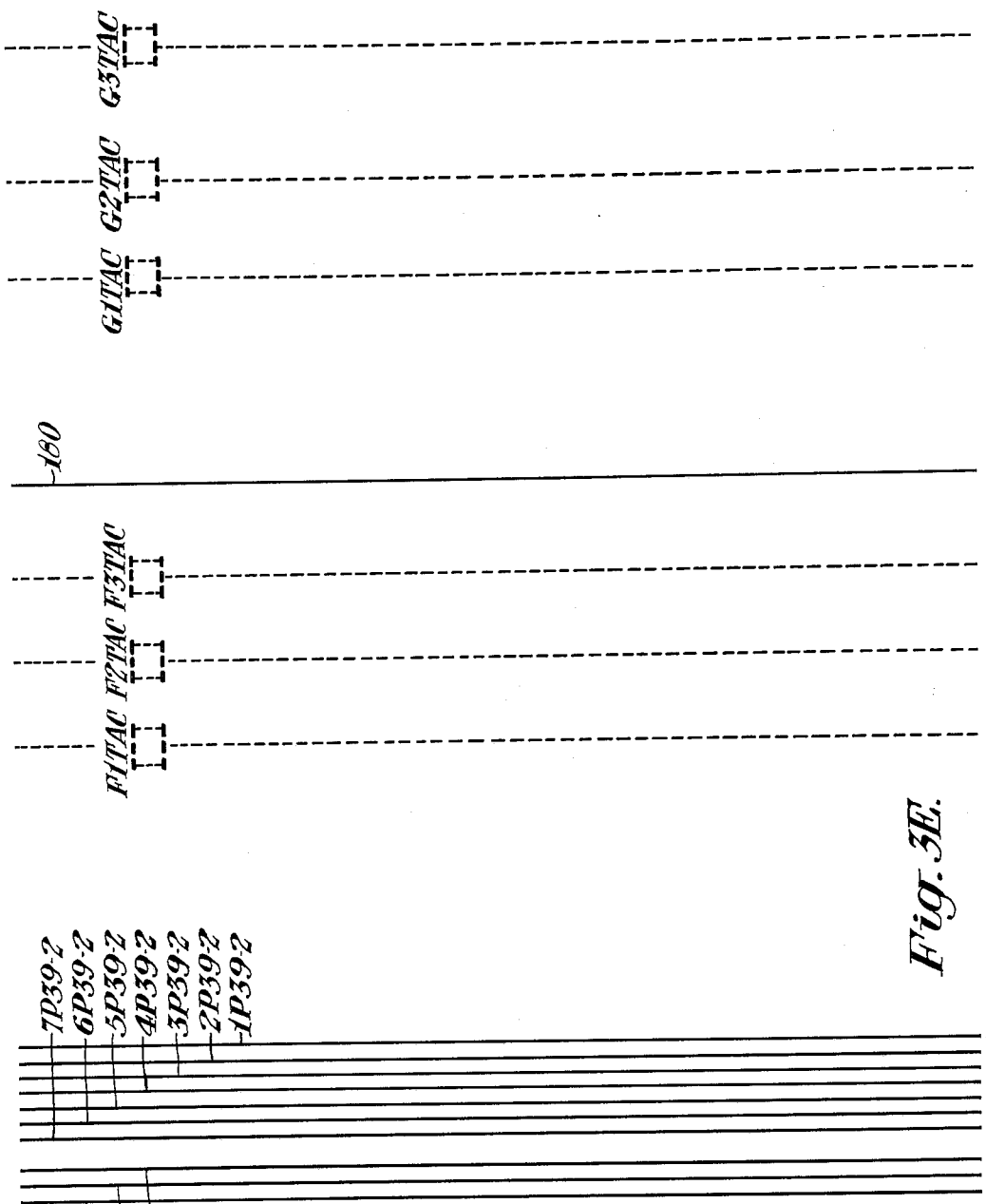
Figure 4A:
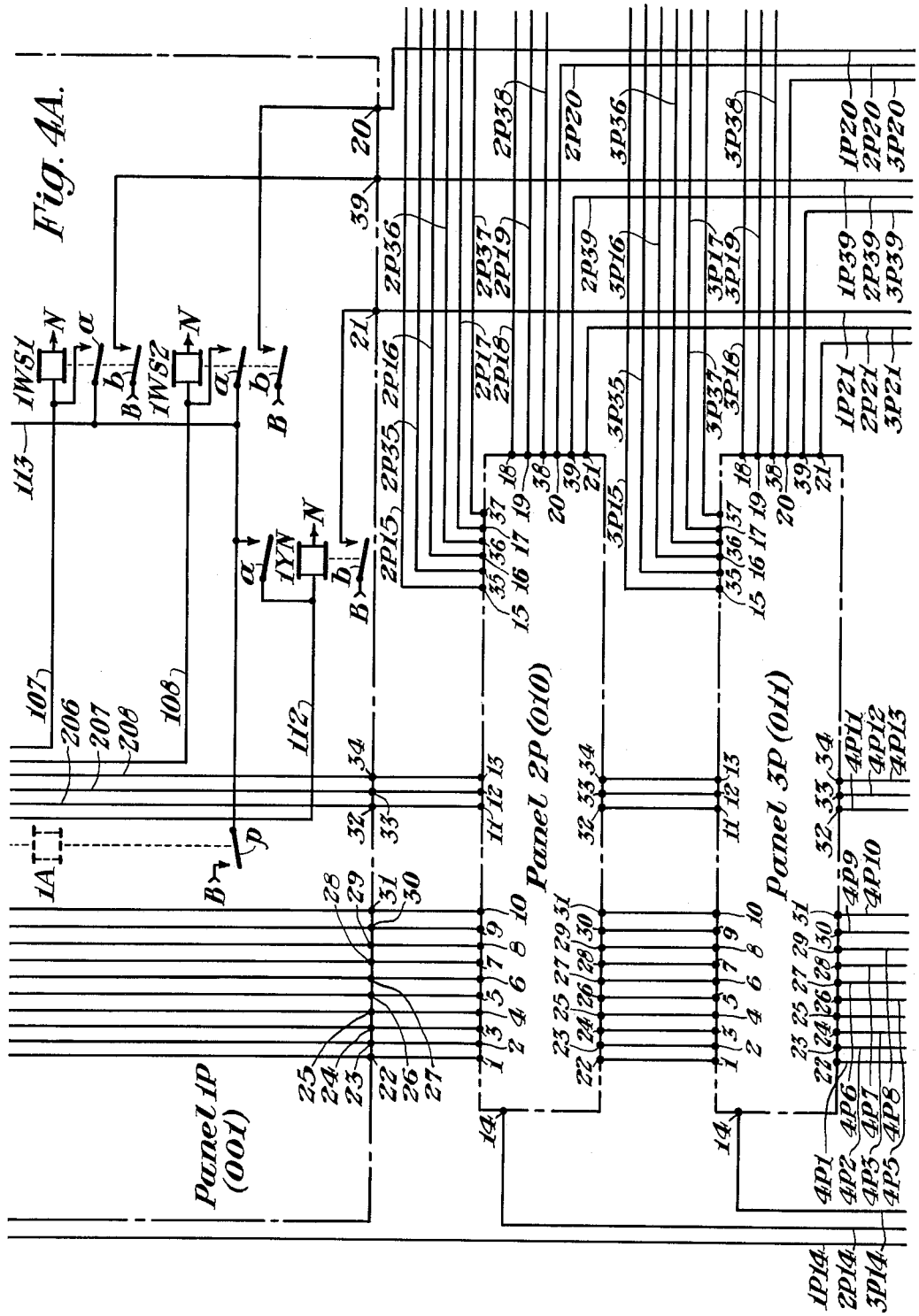
Figure 4B:
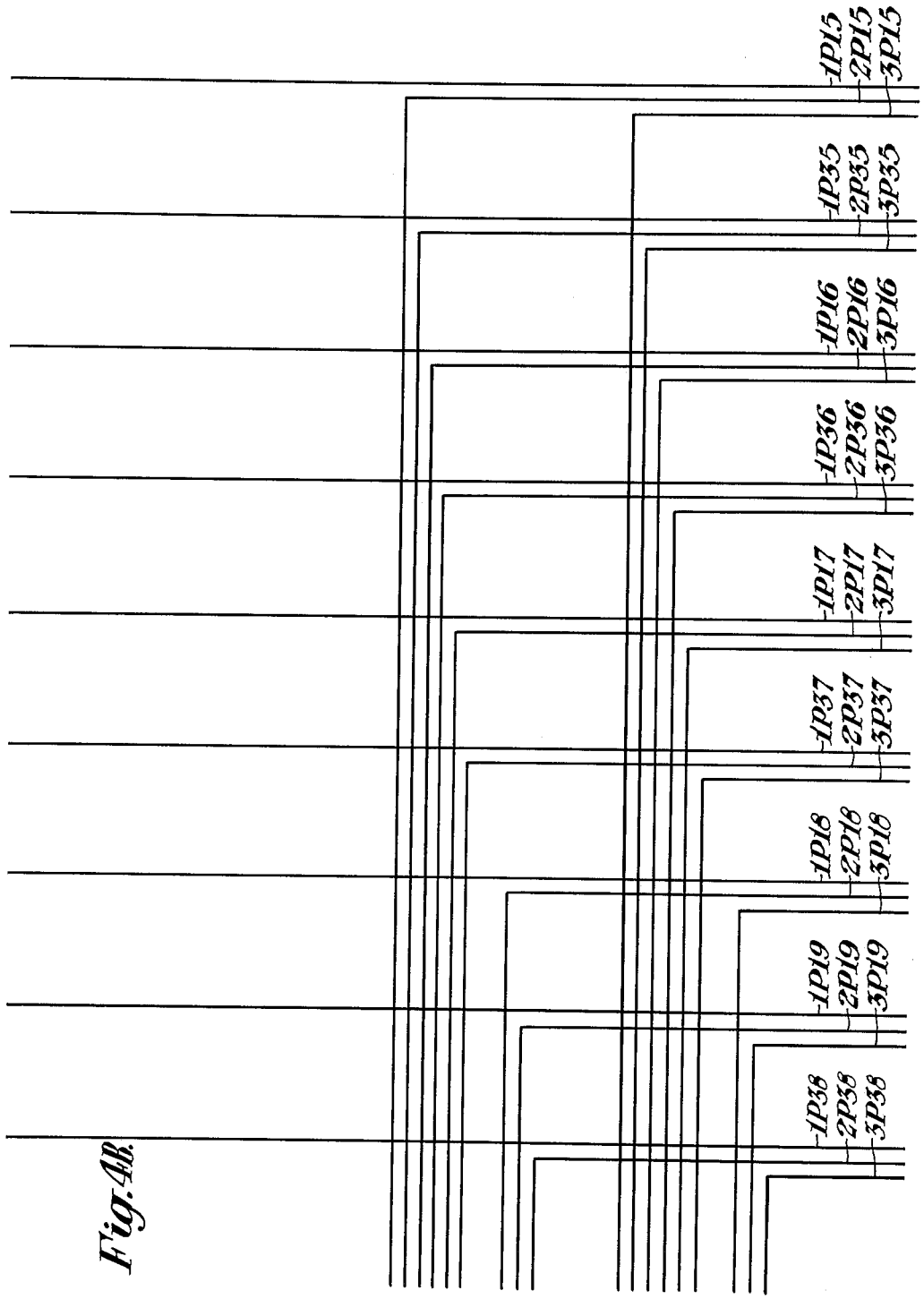
Figure 4C:
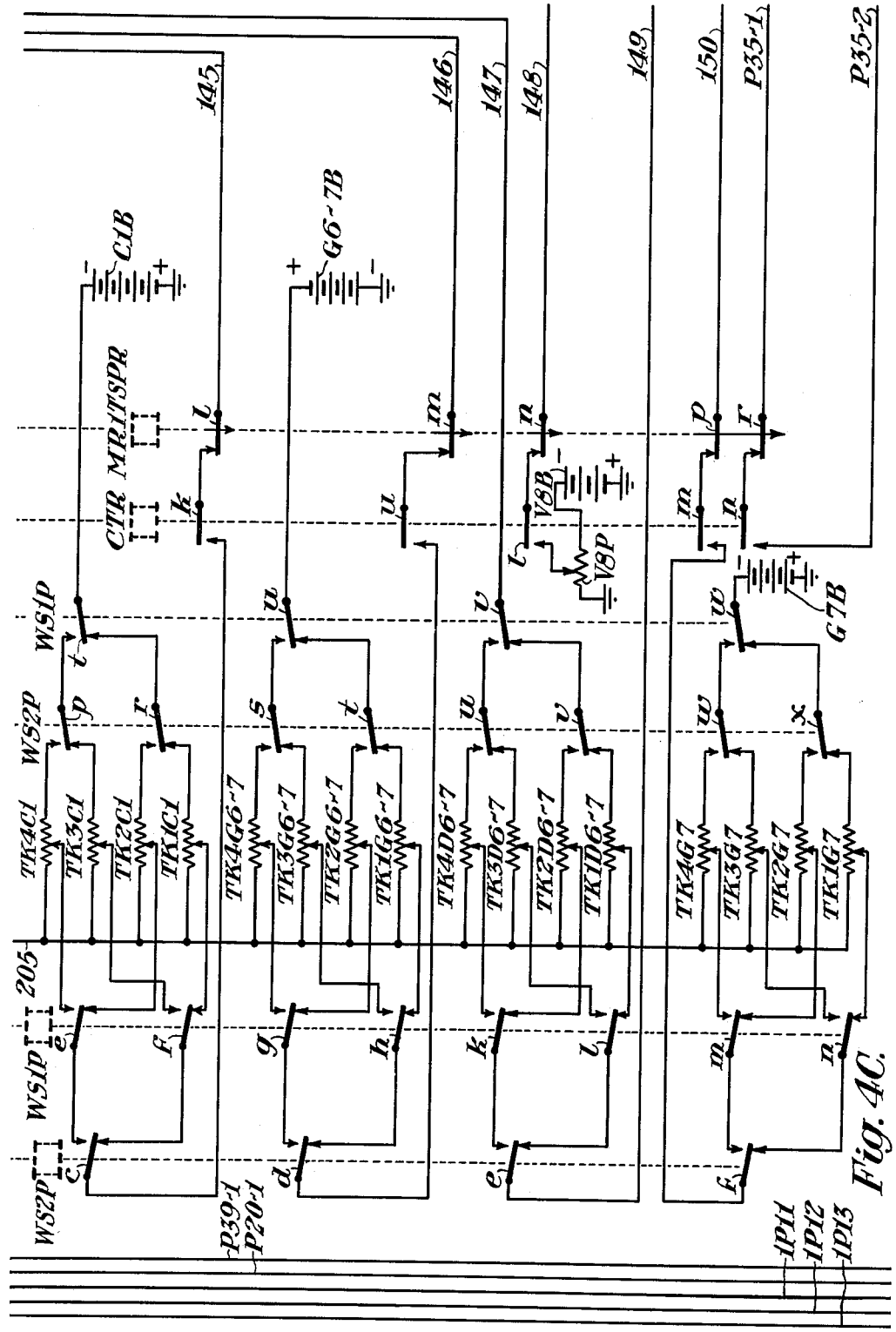
Figure 40:
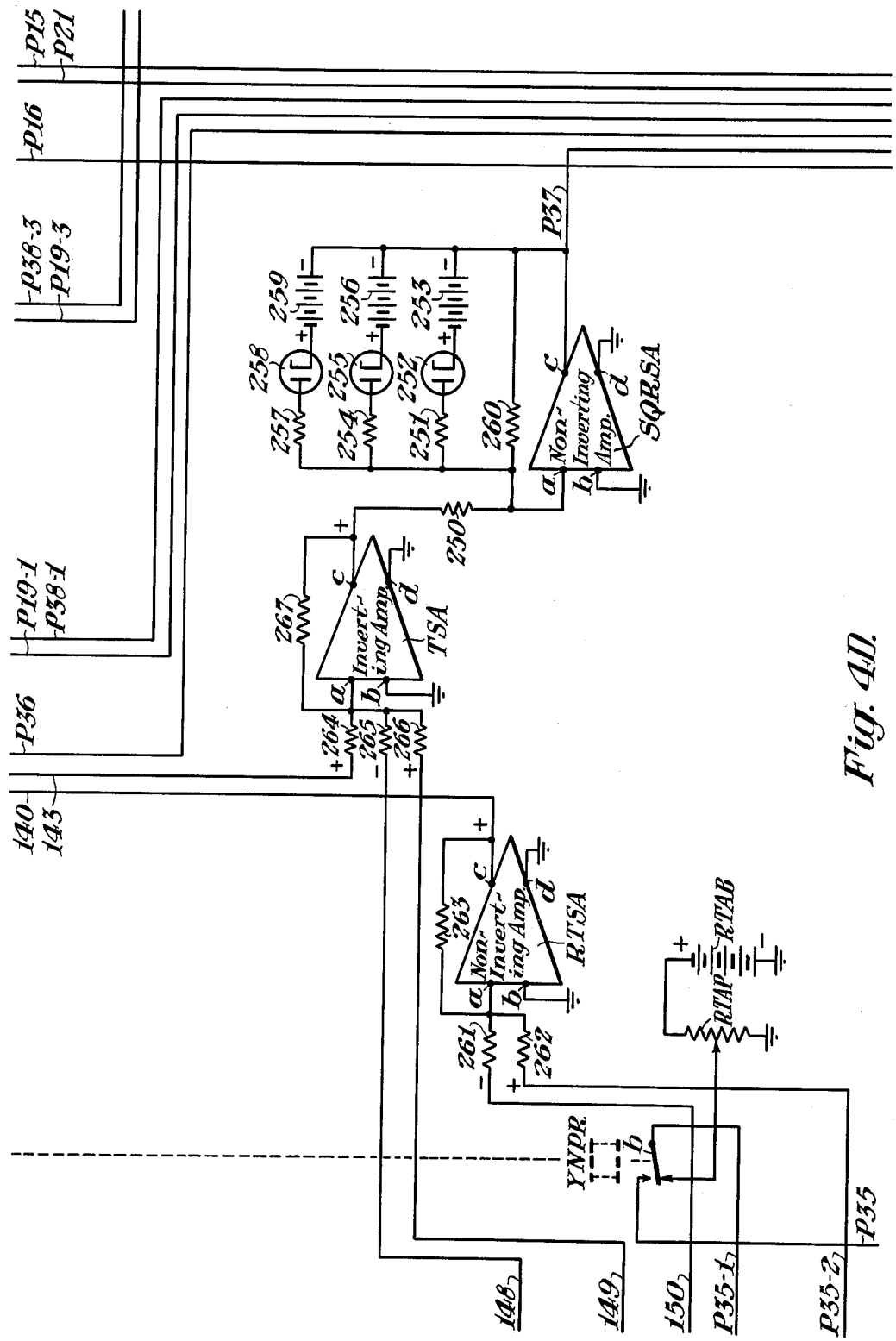
Figure 4E:
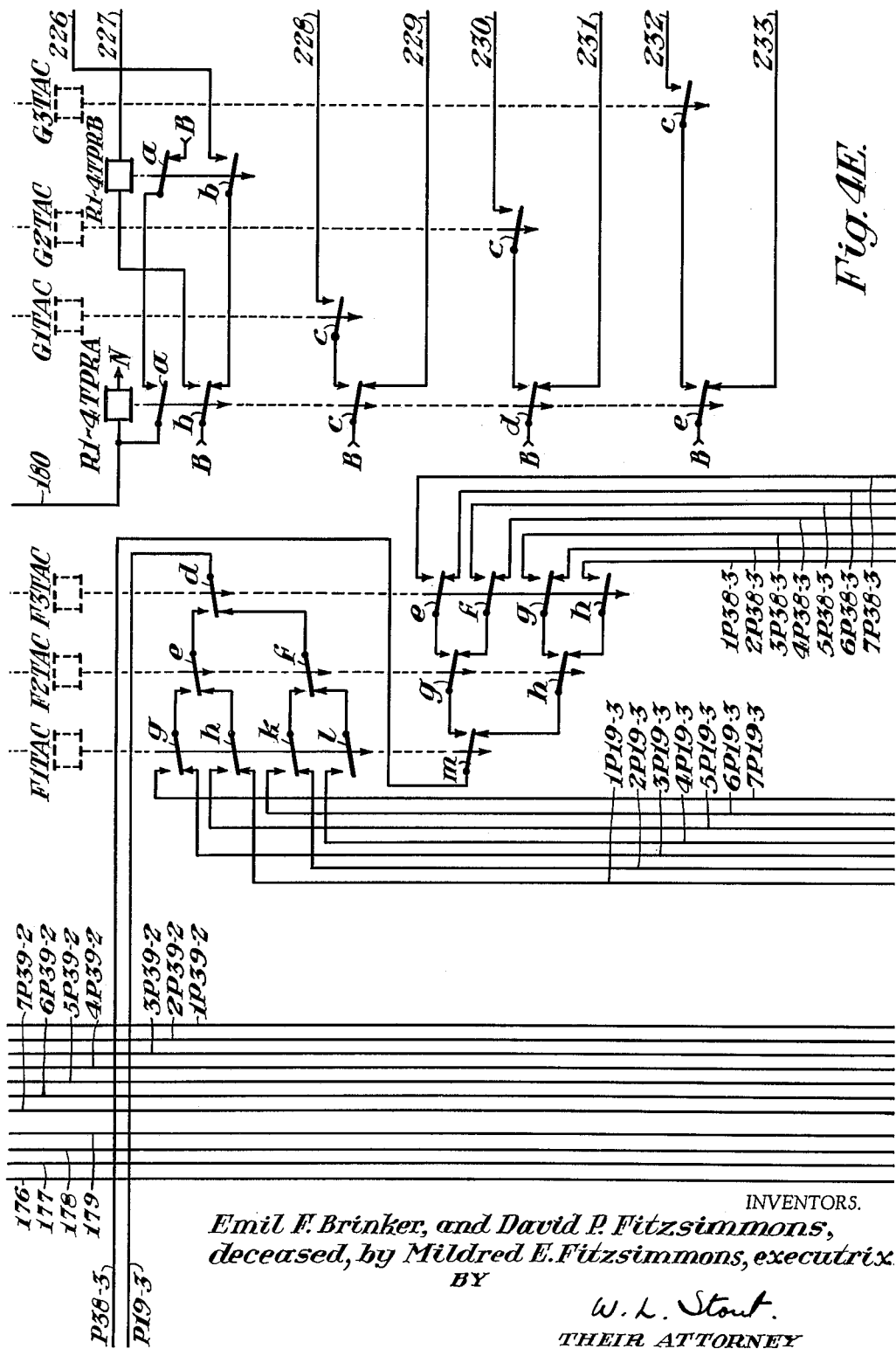
Figure 4F:
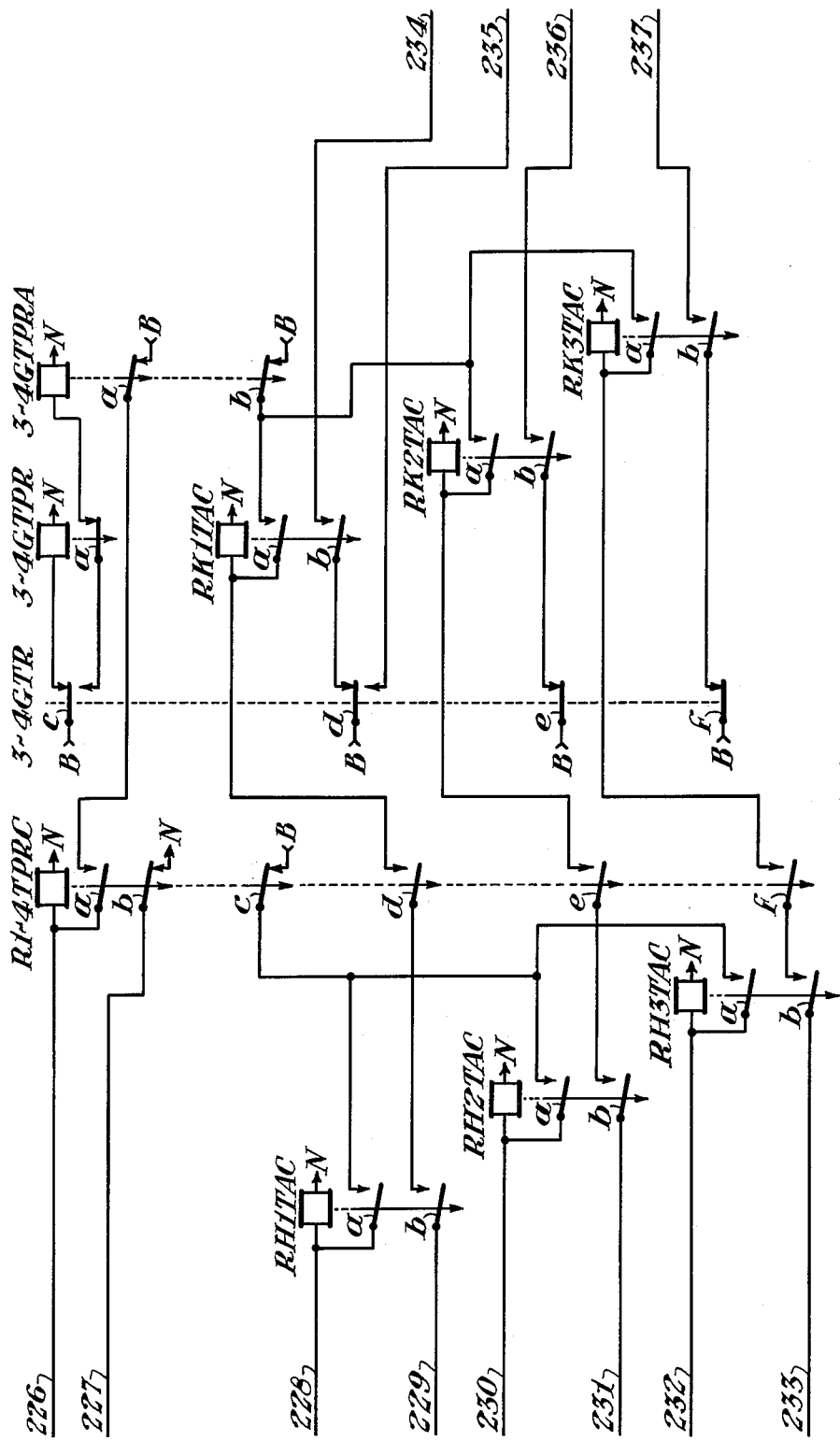
Figure 5B:
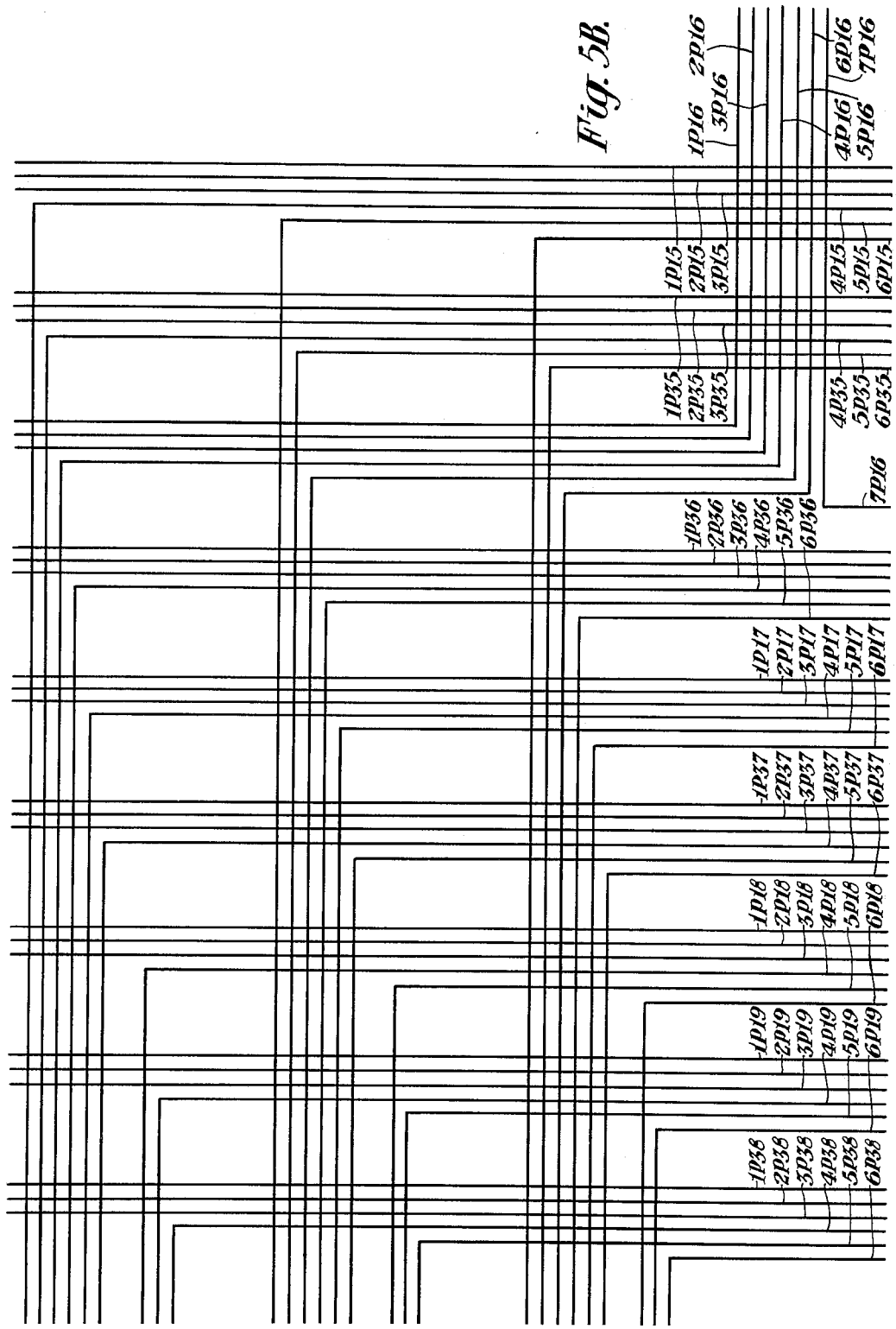
Figure 5C:
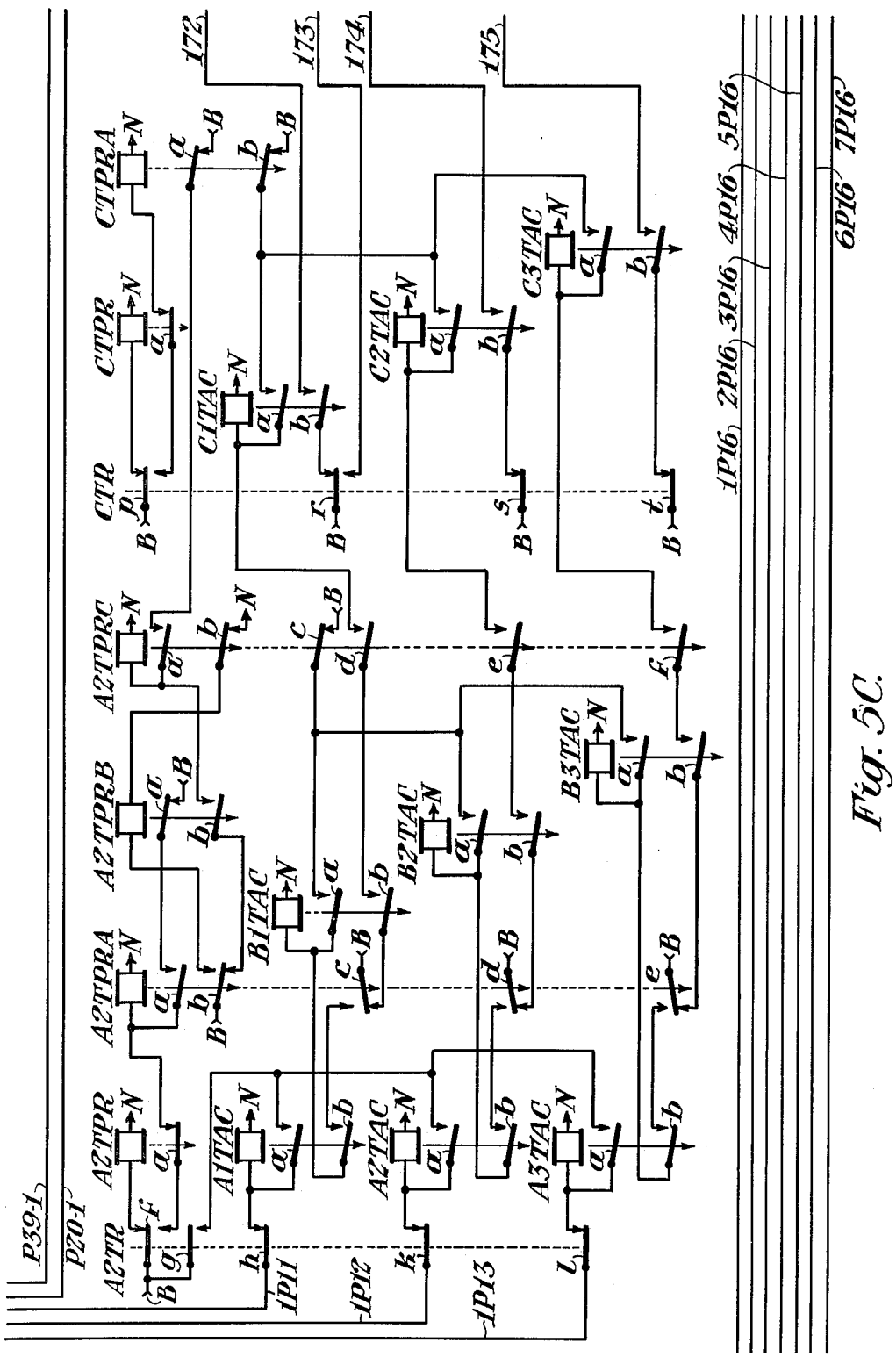
Figure 5D:
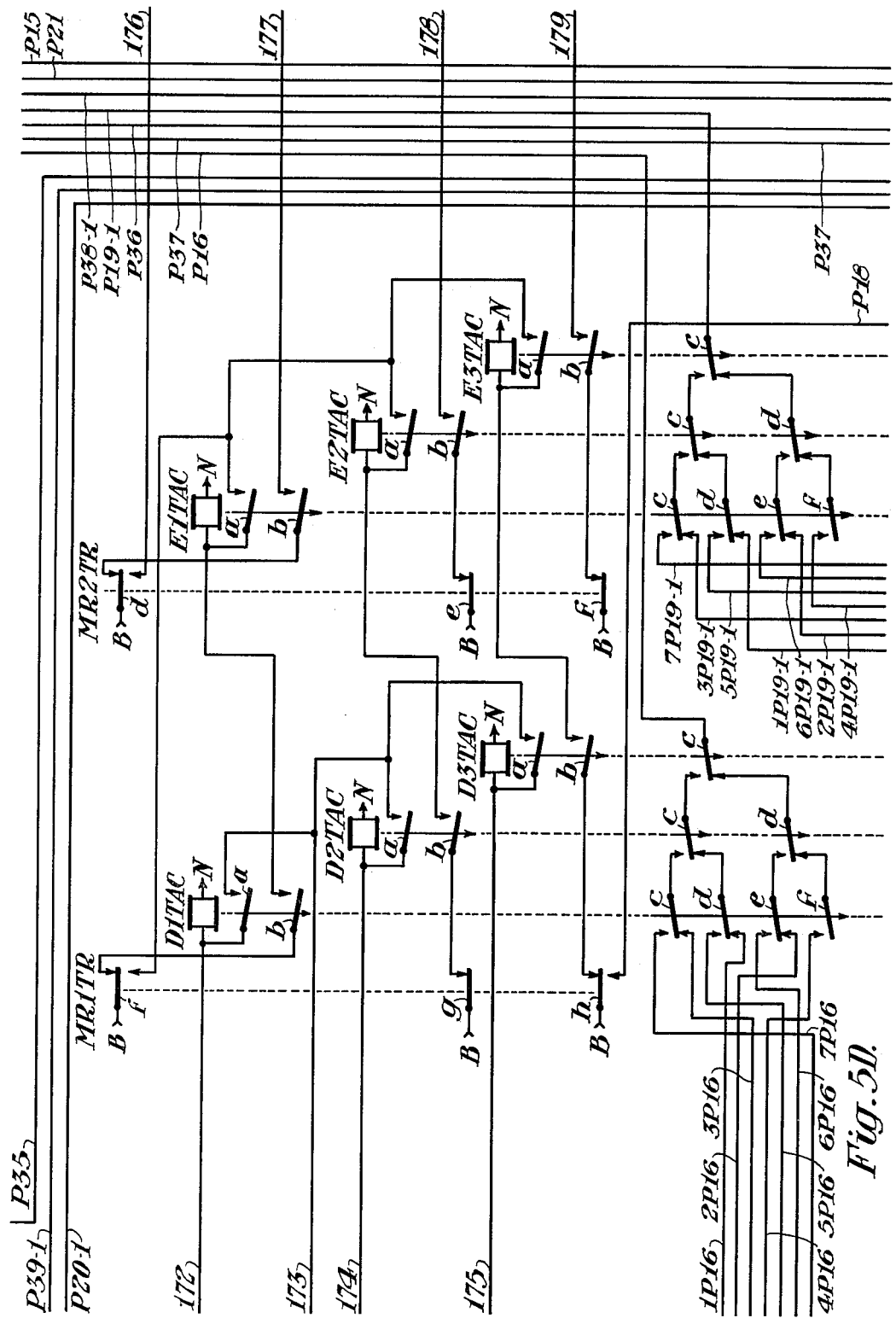
Figure 5G:
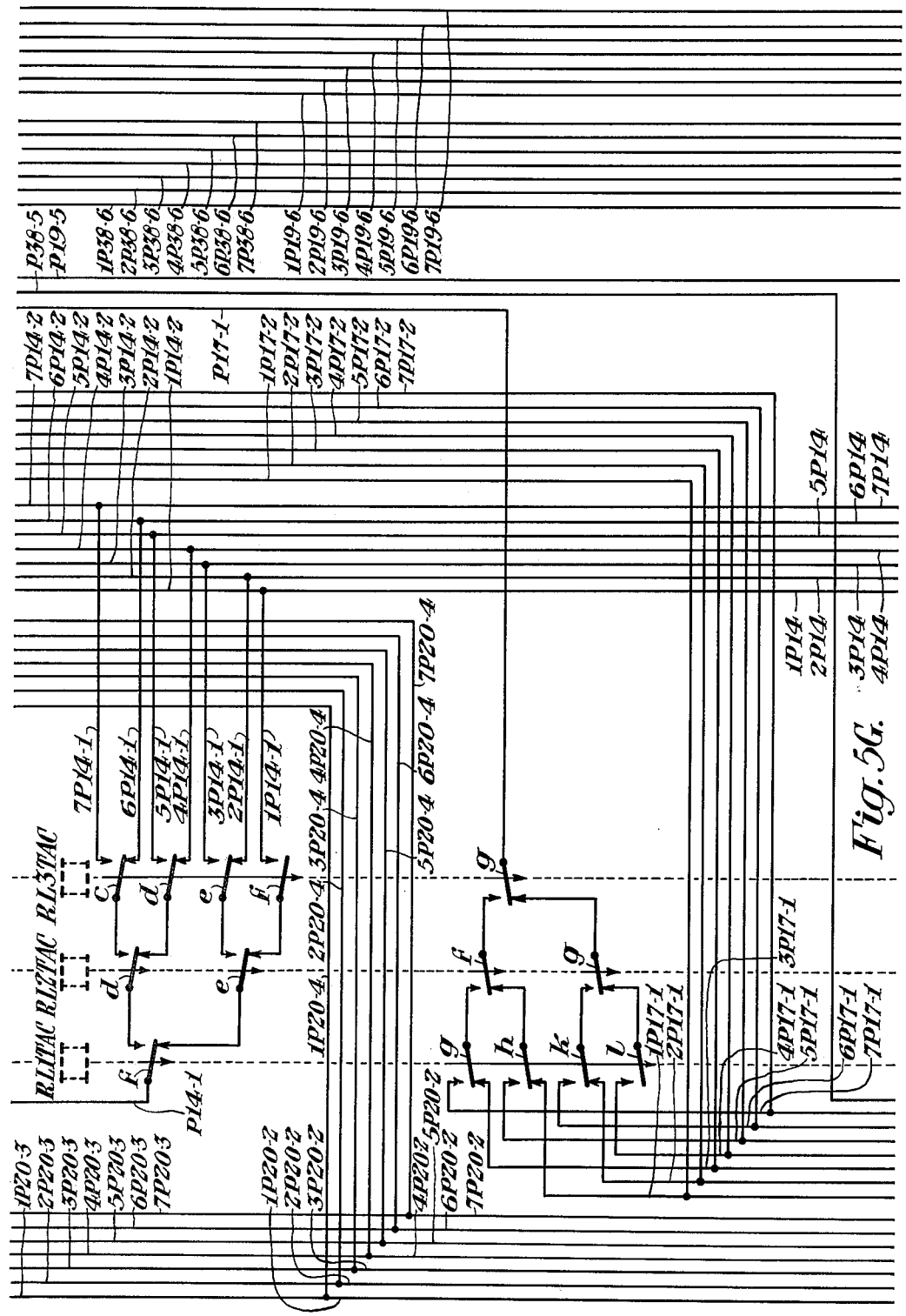
Figure 6A:
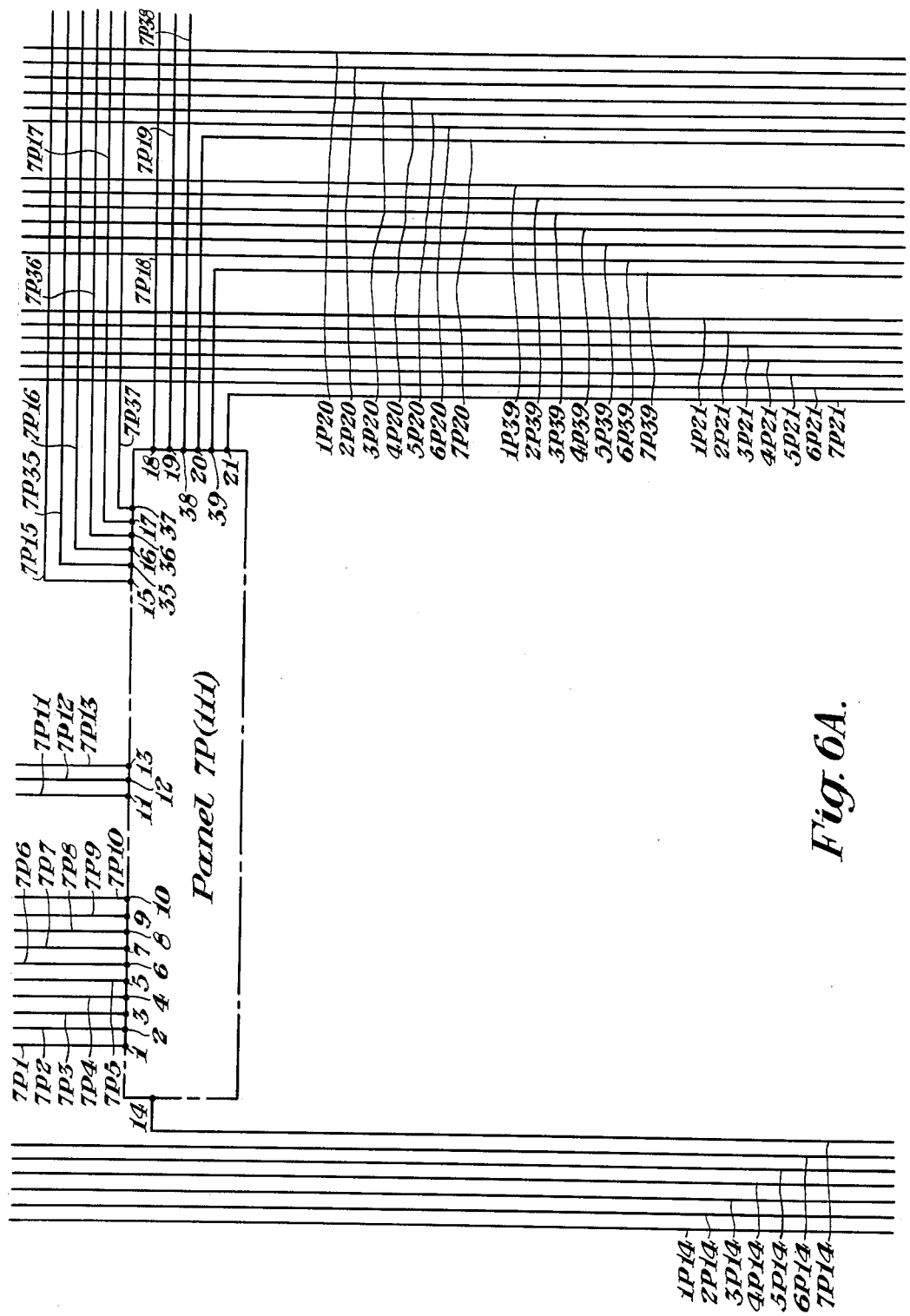
Figure 6B:
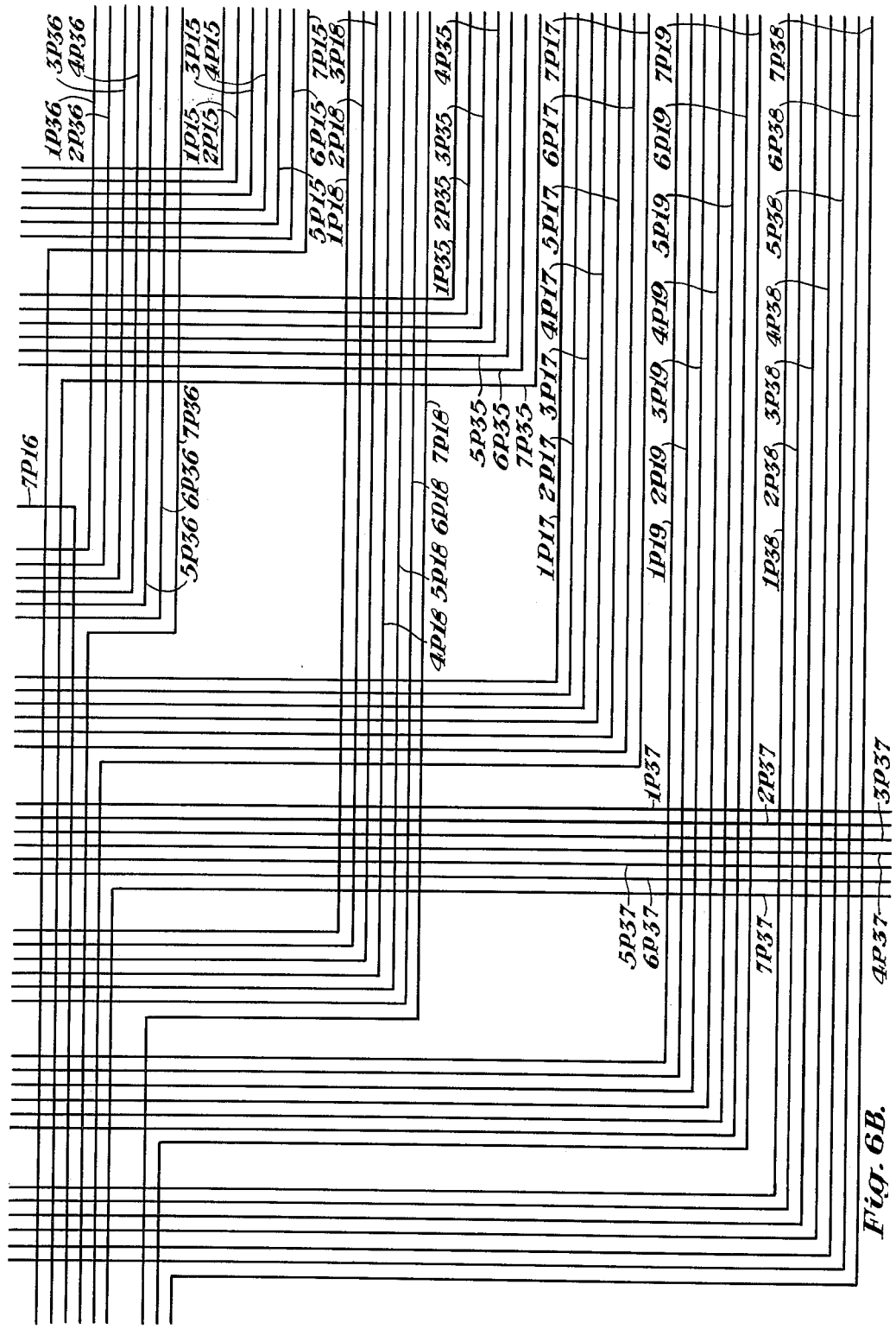
Figure 6C:
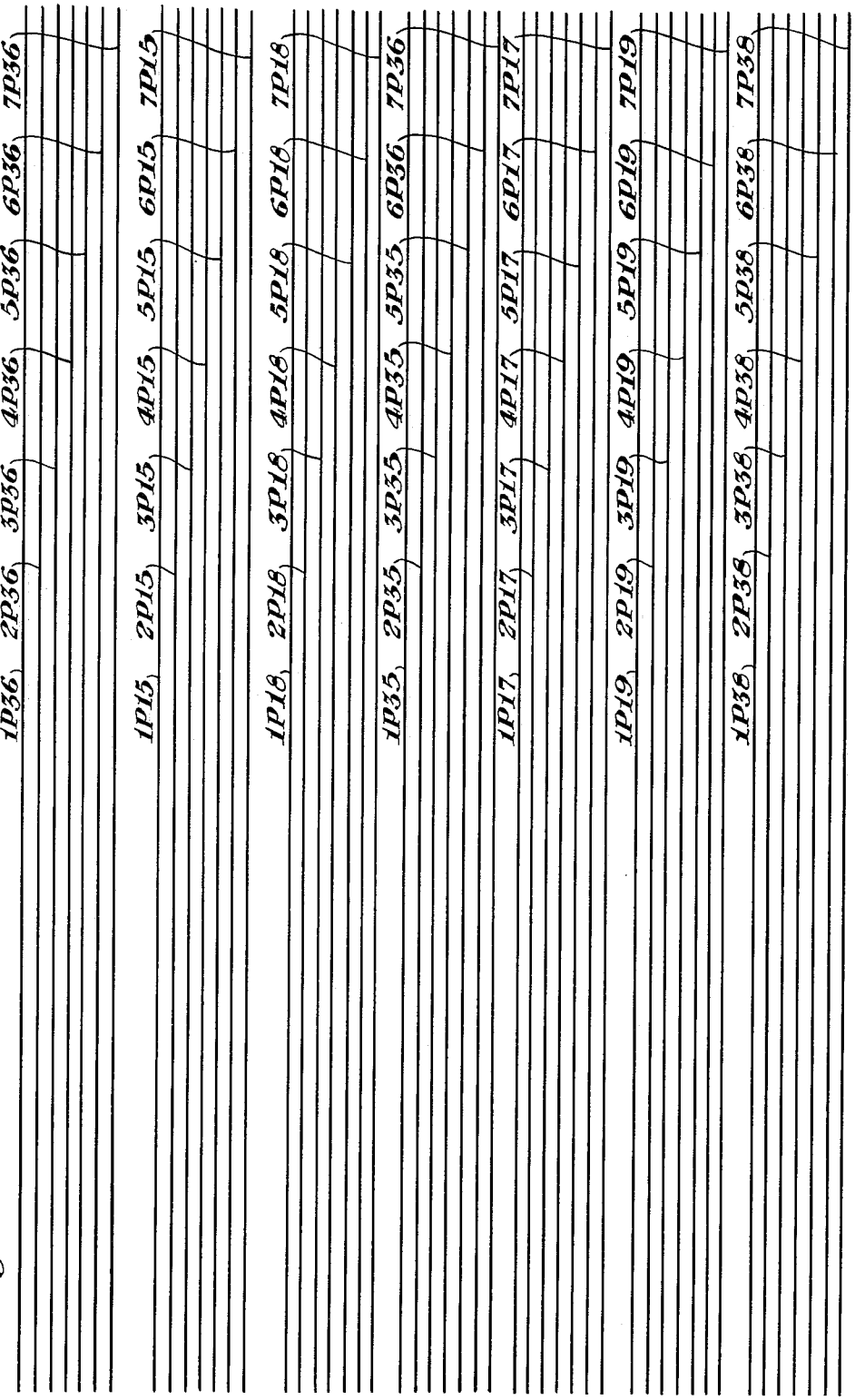
Figure 6D:
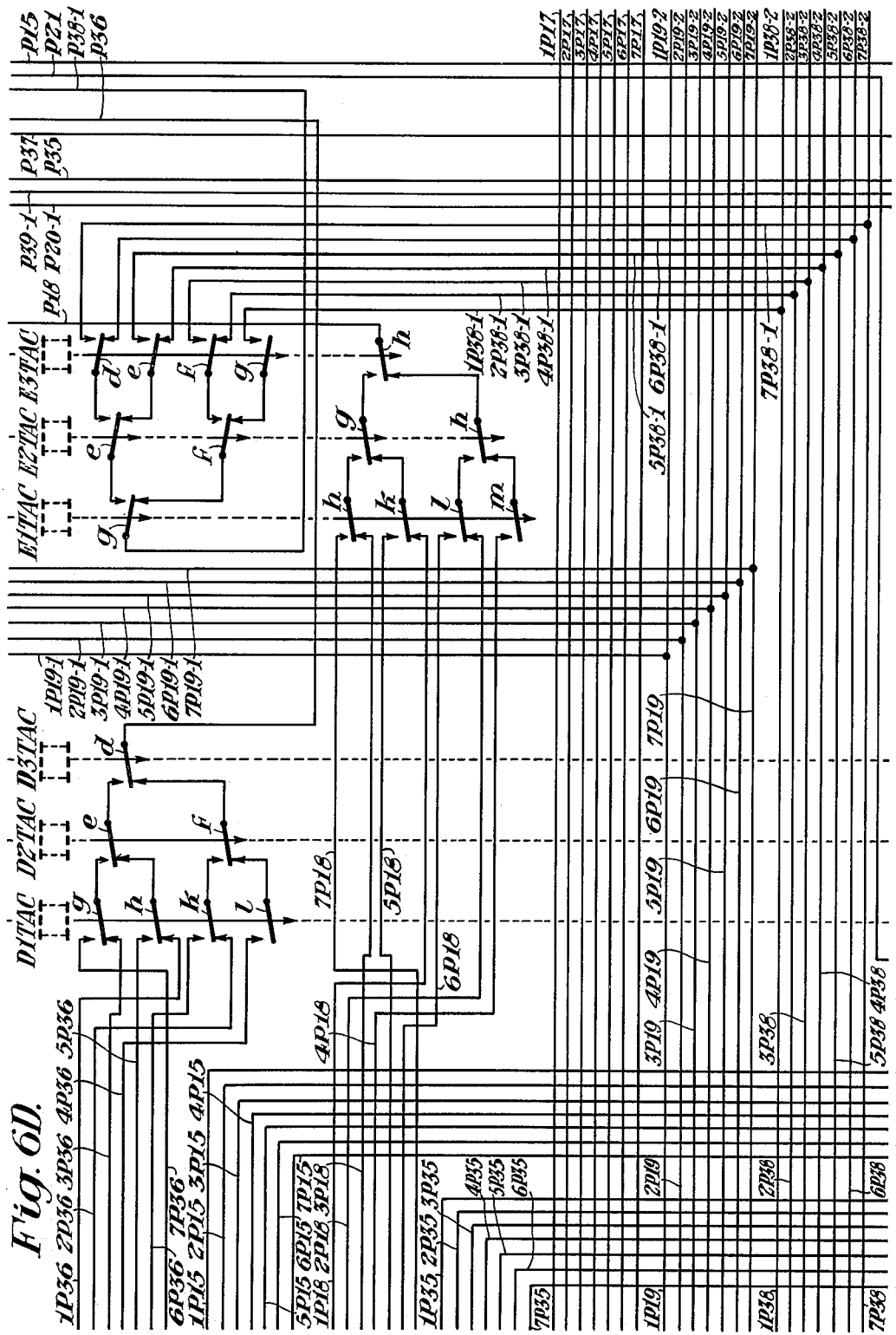
Figure 6E:
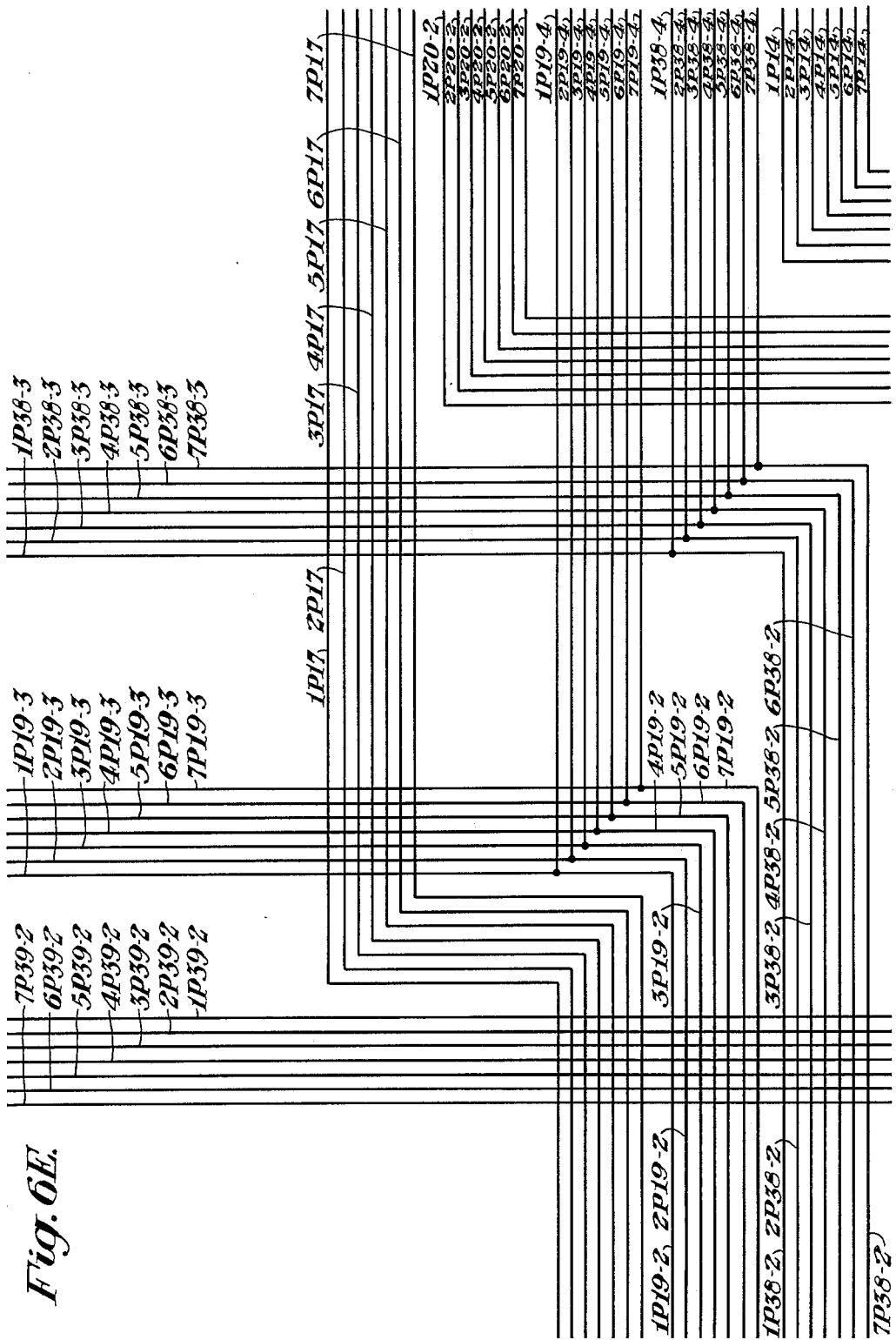
Figure 6F:
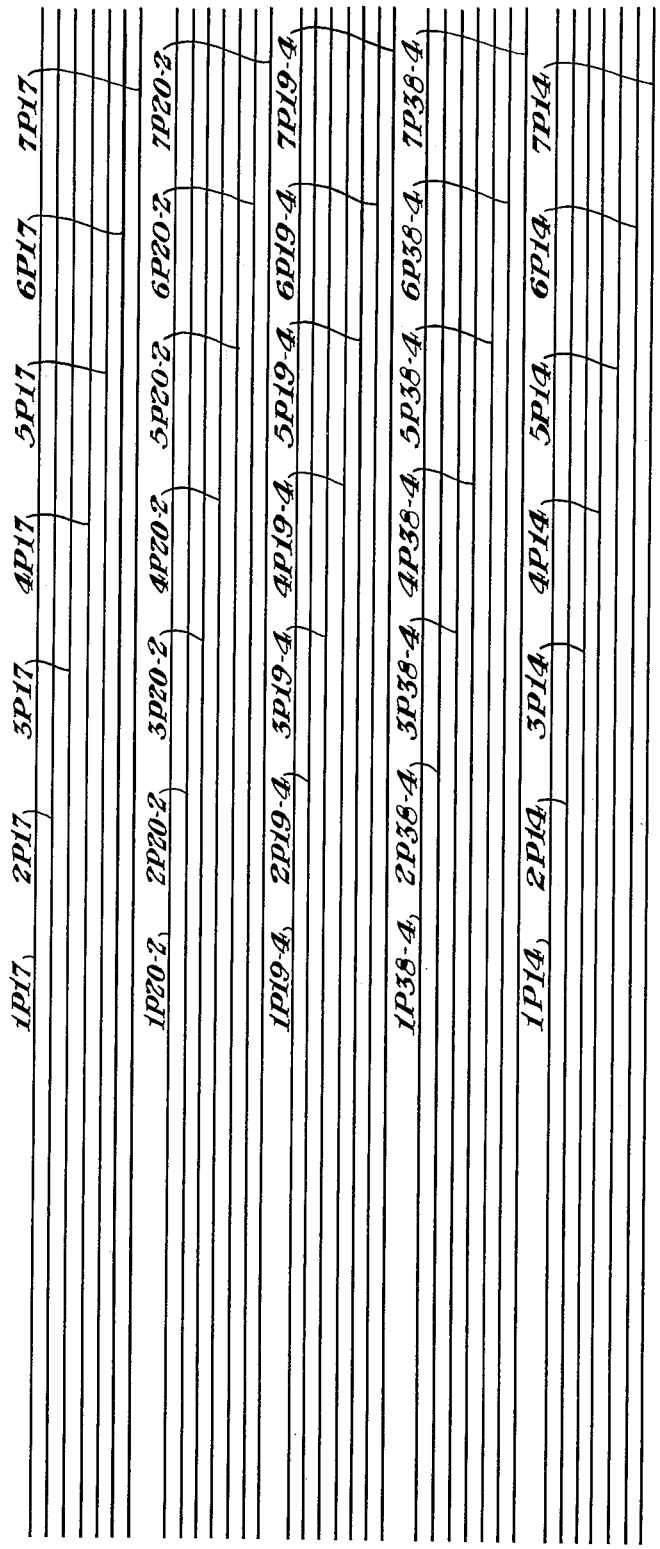
Figure 6G:
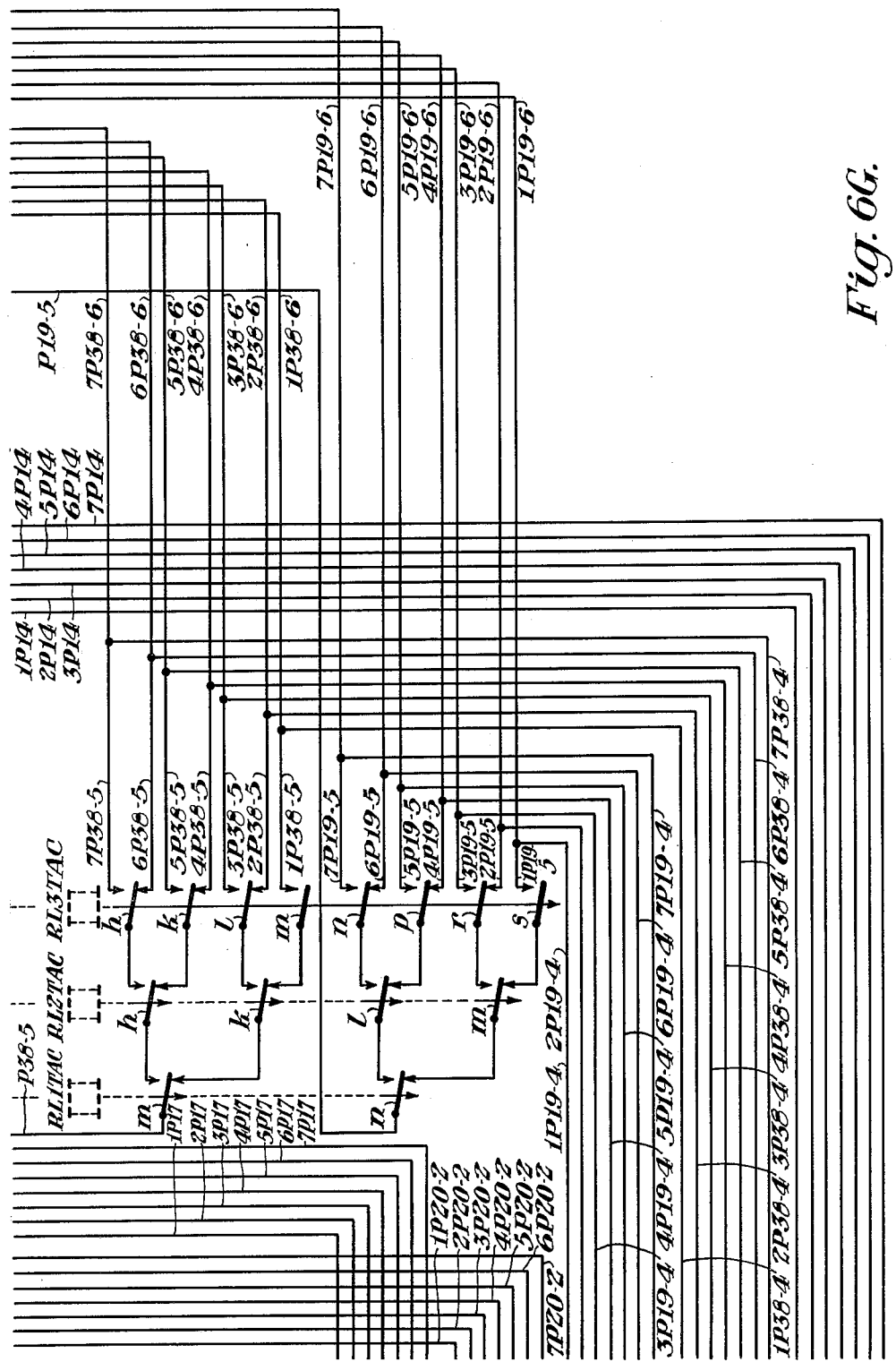
Figure 7A:
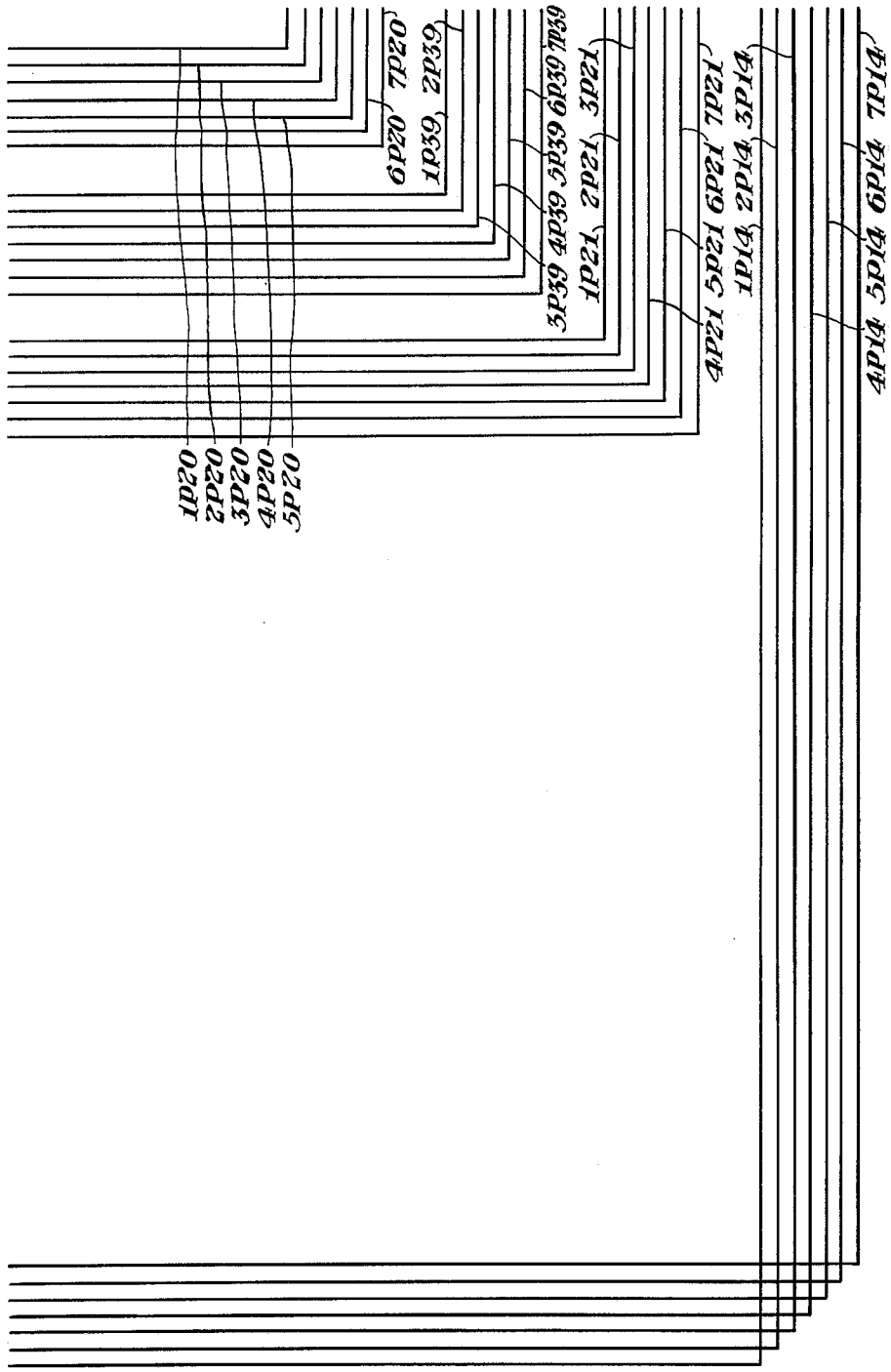
Figure 7B:
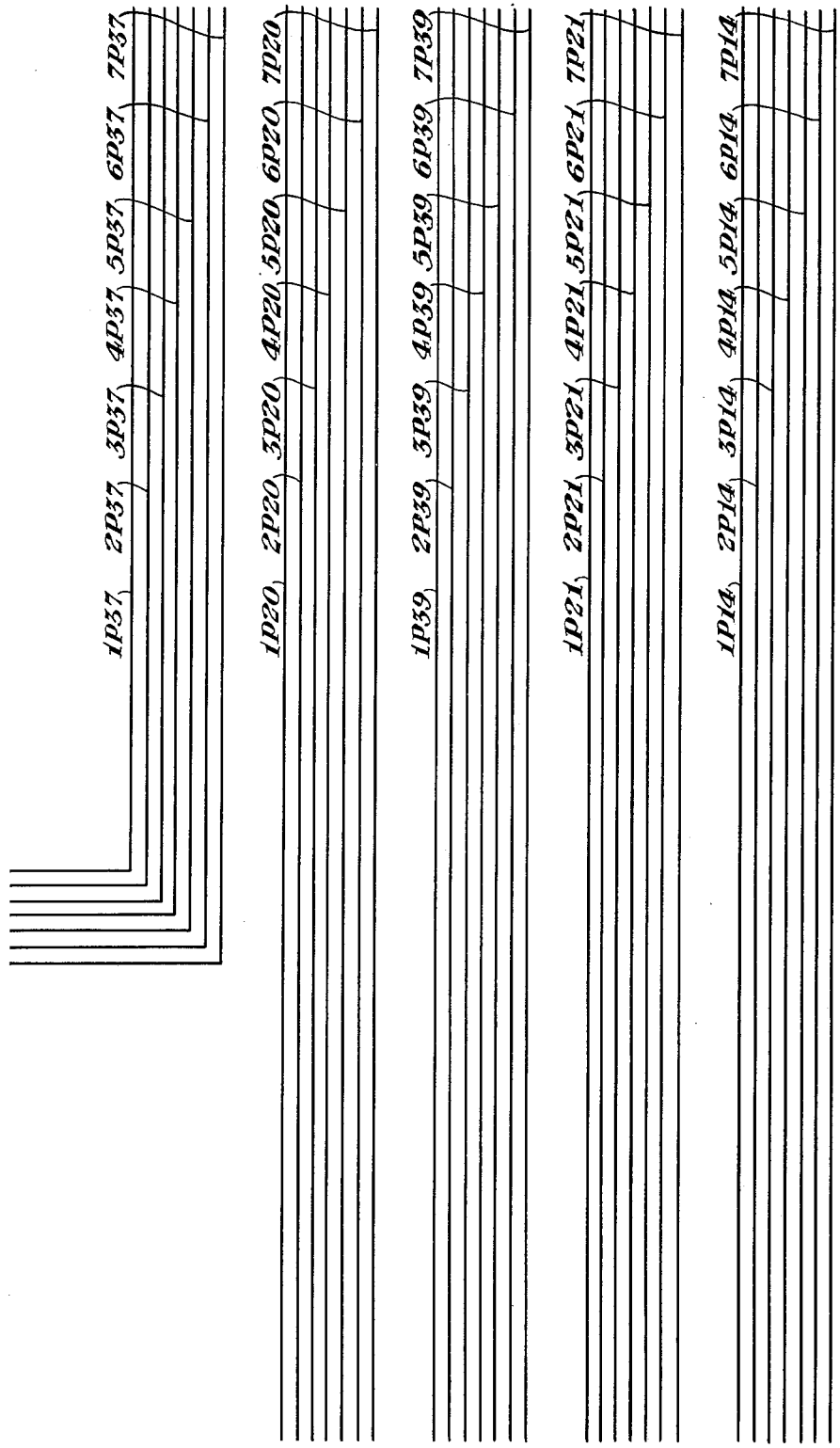
Figure 7C:
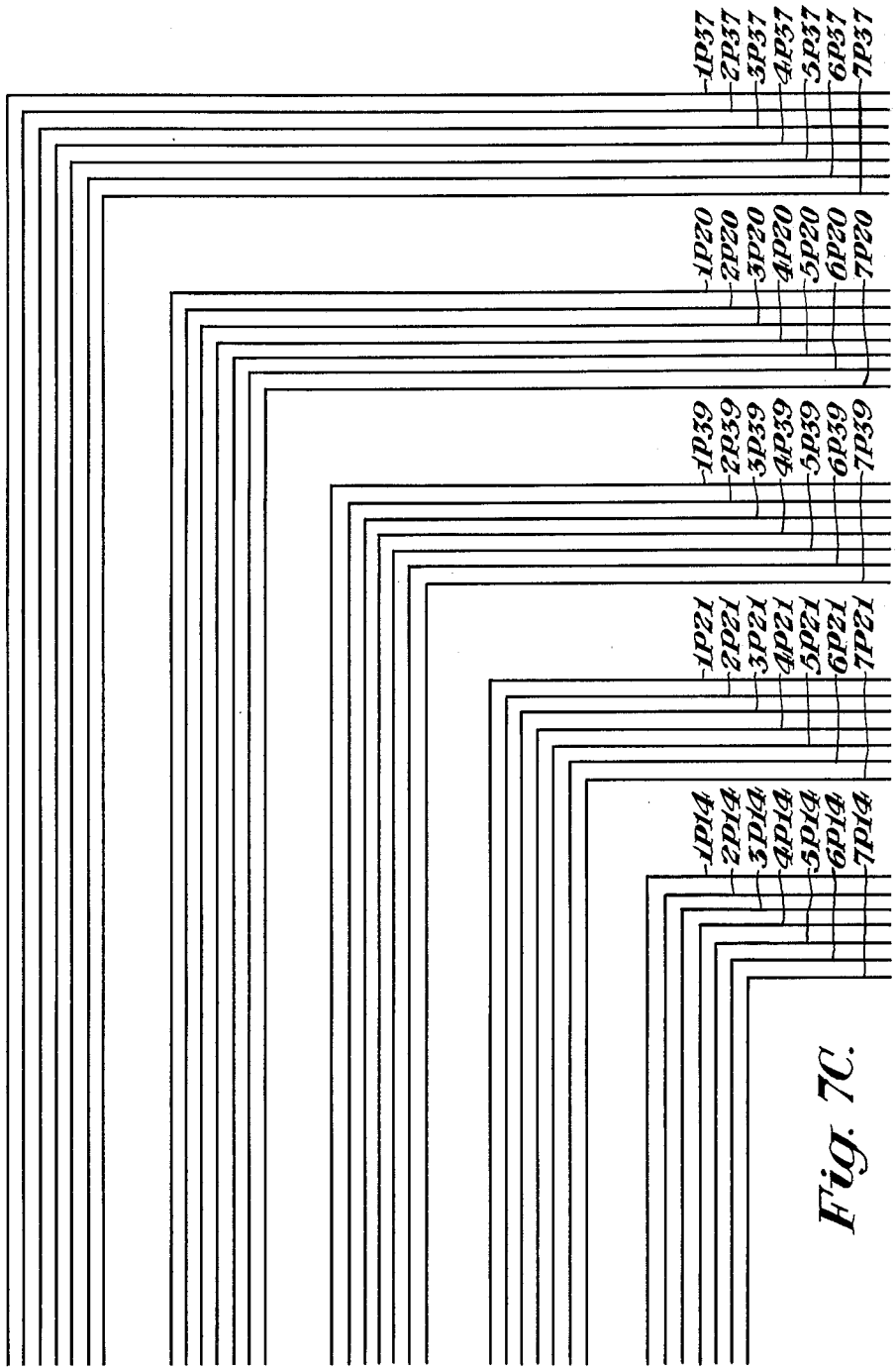
Figure 7D:
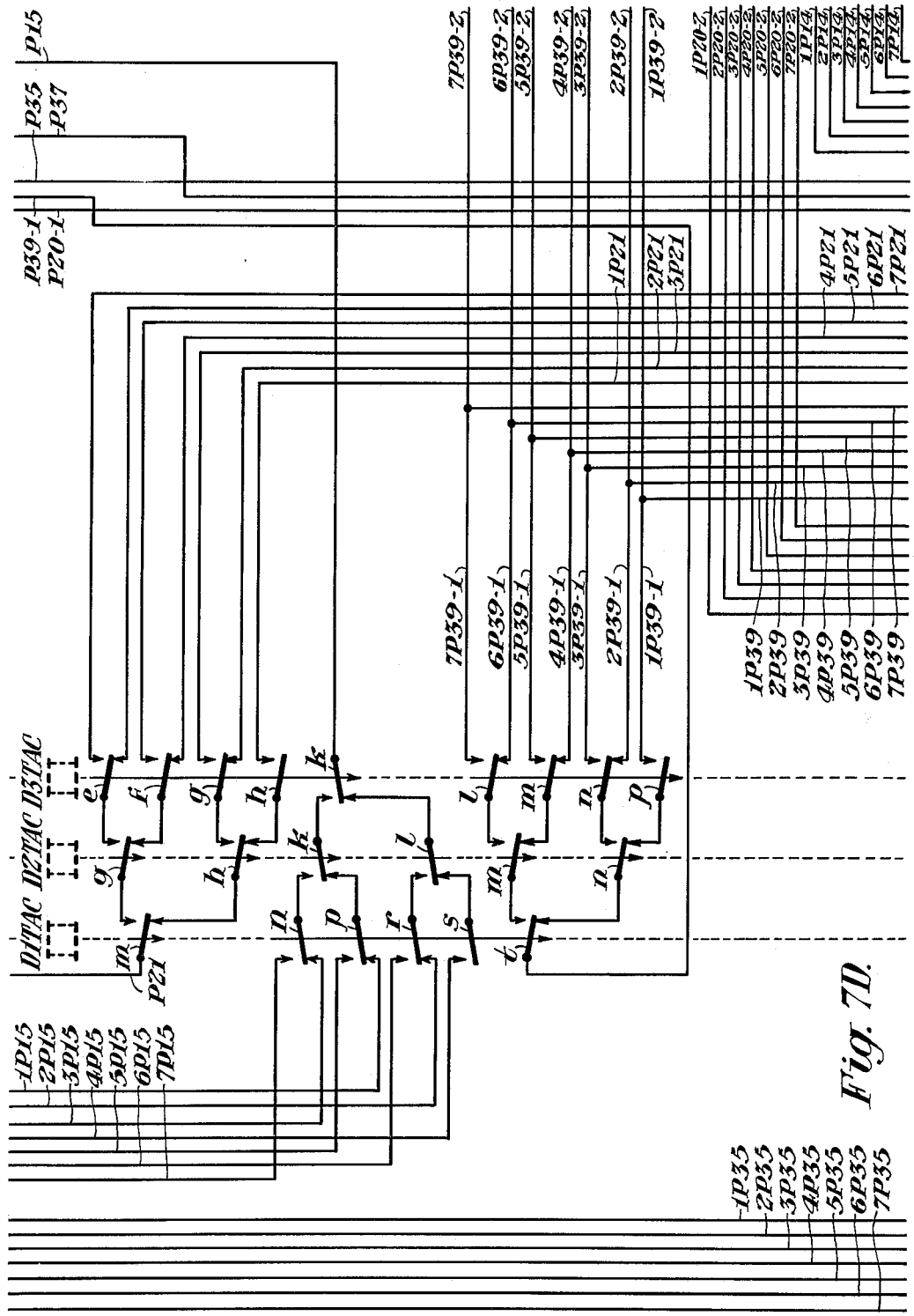
Figure 7E:
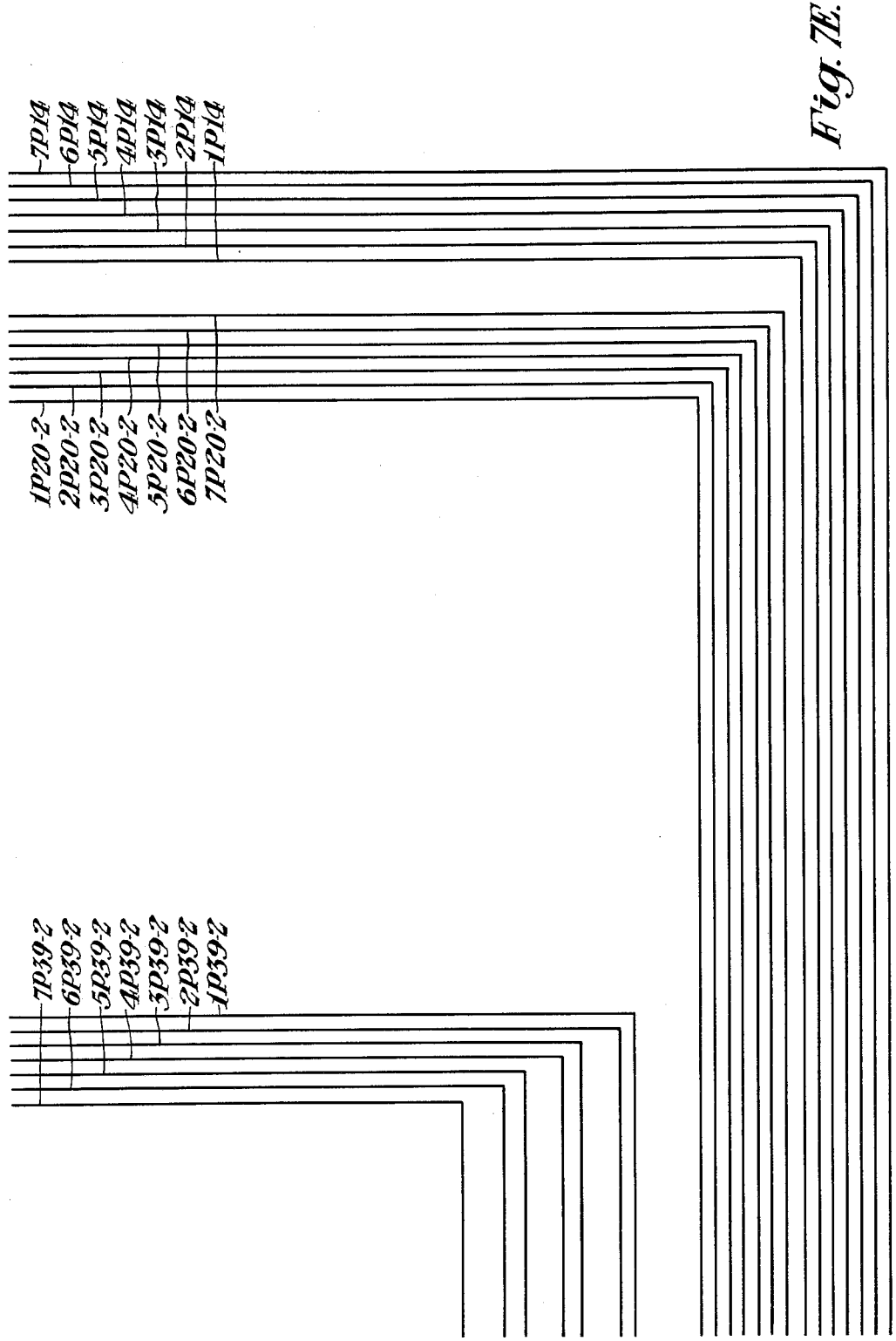
Figure 8C:
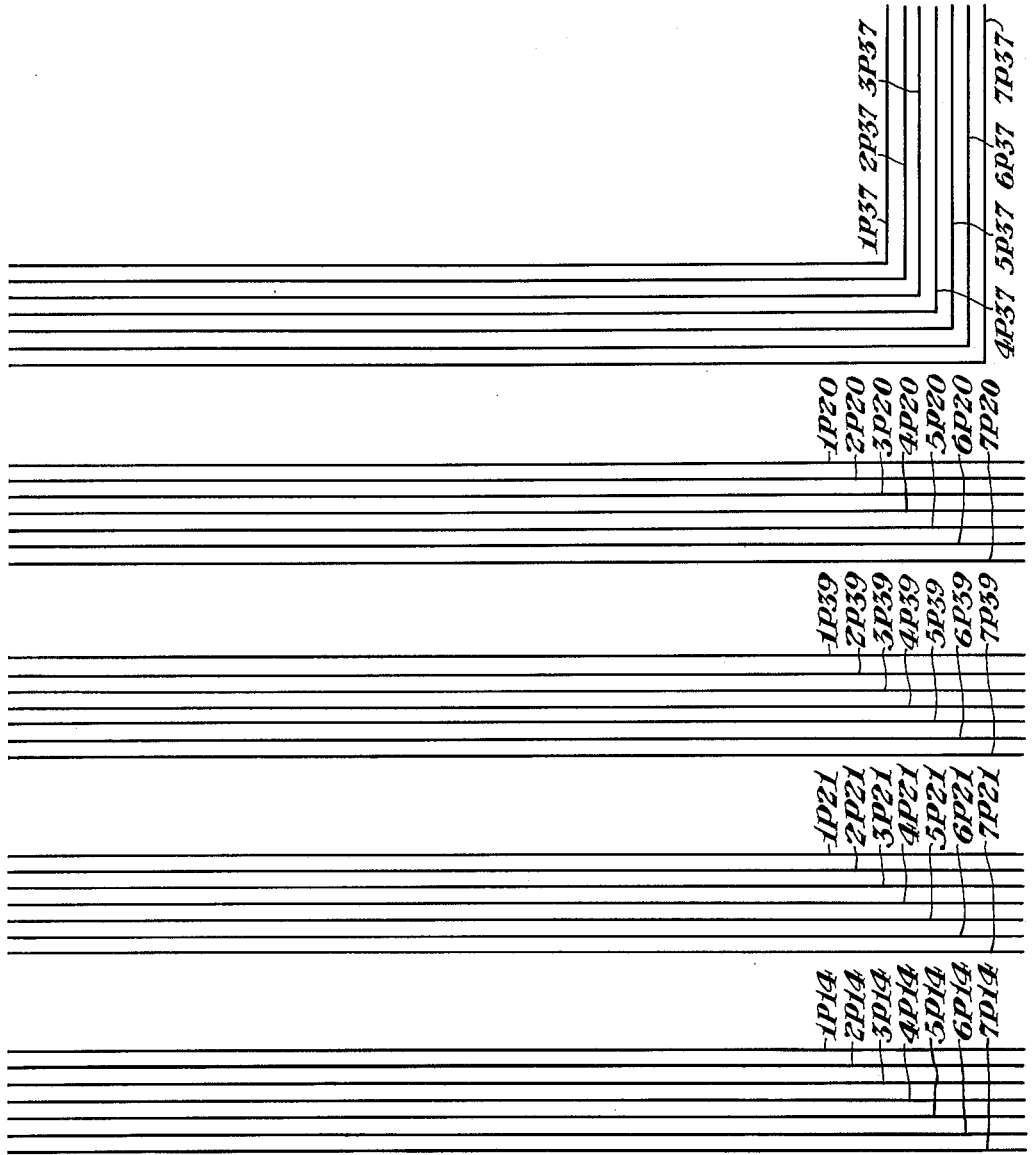
Figure 8D:
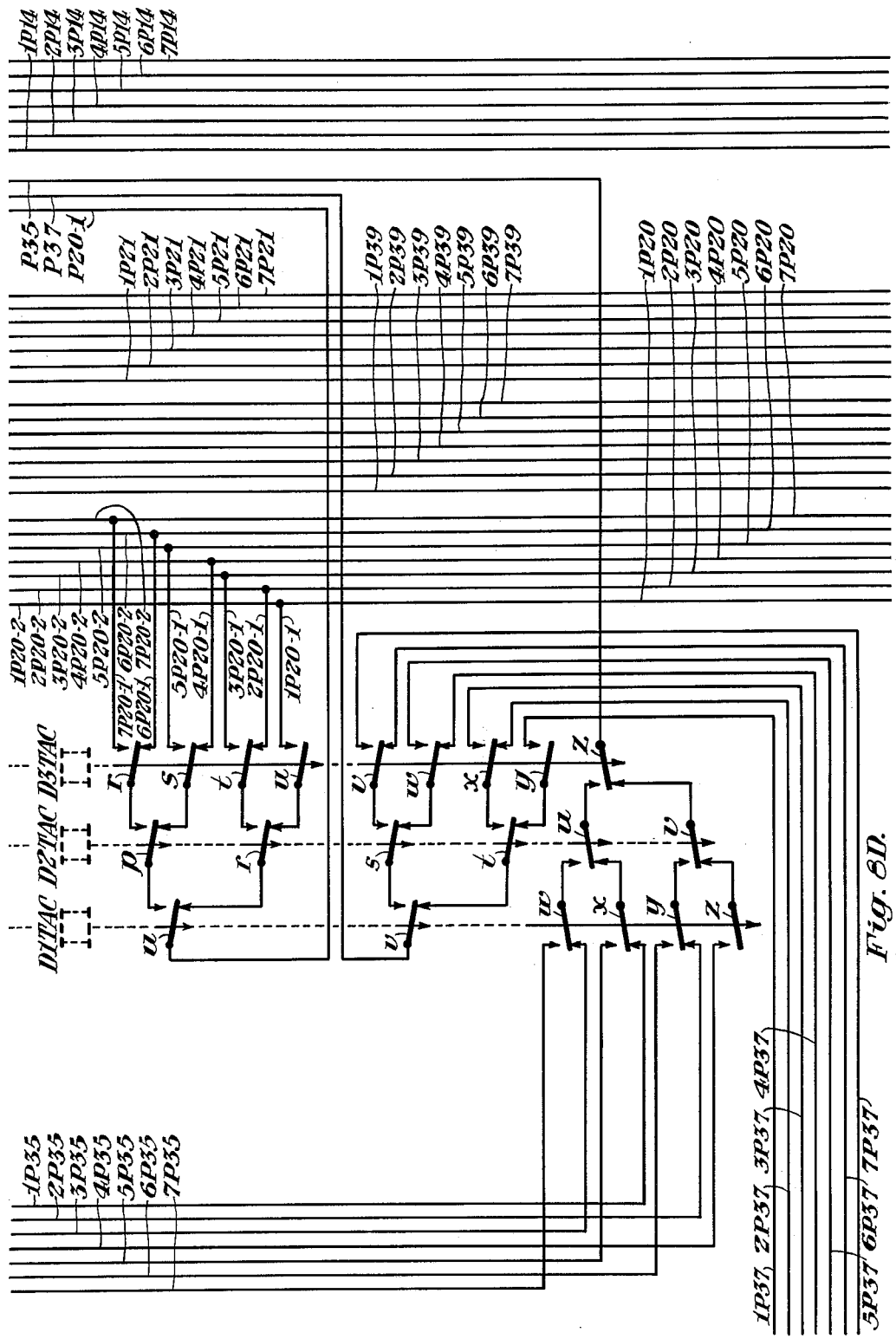
Figure 9C:
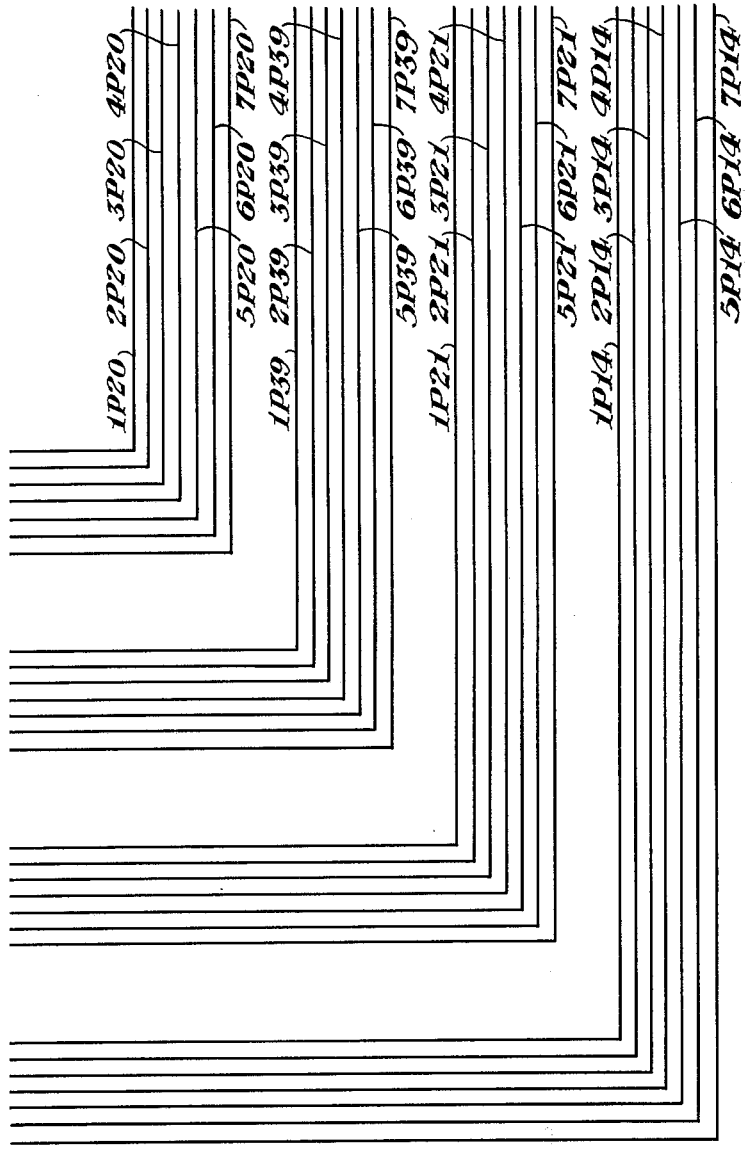
Figure 9D:
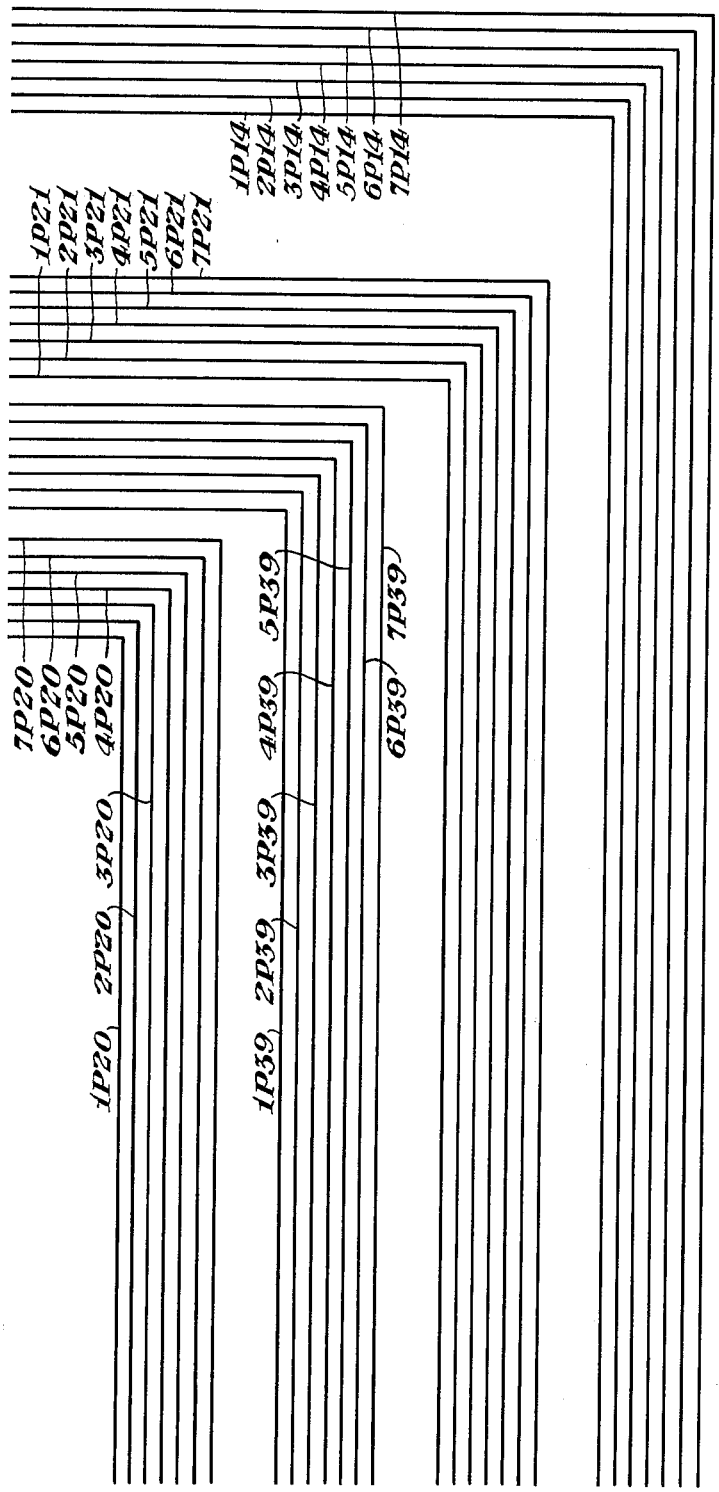

|  | Fig. 1B. | Fig. 1C. | Fig. 1D. | Fig. 1E. | Fig. 1F. | Fig. 1G. |
|---|---|---|---|---|---|---|
| Fig. 2A. | Fig. 2B. | Fig. 2C. | Fig. 2D. | Fig. 2E. | Fig. 2F. | Fig. 2G. |
| Fig. 3A. | Fig. 3B. | Fig. 3C. | Fig. 3D. | Fig. 3E. |  | Fig. 3G. |
| Fig. 4A. | Fig. 4B. | Fig. 4C. | Fig. 4D. | Fig. 4E. | Fig. 4F. | Fig. 4G. |
| Fig. 5A. | Fig. 5B. | Fig. 5C. | Fig. 5D. | Fig. 5E. |  | Fig. 5G. |
| Fig. 6A. | Fig. 6B. | Fig. 6C. | Fig. 6D. | Fig. 6E. | Fig. 6F. | Fig. 6G. |
| Fig. 7A. | Fig. 7B. | Fig. 7C. | Fig. 7D. | Fig. 7E. |  |  |
|  |  | Fig. 8C. | Fig. 8D. |  |  |  |
|  |  | Fig. 9C. | Fig. 9D. |  |  |  |

*Fig. 10.*

INVENTORS.
Emil F. Brinker, and David P. Fitzsimmons,
deceased, by Mildred E. Fitzsimmons, executrix
BY W. L. Stout.
THEIR ATTORNEY

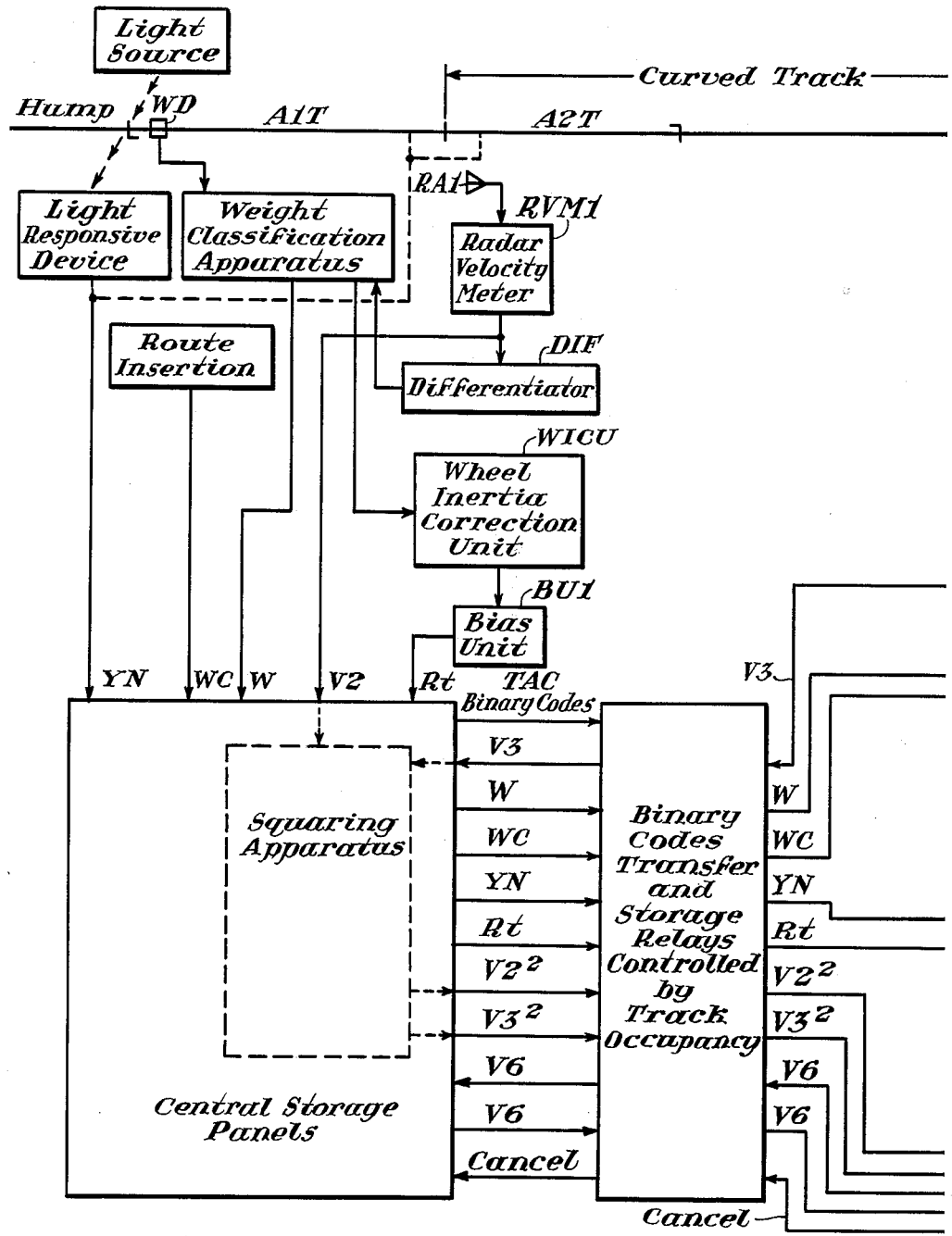

Dec. 28, 1965     E. F. BRINKER ETAL     3,226,541
AUTOMATIC CONTROL SYSTEM FOR RAILWAY CLASSIFICATION YARDS
Filed Aug. 12, 1960     57 Sheets-Sheet 51

INVENTORS.
Emil F. Brinker and David P. Fitzsimmons, deceased, by Mildred E. Fitzsimmons, executrix.
BY    W. L. Stout.
THEIR ATTORNEY INVENTORS.
Emil F. Brinker and David P. Fitzsimmons, deceased, by Mildred E. Fitzsimmons, executrix.
BY W. L. Stout
THEIR ATTORNEY INVENTORS.
Emil F. Brinker, and David P. Fitzsimmons,
deceased, by Mildred E. Fitzsimmons, executrix.
BY W. L. Stout.

THEIR ATTORNEY

Dec. 28, 1965  E. F. BRINKER ETAL  3,226,541
AUTOMATIC CONTROL SYSTEM FOR RAILWAY CLASSIFICATION YARDS
Filed Aug. 12, 1960  57 Sheets-Sheet 54

3,226,541
AUTOMATIC CONTROL SYSTEM FOR RAILWAY CLASSIFICATION YARDS
Emil F. Brinker, Blackridge, Pa., and David P. Fitzsimmons, deceased, late of Trafford, Pa., by Mildred E. Fitzsimmons, executrix, Trafford, Pa., assignors to Westinghouse Air Brake Company, Wilmerding, Pa., a corporation of Pennsylvania
Filed Aug. 12, 1960, Ser. No. 49,379
6 Claims. (Cl. 246—182)

Our invention relates to automatic railway classification yards, and in particular, to an improved automatic control system therefor.

A railway classification yard normally comprises a common lead track and a plurality of storage tracks connected through switches to the common lead track. Ususually, a hump is provided in the lead track over which cars to be classified in the storage tracks are pushed, the cars being released at the crest of the hump and allowed to coast to a point of coupling on the selected storage tracks to which they are routed by appropriate settings of the intermediate switches.

In order to carry out automatically the classification process just described, it is necessary to provide means for properly setting the switches in advance of each car, and at the same time, to control the speeds of the cars to desirable values. Since different cars vary widely in their rolling characteristics, their speeds in the storage tracks, if uncontrolled, would vary over unacceptably wide limits. Accordingly, retarders are located along the various routes through the yard to retard each car more or less in accordance with its rolling characteristics, in such a manner that each car reaches its destination at an appropriately safe coupling speed.

A number of systems have been devised for carrying out automatically the switching and control process. For example, copending application for Letters Patent of the United States, Serial No. 676,730, filed August 7, 1957, by David P. Fitzsimmons and William A. Robison, Jr., for an Automatic Control System for Railway Classification Yards, which is assigned to the assignee of our present application, shows one form of control system in which the switching process is carried out automatically and the speed of cars rolling in the yard is controlled in accordance with the various pertinent parameters such as car weight, distance to coupling, and the rolling resistance of the cars on curved track and on tangent track. In the system disclosed in application Serial No. 676,730, the weight and tangent track rolling resistance of each cut of one or more cars are determined in advance of the master retarder, which is located on the lead track and is common to all routes. The curved track rolling resistance of the cuts is determined by controlling the master retarder to release each car at a speed predetermined in accordance with its weight and the prevailing rolling conditions, measuring the speed of each cut approaching the group retarder in its selected route, and computing the curved track rolling resistance as a function of the difference between these speeds. Associated with each group retarder is a computer which correlates the rolling resistance information and the distance to coupling for each car as it approaches the group retarder to compute the speed at which it should leave the group retarder in order to reach its destination at the selected coupling speed.

While a system of the type described in the above-mentioned copending application has been found to be a satisfactory means for controlling the classification process, there are several important aspects in which it could be improved. First, the use of the master retarder as a constant speed device restricts its function as a speed reduction device; that is, it would be desirable to provide for fuller utilization of the capacity of the master retarder, since retarding capacity in the master retarder location is inherently far cheaper than equivalent capacity in the group retarder locations for the obvious reason that the required capacity of the group retarders must be multiplied by the number of groups. Accordingly, it is a first object of our present invention to provide an automatic control system for classification yards in which maximum utilization of the master retarder is attained.

A second aspect of the system described above is that utilization of the master retarder as a constant speed device restricts penetration of poor rollers into the storage tracks. Restrictions imposed by the mechanical limitations of the tracks, and particularly the track switches, in classification yards, make it unsafe to exceed a relatively low speed such as, for example, 18 m.p.h., at any point in a classification yard. With this restriction, if all cars of a given weight class are brought to a fixed speed, this speed must be so low to prevent runaway of good rollers that it necessarily prevents poor rollers from reaching out to the farthest points of coupling desired in the storage tracks. Accordingly, it is a further object of our invention to provide a classification yard control system in which maximum penetration into the storage tracks by poor rolling cars is attained.

An important problem restricting the fullest use of classification yards is that cars of different rolling characteristics released one after another must be separated by relatively large time intervals to insure that a faster car does not catch up with a slower car. While this would not be unduly serious if following cars all had the same destination, in the operation of automatic switching systems as presently known, one or the other of two cuts that thus ran together would lose its identity in the switching system and be misrouted if the two cuts had different routes. On the other hand, it is desirable to release succeeding cuts having different destinations at as high a rate as is possible. Accordingly, it is a further object of our invention to provide an automatic control system for classification yards in which the maximum even rate of classification can be attained.

In the system described in copending application Serial No. 676,730, a relatively large amount of computing apparatus is required because the bulk of the computing equipment must be duplicated for each group retarder. Accordingly, it is a further object of our invention to provide an automatic control system for classification yards in which only a single computer associated with the master retarder is required.

In order to attain the above objects of our invention, and other objects which will become apparent to those skilled in the art as the description proceeds, we first provide, in a classification yard of the type employing a hump located in a lead track connected to a plurality of storage tracks through track switches and having at least a master retarder located in the lead track and one or more group retarders located along tracks common to various groups of routes in a conventional manner, a relatively long stretch of track between the hump and the master retarder which is divided into a tangent (straight) portion and a curved portion. In addition, we provide a central storage system similar to the type shown in copending application for Letters Patent of the United States, Serial No. 795,672, filed February 26, 1959, by William A. Robison, Jr., for an Information Handling System which is assigned to the assignee of our present application. In such a system, as applied to classification yards, information pertaining to a selected cut can be stored from time to time as the cut progresses along its selected route, and information can be taken out at any time to assist in the control of the cut.

The central storage system performs a number of functions in the control system of our invention, one of which is to set the switches in advance of each cut as it traverses its selected route. In the tangent and curved track portions of the lead track ahead of the master retarder, measurements of car performance are made and stored in the central storage system. The weight of each cut is also registered in the central storage system. As each cut approaches the master retarder, the pertinent stored information is then correlated by a computer associated with the master retarder to derive both a leaving speed for the cut from the master retarder and a leaving speed for the cut from its selected group retarder. The master retarder leaving speed is so computed that it performs the functions of securing maximum penetration into the yard for poor rollers, spacing the cars such that if released at equal time intervals they will arrive at the group retarder at the same intervals, and securing maximum utilization of the master retarder by removing from the car a relatively large percentage of the energy that will have to be removed from that car between the hump and the point of coupling. The leaving speed for the group retarder is selected to cause the particular car to arrive at the selected point of coupling at the desired speed. Means are provided for controlling the master retarder in accordance with its leaving speed and for storing the group retarder leaving speed in the central storage system until it is required by the arrival of the associated cut at its selected group retarder. Means are also provided for taking the group retarder leaving speed storage out of the central storage system at the proper time and controlling the group retarder to reduce the speed of the car to the computed speed. The details of the apparatus thus briefly described will be made clear hereinafter.

We shall first describe one embodiment of our invention in detail, and will then point out the novel features thereof in the claims.

In the drawings, FIGS. 1B through 1G, 2A through 2G, 3A through 3G excluding 3F, 4A through 4G, 5A through 5G excluding 5F, 6A through 6G, 7A through 7E, 8C 8D, 9C, and 9D, when arranged in the manner shown in FIG. 10, comprise a schematic wiring diagram of one embodiment of our invention.

FIG. 10 is a chart showing the manner in which the above named FIGS. 1B through 9D should be arranged in order to show in detail said one embodiment of our invention.

Figure 12:
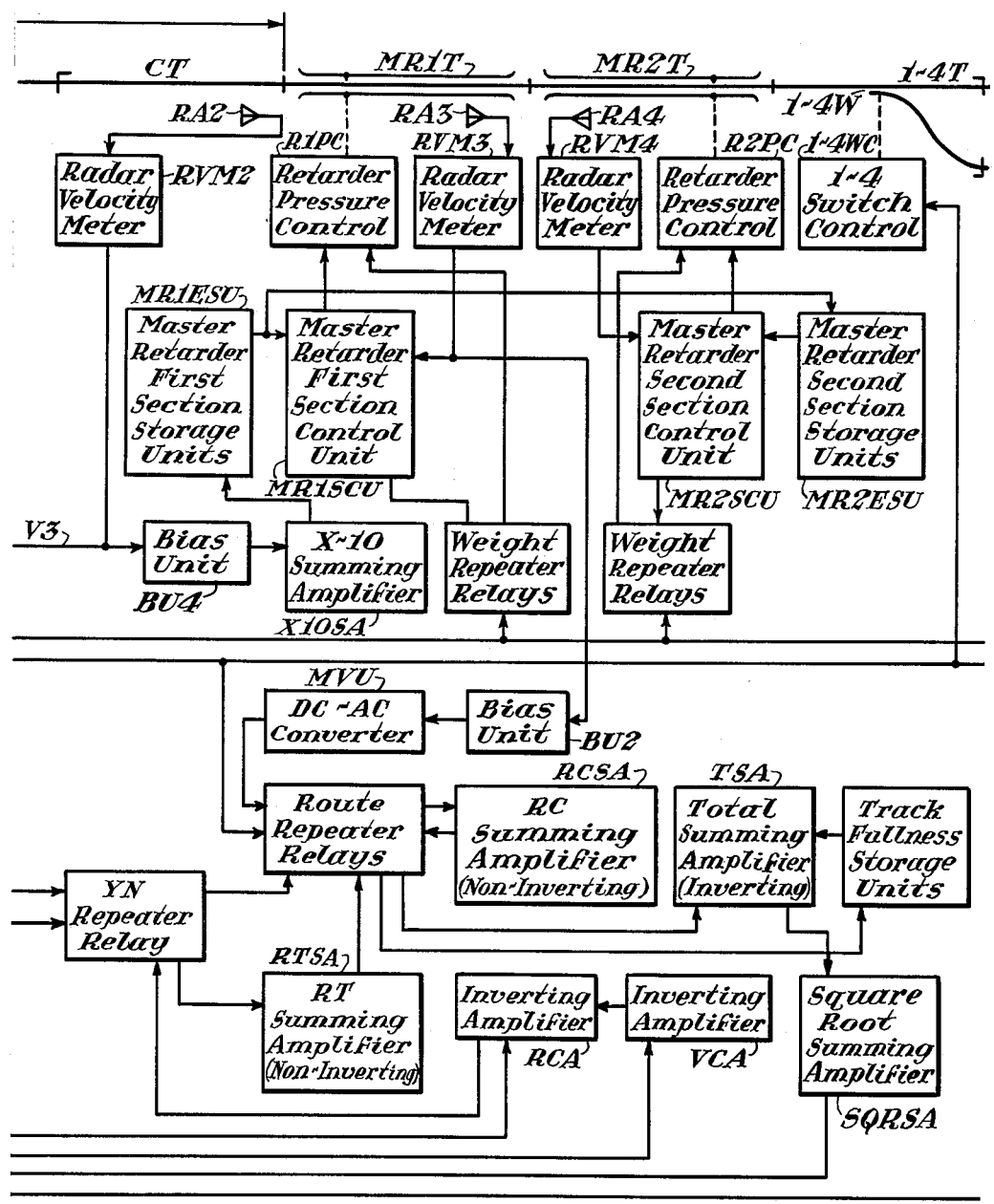
Figure 13:
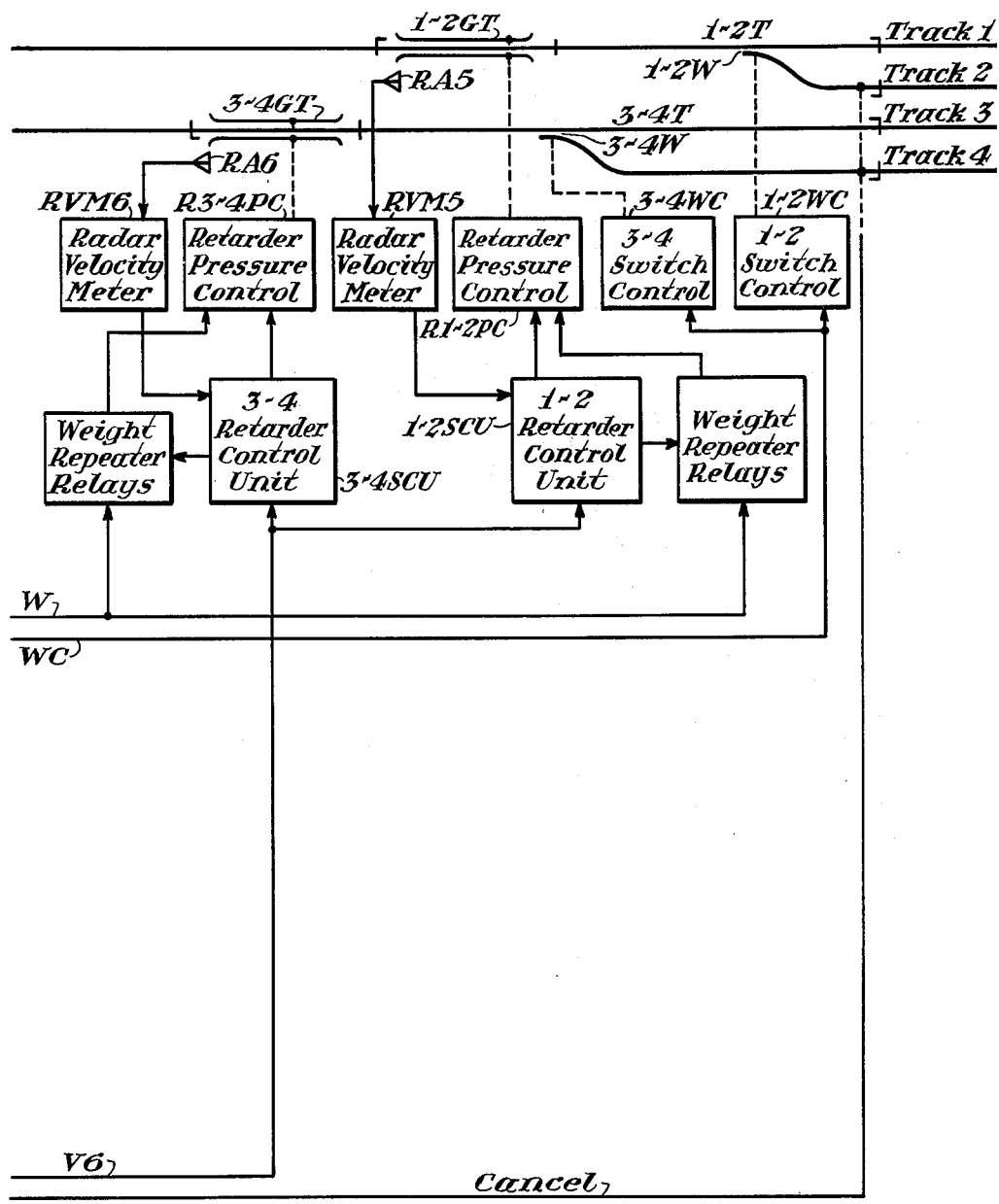

FIGS. 11 through 13, when arranged in numerical order from left to right, comprise a flow diagram illustrating in a general manner the derivation, transfer, storage and read-out of information in one embodiment of our invention as applied to a classification yard of the type illustrated at the upper portions of those drawings and illustrated in more detail at the upper portion of FIGS. 1B through 1G.

Figure 14:
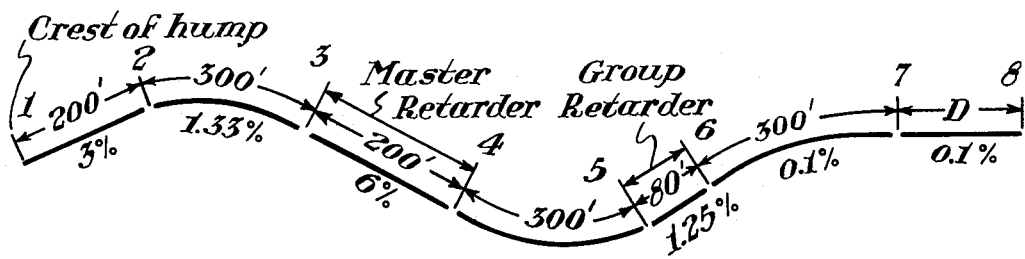

FIG. 14 comprises a schematic track plan illustrating a typical route through a yard constructed in accordance with the illustrated embodiment of our invention and showing typical values of the dimensions of the various portions of such a route.

Figure 15:
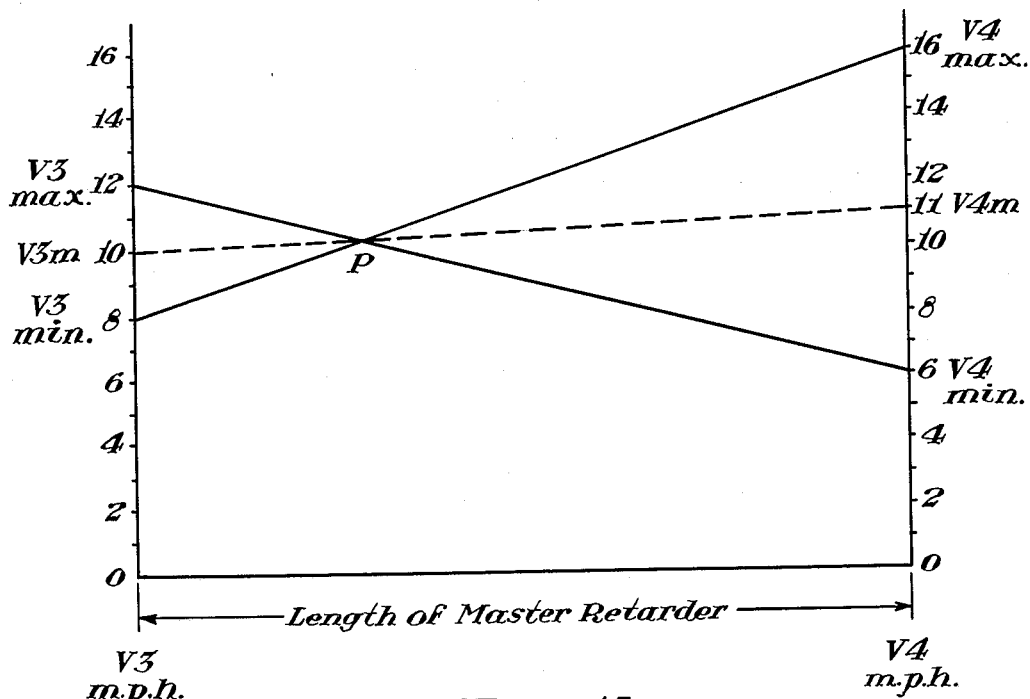

FIG. 15 comprises a graph showing the manner in which speeds are controlled in the master retarder in accordance with the illustrated embodiment of our invention.

Figure 16:
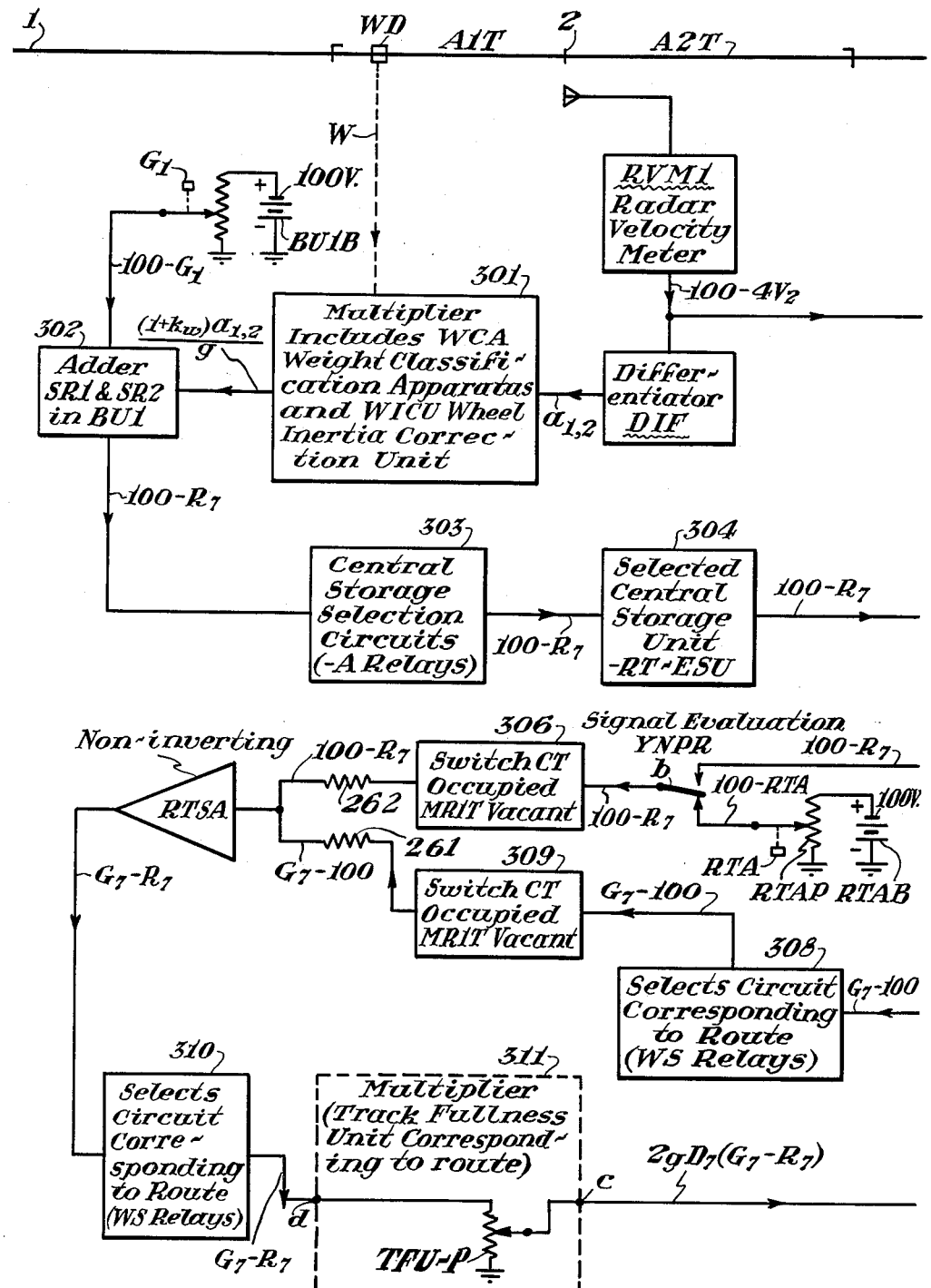

FIGS. 16, 17, 18, and 19, when arranged vertically and side by side in numerical order with FIG. 16 at the left, comprise a schematic wiring diagram showing the flow of information through the computer associated with the illustrated embodiment of our invention.

In order to simplify the description and the tracing of circuits a number of conventions have been employed as outlined below.

First, energy for operation of most of the apparatus shown is furnished by a suitable source of direct current such as a battery of proper voltage and capacity. For purposes of simplicity this power source is not shown in the drawings but its positive and negative terminals are identified by conventional reference characters B and N, respectively. Where other voltages or separate D.C. power supplies are required, such as for the operation of track circuits, each supply is indicated by conventional battery symbols having, where necessary for operation of the respectively associated apparatus, polarities marked thereon. In order to avoid duplicating the leads for positive and negative terminals of several of these separate power supplies, one terminal of each such supply is shown connected to ground by the conventional ground symbol.

Drawing FIGS. 1B through 9D, excluding references 1A, 3F, 5F, 7F, 7G, 8A, 8B, 9A, and 9B, are referenced by numerals and letters in order to expedite the proper arrangement of the drawings and the tracing of the circuits from drawing to drawing. Each horizontal row of the drawings is referenced by a numeral followed by a letter representing the vertical row in which the drawing belongs. This drawing reference arrangement is believed obvious from an examination of FIG. 10 and it is believed that the arrangement will greatly expedite locating any drawing referred to in this description.

There is shown in FIGS. 2A, 2B, 3A, 4A, 5A, and 6A, a series of storage panels designated 1P through 7P. Each of these panels is provided with a plurality of terminals and each terminal is designated by a numerical reference character. Each of these terminals is electrically internally connected in its respective panel to certain apparatus to be described; and each is also electrically externally connected by conductors to certain other apparatus employed in our invention. In order that the circuits of our invention may be more readily followed, the conductors from the terminals on the panels are each designated by a reference comprising the respective panel and terminal designation. For example, conductor 1P14 connects to terminal 14 on panel 1P, and conductor 6P38 connects to terminal 38 on panel 6P, as will be readily understood. Several of these conductors branch into additional conductors or branch circuits and each branch of such a conductor is designated by an additional numerical suffix preceded by a hyphen. For example, the above-mentioned conductor 6P38 branches in FIG. 6D into two conductors 6P38-1 and 6P38-2. Conductor 6P38-2 further branches in FIG. 6E into conductors 6P38-3 and 6P38-4. Thus, it will be readily understood that conductor 6P38-4 connects to terminal 38 of panel 6P, and the conductor is differentiated from the other branch circuits connected to that terminal by the numeral 4.

Groups of the above-described conductors, such as conductors 1P16 through 7P16 connecting to terminals 16 of panels 1P through 7P, respectively, merge through contact trees comprising contacts of TAC relays, to be described, into a single conductor. This conductor is then designated by the same designation as before except the numerical prefix is dropped. Referring to FIG. 5D it may be seen that conductors 1P16 through 7P16 merge through contacts of relays D1TAC, D2TAC, and D3TAC into a single conductor which is designated merely P16. Referring to FIG. 6D for a further example, it may be seen that conductors 1P38-1 through 7P38-1 merge through contacts of relays E1TAC, E2TAC, and E3TAC into a single conductor which is then designated P38-1.

In some instances the above-mentioned conductors connect to contacts of certain relays shown in the drawings and then extend over other conductors from one drawing figure to another. In such cases the reference character designation for the original conductor with an added numerical suffix preceded by a hyphen is also employed to designate each lead extending from one drawing figure to another. For example, in FIG. 4D, conductor P35 extends to the front point of a contact *b* of a relay YNPR, to be described, and then a lead extends from the movable portion of said contact *b* to the movable portion of a contact *r* of a relay MR1TSPR, to be described, in FIG. 4C. The lead extending between the two drawings FIGS. 4C and 4D is designated P35–1.

All other conductors shown extending between figures of the drawings, that is, all other than those connected or extending to or from a terminal on one of said panels, are designated in the usual manner by a numerical reference character.

A plurality of relays are shown in the drawings in the usual manner by a rectangular geometric figure representing the winding of the relay. Contacts of each relay are shown in most instances directly below the rectangle representing the winding of the respective relay and indicated as associated therewith by the usual dashed vertical line extending from the winding to each contact. However, in several instances, for purposes of simplification of the drawings, certain relay contacts are not shown directly below their respective relay winding and no dashed vertical line is used to indicate the relay winding with which the contacts are associated. In such instances the reference characters designating the relays with which the contacts are associated are disposed on the drawings directly above the movable portions of each contact or each group of contacts, and the relay winding with which each contact is associated will be readily recognized.

Several of the relays in the drawings are slow-acting relays, that is, either slow to release, or slow to pick up, or both. The contacts of such relays are shown in the conventional manner by an arrow drawn vertically through the movable portion of each contact with the head of the arrow pointed in the direction of the relay, and consequently its contacts, are slow-acting. In the case of slow-pickup, slow-release relays, an arrow head is provided on both ends of the vertical line through the movabl portions of the relays' contacts.

Many of the components of our system are conventional apparatus well known in the electrical and railway signaling arts, and in such instances the components may be shown by block diagrams illustrating only sufficient details of the component to provide a complete understanding of the description and operation of our invention. Also some of the components of our system in the illustrated embodiment of our invention constitute a series of units similar to each other and, accordingly, we have adoptd the convention of showing the details of but one such unit and indicating the remainder of such units by block diagrams comprised of solid or dotted line blocks. If such units differ from each other in some minor details such features will be indicated in the drawings and fully covered in this description. For an example, the aforesaid storage panels 1P through 7P are identical, with the exception of a binary code assigned to and employed to identify each respective panel. Therefore, it is believed expedient to illustratae in detail only one of the storage panels and to show the remainder of the panels in block diagram form with the binary code identification assigned to each panel indicated on the block representing that particular panel. The manner in which each panel identifies itself by its respective binary code will be readily understood in connection with the detailed description of panel 1P.

A plurality of inverting and noninverting D.C. amplifiers are employed in the arrangement of our invention. These amplifiers are conventional amplifiers well known in the art and are, therefore illustrated in the drawings in a conventional manner, each having an input terminal $a$, an output terminal $c$ and grounded terminals $b$ and $d$. Summing resistors are shown in the input circuits to the amplifiers and a resistor connected between the input terminal $a$ and the output terminal $c$ on each amplifier provides a feedback circuit for the amplifier.

While we have illustrated the apparatus of our invention by showing it in connection with a track plan showing a classification yard with only four storage tracks and with the apparatus arranged roughly in accordance with its function in connection with such a track plan, it will be understood by those skilled in the art that in practice most of the apparatus shown would be located at a central location for engineering and maintenance convenience and would not necessarily be located in the yard in accordance with the functions which the individual apparatus components perform.

Before describing the illustrated embodiment of our invention in detail, one theory explaining its operation will be discussed, and a detailed functional description of the apparatus embodying the invention will then be given in accordance with the theory.

*The master retarder computer*

The master retarder, in a system constructed in accordance with our invention, is used to accomplish several important objectives. Following a brief discussion of these objectives, the theory underlying the manner in which they are accomplished will be developed.

First, from an economic standpoint it is desirable to put as much as possible of the total needed retarder capacity in the master retarder, since the cost of each foot of group retarder is multiplied by the number of such retarders. However, because of known car behavior patterns it is not desirable to put all of the required capacity in the master retarder. The first objective, then, is to provide a computer to control the master retarder so that it will take out of each car the highest possible percentage of its total energy that will leave sufficient remaining energy to permit the proper control of the car thereafter. The remaining energy required to be removed from each car is removed in its selected group retarder, or in the group and intermediate retarders where intermediate retarders are employed. The herein described invention makes more efficient use of the master retarder than previous ways of employing such retarders; and, therefore, less capacity has to be put into the other retarders and the costs of yard installations are thereby reduced. The economic objective of the invention is thereby achieved.

A second object of the master retarder control computer of our invention is to prevent overtaking of cars at or in advance of the group retarder by maintaining adequate time spacing of all cars. This is achieved by using the master retarder in such a manner that at the entrances to the second retarders or, depending on the track layout of the particular yard, at suitable points near them, consecutive cars will arrive at approximately equal time intervals. For example, if cars are humped at, say 10-second intervals they will be controlled so that consecutive cuts will arrive at chosen locations at approximtaely 10-second intervals.

A third object of the master retarder computer of our invention is to provide maximum penetration into the classification tracks for hard rolling cars. This object is accomplished by opening the master retarder for the worst rolling car.

How the line in FIG. 15 which slopes down from left to right is put through its initially known starting point on the left in such a way that the desirable use is made of the master retarder may be found as follows:

Assume a route in a yard up to the entrance of a group retarder or, if employed, an intermediate retarder, the route being divided into $(n-1)$ sections,

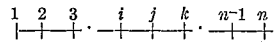

each section $i,j$ being characterized by a grade $G_i$ and a length $D_i$. Any car $s$ on each section $i,j$ has some entering velocity head $H_{si}$, a leaving velocity head $H_{sj}$, and a rolling resistance $R_{si}$. Assume that each section $i,j$ includes a retarder that removes a velocity head $H_{siR}$ (which may be zero) from each car $s$. In the above assumption, $G_i$=grade in feet per foot; that is, the fall in feet per foot travelled over section $i,j$ $D_i$ = length of section $i,j$ in feet
$H_{si}$ = velocity head of car $s$ at point $i$ in feet. (Velocity head is found from the potential energy equivalent of kinetic energy; thus, if a car has a speed $V_{si}$, it will have a head $$H_{si} = \frac{(V_{si})^2}{2g}$$

$R_{si}$ = Rolling resistance, dimensionless

In these symbols, only a single subscript is used to indicate location. It should be kept in mind that in point functions such as $H_{si}$, the subscript $i$ indicates point $i$; in functions that define properties of a track stretch, such as $D_i$, $R_{si}$, the subscript $i$ indicates the stretch from $i$ to the next following point, $j$. Thus, $H_{11}$ would be the velocity head of car 1 at point 1, and $R_{11}$ would be the rolling resistance of car 1 on the stretch 1–2.

In terms of the above symbols, an energy balance for each section can be written:

$$(1) \begin{cases} H_{s2} = H_{s1} + D_1G_1 - D_1R_{s1} - H_{s1R} \\ H_{s3} = H_{s2} + D_2G_2 - D_2R_{s2} - H_{s2R} \\ H_{sj} = H_{si} + D_iG_i - D_iR_{si} - H_{siR} \\ H_{sk} = H_{sj} + D_jG_j - D_jR_{sj} - H_{sjR} \\ H_{sn} = H_{s(n-1)} + D_{n-1}G_{n-1} - D_{n-1}R_{s(n-1)} - H_{s(n-1)R} \end{cases}$$

Usually, in any one humping operation, all cars have approximately the same initial speed corresponding to velocity head $H_{sa}$. The Equation (1) may be written for two cars identified as 1 and 2. Car 1 is the car with the highest rolling resistance to be encountered. Car 2 shall mean the car with the lowest rolling resistance.

There is one retarder in the route, namely the master retarder. The velocity head removed by it from car $s$ shall be denoted by $H_{sR}$.

Since car 1 is, by definition, the hardest rolling car, to secure maximum penetration into the yard we let it go through the master retarder without any retardation; that is, let $H_{1R} = 0$.

As a typical example, assume a yard in which the average route has the configuration shown in FIG. 14. As shown, starting from the crest of the hump at the left, this typical portion of a route comprises a tangent section 1,2, 200 feet long, on 3% grade; a curved section 2,3, 300 long, on 1.33% grade; a master retarder located in section 3,4, 200 feet long on 6% grade; a curved stretch 4,5, 300 feet long on 0.7% grade. It will be appreciated that these dimensions are merely illustrative, and that any other relative dimensions could be employed in practice, so long as a stretch of tangent track and a stretch of curved track are located ahead of the master retarder, each of sufficient length to make an accurate measurement of acceleration thereon practical. It should also be observed that other routes in the yard should be designed so that their dimensions are similar to those of the typical route, since wide departures would interfere with the master retarder correlation.

Assuming the dimensions shown in FIG. 14, and assuming further that all cars leave the crest of the hump at approximately 3 m.p.h. and that the hardest rolling car to be handled automatically has a rolling resistance of 20 lb./ton on tangent track and 25 lb./ton on curved track, the time required for the hardest rolling car to roll from the crest 1 to 5, the entrance of the group retarder, with the master retarder open, can be calculated as follows:

Equation (1) may first be written, replacing the subscript $s$ by the car identifying number 1, as (1a)
$$H_{12} = H_{11} + D_1G_1 - D_1\left(\frac{20}{2000}\right)$$

$$H_{13} = H_{12} + D_2G_2 - D_2\left(\frac{25}{2000}\right)$$

$$H_{14} = H_{13} + D_3G_3 - D_3\left(\frac{20}{2000}\right)$$

$$H_{15} = H_{14} + D_4G_4 - D_4\left(\frac{25}{2000}\right)$$

$$H_{11} = \frac{V_{11}^2}{2g} = \frac{\left(3 \text{ m.p.h.} \times 1.468 \frac{\text{ft.}}{\text{m.p.h. sec.}}\right)^2}{64.32 \text{ ft./sec.}^2}$$

$H_{11} = .3015$ ft.
$H_{12} = .3015 + 200(.03 - .01)$
$H_{12} = 4.302$
$H_{13} = 4.302 + 300(.0133 - .0125)$
$H_{13} = 4.542$ ft.
$H_{14} = 4.542 + 200(.06 - .01)$
$H_{14} = 14.542$ ft.
$H_{15} = 14.542 + 300(.007 - .0125)$
$H_{15} = 12.89$ ft.

Since
$$V = \sqrt{2gH}$$
$V_{12} = \sqrt{64.32 \times 4.302} = 16.64$ ft./sec.
$V_{13} = \sqrt{64.32 \times 4.542} = 17.08$ ft./sec.
$V_{14} = \sqrt{64.32 \times 14.54} = 30.6$ ft./sec.
$V_{15} = \sqrt{64.32 \times 12.89} = 28.8$ ft./sec.

Then $(V_{11,2})$ ave. $= \dfrac{4.4 + 16.64}{2} = 10.52$ ft./sec.

$(V_{12,3})$ ave. $= \dfrac{16.64 + 17.08}{2} = 16.86$ ft./sec.

$(V_{13,4})$ ave. $= \dfrac{17.08 + 30.6}{2} = 23.84$ ft./sec.

$(V_{14,5})$ ave. $= \dfrac{30.6 + 28.8}{2} = 29.7$ ft./sec.

Since $$t = \frac{D}{V_{ave}}$$

$t_{1,1,2} = \dfrac{200}{10.52} = 19.0$ sec.

$t_{1,2,3} = \dfrac{300}{16.86} = 17.8$ sec.

$t_{1,3,4} = \dfrac{200}{23.84} = 8.4$ sec.

$t_{1,4,5} = \dfrac{300}{29.7} = 10.1$ sec.

$t_{1,1,5} = t_{1,2} + t_{2,3} + t_{3,4} + t_{4,5}$
$t_{1,1,5} = 55.3$ seconds.

Assume now that the best roller to be handled automatically has a rolling resistance of 2 lb./ton on tangent track and 6 lb./ton on curved track. The retardation supplied by the master retarder is desired to be such as to bring this car from the crest to the entrance of the group retarder in 55.3 seconds. Equation 1 can be written for this car, replacing the identifying subscript $s$ by 2, as, (1b)
$$H_{22} = H_{21} + D_1\left(G_1 - \frac{2}{2000}\right)$$

$$H_{23} = H_{22} + D_2\left(G_2 - \frac{6}{2000}\right)$$

$$H_{24} = H_{23} + D_3\left(G_3 - \frac{2}{2000}\right) - H_{2R}$$

$$H_{25} = H_{24} + D_4\left(G_4 - \frac{6}{2000}\right)$$

It is assumed that $H_{21} = H_{11} = .3015$ ft. then $H_{22} = .3015 + 200(.03 - .001)$
$H_{22} = 6.10$ ft.
$H_{23} = 6.10 + 300(.0133 - .003)$ $H_{23}=9.19$ ft.
$H_{24}=9.9+200(.06-.001)-H_{2R}$
$H_{24}=20.99-H_{2R}$
$H_{25}=H_{24}+300(.007-.003)$
$H_{25}=1.200+H_{24}$ From the calculated values of head, the corresponding speeds are:

$$V_{21}=4.4 \text{ ft./sec.}$$
$$V_{22}=\sqrt{64.32\times 6.10}=19.77 \text{ ft./sec.}$$
$$V_{23}=\sqrt{64.32\times 9.19}=24.3 \text{ ft./sec.}$$
$$V_{24}=\sqrt{64.32(20.99-H_{2R})}=8.02\sqrt{H_{24}}$$
$$V_{25}=\sqrt{(1.200+H_{24})64.32}=8.02\sqrt{1.2+H_{24}}$$

then $$t_{21,2}=\frac{200}{1/2(4.4+19.77)}=16.59 \text{ sec.}$$
$$t_{22,3}=\frac{300}{1/2(19.77+24.3)}=13.62 \text{ sec.}$$
$$t_{21,3}=t_{21,2}+t_{22,3}=30.2 \text{ sec.}$$

then $$t_{23,5}=55.3-30.2=25.1 \text{ sec.}$$

from which $$t_{23,4}+t_{24,5}=25.1 \text{ sec.}$$

but $$t_{23,4}=\frac{2D_{3,4}}{V_{23}+V_{24}}=\frac{400}{24.3+8.02\sqrt{H_{24}}}$$
$$t_{23,4}=\frac{49.87}{\sqrt{H_{24}}+3.03}$$
$$t_{24,5}=\frac{V_{25}-V_{24}}{A_{24,5}}=\frac{8.02\sqrt{1.2+H_{24}}-\sqrt{H_{24}}}{32.2(.007-.003)}$$

where $A_{24,5}$=acceleration between 4 and 5=$g(G_{4,5}-R_2)$ $$t_{24,5}=\frac{\sqrt{1.2+H_{24}}-\sqrt{H_{24}}}{.01604}$$

then $$25.1=\frac{49.8}{\sqrt{H_{24}}+3.03}+\frac{\sqrt{1.2+H_{24}}-\sqrt{H_{24}}}{.01604}$$

Solution of this equation for $H_{24}$ gives, approximately $$H_{24}=5.10 \text{ ft.}$$

Then $$V_{24}=\sqrt{64.32\times 5.10}=18.09 \text{ ft./sec.}$$
$$V_{25}=\sqrt{(1.2+5.10)64.32}=20.10 \text{ ft./sec.}$$
$$H_{2R}=20.99-H_{24}=20.99-5.10$$
$$H_{2R}=15.89 \text{ ft.}$$

This value sets the maximum required rating for the master retarder.

Referring now to FIG. 15, assumed speeds V3 min., V3 max., V4 min., and V4 max. are indicated at the proper points on their respective vertical axis, and lines are drawn between V3 min. and V4 max. and between V3 max. and V4 min. These lines represent the change in velocity of the worst and best rolling cars, respectively, as they traverse the master retarder. The mean of V3 min. and V3 max. and V4 min. and V4 max. are then indicated at their proper points on their respective vertical axis and a line drawn between the two points. As is obvious this line passes through point P and represents the velocity change of a car having a mean velocity (V3$m$) that is, an average of velocities V3 min. and V3 max. when entering the retarder.

The algebraic expression for any straight line passing through point P is:

$$V4=V4m+K(V3m-V3)$$

where $$K=\frac{V4 \text{ max.}-V4 \text{ min.}}{V3 \text{ max.}-V3 \text{ min.}}$$

Therefore, the velocity V4 for each car entering the master retarder at a velocity V3 can be determined by the above formula or expression.

Referring further to FIG. 15, it will be noted that a set of conditions has been assumed as follows:

V3 max.=12 m.ph.
V3 min.=8 m.p.h.
V4 max.=16 m.p.h.
V4 min.=6 m.p.h.

Then:

$$V3m=\frac{V3 \text{ max.}+V3 \text{ min.}}{2}=\frac{12+8}{2}=10 \text{ m.p.h.}$$
$$V4m=\frac{V4 \text{ max.}+V4 \text{ min.}}{2}=\frac{16+6}{2}=11 \text{ m.p.h.}$$
$$K=\frac{V4 \text{ max.}-V4 \text{ min.}}{V3 \text{ max.}-V3 \text{ min.}}=\frac{16-6}{12-8}=2.5$$

Assuming now a car entering the master retarder at a velocity V3 of 9 m.p.h. and substituting the above values in the equation, the velocity V4 for the car will be as follows:

$$V4=11+2.5(10-9)$$
$$V4=11+2.5$$
$$V4=13.5 \text{ m.p.h.}$$

Thus, the desired leaving speed for the car when leaving the master retarder will be 13.5 m.p.h. It is, therefore, apparent that the desired leaving speed for any car when leaving the master retarder can be determined from the measured velocity of the car when entering the retarder, by employing the algebraic formula or equation set forth.

*The group retarder computer*

The function of the group retarder in our system is to complete the speed control process, using a relatively exact computation of the speed at which each car should leave the group retarder to couple with preceding cars on its particular storage track, to remove enough energy from each car so that it will leave at the computed speed. This function is performed by computing the desired leaving speed for each car and then braking the car until it reaches the computed leaving speed.

Referring now to FIG. 14, the specific function of the group retarder computer is to determine the speed at which each car should leave point 6 in order to arrive at the current point 8 on its selected storage track. Broadly, this computation is carried out in the manner shown in the previously mentioned copending application Serial No. 676,730. However, since the specific structure employed in the illustrated embodiment of our invention differs in detail from that shown in the copending application, and the method of handling some of the constants is different, an independent derivation of the control formulae will be given:

Assuming that a car of total mass $m$ is rolling on a stretch of track between an entrance point $i$ and an exit point $j$, the stretch having a length $D_i$, an energy balance may be written over the stretch as (2) 
$$\tfrac{1}{2}mV_i^2+mgH_i+\tfrac{1}{2}Iw_i^2=\tfrac{1}{2}mV_j^2+mgH_j+\tfrac{1}{2}Iw_j^2+F_{R_i}D_i$$

Where $V$=speed, ft./sec.
$H$=elevation, feet
$w$=angular velocity of wheels, rad./sec.

$I$ = total moment of inertia of wheel-axle combination, lb. ft.$^2$
$F_R$ = frictional force opposing motion of car, lb. ft./sec.$^2$ Since
$$w = \frac{V}{r_w}$$

And
$$I = m_w k^2$$

where $V$ = speed of car, ft./sec.
$r_w$ = radius of wheel, ft.
$k$ = radius of gyration of wheel, ft.
$m_w$ = total mass of wheels and axles, lb.

Equation (2) can be written as (3)
$$\tfrac{1}{2} m V_i^2 \left[1 + \frac{m_w k^2}{m r_w^2}\right] + mgH_i$$
$$= \tfrac{1}{2} m V_j^2 \left[1 + \frac{m_w k^2}{m r_w^2}\right] + mgH_j + F_{R_i} D_i$$

Let
$$\frac{m_w k^2}{m r_w^2} = k_w$$

Thus (4)
$$\tfrac{1}{2} m (V_j^2 - V_i^2)(1+k_w) = mg(H_i - H_j) - F_{R_i} D_i$$

Dividing by $mgD_i$ (5)
$$\frac{(V_j^2 - V_i^2)(1+k_w)}{2gD_i} = \frac{(H_i - H_j)}{D_i} - \left(\frac{F_R}{mg}\right)$$

Let
$$G_i = \frac{H_i - H_j}{D_i}$$

Where $G_i$ is the grade in ft./ft.
and
$$\frac{F_{R_i}}{mg} = R_i$$

where $R_i$ will be called the rolling resistance between points $i$ and $j$

Then (6) $$\frac{(V_j^2 - V_i^2)(1+k_w)}{2gD_i} = G_i - R_i$$

or (7) $$V_j^2 - V_i^2 = \frac{2gD_i}{1+k_w}(G_i - R_i)$$

For the stretches from 6 to 7 and from 7 to 8 in FIG. 14, (7) can be written as (8) $$V_7^2 - V_6^2 = \frac{2gD_6}{1+k_w}(G_6 - R_6)$$

(9) $$V_8^2 - V_7^2 = \frac{2gD_7}{1+k_w}(G_7 - R_7)$$

adding

(10) $$V_8^2 - V_6^2 = \frac{2gD_6}{1+k_w}(G_6 - R_6) + \frac{2gD_7}{1+k_w}(G_7 - R_7)$$

solving for $V_6$

(11) $$V_6^2 = V_8^2 - \frac{2gD_6}{1+k_w}(G_6 - R_6) - \frac{2gD_7}{1+k_w}(G_7 - R_7)$$

In the illustrated embodiment of our invention, the coefficient
$$\frac{g}{1+k_w}$$
in the above equation is taken into account by using a value of $g'$ of $g$ that differs from the true value by an amount sufficient to compensate for $1+k_w$. The value of $k_w$ varies from about .02 to .08 in practice. Since the most significant effect of $k_w$ in the storage tracks occurs with high values of rolling resistance that tend to be coupled with low values of $k_w$, this approach is sufficiently accurate, particularly if the value of $g'$ selected is such as to give the best compensation in the lower ranges of $k_w$. Thus, in practice, Equation (11) may be written as

(12) $$V_6 = \sqrt{V_8^2 - 2gD_6(G_6 - R_6) - 2gD_7(G_7 - R_7)}$$

In this equation:
$R_7$ is a tangent track rolling resistance, and may be assumed to be the same as any other tangent track rolling resistance. In particular, referring now to FIG. 14

$$R_7 = R_1$$

where

(13) $$R_1 = G_1 - \frac{(1+k_w)(V_2^2 - V_1^2)}{2gD_1}$$

Since
$$\frac{V_2^2 - V_1^2}{2D_1} = \frac{(V_2+V_1)(V_2-V_1)}{2D_1} = \frac{V_2 - V_1}{\left(\frac{2D_1}{V_2+V_1}\right)}, \quad t_{1,2} = \frac{2D_1}{V_2+V_1}$$

and
$$a_{1,2} = \frac{V_2 - V_1}{t_{1,2}}$$

we have
$$R_1 = G_1 - \frac{(1+k_w)a_{1,2}}{g}$$

Then

(14) $$R_7 = G_1 - \frac{(1+k_w)a_{1,2}}{g}$$

$R_6$ is a curved track rolling resistance. As pointed out in copending application Serial No. 676,730, $R_6$ can be correlated with $R_2$ on the measuring stretch between points 2 and 3 in FIG. 14 by means of

(15) $$R_6 = b_1 R_2 + c_1$$

where $b_1$ and $c_1$ are constants determined by the particular curve 6–7.

From (6)

(16) $$R_2 = G_2 - \frac{(1+k_w)(V_3^2 - V_2^2)}{2gD_2}$$

Since the curved stretch is relatively short, the $1+k_w$ term is neglected in the illustrated embodiment of our invention.

Substituting (14), (15) and (16) in Equation 12, we have

(17)
$$V_6 = \sqrt{V_8^2 - 2gD_6\left[G_6 - b_1 G_2 - c_1 + \frac{b_1(V_3^2 - V_2^2)}{2gD_2}\right] - 2gD_7\left[G_7 - G_1 + \frac{(1+k_w)a_{1,2}}{g}\right]}$$

Equation 17 is instrumented, in the illustrated embodiment of our invention, as shown schematically in FIGS. 16, 17, 18 and 19. These figures comprise a schematic diagram of the flow of information through the illustrated embodiment of our invention, which corresponds to the detail drawings of FIGS. 1 through 9 except that essentially all of the switching functions have been replaced by functional blocks labeled with the functions performed by the contacts of various relays in the central information storage system and associated input and output switching circuits, these blocks also being labeled with the general identification of the relay groups shown in the detail drawings which are directly involved. In general, leads carrying information in FIGS. 16 through 19 can be correlated either with particular leads in the detail drawings or with typical leads, the exact identity of which will depend on the switching combinations that are set up. For the purpose of identifying the various functional blocks a series of reference numerals beginning with 300 has been adopted, but the blocks and functions are also identified to the extent practical with the specific reference characters shown in the detail drawings.

As shown in FIGS. 16 through 19, the stretch of track approaching the master retarder has been divided into three track sections A1T, A2T, and CT by conventional insulated joints. The master retarder itself is located on a stretch of track divided by insulated joints into two adjacent track sections MR1T and MR2T. The reference characters 1, 2, 3 and 4 associated with particular points along the stretch correspond to the similarly designated points in the typical route shown in FIG. 14.

Referring now to FIG. 16, a radar velocity meter RVM1 is shown having an antenna facing cars coming from the hump and located adjacent point 2, comprising the exit end of tangent track section A1T. The output of this velocity meter is a voltage having a magnitude, in the illustrated embodiment, of $100-4V_2$ volts, where $V_2$ is the speed of the cut between points 1 and 2. This voltage is supplied in parallel to a switching circuit 300, to be described and to a differentiator DIF. The output of the differentiator is a voltage proportional to $a_{1,2}$, the acceleration between the points 1 and 2 on the track plan. This voltage is supplied to a multiplier schematically indicated at 301, which is adjusted in accordance with the weight of the cut, as schematically indicated, in response to the actuation of a weighing device WD located in track section A1T. The detailed apparatus employed in unit 301 is shown in FIG. 1B, and is generally indicated by the reference characters in block 301. The function of unit 301 is to reduce the acceleration to dimensionless units, and to multiply it by a factor $(1+k_w)$ which corrects for wheel inertia in accordance with the theory developed above. The output of multiplier 301 is a voltage proportional to $$\frac{(1+k_w)a_{1,2}}{g}$$

This factor is combined with a voltage proportional to $100-G_1$, where $G_1$ is the grade of the stretch between points 1 and 2, in adder 302. The grade correction voltage is supplied by a potentiometer energized by a 100-volt battery BU1B and controlled by adjustment of the potentiometer in accordance with the grade as schematically indicated. The detailed components of adder 302, indicated in the block, are shown in FIG. 1B. The output of adder 302, which is $$100-G_1+\frac{(1+k_w)a_{1,2}}{g}$$

is equal to $100-R_1$, where $R_1$ is the rolling resistance between points 1 and 2. Since this stretch is tangent, the rolling resistance will be essentially the same as on any other tangent stretch, so that it can be considered to be $100-R_7$, as shown. At this point, then, there exists a voltage which is linearly related to the rolling resistance on the stretch of track between points 7 and 8 in FIG. 14. This voltage is next channeled through a series of selecting circuits. For the purposes of the present discussion, these circuits merely provide a path of flow for the information. First, by central storage selection circuits indicated schematically at 303 and corresponding to relays 1A through 7A which are shown partly explicitly and partly schematically in FIGS. 2A through 7A, a central storage panel or bank is selected. In this storage panel, corresponding to one of panels 1P through 7P shown in FIGS. 2A through 7A, the signal is stored in storage unit 304 which unit is designated in the detail drawings in the form −RT−ESU. As it will appear, this storage is continued until the cut approaches the master retarder and occupies track section CT. From the central storage unit 304, the signal is supplied over central storage selection circuits indicated schematically at 305 and corresponding in detail to the contacts of relays D1TAC, D2TAC and D3TAC shown in FIG. 8D through the front contact of the signal evaluation relay YNPR. As will later appear, this relay is energized if the value $100-R_7$ is reliable, but is deenergized if the value is unreliable. If relay YNPR is deenergized, a substitute average value signal is supplied from battery RTAB through potentiometer RTAP, the latter being adjusted in accordance with the average rolling resistance on track section A1T. Regardless of whether the actual rolling resistance signal or the average value is selected, it is supplied to switching circuit 306 which may be thought of as a switch closed when track section CT is occupied and track section MR1T is vacant. The corresponding contacts in the detail drawings are shown in FIG. 4C, and comprise front contact $r$ of relay MR1TSPR and back contact $n$ of track relay CTR. (Since, with this illustration, it is believed that it will be clear how other similar functions are correlated with the detail drawings, generally speaking the following discussion will not specifically point out these correlations.) The signal supplied through switch 306 is applied to one input terminal of a non-inverting summing amplifier RTSA.

A second signal, which introduces the grade of the tangent storage track on the particular route assigned to each cut, and which corresponds to stretch 7 to 8 in the typical route shown in FIG. 14, is also supplied to amplifier RTSA. The 100 voltage bias is removed by an equal and opposite negative voltage of 100 volts supplied from battery G7B. This voltage is applied across a potentiometer TK−G7 by circuits 307 which are controlled in accordance with the route of each car. The potentiometer is adjusted in accordance with the grade $G_7$, such that the output signal from the wiper of the potentiometer is equal to $G_7-100$. This voltage is applied, through a circuit 308 selected in accordance with the route, and circuits typified by a switch 309, which is closed when track circuit CT is occupied and section MR1T is unoccupied, to the input of amplifier RTSA.

As indicated, amplifier RTSA is non-inverting, so that it provides a signal which is proportional to $G_7-R_7$. This signal is applied through a route determined circuit 310 to a potentiometer TFU−P in a track fullness unit 311 corresponding to the route of each car. The wiper of this potentiometer is adjusted, by means shown in more detail in FIG. 2C, in accordance with the length $D_7$ remaining on the storage track selected. The adjustment of the potentiometer in unit 311 is also quantitatively dependent on a dimensionless coefficient $2g$, so that the result of biasing the signal through 311 is to multiply it by the factor $2gD_7$. The output of unit 311 is accordingly equal to $2gD_7(G_7-R_7)$.

The output signal from unit 311 is applied through route selected circuits 312 and summing resistor 264 to the input of an inverting summing amplifier TSA. This input supplies all of the necessary information about the behavior of a given cut on the tangent portion of the storage track to which each car is assigned. Information about the behavior of the cut on the curved stretch between the group retarder and the point of tangency in each route is supplied through summing resistor 266, in a manner which will next be described.

*The curved track rolling resistance measurement*

The first information necessary to describe the performance of any given car on the curved stretch between points 6 and 7 on the typical route shown in FIG. 14 is the rolling resistance of that cut on the particular section. This factor is determined by correlation with measurements made on the common curved stretch between points 2 and 3 in FIG. 14, by apparatus which will now be described.

Recalling Equation 16, the rolling resistance of a cut between points 2 and 3 is $$R_2 = G_2 - \frac{V_3^2 - V_2^2}{2gD_2}$$

where $G_2$ is the grade between points 2 and 3 in feet per foot, $D_2$ is the distance between points 2 and 3 in feet, $V_2$ is the speed at point 2 in feet per second, $V_3$ is the speed at point 3 in the same units, and $R_2$ is the curved track rolling resistance of the cut in dimensionless units such as pounds per pound.

Figure 17:
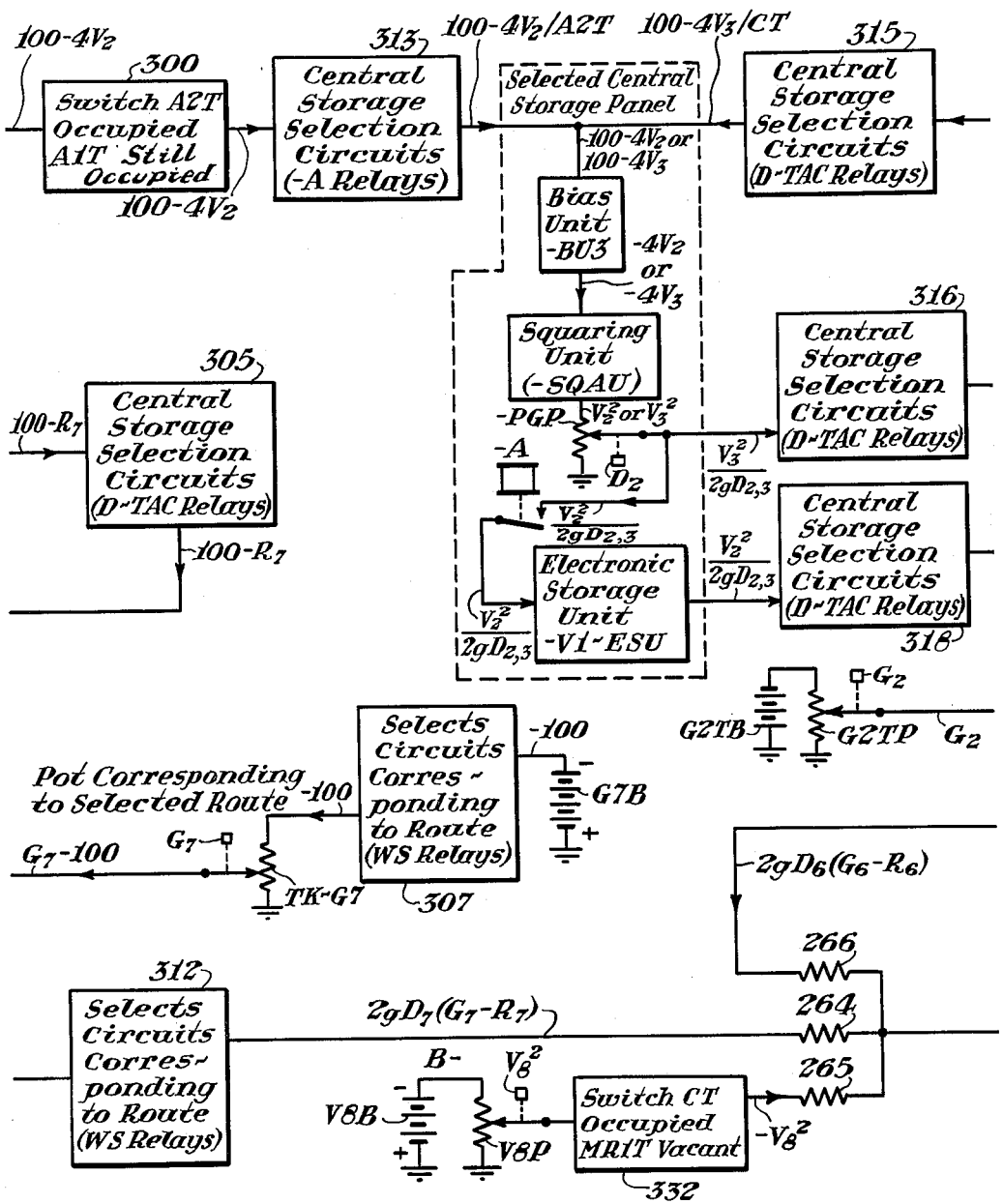
Figure 18:
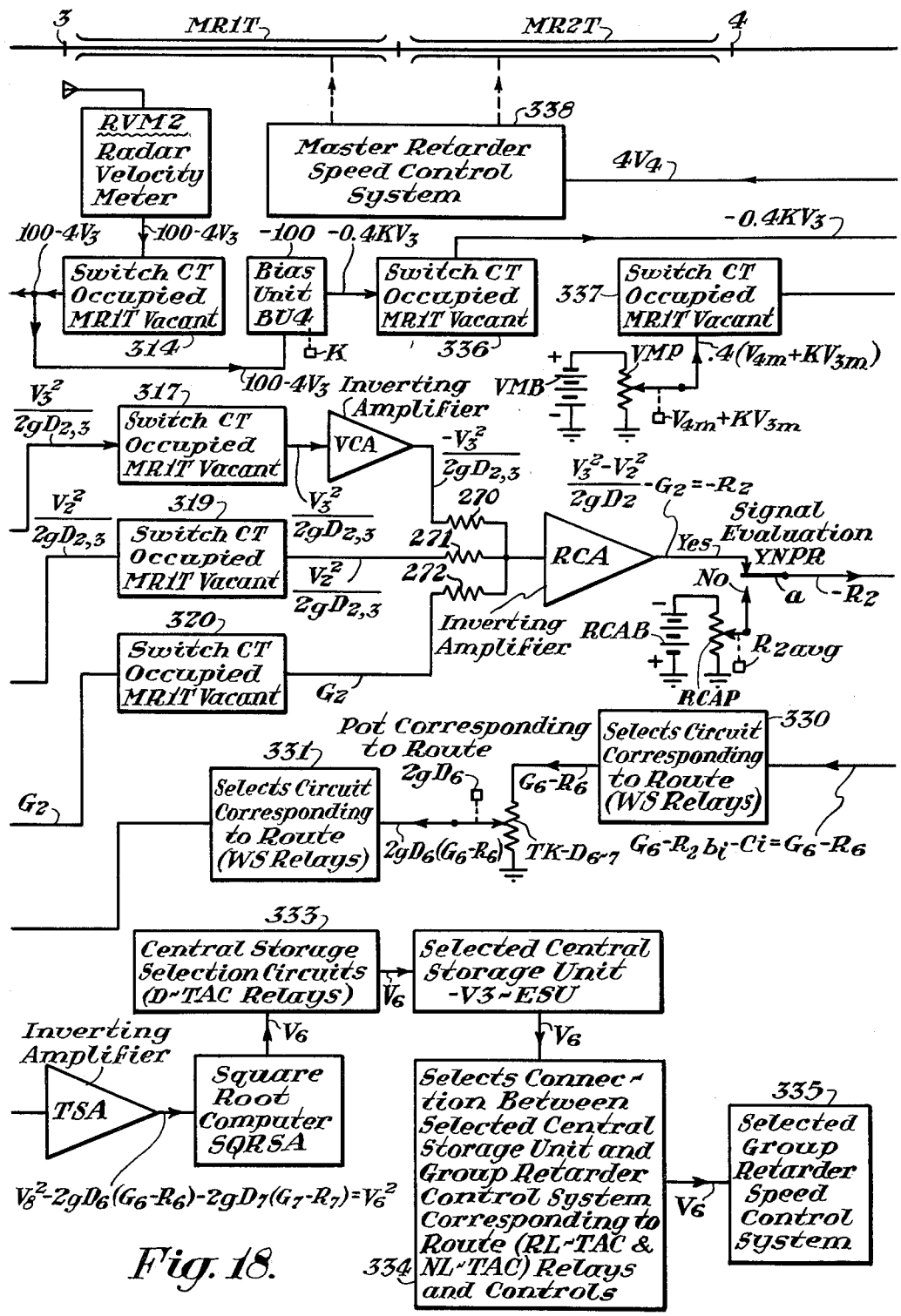
Figure 19:
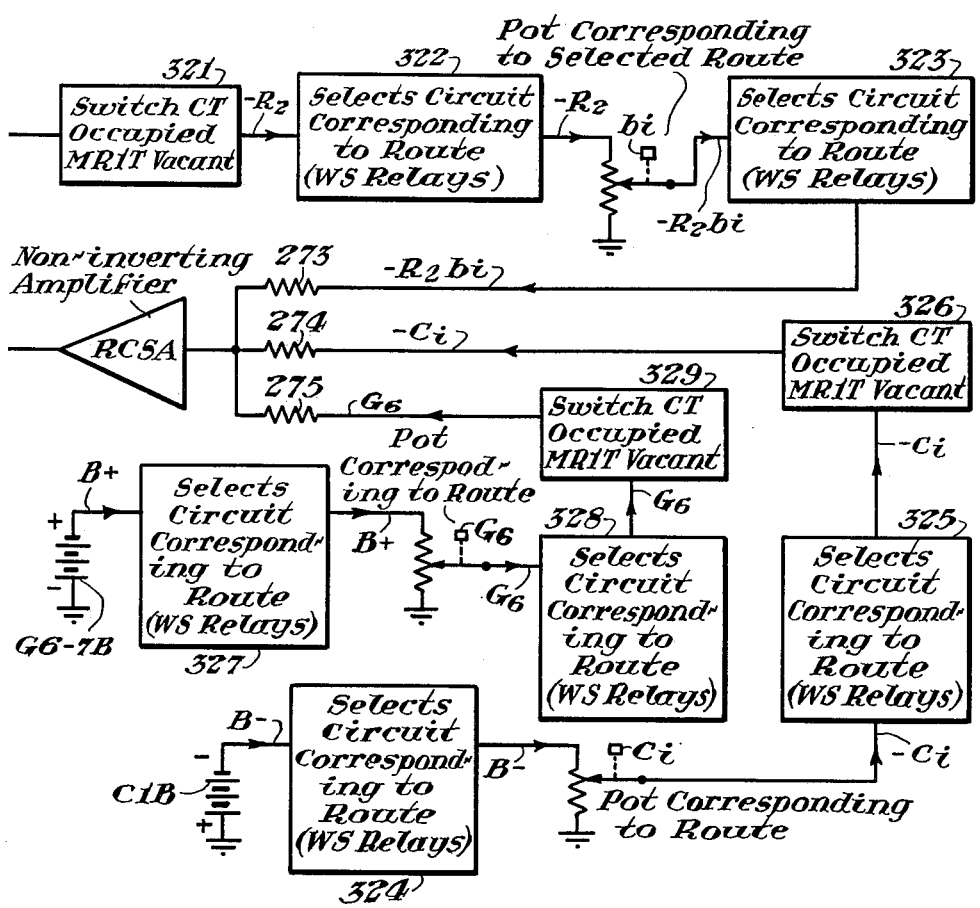

The squared velocities in the above equation are obtained in the illustrated embodiment by time-sharing a common squaring unit. As shown in FIGS. 16 and 17, a voltage equal to $100-4V_2$ from radar velocity meter RVM1 is applied through a switch 300, closed only when track section A2T is occupied by a car cut still occupying section A1T, and central storage selection circuits 313, which assign a storage panel in the central storage system to each cut, to a bias unit $-BU3$ (a typical unit is shown in FIG. 2A). The function of the bias unit is to remove the 100-volt bias on the speed voltage, so that the output at this time is $-4V_2$. As indicated on the drawing, at other times this unit is supplied with a signal proportional to $V_3$, in a manner which will be made clear.

The output of bias unit $-BU3$ is supplied to a common squaring unit $-SQAU$, such that the output is $V_2^2$ at the time that track section A2T is first occupied with A1T still occupied. The output of unit $-SQAU$ is also $V_2^2$ for the interval of the operation of the selection circuits 313 during which the relay $-A$ in the selected panel is energized. The output of the squaring unit is applied across a potentiometer $-PGP$ which is adjusted in accordance with the distance $D_2$ in such a manner that the output of the potentiometer is $$\frac{V_2^2}{2gD_2}$$

at the time in question. This output is applied over the front contact of relay $-A$ to an electronic storage unit $-V1-ESU$. This storage is maintained until the rest of the information necessary for the rolling resistance measurement has become available.

A radar velocity meter RVM2 is located adjacent the entrance to the master retarder and has its antenna oriented to measure the speed of the cuts approaching the master retarder. Thus, at the time when a given cut occupies track section CT, the radar velocity meter provides an output equal to $100-4V_3$. This output is supplied through a switch 314, closed when track section CT is occupied and track section MR1T is vacant, and central storage selection circuits 315 to the input terminal of the common bias unit $-BU3$. The same sequence previously described now takes place, with $V_3^2$ now appearing at the output of squaring unit $-SQAU$, and $$\frac{V_3^2}{2gD_2}$$

appearing on the wiper of the potentiometer $-PGP$. Relay $-A$ is released at this time, and accordingly this signal is not applied to the storage unit, but is supplied through central storage selection circuits 316, switch 317, closed when section CT is occupied and section MR1T is unoccupied, and inverting amplifier VCA to the input of summing amplifier RCA. Due to the inversion in amplifier VCA, this input is now $$-\frac{V_3^2}{2gD_2}$$

At the same time, the output of electronic storage unit $-V1-ESU$ is applied through central storage selection circuits 318 and switch 319 to a second input of summing amplifier RCA. This input is equal to $$+\frac{V_2^2}{2gD_2}$$

A third input to amplifier RCA is provided from battery G2TB and potentiometer G2TP. As shown, the wiper of potentiometer G2TP is adjusted in accordance with grade G2 so that an output proportional to G2 is supplied through switch 320 to the input of amplifier RCA.

Amplifier RCA inverts the signals supplied to it to provide an output voltage equal to $$\frac{V_3^2 - V_2^2}{2gD_2} - G2$$

As can be seen from equation (16) above, this signal is equal to $-R_2$.

The rolling resistance signal $-R_2$ is evaluated, resulting in the actuation of relay YNPR to close its front contacts if the measured signal is presumably valid, and to close its back contact if the signal is probably invalid. If a back contact of relay YNPR is closed, an average value signal is supplied, as by a battery RCAB and a potentiometer RCAP adjusted in accordance with the average value, as shown.

The curved track rolling resistance signal, whether measured or average, is supplied through a switch 321 and means for selecting a circuit corresponding to the route of each car, schematically indicated at 322, to a potentiometer corresponding to the selected route which has a wiper adjusted in accordance with the correlated constant $b_1$, so that the output of the potentiometer is equal to $-b_1R_2$. This signal is supplied through a route selected circuit 323 to one input terminal of a non-inverting summing amplifier RCSA.

A second input to amplifier RCSA is supplied from a battery C1B through route selected circuits 324, a potentiometer corresponding to the route and adjusted in accordance with the route correlation constant $c_1$, another route selected circuit 325, and a switch 326, which is closed when track section CT is occupied and section MR1T is not occupied.

A third input to amplifier RCSA is provided from a battery G6-7B, a route selected circuit 327, a potentiometer corresponding to the route and adjusted in accordance with G6, the grade of the curved portion following the group retarder in the route, a route selected circuit 328, and a switch 329 closed when section CT is occupied and section MR1T is not occupied.

The output of amplifier RCSA is now equal to $$G_6 - b_1R_2 - c_1$$

The portion $-(b_1R_2 + c_1)$ of this signal is equal to $-R_6$, in accordance with the correlation used in the illustrated embodiment of our invention. That is, the rolling resistance on the curved portion of track following the group retarder in any particular route may be correlated with the rolling resistance on the measuring section between points 2 and 3 by a straight line relationship employing the empirical constants $b_1$ and $c_1$ which are determined for each route. Thus, the output of amplifier RCSA may be expressed as $G_6 - R_6$.

The output of amplifier RCSA is applied through a circuit 330 selected in accordance with the route to a potentiometer $TK-D_{6-7}$. The wiper of this potentiometer is adjusted such that the output is the input multiplied by the factor $2gD_6$, in which $D_6$ is the length of the curved portion following the group retarder in the selected group. This output is accordingly $2gD_6(G_6-R_6)$. It is applied through a route selected circuit 331 to summing resistor 266 at the input of summing amplifier TSA. This input supplies all of the necessary information concerning the behavior of a given cut on the curved portion of track following the group retarder in its route.

An input in accordance with the desired coupling speed is applied to amplifier TSA from means comprising a battery V8B and a potentiometer V8P having its wiper adjusted to provide an output equal to $-V_8^2$ through a switch 332, which is closed when track section CT is occupied and section MR1T is unoccupied, and summing resistor 265.

The output of inverting amplifier TSA is $$V_8^2 - 2gD_6(G_6-R_6) - 2gD_7(G_7-R_7)$$

which is equal to the square of the correct leaving speed of the cut in question from the group retarder in its route; that is, to $V_6^2$. This signal is applied to square root computer SQRSA to provide an output voltage equal to $V_6$. This voltage is supplied through central storage selection circuits 333 to a central storage unit –V3–ESU, where it is stored until required for the control of the cut in the group retarder. At the proper time, this stored signal is read out by means schematically indicated at 334 which selects a connection between the proper central storage unit and the group retarder control system corresponding to the assigned route. This signal is then applied to the selected group retarder speed control system as indicated schematically at 335.

The master retarder leaving speed computer

The master retarder is controlled in accordance with a leaving speed $V_4$ obtained from the equation $$V_4 = K(V_{3m} - V_3) + V_{4m}$$

developed above. The manner in which this equation is instrumented in the disclosed embodiment of our invention will now be described.

As previously described, radar velocity meter RVM2 supplies a signal equal to $100-4V_3$, where $V_3$ is the speed of the cut approaching the master retarder. This signal is applied through a switch 314, which is closed when section CT is occupied and section MR1T is not occupied, to a bias unit BU4 which is adjusted in accordance with the constant K in the above equation and which supplies an opposite bias voltage to remove the 100-volt bias on the input signal such that the output is equal to $-.4KV_3$. This signal is applied through a switch 336 to the input of a non-inverting summing amplifier X10SA. A second input is supplied to amplifier X10SA from a battery VMB and a potentiometer VMP, as shown, the potentiometer having its wiper adjusted in accordance with the constants $V_{4m}+KV_{3m}$ so that the output signal is $.4(V_{4m}+KV_{3m})$. This signal is applied through a switch 337 to amplifier X10SA. In accordance with the equation given above, the output of amplifier X10SA is obviously equal to $4V_4$, the 4 serving to properly scale the voltage for use in the master retarder speed control system schematically indicated at 338 (FIG. 18) to which it is applied.

Referring now to FIGS. 11 through 13 arranged side by side in numerical order, there is shown an information flow diagram having the components comprising our invention shown in block form. It will be understood that the flow diagram illustrates the functions of the apparatus of our invention and, for complete circuits, reference should be made to said FIGS. 1B through 9D (less the previously mentioned excluded figures) to be described in detail later. The operation in general of the apparatus of our invention will now be described by referring to said FIGS. 11, 12, and 13.

As previously mentioned there is shown in the upper portion of FIGS. 11, 12, and 13 a stretch of railway track extending from a hump through a plurality of track switches to classification tracks 1, 2, 3, and 4. This stretch of railway track is divided into track sections, some of which are provided with track circuits to detect occupancy of the respective section. The track circuits are not shown in FIGS. 11, 12, and 13 but the sections provided with such circuits are indicated in the drawings by reference characters such as A1T, A2T, 1–2GT, etc. For the purposes of this description each of the track circuited sections will be assumed to be at least longer than the inner wheel base of the longest car to be classified in the yard, and the spacing between railway car cuts being moved over the hump will be assumed to be such that no two cuts can occupy any one track circuited section at the same time.

It is believed that it will be expedient to describe in a functional manner the general operation of the flow of information illustrated by the flow diagram by describing it in connection with the movement of a single car cut from the hump toward its selected classification track and, therefore, it will be assumed that such a cut enters the yard over the hump and enters track section A1T. It is to be understood, however, that the flow diagram is not intended to illustrate the complete operation of the apparatus of our invention and this portion of the description will necessarily refer to certain operational features not illustrated in the diagram.

Referring to FIG. 11, when the single car cut enters track section A1T it selects, from a series of storage panels, a panel for storage of all information pertaining to the cut. The selection of the respective panel establishes a binary code designated TAC for identification of the panel, and the insertion or read-out of all information pertaining to the cut, after it vacates track section A1T, is controlled by said binary code which is transferred along with or ahead of the cut as it traverses the track stretch to its destined storage or classification track.

The entrance of the cut into track section A1T interrupts the light beam from the light source to the light responsive device and, in conjunction with the track circuits for sections A1T and A2T, it can be determined that the car is a single car cut. That is, if the light responsive device again responds to the light beam, after an interruption thereof and before track section A2T is occupied by the cut, it is determined that the cut is a single car cut, as in the preesnt example, and a "yes" bit of information is inserted into the storage panel for the cut. A "no" bit of information would be inserted if the cut consists of more than a single car since section A2T would be occupied before the light beam to the light responsive device will again be completed. The "yes-no" indication is designated YN on the drawings. It will be understood that although the apparatus of our invention is shown and described as differentiating between single car cuts and cuts of a greater number of cars, the apparatus can be readily adapted to differentiate between a cut of any preselected maximum number of cars and cuts having a number of cars greater than that preselected maximum number.

The traversal of the wheels of the car over a weight detector WD causes the cut to be classified in weight classification apparatus WCA under a light, medium, or heavy classification and this bit of information designated W is supplied to the selected storage panel where it is stored until required later as will be described.

A radar velocity meter RVM1 receives from a radar antenna RA1 a signal which is converted by the meter to produce a signal voltage proportional to and representing the velocity of the cut in section A1T. This signal voltage is employed for curved track, and tangent or straight track rolling resistance computations. The signal voltage produced while the car cut traverses both track sections A1T and A2T is considered to be representative of the velocity $V_2$ of the cut when entering a curved track stretch beginning at track section A2T. This signal voltage is supplied to the proper storage panel where it is adjusted as hereinafter described, squared by the squaring apparatus indicated in the storage panels, and further adjusted in accordance with the length of said curved track stretch. This adjusted signal voltage is then stored until required later in the curved track rolling resistance computation. The signal voltage produced while the cut is traversing section A1T only is supplied to a differentiator DIF which produces an output signal voltage representing the acceleration of the cut in section A1T. This output signal voltage is in turn supplied through the weight classification apparatus to a wheel inertia correction unit WICU, previously mentioned, where the signal voltage is corrected for wheel inertia in accordance with the weight classification of the cut. The corrected signal voltage is then connected to a bias unit BU1 in which a value of voltage representing the grade in section A1T is to be subtracted from the corrected voltage. However, since such subtraction would result in a negative voltage and the storage units employed in our invention are constructed to store only positive voltages, a source of energy (not shown) is provided in the bias unit so that the unit may operate to subtract the required voltage and also provide a bias voltage to render the output from the bias unit a positive voltage representative of the tangent track rolling resistance $Rt$ of the cut of cars. This signal voltage is then supplied to the proper storage panel for storage until required later for speed control computations.

The entrance of the car cut into track section A1T also operates to supply to the proper central storage panel a route insertion designated WC for controlling the track switches in the route to the respective classification track for the cut.

No information pertaining to the cut is derived, after the cut vacates section A1T, until it enters track section CT in advance of a master retarder comprising first and second retarder sections in track sections MR1T and MR2T, respectively. Therefore, a second car cut can enter track section A1T after the first cut vacates that section, and bits of information similar to that described for the first cut will be derived for the second cut and stored in a different one of the central storage panels.

Referring to FIG. 12, when the first cut enters track section CT and traverses that section, a radar antenna RA2 supplies a signal to a radar velocity meter RVM2 which signal is converted by the meter to produce a signal voltage proportional to the velocity of the cut in section CT. This velocity is designated V3 and the derived signal voltage representative thereof is transferred by the binary code transfer and storage relays to the proper storage panel for the cut, where the signal voltage is adjusted and squared by the same apparatus employed for adjusting and squaring the voltage representing velocity V2. The V3 velocity voltage is in addition supplied to a bias unit BU4, associated with the first section of the master retarder, where the voltage is biased by a negative voltage to produce a resultant negative signal voltage proportional to the velocity of the cut. This resultant signal voltage is supplied to a computer or summing amplifier designated X10SA, to which certain constants are also supplied in the form of a voltage, to derive a second resultant signal voltage for control of the speed of the cut in the first section of the master retarder. This second resultant signal voltage is supplied to the master retarder first section storage units designated MR1ESU where it is stored in one of the units until the cut enters track section MR1T. The entrance of the cut into track section MR1T makes the said second resultant signal voltage final as representative of the proper speed control computation for the cut and the inputs to the computer X10SA are cut off. At the same time the signal voltage, representing the speed control computation and stored, as stated, in one of the master retarder first section storage units, is supplied from that storage unit to the master retarder first section control unit MR-SCU.

In addition to the signal voltage supplied from said master retarder first section storage unit to the control unit MR1SCU, the movement of the cut through track section MR1T causes a radar antenna RA3 to supply a signal to a radar velocity meter RVM3 for generating an output signal voltage in accordance with the velocity of the cut in first section of the master retarder, and this output signal voltage is also supplied to control unit MR1SCU. The two signal voltages thus supplied to MR1SCU are compared in the unit and the unit operates, in accordance with the result of said comparison, through contacts of the weight repeater relays to control retarder pressure control apparatus R1PC for the first section of the master retarder, thereby regulating the retardation force of that retarder section. The cut weight classification as indicated by the weight repeater relays is transferred to those relays previous to the entrance of the cut into track section MR1T, as will be hereinafter described. Control unit MR1SCU operates to control the pressure control apparatus R1PC directly when the unit contains no speed control computation.

In the meanwhile, all the factors required for a group retarder speed control computation V6 having been derived, velocity V3 being determined while the cut traverses track section CT and made final when the cut enters track section MR1T, speed control computation V6 is made during the traversal of section CT by the cut. It is to be noted in this connection that the aforementioned curved track section beginning at the entrance end of track section A2T ends at the exit end of track section CT and the curved track rolling resistance derivation as well as the V6 computation can therefore be terminated when the cut enters track section MR1T.

Referring further to FIGS. 11 and 12, when the cut enters track section CT as mentioned above, all the parameters pertaining to the cut and stored in the central storage panel for the cut are transferred, through control of the binary code transfer and storage relays and the occupancy of track section CT, to the computing apparatus for deriving the group retarder leaving speed computation V6 for the cut. In addition, the signal voltage representing velocity V3, generated while the cut is traversing section CT, is being supplied to the squaring apparatus in the respective central storage panel for the cut and is available for supplying to the V6 computing apparatus. Therefore, all the parameters necessary for making the group retarder leaving speed computation are now available.

The signal voltage from the squaring apparatus is supplied to an inverting amplifier VCA where it is converted to a negative signal voltage and then supplied to a second inverting amplifier RCA. It is necessary to convert the signal voltage from the squaring apparatus to a negative voltage in order to satisfy the formula for deriving the measured curved track rolling resistance. The voltage representing $V2^2$, adjusted in accordance with the length of the curved track rolling resistance measuring section, is supplied directly to inverting amplifier RCA, and an additional voltage (not shown) representing the grade in the previously mentioned curved track section, is also supplied to amplifier RCA. The voltage output of amplifier RCA represents the measured curved track rolling resistance of the cut of cars. RCA must be an inverting amplifier in order that its output will be in the form of a negative voltage to satisfy the formula for summing the curved track rolling resistance in accordance with the grade and the curvature in the track leading to the destined storage track for the cut.

The "yes-no" function as indicated by the energized or deenergized position of the YN repeater relay in FIG. 12 indicates, in the presently described instance of the general operation of our invention, whether the car cut is a single car cut and, since in the example under description the cut consists of only a single car, the YN repeater relay would control the output from amplifier RCA to supply the output for control by the route repeater relays. If the cut consisted of more than one car the YN repeater relay would indicate a "no" function and a preselected negative voltage representing the average curved track rolling resistance of cuts traversing the curved track rolling resistance measuring section would be employed in place of the output from amplifier RCA.

The route repeater relays indicated in FIG. 12 control the output from amplifier RCA to a non-inverting summing amplifier RCSA in order that said output may be adjusted with a first curved track correlation factor in accordance with the curve in the route leading to the destined storage track for the cut. There is supplied to amplifier RCSA under control of the route repeater relays a first additional voltage representing a second curved track correlation factor selected in accordance with the curve in the route leading to the destined storage track for the cut, and a second additional voltage representing the grade in that route. The output from amplifier RCSA is controlled by said route relays to adjust the output in accordance with the distance, in the respective route for the cut, from the end of the group retarder to the point of tangency in the route. The adjusted output is then supplied to an inverting total summing amplifier TSA.

The signal voltage representing the measured tangent track rolling resistance Rt stored in the respective central storage panel for the cut is transferred from the panel along to the YN repeater relay which routes the voltage to an input terminal of a non-inverting amplifier RTSA. Similarly as with the output of amplifier RCA, if the cut of cars consists of more than a single car, YN repeater relay operates to supply a preselected voltage representative of the average tangent track rolling resistance of car cuts to amplifier RTSA, rather than the measured resistance from the storage panel. At the same time that the signal voltage representing the tangent track rolling resistance for the cut is supplied to amplifier RTSA, an additional voltage representing the grade in the respective storage track for the cut is also supplied to that amplifier. The output from amplifier RTSA is controlled by the route repeater relays and routed to the proper track fullness storage unit so that said output may be adjusted in accordance with the distance to travel to coupling in the destined storage track for the cut. The adjusted output is then supplied to the total summing amplifier TSA mentioned above.

In addition to the signal voltages supplied to amplifier TSA and representing the curved track and tangent track rolling resistances adjusted in accordance with the various factors mentioned, another signal voltage respresenting the square of the desired coupling speed is supplied to amplifier TSA. The output from amplifier TSA is supplied to a non-inverting square root summing amplifier designated SQRSA which has as its output a signal voltage representative of velocity V6 which is the velocity at which the cut of cars should leave the group retarder in the route to the respective storage track for the cut. This output V6 is transferred under control of the binary code transfer and storage relays to the panel previously selected for the cut from among the central storage panels. That panel still retains the switch control and weight classifications for the cut and the signal voltage representing V6 is stored in the panel until required for control of the group retarder in the route for the cut.

When the cut enters track section MR1T and the V6 computation is thus made final, the track fullness storage for the storage track to which the cut is destined is adjusted to include the cut as another car in that track. The output signal voltage of the aforementioned radar velocity meter RVM3 is connected to a bias unit BU2 where said voltage is biased by a negative voltage to render it directly proportional in a progressively negative direction to the velocity of the cut when traversing both track sections CT and MR1T. Thus the output of bias unit BU2 at any one instant will be a negative voltage value directly in proportion to the velocity of the cut at that instant, and the total negative voltage output of unit BU2 during the period a cut traverses both said track sections can be considered as representative of the length of the cut.

The output from bias unit BU2 is supplied to a D.C.–A.C. converter MVU, the A.C. output of which is controlled by the route repeater relays to supply said A.C. to the track fullness storage unit for the destined storage track for the cut. That storage unit is adjusted in accordance with the A.C. input to reflect an additional single car cut in said storage track.

When the output from the master retarder first section storage unit is supplied to the master retarder first section control unit as described above, that output is also supplied to the master retarder second section storage units MR2ESU where it is stored in one of the units for controy of the second section of the master retarder when the car cut enters track section MR2T. When the cut enters track section MR2T, the storage in said one MR2ESU unit is transferred to the master retarder second section control unit MR2SCU. Radar antenna RA4 supplies a signal to radar velocity meter RVM4 while the car cut traverses track section MR2T, and the output from velocity meter RBM4 is supplied to control unit MR2SCU. This unit controls master retarder second section pressure control apparatus R2PC in conjunction with weight repeater relays in a manner similar to that by which apparatus R1PC is controlled by unit MR1SCU.

Prior to the time the cut enters track section 1–4T the switch control storage WC for track switch 1–4W is transferred from the respective panel for the cut in the central storage panels to switch control apparatus designated 1–4WC. The switch remains in its normal position if the cut is destined for storage track 1 or 2, or is controlled to its reverse position if the cut is destined for storage track 3 or 4.

Referring now to FIG. 13, as the cut proceeds towards the group retarder in track section 1–2GT or the group retarder in track section 3–4GT, the binary code identifying the central storage panel associated with the cut is transferred along with or ahead of the cut and, prior to the entry of the cut into the respective track section 1–2GT or 3–4GT in the route for the cut, the stored computation V6 is read out of the storage panel and transferred to a retarder control unit 1–2SCU or 3–4SCU according as switch 1–4W then occupies its normal or reverse position, respectively. There is associated with track section 1–2GT a radar antenna RA5 and a radar velocity meter RVM5; and with track section 3–4GT, a radar antenna RA6 and a radar velocity meter RVM6. The outputs of these meters are supplied to the respective control unit 1–2SCU or 3–4SCU, and these units control, through the weight repeater relays, retarder pressure control apparatus R1–2PC or R3–4PC in a manner similar to that described for the first and second sections of the master retarder.

Prior to the entry of the cut into track section 1–2T or 3–4T the switch control storage for the second switch in the route for the cut is transferred to switch control apparatus 1–2WC or 3–4WC depending on the destined storage track for the cut, and switch 1–2W or 3–4W is controlled to its normal or reverse position depending on said storage track destination. The transfer of the binary code identifying the storage panel for the cut depends on the position to which switch 1–4W is controlled for the route for the cut. That is, if switch 1–4W remains in its normal position as shown in FIG. 12 of the drawings, the binary code identification is transferred so that computation V6 and the second switch control functions WC stored in the storage panel will be transferred to 1–2 retarder control unit 1–2SCU and switch control apparatus 1–2WC, respectively. Similarly, if switch 1–4W is controlled to its reverse position the binary code identification is transferred so that V6 and the second switch control function WC will be transferred to 3–4 retarder control unit 3–4SCU and switch control apparatus 3–4WC, respectively.

When the cut enters track section 1–2T or 3–4T, as the case may be, a cancel control is transferred by the binary code transfer relays to the storage panel for the cut and all storages remaining in the panel for the cut are cancelled since all functions for the cut have been performed. The panel now returns to its normal condition and its binary code identification may now be employed, in a manner similar to that described above, for another cut of railway cars entering the yard over the hump.

The general operation of the control apparatus of our invention having been described, we will now describe in detail a specific embodiment thereof as illustrated in said FIG. 1B through FIGS. 1C and 1D to FIG. 1E, where cluded drawing references.

There is shown at the upper portion of FIGS. 1B through 1G the yard or track layout employed for the specific example of our invention herein described. This track layout comprises a stretch of railway track extending from the hump indicated at the upper left hand side of FIG. 1B through FIGS. 1C and 1D to FIG. 1E, where the stretch divides through a track switch 1–4W into two branch tracks. These branch tracks extend through FIG. 1F to FIG. 1G where they further divide through track switches 1–2W and 3–4W into four track branches leading to four classification or storage tracks designated TK1, TK2, TK3, and TK4.

As is well known, track switches have two extreme positions usually termed the normal and the reverse positions of the switch. In the drawings the switches are shown as occupying a position in which the right hand switch point is normally closed against a running rail and this position is hereinafter referred to as the switch normal position. When a switch is controlled to the opposite extreme position and its left hand switch point is closed against the other running rail the switch is occupying its reverse position hereinafter referred to as the reverse position of the switch. It is thus apparent that with switches 1–4W and 1–2W occupying their normal positions as shown, a route leading to storage track 1 is aligned through the track layout. When switch 1–4W occupies its normal position as shown and switch 1–2 occupies its reverse position, or its left hand position when referring to the drawings, a route leading to storage track 2 is aligned. Similarly, switch 1–4W occupying its reverse position and switch 3–4W occupying its normal position aligns a route to storage track 3, and switches 1–4W and 3–4W both occupying their reverse positions align a route to storage track 4. For a ready understanding of this description it should be remembered that switch 1–4W is so designated because it controls the routes to storage tracks 1 through 4. In a similar manner, switches 1–2W and 3–4W are so designated because they control the routes to storage tracks 1 and 2, and tracks 3 and 4, respectively.

Referring to FIGS. 1C, 1D, and 1E, the aforesaid stretch of railway track is provided with a master car retarder located in advance of switch 1–4W. This retarder comprises first and second retarder sections designated MR1S and MR2S, respectively, through which cars to be classified pass in the order named. It is to be understood that the master retarder may consist of one section, two sections as shown, or more than two sections as may be required. They are shown conventionally by rectangles since they may be of any one of the several known constructions with independent motor operating means, their specific construction forming no part of our present invention. However, as an aid in understanding the apparatus of our invention we shall assume that each retarder section comprises the mechanism disclosed in Letters Patent of the United States No. 1,927,201, issued September 19, 1933 to Herbert L. Bone for Railway Braking Apparatus. In this type of retarder, braking bars mounted parallel with the track rails are moved by a plurality of pneumatic units to a braking position where they engage the sides of the wheels of railway cars traversing the track section provided with the retarder. Air pressure is supplied to and exhausted from cylinders provided with pistons for actuation of the pneumatic units and consequently the braking bars. The air pressure supply to and exhaust from the cylinders is controlled by valves as hereinafter pointed out.

Beyond the master retarder and switch 1–4W there is located in each of the routes from that switch as shown in FIG. 1F and FIG. 1G a group car retarder for further applying braking force to cuts of railway cars proceeding to their respective storage tracks so that the cuts will couple with the preceding cars in each track with the minimum of impact and resultant damage of lading. The group car retarder located in the route to storage tracks 1 and 2 is designated 1–2GR, and the group retarder located in the route to storage tracks 3 and 4 is designated 3–4GR. For purpose of simplicity in the specific example of the arrangement of our invention herein described, each group retarder is assumed to comprise only a single section similar to each section of the master retarder described above and controlled in a similar manner. However, it is to be understood that in actual practice each group retarder 1–2GR and 3–4GR may comprise more than one retarder section, each section having independent control means.

The track stretch and its branches are divided into a plurality of insulated track sections, certain ones of which are provided with track circuits, each such circuit including a track battery connected across the rails at one end of the track section and a track relay connected across the rails at the other end of the section in such a manner that the track relay is energized only when its respective track section is unoccupied by the wheels and axles of a railway car. Each of these track circuited sections is of length that it cannot be spanned by the inner wheel base of the longest car to be classified in the yard.

In order that each track circuited section may be readily identified, each section is provided with a designation indicating its location or function in the yard and having a suffix T. The track battery and relay for each section are indicated by the track section designation followed by suffixes B and R, respectively. For example, in FIG. 1C there is shown the track section designated CT which is a computer track section employed for control of computation apparatus to be later described. The track battery and relay for this section are designated CTB and CTR, respectively. As a further example, there is shown in FIG. 1C and FIG. 1D the track section designated MR1T. This section is associated with the first section of the master car retarder MR1S, and the track relay and battery for the track section are designated MR1TR and MR1TB, respectively.

The uncircuited track sections, such as the section between track section A2T, to be described, and the previously mentioned track section CT, may in practice be of any length but, for purposes of this description, such sections are assumed to be no longer than twice the length of the outer wheel base of the shortest cars to be classified in the yard plus the length of te shortest track circuited section. Such length for the uncircuited track sections will insure that all the wheels and axles of a second single car cut will not be out of the track circuited section preceding the uncircuited section before at least one pair of wheels and axles of a first single car cut have entered the next track circuited section, assuming that the cuts have been properly spaced so that wheels and axles of both cuts could not occupy a track circuited section simultaneously. The reason for assuming an uncircuited track section of such a length will be made more apparent later in this description.

Referring further to said track layout it may be seen that the track sections are traversed in the following order when a movement is made from the hump through said track stretch, or from left to right as shown in the drawings. The first traversed sections are first and second approach track sections designated A1T and A2T, respectively, followed by an uncircuited section of track having no designation. Following this uncircuited section is the previously mentioned computer track section designated CT. The first section of the master retarder MR1S is located in the next track which as previously mentioned is designated MR1T, and following that track section is the track section MR2T in which the second section MR2S of the master retarder is located. Subsequent to track section MR2T is the track section 1–4T which extends through both tracks leading from switch 1–4W to the clearance points for the switch, in the manner well known in the art such that the switch may be maintained in its existing position when the section of track in which the swtch is located is occupied within said clearance points. A second uncircuited section of track extends from the clearance point for switch 1–4W in the track branch leading from the switch in its normal position to a point just short of group retarder 1–2GR, and a third uncircuited section of track extends branch leading from the switch in its reverse position to a point just short of roup retarder 3–4GR.

As previously mentioned, in the specific example of the arrangement of our invention herein described, group retarders 1–2GR and 3–4GR, for purposes of simplicity, are assumed to be single section retarders. These retarders are located in track sections designated 1–2GT and 3–4GT, respectively. However, these group retarders may each comprise more than one retarder section similar to the master retarder, and in such case a separate track circuited section would be provided for each section of each retarder so that each section of the retarder can be separately controlled.

The sections of track following track sections 1–2GT and 3–4GT each comprise an insulated track section extending to the clearance points for switches 1–2W and 3–4W, respectively, in a manner similar to that described for switch 1–4W. These track sections for switches 1–2W and 3–4W are designated 1–2T and 3–4T, respectively, and are employed in a manner similar to that described for switch 1–4W as well as for other uses to be described herein. As is apparent from the drawings, no track sections are provided in the classification track sections are provided in the classification tracks as no track circuits are required therein for the present example of our invention.

The stretch of track extending from the exit end of track section A1T to the entrance end of track section MR1T and including track sections A2T, CT, and the non-track-circuited section between, is a curved track section employed for the purpose of measuring the curved track rolling resistance of cuts of cars classified in the yard. The limits of this curved track section are defined on the drawings by the letters PT for "point of tangency" disposed on the drawing adjacent the insulated joints at the entrance end of track section A2T and the exit end of track section CT. The manner in which this curved track section is employed will be set forth in detail later in this description.

There is shown on one of the track rails adjacent the entrance end of track section A1T in FIG. 1B a car weight determining means for device indicated by the reference character WD. This device is indicated as connected to weight classification apparatus designated WCA, by a dotted line extending from the device to a dotted line block representing such apparatus and enclosing three relays designated R1, RH1 and RL1. The weight determining device and the weight classificaiton apparatus are shown in such manner because they form no part of our present invention but, for purposes of this description, are assumed to be similar to apparatus disclosed in Letters Patent of the United States, No. 2,819,682, issued January 14, 1958 to Edward C. Falkowski for Car Retarder Speed Control Apparatus. In FIG. 1a of that patent are shown relays R1, RH1 and RL1 as indicated in said dotted line block in FIG. 1B of the drawings of our apparatus and, for purposes of this description, it is sufficient to point out that relay RL1 only is energized when a railway car traversing track section A1T is classified by the weight determining device WD as a light weight car, relay RH1 only is energized when the car is classified as a heavy car, and both relays are energized when the car is of a medium weight classification. In the operation of our apparatus relay R1 is energized, so long as track section A1T is occupied, by a circuit extending from terminal B of the battery over back contact e of track relay A1TR and through the winding of relay R1 to terminal N of the battery. Relay R1 operates in a manner similar to that shown in FIG. 1a of the said Falkowski patent, to return relays RH1 and RL1 energized, when once energized, so long as track section A1T is occupied. Reference is made to the cited Faulkowski patent for a complete understanding of the manner in which the weight determining arrangement shown in FIG. 1B of the drawings of our apparatus operates. The circuits controlled by relays RL1 and RH1 will be discussed in detail hereinafter.

At the upper left hand portion of FIG. 1B is indicated a normally energized light source projecting a light beam, indicated by the arrows, diagonally across the junction of track section A1T and the stretch of track to the left thereof leading from the hump. On the opposite side of the track is indicated a light responsive device arranged to receive said light beam and to control the energization of a relay designated PCR from a battery designated LRB. The light responsive device is arranged to energize relay PCR only so long as the light beam from hte light source is uninterrupted. Such arrangements of light beams and light responsive devices are well known in the art and it is not necessary to describe the details thereof. Relay PCR is provided with a front contact a employed to control a circuit in a manner to be hereinafter described. However, it is desired to point out at this time that relay PCR is released whenever a railway car interrupts the light beam, and the diagonal projection of the light beam across the tracks will insure that relay PCR will remain released during the passage of the spaces between cars of a car cut comprising more than a single car.

A plurality of relays designated 1–4 ASDR, 1–4A1CR, 1–4A2CR, 1–4A3CR, and 1–4A4CR are shown in FIG. 1B enclosed in a dotted line rectangle or block. These relays are employed in conjunction with the apparatus of our invention to illustrate the insertion of route storages into the storage apparatus of our invention and in themselves form no part of the invention. In Letters Patent of the United States, No. 2,863,991, issued December 9, 1958 to Benjamin Mishelevich for Automatic Control of Railway Classification Yard Track Switches, there is shown in FIG. 2a a series of relays designated 1–6A1CR through 1–6A6CR, and in FIG. 2b a relay designated 1–6ASDR. These CR relays comprise relays in the last bank of an initial storage unit employed for storing route controls for aligning the routes in the yard shown in FIG. 1 of said patent. The relay 1–6ASDR is employed for controlling the energization of the CR relays at the proper time. In FIG. 1B of the drawings of the present application the CR relays correspond to said CR relays of the cited patent, and relay 1–4ASDR corresponds to the 1–6ASDR relay of the patent. However, since only four classification tracks are employed in the example of our present application only four CR relays are necessary instead of the six such relays employed in the cited patent.

Referring to FIG. 1B of the present application it may be seen that only that portion of the control circuits for the CR and DR relates leading to the negative terminal N of the battery are shown, contact a of relay 1–4ASDR corresponding to contact h of relay 1–6ASDR shown in FIG. 2b of the Mishelevich patent. Relay 1–4ASDR of the present application is controlled in part over back contact a of track relay A1TR to indicate that relay 1–4ASDR and consequently a predetermined one of the CR relays is to be energized when track section A1T is occupied by a cut of railway cars. It is believed sufficient for the purposes of this description to point out that only relay 1–4A1CR in FIG. 1B of the present application energized when a route to storage track 1 is to be aligned for a cut of cars traversing track section A1T, relay 1–4A2CR only is energized when the route for the cut is to storage track 2, relay 1–4A3CR only is energized when the route for the cut is to storage track 3, and relay 1–4A4CR only is energized when the route to storage track 4 is to be aligned for the cut. The circuits controlled by each of these relays in its energized position will be discussed later. For a complete understanding of the operation of the circuits of the initial storage unit containing the CR relays, reference should be made to the above cited Mishelevich Patent No. 2,863,991.

The velocity of car cuts traversing track section A1T is measured with a standardized radar velocity meter designated RVM1, employed in conjunction with a directional radar antenna RA1, both shown in FIG. 1B. The antenna RA1 is oriented in the direction of the track and faces the hump as shown. This antenna is connected over a suitable wave guide to an input terminal $a$ on radar velocity meter RVM1. The velocity meter produces an output voltage that is representative of the velocity of a car moving in track section A1T. The radar velocity meter and associated antenna form no part of our present invention but for the details of the arrangement and operation thereof reference is made to the aforesaid copending application for Letters Patent of the United States, Serial No. 676,730, of David P. Fitzsimmons and William A. Robinson Jr.

The output from output terminal $b$ of radar velocity meter RVM1 is supplied to an input terminal $a$ on a differentiator designated DIF which may be of the type disclosed in Letters Patent of the United States, No. 2,908,865, issued October 13, 1959 to Richard D. Campbell for Frequency Measuring Apparatus. The output of differentiator DIF will be a signal voltage proportional to the acceleration of a cut of cars moving in the path of antenna RA1 associated with velocity meter RVM1, and this output is supplied from an output terminal $b$ on differentiator DIF to an input terminal $a$, $b$, or $c$ on a wheel inertia correction unit designated WICU. The input terminals $a$, $b$, or $c$ of unit WICU are selected over contacts of the previously mentioned RL1 and RH1 relays of the weight classification apparatus WCA. If the car cut is of light weight classification the circuit from output terminal $b$ on differentiator DIF extends over the front point of contact $b$ of relay RL1 and the back point of contact $b$ of relay RH1 to input terminal $b$ on unit WICU. If the car cut is classified as medium weight the circuit from output terminal $b$ on the differentiator extends over the front points of contacts $b$ of relays RL1 and RH1 in series to input terminal $a$ on unit WICU, and if the cut is a heavy weight cut the circuit from the differentiator extends over the back point of contact $b$ of relay RL1 and front contact $c$ of relay RH1 to input terminal $c$ on unit WICU. The input to terminals $a$, $b$, and $c$ of unit WICU is supplied to the resistance portions of potentiometers M, L, and H, respectively, inside the unit, which adjust the input signal supplied to the unit for a wheel inertia factor in accordance with the weight classification of the car cut. The wiper portions of the potentiometers M, L, and H are connected to output terminals $f$, $e$, and $d$, respectively, on the unit WICU. The output from terminals $d$, $e$, or $f$ is again routed over contacts of said RL1 and RH1 relays to a common conductor which is connected to input terminal $a$ on a bias unit designated BU1. The circuit from output terminal $d$ of unit WICU extends over the back point of contact $c$ of relay RL1 and the front point of contact $d$ of relay RH1 to said common conductor. The circuit from output terminal $e$ of unit WICU extends over front contact $d$ of relay RL1 and the back point of contact $d$ of relay RH1 to the common conductor. The circuit from output terminal $f$ of unit WICU extends over the front point of contact $c$ of relay RL1 and the front point of contact $d$ of relay RH1 to the common conductor.

The above-mentioned bias unit BU1 comprises a suitable source of D.C. voltage such as a battery BU1B which may, for example, have a voltage of 100 volts which is connected across a potentiometer that is normally adjusted to a value dependent on the grade in track section A1T, so that the output from the potentiometer is 100 volts minus the said adjustment for the grade. This signal voltage is supplied to a summing network comprising summing resistors SR1 and SR2 connected to an output terminal $b$ on the bias unit. The rolling resistance of a cut of cars traversing track section A1T is represented by the signal voltage appearing at said output terminal $b$ of unit BU1 and the 100-volt bias is applied at this time to render the output a positive voltage since the voltage storage units employed in the apparatus arrangement of our invention, and to be hereinafter described, will store positive voltages only. The output from output terminal $b$ of bias unit BU1 is supplied for storage to a selected one of a group of storage panels as hereinafter set forth.

As mentioned above the output from radar velocity meter RVM1 is a signal voltage representative of the velocity of a cut of cars traversing track section A1T and may be employed as representing the velocity V2 of the cut when entering the curved track section beginning at the entrance end of track section A2T. Therefore, in addition to supplying the voltage output from output terminal $b$ of velocity meter RVM1 to input terminal $a$ of differentiator DIF, the voltage is also supplied, during the period the cut occupies both track section A1T and A2T, to said selected one of said group of storage panels for storage. This operation will also be described in more detail later on.

Referring to FIGS. 2A, 2B, and 3A through 6A, there is shown a series of seven storage panels designated 1P through 7P. One of these panels is selected by each cut of cars entering the yard over the hump and the selected panel is employed to store parameters or bits of information for the cut until required for making computations pertaining to the cut or for controlling apparatus in the yard for retarding or routing of the cut. Each storage panel is identified by a distinctive binary code and this code is transferred along with or ahead of the cut for which a panel is selected so that the proper panel may at any time be reselected and the stored information in the panel may be read out when required. In the example of our invention we have assumed that the maximum number of cuts that can be between the hump and the last switches in the routes to the several storage tracks is seven and, therefore seven storage panels are all that are required for the illustration of our invention. A three-bit binary code can identify a maximum of seven panels and, therefore, the binary code employed in our example consists of only three bits. It is to be understood, however, that the number of storage panels employed may be any number equal to or greater than the number of cuts that can simultaneously be en route through the yard to the storage tracks, and the binary code may consist of any number of bits so long as the identities available by employing the bits of the code are equal to or greater than the number of panels. That is to say, a four-bit binary code could be employed to identify the seven panels in the example of our invention, if so desired for any reason. Similarly, the three-bit binary code employed in the illustrated example could be used to identify less than seven storage panels, as is believed obvious.

Each of the storage panels being similar in apparatus arrangement, except as pointed out below, it is believed expedient for purpose of simplicity to illustrate only storage panel 1P in detail. The description of the details of panel 1P will apply equally well to each of the other panels as will readily be apparent as the description proceeds.

The panels 1P through 7P are identified respectively by binary codes 001, 010, 011, 100, 101, 110, and 111, and each respective code is indicated in parentheses following the panel designation of each panel shown on the drawings.

The details of panel 1P are shown in FIGS. 2A, 2B, 3A, and 4A of the drawings. Referring to FIG. 2A there is shown on storage panel 1P a plurality of terminals designated 1 through 13. Terminals 1 and 2 comprise panel selection terminals which are connected internally in the panel to the windings of selection control relays 1A and 1H, respectively. The pickup circuit for relay 1A may be traced from terminal 1 over back contact b of relay 1H and through the winding of relay 1A to terminal N of the battery. Relay 1A is thus energized when current is supplied from battery terminal B to terminal 1 of panel 1P, in a manner to be hereinafter described, and when relay 1H is in its released position. Relay 1A is provided with a stick circuit which may be traced from battery terminal B over back contact c of relay 1H in multiple with a back contact a of a relay 1HA, to be described, and thence over front contact a of relay 1A, and through the winding of relay 1A to battery terminal N. Relay 1A is thus maintained in its picked-up position, when once controlled to that position, so long as either relay 1H or 1HA remains released.

The pickup circuit for relay 1H extends from said terminal 2 on storage panel 1P, over front contact c of relay 1A and through the winding of relay 1H to battery terminal N. Relay 1H is thus energized when current is supplied from battery terminal B to terminal 2 of panel 1P, in a manner to be hereinafter described, and relay 1A is in its picked-up position. Rellay 1H is provided with a stick circuit which extends from battery terminal B over a back contact b of a relay 1RO, to be described, and thence over front contact a of relay 1H, and through the winding of relay 1H to battery terminal N. Relay 1H is thus maintained in its picked-up position, when once controlled to that position, so long as relay 1RO remains released.

Relay 1HA previously mentioned, is an auxiliary control relay which repeats the picked-up position of relay 1H. The pickup circuit for relay 1HA extends from battery terminal B over front contact d of relay 1H and through the winding of relay 1HA to battery terminal N. Relay 1HA is thus energized whenever relay 1H is energized. Relay 1HA is employed to insure that relay 1A will maintain its front contact c closed for a sufficient period of time for relay 1H to close its front contact a and complete its stick circuit. Back contact a of relay 1HA in the stick circuit for relay 1A is, therefore, employed to maintain relay 1A picked up until relay 1H closes its front contact d, thereby also insuring the closure of front contact a of relay 1H and the completion of the stick circuit for relay 1H.

Relay 1RO, previously mentioned, is the cancellation for panel 1P. This relay has a pickup circuit extending from an additional terminal 14 on panel 1P through the winding of relay 1RO to battery terminal N. Relay 1RO is thus energized whenever battery terminal B is connected to termnial 14 in a manner to be hereinafter described. Relay 1RO is provided with a stick circuit which extends from terminal 1 on panel 1P, through a rectifier designated 1PRE1, employed to prevent sneak circuits, over front contact a of relay 1RO and through the winding of relay 1RO to battery terminal N. Relay 1RO is thus maintained picked-up when once picked up if and so long as energy from battery terminal B is being supplied to said terminal 1.

Relay 1H has a second pickup circuit which extends from terminal 14 on panel 1P through a rectifier designated 1PRE2, employed to prevent sneak circuits, and through the winding of relay 1H to battery terminal N. This circuit insures that relay 1H is maintained picked up, after the opening of back contact b of relay 1RO in the stick circuit for relay 1H, so long as energy is supplied to the winding of relay 1RO. Upon energy being removed from the winding of relay 1RO, relay 1H will release before relay 1RO due to the slow release feature of relay 1RO. Thus, it is insured that relay 1RO cannot close its back contact b and again complete the stick circuit for relay 1H in the event relay 1H is slightly sluggish in releasing.

By the above circuit description it is apparent that relay 1A may be energized by supplying energy from terminal B of the battery to terminal 1 of panel 1P, providing relay 1H is not energized, thereby indicating that panel 1P is not available for storage because it already contains storages. When relay 1A is energized, relay 1H may then be energized by supplying energy to terminal 2 of panel 1P. When relay 1H (and consequently relay 1HA) is energized, it is maintained energized until energy is supplied to and removed from terminal 14 of the panel, thereby momentarily energizing cancellation relay 1RO. The continued energization of relay 1H prevents relay 1A from again becoming energized so long as relay 1H is energized.

A conductor 206 extends between the aforesaid terminal 11 on panel 1P and an additional terminal 32 on panel 1P as shown in FIGS. 2A, 3A and 4A of the drawings. Another conductor 207 extends between the aforesaid terminal 12 on panel 1P and an additional terminal 33 on panel 1P as shown in said drawings. A third conductor designated 208 extends between terminal 13 on panel 1P and a third additional terminal 34 on panel 1P. The energized or deenergized conditions of these conductors establish the three-bit binary code identifications previously discussed. That is, the deenergized or energized condition of conductor 206 indicates zero or one, respectively, for the first bit of the three-bit binary codes. Similarly, the deenergized or energized condition of conductor 207 indicates zero or one, respectively, for the second bit of the three-bit binary codes, and the deenergized or energized condition of conductor 208 indicates zero or one, respectively, for the third bit of the three-bit binary codes. Therefore, to establish the binary code identification 001 assigned to panel 1P only conductor 208 would be energized. This is accomplished over the front contact b of relay 1A which, when closed, connects battery terminal B to conductor 208, conductors 206 and 207 remaining deenergized at this time.

Terminal 1 of panel 1P is connected to an additional terminal 22 on panel 1P (FIG. 4A) when relay 1H is energized. This circuit may be traced from terminal 1 in FIG. 2A over the front point of contact e of relay 1H and thence through FIGS. 3A and 4A over conductor 241 to said terminal 22. When this circuit is closed by the energization of relay 1H, energy supplied to terminal 1 of panel 1P is supplied to said terminal 22 and thence to terminal 1 of panel 2P as shown in FIG. 4A. This energy operates in panel 2P to energize relay 2A over circuits similar to those traced for relay 1A. Relay 1A in panel 1P cannot be energized at this time as its previously described pickup circuit is open at back contact b of relay 1H. Terminal 1 of each storage panel is connected to terminal 22 of that panel by the energization of the H relay in the panel, and terminal 22 of each preceding panel is connected to terminal 1 of the succeeding panel. Thus, energy supplied to terminal 1 of panel 1P may be relayed by the energized position of relay 1H to terminal 1 of panel 2P and thence by the energized position of relay 2H to terminal 1 of panel 3P, etc., until the energy is supplied to a panel in which the H relay is not energized. This panel will constitute the first available panel, that is the first panel not containing storages, and the A relay in that panel will be energized and indicate that that panel has also been selected for storages. Each time the A relay in a selected panel is energized, contacts of that relay supply energy to the proper ones of the terminals 11, 12, and 13 of the selected panel to establish the binary code identifying that panel, these terminals 11, 12, and 13 of each panel being internally connected to terminals 32, 33, and 34, respectively, on that panel; and terminals 32, 33, and 34 of each preceding panel being externally connected to terminals 11, 12, and 13, respectively, of the succeeding panel, as shown in FIGS. 4A, 5A, and 6A.

Terminal 2 of panel 1P is internally connected over conductor 242 to terminal 23 of that panel, and thence to terminal 2 of panel 2P. Terminal 2 of panel 2P connects internally to terminal 23 of that panel. Each successive panel is connected internally in a similar manner and, also in a similar manner, externally to the next preceding panel. Thus, when energy is supplied from terminal B of the battery to terminal 2 of panel 1P, this energy flows through the successive panels to the one having its A relay energized and energizes the H relay of that panel. The energization of the H relay releases the A relay of the respective panel, as heretofore pointed out for panel 1P.

The aforementioned terminals 3 through 10 on panel 1P are internally directly connected in the panel over conductors 243 through 250 to additional terminals 24 through 31, respectively, on the panel, which terminals in turn are externally connected to terminals 3 through 10 on panel 2P. Similar terminals on each of the panels 2P through 7P are internally connected in a manner similar to panel 1P, and terminals 3 through 10 of each panel connect externally to terminals 24 through 31, respectively, of the preceding panel, in a manner similar to panels 1P and 2P. It is not necessary to show terminals 22 through 34 on panel 7P as that panel is the last in the series and, therefore, has no succeeding panel. It should also be noted that each of the panels 2P through 7P is provided with a cancellation terminal 14 which is connected internally to an RO cancellation relay similar to relay 1RO in panel 1P. The application and removal of energy from battery terminal B to each terminal 14 serves to cancel the storages in that panel in a manner similar to that outlined for panel 1P.

Referring again to panel 1P shown in FIGS. 2A, 2B, 3A, and 4A, terminals 3 through 10 each connects through a front contact of relay 1A to relays or storage apparatus provided in the panel for storing bits of information supplied to each said terminal. The relays employed in the panel for storing informtion will be discussed first.

Relays 1RLS and 1RHS in FIG. 3A are used to store weight classification information for a cut of cars. Relay 1RLS is provided with a pickup circuit which extends from terminal 5 on panel 1P over front contact $g$ of relay 1A, conductor 106, and through the winding of relay 1RLS to battery terminal N. Relay 1RLS is thus picked up when energy from battery terminal B is supplied to terminal 5 on panel 1P and relay 1A is energized. Relay 1RLS is provided with a stick circuit which extends from battery terminal B over front contact $h$ of relay 1H, front contact $a$ of relay 1RLS, and through the winding of relay 1RLS to battery terminal N. Relay 1RLS is thus maintained picked-up, when once picked up, so long as relay 1H is energized.

Relay 1RHS is provided with a pickup circuit extending from terminal 6 of panel 1P over front contact $f$ of relay 1A, conductor 105, and through the winding of relay 1RHS to battery terminal N. Relay 1RHS is thus picked up when energy from battery terminal B is supplied to terminal 6 on panel 1P and relay 1A is energized. Relay 1RHS has a stick circuit which extends from battery terminal B over said front contact $h$ of relay 1H, front contact $a$ of relay 1RHS, and through the winding of relay 1RHS to battery terminal N. Relay 1RHS is thus maintained picked-up, when once picked up, so long as relay 1H is energized.

It is believed expedient to point out here that relay 1RLS only will be energized if the cut of cars for which panel 1P is selected is classified as a light weight cut, relay 1RHS only will be picked up if the cut of cars is classified as a heavy weight cut, and both relays will be energized if the cut is classified as a medium weight cut, as hereinafter described.

Relays 1WS1 and 1WS2 in FIG. 4A are employed to store switch controls for switch 1-4W, and for switches 1-2W and 3-4W, respectively. That is, relay 1WS1 is used to store a switch control for the first switch in any route (switch 1-4W) and relay 1WS2 is used to store a switch control for the second switch in any route (switch 1-2W or switch 3-4W). Relay 1WS1 has a pickup circuit extending from terminal 4 on panel 1P over front contact $h$ of relay 1A, conductor 107, and through the winding of relay 1WS1 to battery terminal N. Relay 1WS1 is thus energized when energy from terminal B of the battery is supplied to terminal 4 on panel 1P and relay 1A is energized. Relay 1WS1 has a stick circuit extending from terminal B of the battery over said front contact $h$ of relay 1H, conductor 113, front contact $a$ of relay 1WS1, and through the winding of relay 1WS1 to battery terminal N. Relay 1WS1 is thus maintained energized, when once energized, so long as relay 1H remains energized.

Relay 1WS2 is provided with a pickup circuit extending from terminal 3 on panel 1P over front contact $k$ of relay 1A, conductor 108, and through the winding of relay 1WS2 to battery terminal N. Relay 1WS2 is thus energized when energy from battery terminal B is supplied to terminal 3 on panel 1P and relay 1A is energized. Relay 1WS2 is provided with a stick circuit which extends from terminal B of the battery over said front contact $h$ of relay 1H, conductor 113, front contact $a$ of relay 1WS2, and through the winding of the relay to battery terminal N. Relay 1WS2 is thus maintained energized, when once energized, so long as relay 1H remains energized.

Relays 1WS1 and 1WS2 will be energized only if the first and second switches respectively in the route for the cut of cars for which panel 1P is selected are to be controlled to their reverse positions. When a switch is to occupy its normal position for aligning the route for such cut the respective switch control storage relay 1WS1 or 1WS2 will remain deenergized. This operation will become more apparent as the description proceeds.

Relay 1YN in FIG. 4A is a "yes-no" function control relay provided in panel 1P and employed to indicate when the cut of cars for which the panel is selected is no longer than the maximum length. This maximum length in the specific example of our invention being described is the length of a single car. However, as previously mentioned, it will be understood that such maximum length may in actual practice constitute the combined total length of any chosen maximum number of cars making up a cut, as long as the distance from the hump to the exit end of the tangent track rolling resistance measuring section A1T is sufficiently long that the rolling resistance of a cut comprising said chosen maximum number of cars can be effectively measured.

Relay 1YN is energized to indicate "yes" when the cut of cars for which panel 1P is selected is of the proper length, and remains deenergized when the cut is greater than said maximum length, that is, in the present example, greater than the length of a single car. Relay 1YN is provided with a pickup circuit extending from terminal 7 of panel 1P over front contact $n$ of relay 1A, conductor 112, and through the winding of relay 1YN to battery terminal N. Relay 1YN has a stick circuit which extends from terminal B of the battery over said front contact $h$ of relay 1H, conductor 113, front contact $a$ of relay 1YN and through the winding of the relay to battery terminal N. Relay 1YN is thus energized when energy from battery terminal B is supplied to terminal 7 of panel 1P and relay 1A is energized, and is maintained energized, when once energized, so long as relay 1H remains energized.

Relays 1RHS, 1RLS, 1WS1, 1WS2, and 1YN are provided with stick circuits additional to those previously described for each relay, each such circuit extending from terminal B of the battery over front contact $p$ of relay 1A, and thence over said front contacts $a$ of each respective relay and through the respective relay winding to battery terminal N. Each of these relays are therefore maintained energized, when once energized, so long as relay 1A remains energized, these stick circuits insuring that the energized relays will remain so until relay 1H becomes picked up, as hereinafter described, to complete the stick circuits over said front contact *h* of relay 1H.

It is to be understood that each of the remaining storage panels 2P through 7P are each also provided with storage relays having pickup and stick circuits similar to that described for panel 1P. The pickup circuits for such relays in each respective panel are connected to corresponding terminals on each panel as the corresponding relays shown and described for panel 1P. It is believed that such arrangement is readily understood and, therefore, the details of each of the panels 2P through 7P need not be shown and described for an understanding of the arrangement.

In FIG. 3A are shown three electronic storage units designated 1V1–ESU, 1RT–ESU, and 1V3–ESU. These units are respectively employed for storing voltages representative of the entering velocity V2 of cuts of cars entering track section A2T, squared and adjusted in accordance with the grade in the curved track measuring section; the RT straight track rolling resistance of the cut of cars when traversing track section A1T, and the V6 computed desired leaving speed for the cut of cars when it leaves the respective group retarder in the route to the storage track for the cut. The complete details of these storage units are not shown in the drawings as such details are not part of our present invention. However, each of these units may be identical to the unit shown and described in Letters Patent of the United States No. 2,914,750, issued November 24, 1959 to James A. Cook, Jr. for Electronic Storage Device.

The internal arrangement of electronic storage device 1V1–ESU is shown in relatively greater detail than that of the other similar storage units employed and the structure and operation of these units as typified by unit 1V1–ESU will be described. As shown in FIG. 3A unit 1V1–ESU comprises a D.C. amplifier designated by the reference character 41 having an input circuit between a terminal *a* and a grounded terminal *b* of the amplifier, and an output between terminal *c* and grounded terminal *d* of the amplifier.

As described in the aforesaid Cook Patent No. 2,914,750, an input signal or voltage to be stored is supplied to terminal *a* of storage unit 1V1–ESU and thence flows through a circuit extending through a resistor 42 over the back point of contact *b* of relay 1V1H, capacitor 43, back contact *c* of relay 1V1H, and through resistor 44 to ground. In the condition shown, output terminal *c* of amplifier 41 is connected over lead 45 through back contact *a* of relay 1V1H, and the circuit then extends through resistor 44 to ground to provide a first feedback circuit to the amplifier. Resistor 44 is thus connected in shunt with the input and output circuits of the amplifier. With relay 1V1H deenergized, the voltage supplied to terminal *a* of storage unit 1V1–ESU causes current to flow through resistor 42, capacitor 43, and resistor 44 in series. While the capacitor is charging, the input and output circuits of amplifiers 41 are connected together and shunted by resistor 44. Accordingly, a voltage will be developed at the output of the amplifier in accordance with the internal characteristics of the amplifier. This voltage will appear across resistor 44. The polarity of this voltage may be the same as or opposite to that provided by the supplied signal voltage. If the voltages are opposite in polarity, capacitor 43 will be charged to a voltage equal to the difference between the supplied signal voltage and the voltage developed by the amplifier across resistor 44. If the voltages are of the same polarity, the capacitor will be charged to a voltage equal to the sum of the supplied signal voltage and the voltage across resistor 44. In either case, the capacitor is charged to a voltage which differs from the voltage supplied to terminal *a* of unit 1V1–ESU by the voltage developed across resistor 44.

The circuit constants are so chosen that capacitor 43 is charged rapidly. When relay 1V1H is energized, as hereinafter described, the connection between the amplifier output circuit and the input circuit is interrupted at the open back contact *c* of relay 1V1H. The supplied signal voltage is now disconnected at the open back point of contact *b* of relay 1V1H. The closing of the front point of contact *b* of relay 1V1H now connects a resistor 46 in series with capacitor 43 in a feedback path between input terminal *a* and output terminal *c* of amplifier 41. A high value is chosen for resistor 46 and, since the amplifier is arranged to have negligible current flowing in the input circuit, capacitor 43 retains its charge for a relatively long period of time, during which the stored value of the supplied signal voltage is available between terminal *c* and grounded terminal *d* of the storage unit 1V1–ESU.

Units 1RT–ESU and 1V3–ESU each contain a control relay designated 1RTH and 1V3H, respectively, similar to relay 1V1H in storage unit 1V1–ESU just described. Relays 1RTH and 1V3H each have one terminal of their control windings connected to input terminals *b* of their respective storage units and the other terminal of their control windings connected to battery terminal N similarly to relay 1V1H in storage unit 1V1–ESU. A pickup circuit for relay 1V1H may be traced from battery terminal B over front contact *f* of relay 1H, terminal *b* of unit 1V1–ESU, and through the winding of relay 1V1H to battery terminal N. Relay 1V1H is thus energized whenever relay 1H is energized. A pickup circuit for relay 1RTH may be traced from battery terminal B over front contact *g* of relay 1H, terminal *b* of unit 1RT–ESU, and through the winding of relay 1RTH to battery terminal N. Relay 1RTH is thus energized whenever relay 1H is energized. Relay 1V3H is provided with a pickup circuit which extends from battery terminal B over front contact *b* of an auxiliary relay 1V3HS, to be described, terminal *b* of unit 1V3–ESU, and through the winding of relay 1V3H to battery terminal N. The energization of each of the relays 1V1H, 1RTH and 1V3H makes the voltage signals supplied to terminals *a* of the respective storage units final and supplies the voltage signals stored in each unit to the output terminals *c* of the respective unit. Output terminal *c* of unit 1V1–ESU is connected to a terminal 15 on panel 1P, output terminal *c* of unit 1RT–ESU is connected to a terminal 35 on panel 1P, and output terminal *c* of unit 1V3–ESU connects to a terminal 17 on panel 1P. The circuits and apparatus for utilizing the signal voltages stored in said storage units are connected to said terminals 15, 17 and 35 in a manner to be hereinafter described. It is to be noted that panels 2P through 7P are also each provided with terminals 15, 17 and 35 which connect to similar storage units provided internally in each panel and employed for similar storages as those of panel 1P.

Relays 1V3HS is an auxiliary control relay employed for making storages in storage unit 1V3–ESU final. Relay 1V3HS has a pickup circuit extending from a terminal 18 on panel 1P and through the winding of the relay to battery terminal N. Relay 1V3HS is provided with a stick circuit extending from battery terminal B over the previously mentioned front contact *h* of relay 1H, front contact *a* of relay 1V3HS, and through the winding of the relay to battery terminal N. Relay 1V3HS is thus energized when energy from terminal B of the battery is supplied to terminal 18 on panel 1P, as hereinafter described, and is maintained energized, when once energized, so long as relay 1H remains energized. It will also be noted that panels 2P through 7P are also each provided with a terminal 18 which is employed for a similar purpose as terminal 18 of panel 1P.

The input terminal *a* of storage unit 1RT–ESU is connected to a terminal 8 on panel 1P over conductor 104 and a front contact *e* of relay 1A. Therefore, a voltage signal representing the straight track rolling resistance of a cut of cars traversing track section A1T may be supplied to terminal 8 of said panel and stored in unit 1RT–ESU when panel 1P, as indicated by the energized condition of relay 1A, is the panel selected for said cut. If one of the other panels 2P through 7P is the panel selected for the cut the voltage signal will be conducted through each panel and will be supplied to terminal 8 of the proper panel and thence to the proper RT–ESU storage unit by the energized A relay of the panel selected for the cut.

Input terminal $a$ of storage unit 1V3–ESU is connected to a terminal 37 on panel 1P. The voltage signal representing the desired leaving speed V6 for a cut from its respective group retarder may be supplied to said terminal 37 when panel 1P is the panel previously selected for that cut. Each of the panels 2P through 7P also has a terminal 37 to which the voltage signal representing velocity V6 is supplied when the respective panel is the proper one for the cut. The arrangement for reselecting the previously selected panel for each cut will be set forth hereinafter.

Terminal 9 on panel 1P is connected over a front contact $d$ of relay 1A and conductors 100 and 101 to an input terminal $a$ on a bias unit 1BU3 in panel 1P. The signal voltage representing the velocity V2 of a cut of cars entering track section A2T is supplied to said terminal 9 as hereinafter described and, if panel 1P is the selected panel for the cut, is supplied to input terminal $a$ of said bias unit. The voltage signal representing V2 comprises a positive voltage which is proportional in a progressively negative direction to the speed of the cut. That is, for example, a cut moving at 5 m.p.h. when entering track section A2T may have a V2 representative signal voltage of plus 80 volts, while a cut moving at 20 m.p.h. may have a V2 signal of plus 20 volts. The decrease of the voltage signal as the velocity increases is a straight-line function. For further examples, therefore, a cut having a velocity of 15 m.p.h. when entering track section A2T would have a V2 representative voltage of plus 40 volts, and a velocity of 10 m.p.h. is represented by a V2 voltage of plus 60 volts.

Since the velocity voltage signal representing V2 is to be supplied to a squaring circuit, to be described, which requires a negative voltage input and produces a positive squared voltage output for storage in storage unit 1V1–ESU, it is necessary to change the positive voltage signal representing V2 to a negative voltage which is proportional to the velocity of the cut which the V2 voltage represents. To accomplish this it is only necessary to bias the voltage signal representing V2 and supplied to terminal 9 of panel 1P by a negative voltage of 100 volts. This biasing is performed in bias unit 1BU3 by means of a 100-volt battery 1BU3B in the unit, the positive terminal of the battery being connected to ground, and the negative terminal of the battery being connected, through summing resistors SR3 and SR4 provided in the unit, to the unit supplied to terminal $a$ of the bias unit. The resultant voltage produced is a negative voltage proportional to the velocity of a cut entering track section A1T. That is, referring to the above-stated examples of the V2 representative voltages, the position voltage signal of plus 80 volts representing a velocity of 5 m.p.h. would be coverted to a minus 20 volts in the bias unit, the plus 60 signal voltage representing a velocity of 10 m.p.h. would be converted to minus 40 volts, the plus 40 signal voltage representing a velocity of 15 m.p.h. would be converted to minus 60 volts, and the plus 20 signal voltage representing a velocity of 20 m.p.h. would be converted to a minus 80 volts. Thus the output from terminal $b$ of bias unit 1BU3, which terminal is connected at the junction of resistors SR3 and SR4, and an additional resistor SR5 converted between said junction and ground, will be a negative voltage proportional to the velocity of the cut. This voltage is supplied to an input terminal $a$ of the squaring apparatus unit 1SQAU, to be described, and the output from that unit will be a positive voltage proportional to $1/100$ of the square of a signal voltage representing the square of the speed of a cut of cars entering track section A2T or $V2^2/100$. This voltage signal representing $V2^2/100$ is supplied from output terminal $b$ of unit 1SQAU to one terminal of the resistance portion of a potentiometer designated 1PGP employed for adjusting the voltage signal in accordance with the length of the aforementioned curved track section beginning at the entrance end of track section A2T. The wiper portion of potentiometer 1PGP is connected over conductors 109 and 110 and through a front contact $l$ of relay 1A to the input terminal $a$ of storage unit 1V1–ESU.

The bias unit 1BU3, the squaring apparatus unit 1SQAU and the potentiometer 1PGP are also employed in conjunction with a signal voltage which represents the velocity V3 of a cut of cars when leaving said curved track section and for which panel 1P is the selected storage panel. This signal voltage representing V3 is derived in a manner similar to V2, as hereinafter described, and is supplied to a terminal 36 (FIG. 3A) on panel 1P. From terminal 36 the signal voltage representing V3 flows over conductor 103 and conductor 101 to terminal $a$ on bias unit 1BU3. This voltage signal is adjusted in bias unit 1BU3, the squaring apparatus unit 1SQUA, and by potentiometer 1PGP similarly to the voltage representing V2, and appears at the wiper of potentiometer 1PGP as a signal voltage which represents $1/100$ of the square of the velocity of the cut of cars when leaving the curved track measuring section, or $V3^2/100$, adjusted for the distance from the entering end to the exit end of said track section. This signal voltage is supplied over conductors 109 and 111 to a terminal 16 on said panel 1P and will be transferred to computing apparatus for deriving a group retarder desired leaving speed V6 in a manner to be hereinafter described.

The squaring apparatus unit 1SQAU in panel 1P, as well as similar units in panels 2P through 7P, comprise no part of our present invention, but for the purpose of this description each such unit may be considered to be identical to that shown and described in copending application for Letters Patent of the United States, Serial No. 38,024 filed June 26, 1960, by Orval L. Utt for an Analog Squaring Device which application is assigned to the assignee of the present application. A brief description of the operation of unit 1SQAU is sufficient for the purpose of an understanding of the present description.

Referring to FIG. 2B the squaring apparatus unit 1SQAU is shown as comprising five main parts, mainly, an oscillator, an amplifier limiter, an integrator, a squaring circuit, and a smoothing circuit. An alternating current signal of fixed frequency, for example of the order of 784 cycles per second, is supplied from the oscillator as an input to the amplifier limiter. This fixed frequency is amplified and limited by the amplifier limiter to produce an output signal having a square wave form of precise amplitude which is confined between limits of positive 150 volts and positive 300 volts so that the signal amplitude is relatively free of variation of parameters of the amplifier. The amplifier limiter, therefore, produces a signal output of square wave form and symmetrical about ground potential. This signal output is supplied to the input of the integrator which comprises a high gain direct current amplifier and a feedback capacitor C1, and a resistor R1 in the input circuit to the amplifier. This integrator, therefore, produces an output signal which is of triangular wave form.

The output signal from the integrator is passed through a 0.1 mcf. coupling capacitor C3 and clamped by means of a diode D2 connected in parallel with a 1 meg. resistor R6, to the input signal to be squared. This input signal appears between input terminal $a$ on unit 1SQAU and ground and is the signal which it is desired to square. As previously pointed out, this input signal is a direct current voltage having an amplitude anywhere between zero and negative 100 volts and is supplied to said input terminal $a$ on unit 1SQAU from bias unit 1BU3. Thus a triangular signal will appear at the junction of diode D2 and capacitor C3 which has its lowest extremity a voltage equal to the voltage supplied to input terminal $a$ of unit 1SQAU. A diode D1 and a 1 meg. resistor R7 are connected in series to the junction of diode D2 and capacitor C3 so as to serve as a rectifying circuit which passes only the negative part of the triangular wave form appearing at said junction. This negative part of the triangular wave form or signal pulses is supplied to the input of a cathode follower amplifying stage. These signal pulses consist of triangular pulses having an amplitude exactly equal to the amplitude of the signal appearing at terminal $a$ of unit 1SQAU and, as is well known, the average voltage produced by these triangular pulses is proportional to the square of the signal voltage appearing at said terminal $a$. These triangular pulses are passed through the cathode follower amplifier to result in a signal at a lower impedance point than that supplied to the input of that amplifier and thereby facilitate the smoothing or filtering stage which follows. The ouput from the cathode follower amplifying stage passes through a 0.1 mcf. capacitor C4 connected in series with a diode D3 the other terminal of which is connected to ground. This arrangement provides a clamp circuit such that the output from the cathode follower amplifier stage consists of triangular pulses similar to that appearing at the input to that amplifier stage but at a lower impedance point. It is now only necessary to smooth the triangular output pulses from the cathode follower amplifier stage into a direct current voltage.

The apparatus for smoothing or filtering the triangular pulses, that is, the smoothing circuit, consists of resistors R2, R3, R4 and R5, capacitor C2 and a standard operation amplifier SMA. The triangular pulses appearing at the junction of capacitor C4 and diode D3 are supplied through the 2 meg. resistor R2 to the input of amplifier SMA. The arrangement of the 1 meg. resistors R3 and R4, the 2 meg. resistor R5 and the capacitor C2 in conjunction with the amplifier SMA provides a circuit having a low frequency cut off to provide smoothing of the triangular pulses so as to provide a direct current voltage at the output of the amplifier SMA. Resistors R2, R3, R4 and R5 are chosen so to provide proper calibration and these resistors serve to provide 100 volts output from amplifier SMA for 100 volts input to terminal $a$ of unit 1SQAU, or 1/100 of the square of the voltage supplied to said terminal $a$. Similarly, a 10-volt input to terminal $a$ of unit 1SQAU provides a 1-volt output from terminal $b$ of the unit, a 20-volt input will provide a 4-volt output, and an 80-volt input will provide a 64-volt output. The output voltages resulting from other input voltages are obvious from these examples, that is, they are 1/100 of the square of the input voltages. It should also be noted that the squaring apparatus described requires a negative voltage input and produces a positive voltage output.

There is also shown on panel 1P in FIGURES 3A and 4A five additional terminals designated 19, 20, 21, 38, and 39. A circuit for supplying energy to terminal 19 extends from terminal B of the battery over front contact $b$ of relay 1RHS to terminal 19. A circuit for supplying energy to terminal 38 extends from terminal B of the battery over front contact $b$ of relay 1RLS to terminal 38. Similar circuits for supplying energy to terminals 39, 20, and 21 extend from terminal B of the battery over front contacts $b$ of relays 1WS1, 1WS2, and 1YN, respectively, to terminals 39, 20, and 21, respectively. These circuits are employed to control repeater relays which are connected to said terminals in a manner to be hereinafter described.

Each of the panels 2P through 7P contains apparatus and circuitry similar to that just described for panel 1P and the terminals on panels 2P through 7P are identical to those on panel 1P in relation to the apparatus to which they are connected and the functions which they control.

Referring now to FIG. 1B, it is believed that it will be expedient to describe the manner in which one of the storage panels 1P through 7P is selected for a cut of cars entering track section A1T, and the manner in which the different parameters pertaining to the cut of cars are supplied to the storage panels through control of the track relays for sections A1T and A2T, and relay PCR controlled by the photocell or light responsive arrangement shown in the upper left hand portion of FIG. 1B.

When a cut of cars proceeding from the hump interrupts the light beam projected across the track from the light source to the light responsive device, relay PCR is released, opening its front contact $a$ and thus interrupting the circuit to front contact $c$ of track relay A2TR. Therefore, when the first wheels and axle of the cut enter track section A1T releasing track relay A1TR, no energy will be supplied to back contact $c$ of relay A1TR and conductor 1P7. No further action takes place in these circuits at this moment.

The release of track relay A1TR by the entrance of the first wheels and axle of the cut into track section A1T closes at back contact $a$ of relay A1TR, the energizing circuit for relay 1–4ASDR which closes its front contact $a$ to energize the proper one of the relays 1–4A1CR through 1–4A4CR for the route for the cut which route is thus stored in the preliminary switch storage apparatus shown. As shown the energization of relays 1–4A2CR or 1–4A4CR, indicating a storage for aligning the routes to storage tracks 2 or 4, respectively, will connect terminal B of the battery to conductor 1P3 over front contact $a$ of the respective relay. The energization of relay 1–4A4CR will also connect terminal B of the battery to conductor 1P4 over front contact $b$ of that relay. Relay 1–4A3CR being energized to indicate a storage for aligning the route to storage track 3 will connect terminal B of the battery to conductor 1P4 over front contact $a$ of that relay. These conductors 1P3 and 1P4 connect to terminals 3 and 4, respectively, of storage panel 1P.

The release of track relay A1TR also energizes relay R1 over back contact $e$ of relay A1TR, and relay R1 will complete stick circuits for relays RH1 and RL1 which are energized in accordance with the weight classification for the cut of cars as the wheels of the cut pass over weighing device WD. Assuming the weight classification for the cut to be determined as medium both relays RH1 and RL1 will be energized and will in turn energize conductors 1P5 and 1P6 from terminal B of the battery over front contacts $a$ of relays RL1 and RH1, respectively. Conductors 1P5 and 1P6 are connected to terminals 5 and 6 respectively, of panel 1P.

The release of track relay A1TR also connects terminal B of the battery over the back point of contact $d$ of that relay to conductor 1P1 which connects to terminal 1 of panel 1P. This circuit is the panel selection circuit which operates to energize the A relay in the series of panels 1P through 7P which is the first of said panels having no storages. For example, if panel 1P already contains storages, relay 1H is energized and the energy supplied to terminal 1 of panel 1P will be conducted over front contact $e$ of relay 1H to terminal 22 of panel 1P and thence to terminal 1 of panel 2P. The open back contact $b$ of relay 1H prevents said energy from being supplied to the winding of relay 1A. If panel 2P also contains storages, the energy supplied to terminal 1 of that panel is sequentially transferred to each of the panels 3P through 7P over a closed front contact $e$ of the H relay in each panel containing storages. When the energy is supplied to terminal 1 of a panel void of storages it will be conducted over back contact $b$ of the H relay in that panel to the winding of the A relay in the panel which relay will thus be energized to select that panel for storing the parameters pertaining to the cut.

It will now be assumed that panel 1P is void of storages, and, therefore, the energy supplied to terminal 1 of panel 1P is supplied to the winding of relay 1A over the previously described pickup circuit for that relay and relay 1A becomes energized closing its front contacts $a$ through $h$, $k$ through $n$, and contact $p$.

Assuming that the route for the cut is to be to storage track 4 and, as previously mentioned, the cut has a medium weight classification, the energy supplied to conductors 1P3, 1P4, 1P5, and 1P6 will flow from terminals 3, 4, 5, and 6 of panel 1P over the front contacts $k$, $h$, $g$, and $f$, respectively, of relay 1A and over conductors 108, 107, 106, and 105, respectively, to the windings of relays 1WS2, 1WS1, 1RLS, and 1RHS, respectively. These relays will all thus become energized to store the medium weight classification for the cut and switch control storages for aligning the route to storage track 4 for the cut.

As the cut progresses through track section A1T and before it enters track section A2T, radar velocity meter RVM1 and its associated antenna RA1, differentiator DIF, wheel inertia correction unit WICU, and bias unit BU1 all operate in the manner previously described to supply to conductor 1P8 and thence to terminal 8 of panel 1P a signal voltage representative of the tangent track rolling resistance of the cut of cars as it traverses the tangent track rolling resistance measuring section A1T. The circuit from output terminal $b$ of differentiator DIG extends at this time to input terminal $a$ of unit WICU which, therefore, adjusts the output voltage signal from the differentiator in accordance with the wheel inertia correction factor for a medium weight cut classification. The signal voltage representative of the tangent track rolling resistance of the cut is conducted from terminal 8 of panel 1P over front contact $e$ of relay 1A to terminal $a$ of storage unit 1RT–ESU for storage.

If panel 1P had not been selected for the cut the subsequent panel 2P through 7P so selected would have its A relay energized and the energies supplied to terminals 3, 4, 5, 6 and 8 of panel 1P would flow sequentially through each panel to the selected panel and thence over similar front contacts of the A relay in that panel to the windings of storage relays and to the storage units RT–ESU in the selected panel.

In the example of our invention herein described a "yes" function is to be stored for each cut of cars only if the respective cut entering the yard is a single car cut. Therefore relay YN in each storage panel 1P through 7P should be energized to store a "yes" function only if the cut of cars for which the panel is selected consists of but a single car. Track section A1T is therefore assumed to be but slightly longer than the outer wheel base of the longest car to enter the yard. When a single car cut traverses track section A1T, therefore, the light beam projected across the tracks will be again received by the light responsive device to energize relay PCR, before track section A2T is occupied thereby releasing track relay A2TR. Under such conditions relay PCR will close a circuit extending from terminal B of the battery over front contact $a$ of relay PCR, front contact $c$ of relay A2TR, back contact $c$ of relay A1TR, and conductor 1P7 to terminal 7 of panel 1P. Assuming as before that panel 1P has been selected for the cut, the energy supplied to said terminal 7 will flow over front contact $n$ of relay 1A to the winding of relay 1YN and through the winding of the relay to battery terminal N. Relay 1YN will thus be energized closing its front contact $a$ to complete its stick circuit including front contact $p$ of relay 1A. If the cut of cars consists of more than a single car, track circuit A2T will be occupied before the light beam projected across the track is again uninterrupted and the pickup circuit for relay 1YN would be open at front contact $c$ of track relay A2TR when relay PCR picks up upon the passage of the rear end of the cut past the light beam. Relay 1YN (or the YN relay in the selected panel) would thus remain deenergized to indicate a "no" function for the cut. The use of the "yes-no" functions will be pointed out later.

It will now be assumed that the car cut under discussion is a single car cut and, therefore, relay 1YN is energized prior to the entry of the cut into section A2T. It should be pointed out that front contact $p$ of relay 1A is employed in the stick circuits for all the storage relays in panel 1P as previously mentioned, and relays 1RHS, 1RLS, 1WS1, 1WS2, and 1YN are all thus maintained energized over said front contact at this time.

There is shown in FIG. 1B an additional relay designated A2TSR which is controlled by the track relays A1TR and A2TR. This relay is a normally released slow pickup relay and has a pickup circuit which extends from terminal B of the battery over back contact $a$ of relay A2TR, front contact $b$ of relay A1TR and through the winding of relay A2TSR to the battery terminal N. Relay A2TSR is also provided with a stick circuit which extends from terminal B of the battery over said back contact $a$ of relay A2TR, front contact $a$ of relay A2TSR and through the winding of relay A2TSR to battery terminal N. Relay A2TSR is thus energized whenever a cut of cars enters track section A2T and vacates track section A1T and, once so energized remains so as long as the cut continues to occupy track section A2T.

The entrance of the cut into track section A2T and the release of track relay A2TR closes a circuit which operates to make the tangent track rolling resistance measurement final, and also closes a circuit for supplying the signal voltage from velocity meter RVM1 to the previously described apparatus for squaring and adjusting such voltage to obtain a resultant voltage representing velocity $V2^2/100$, adjusted for the length of the curved track measuring section, and for storing said resultant voltage. The first of these circuits extends from terminal B of the battery over back contact $e$ of relay A2TR, back contact $c$ of relay A2TSR, described above, conductor 1P10, terminal 10 of panel 1P, and thence over front contact $m$ of relay 1A to the winding of control relay 1RTH in storage unit 1RT–ESU. Relay 1RTH is thus energized, terminates the storage of further energy supplied to terminal $a$ of unit 1RT–ESU, and supplies to the output terminal $c$ of that unit, and consequently to terminal 5 of panel 1P, the energy already stored in the unit. The second circuit mentioned extends from output terminal $b$ of velocity meter RVM1 over back contact $b$ of relay A2TSR, back contact $b$ of relay A2TR, conductor 1P9, terminal 9 of panel 1P, and over front contact $d$ of relay 1A and conductors 100 and 101 to input terminal $a$ of bias unit 1BU3. The output from meter RVM1 is thus eventually stored in unit 1V1–ESU by the circuits previously described, as a voltage representative of $V2^2/100$ adjusted in accordance with the length of the curved track rolling resistance measuring section. It should be noted that the voltage supplied to unit 1V1–ESU is terminated by the energization of relay A2TSR when the cut of cars vacates track section A1T. The slow pickup feature of relay A2TSR insures that relay 1H will be energized, in the manner hereinafter described, before the relay A2TSR opens its back contacts $b$ and $c$ to interrupt the pickup circuit for relay 1RTH and the input circuit to terminal $a$ of storage unit 1V1–ESU.

When the cut of cars vacates track section A1T and relay A1TH again picks up, an energizing circuit for relay 1H is closed. This circuit for relay 1H extends from terminal B of the battery over the front point of contact $d$ of track relay A1TR, back contact $d$ of track relay A2TR, conductor 1P2, terminal 2 of panel 1P, through the previously described pickup circuit for relay 1H to the winding of that relay and through the winding to battery terminal N. Relay 1H picks up and closes the previously described stick circuits over front contact $h$ of relay 1H to relays 1RHS, 1RLS, 1WS1, 1WS2 and 1YN. The picking up of relay 1H also closes over its front contact $f$ an obvious pickup circuit for relay 1V1H in storage units 1V1–ESU and the $V2^2$ voltage supplied to that unit is made final. The closing of front contact $g$ of relay 1H closes a second pickup circuit for relay 1RTH in storage unit 1RT–ESU. Thus, the storage relays and storage unit control relays in panel 1P will be maintained energized so long as relay 1H remains energized.

The pickup of relay 1H closes the pickup circuit for relay 1HA and, when this latter relay opens its back contact *a*, relay 1A in panel 1P will release. The release of relay 1A opens at the front contact *p* of that relay the previously described stick circuit for the storage relays, but these relays are now maintained picked up over front contact *h* of relay 1H. The release of relay 1A also opens as its contacts *d* through *h* and *k* through *n* the energizing circuits for the storage relays and storage units in panel 1P and the storages in these units cannot, therefore, be disturbed or changed by storages for another cut of cars entering track section A1T and for which the next empty storage panel will be selected.

As previously mentioned relay A2TSR once picked up is maintained so as long as the cut of cars occupies track section A2T. Therefore, while a first cut of cars is traversing track section A2T, having vacated track section A1T, a second cut of cars can enter track section A1T and the parameters for this second cut will be stored in the storage panel selected for that cut. The continued energization of relay A2TSR, while the first cut occupies track section A2T, assures that the occupancy of track section A2T by the first cut will not operate to indicate that the second cut which entered track section A1T has also entered track section A2T. Thus, the parameters for the second cut will be supplied to the storage panel selected for that cut in the proper sequence, that is, in a manner similar to that just described for the first cut. The vacating of track section A2T by the first cut and the consequential picking up of track relay A2TR will open at back contact *a* of relay A2TR the stick circuit for relay A2TSR, and that relay will release. The circuits and apparatus, with the exception of the storages in panel 1P, are now in the condition existing before the entry of the first cut into track section A1T, providing a second cut has not entered into that track section. If a second cut has already entered track section A1T when the first cut vacates section A2T, the circuits and apparatus will operate in a manner identical to that described for the first cut except, as pointed out, the storages for the second cut will be supplied to a storage panel other than panel 1P.

In order that the description of the read-in into selected storage panels of additional information pertaining to each cut of cars and the read-out of information from said panels for each cut may be readily understood, it is believed expedient at this time to describe the manner in which the distinctive binary codes identifying selected panels are transferred along wth the associated cuts of cars as they progress through the yard to their respective storage tracks. The relays and associated circuitry employed for the transfer of the TAC binary codes along with the associated cuts of cars are shown in FIGS. 5C, 5D, 2E, 2F, 2G, 4E, 4F, and 4G of the drawings.

Referring first to FIG. 5C there is shown a series of transfer control relays designated A2TPR, A2TPRA, A2TPRB, A2TPRC, CTPR, and CTPRA; a first group of TAC or binary code storage relays designated A1TAC, A2TAC, and A3TAC; a second group of binary code storage relays designated B1TAC, B2TAC, and B3TAC; and a third group of binary code storage relays C1TAC, C2TAC, and C3TAC. The energized or deenergized condition of each relay of each group of TAC relays reflects the binary code being stored by that relay group. For example, if relay A3TAC is energized and relays A1TAC and A2TAC remain deenergized that group of relays is storing the binary code 001 employed for identifying panel 1P of the storage panels. Similarly, if relays A1TAC and A3TAC are energized and relay A2TAC remains deenergized the group of relays is storing the binary code 101 identifying panel 5P of the storage panels. The other energized or deenergized combinations of each group of code storage relays and the codes stored thereby is believed obvious from these two examples.

Referring further to FIG. 5C, relay A2TPR is a normally energized relay which has a pickup circuit extending from terminal B of the battery over the front point of contact *f* of track relay A2TR and through the winding of relay A2TPR to battery terminal N. Relay A2TPR is thus picked up whenever track relay A2TR is energized.

Relay A2TPRA has a pickup circuit which extends from terminal B of the battery over the back point of contact *f* of relay A2TR, front contact *a* of relay A2TPR, and through the winding of relay A2TPRA to battery terminal N. Relay A2TPRA has a stick circuit which extends from battery terminal B over back contact *a* of relay A2TPRB, front contact *a* of relay A2TPRA, and through the winding of relay A2TPRA to battery terminal N. Relay A2TPRA is thus energized when relay A2TR releases after a period of energization and, when relay A2TPRA is thus energized, it is maintained energized so long as relay A2TPRB remains released.

Relay A2TPRB has a pickup circuit which extends from terminal B of the battery over the front point of contact *b* of relay A2TPRA, through the winding of relay A2TPRB, and over back contact *b* of relay A2TPRC to battery terminal N. Relay A2TPRB is thus picked up whenever relay A2TPRA is energized and relay A2TPRC is released.

Relay A2TPRC has a pickup circuit extending from terminal B of the battery over the back point of contact *b* of relay A2TPRA, front contact *b* of relay A2TPRB and through the winding of relay A2TPRC to battery terminal N. Relay A2TPRC is provided with a stick circuit which extends from battery terminal B over back contact *a* of relay CTPRA, front contact *a* of relay A2TPRC, and through the winding of relay A2TPRC to battery terminal N. Relay A2TPRC is thus energized whenever relay A2TPRA is released and relay A2TPRB is energized and, once so energized, is maintained energized so long as relay CTPRA remains released.

Relay CTPR is a normally energized relay which has a pickup circuit extending from terminal B of the battery over the front point of contact *p* of relay CTR and through the winding of relay CTPR to battery terminal N. Relay CTPR is thus energized whenever track relay CTR is energized.

Relay CTPRA is provided with a pickup circuit which extends from battery terminal B over the back point of contact *p* of track relay CTR, front contact *a* of relay CTPR, and through the winding of relay CTPRA to battery terminal N. Relay CTPRA is thus energized when relay CTR releases after a period of energization, and remains so energized only until the effects of the slow release feature of relay CTPR have terminated thereby releasing relay CTPR and in turn relay CTPRA.

Relays A2TPR, A2TPRA, A2TPRB, and A2TPRC are employed to count and store two actuations of track relay A2TR. However, it is believed that the operation of the relay combination will be more readily understood by specific examples thereof.

Assuming track relay A2TR to be normally energized as shown, slow release repeater relay A2TPR will also be normally energized. Upon the release of track relay A2TR the pickup circuit over the front contact *a* of slow release repeater relay A2TPR to relay A2TPRA will be momentarily closed and relay A2TPRA will pick up to close its stick circuit. However, the energization of relay A2TPRA will also energize relay A2TPRB at this time and the stick circuit to relay A2TPRA will be interrupted at open back contact *a* of relay A2TPRB. Relay A2TPRA will, therefore, release after the expiration of its slow release period. The release of relay A2TPRA will momentarily close the pickup circuit for relay A2TPRC which will pick up and close its stick circuit including back contact *a* of repeater relay CTPRA. Relay A2TPRC will thus be picked up and maintained picked up until relay CTPRA opens it back contact *a*. It may then be said that relay A2TPRC is storing a count for a first deenergization of track relay A2TR. Relay A2TR picking up after said deenergization again picks up repeater relay A2TPR. Assuming that relay A2TR is now deenergized a second time, relay A2TPRA is energized as before, but relay A2TPRB remains released as its pickup circuit is open at back contact *b* of relay A2TPRC. Since relay A2TPRB remains released at this time the stick circuit for relay A2TPRA will be maintained over back contact *a* of relay A2TPRB and relay A2TPRA will thus remain energized to store a count for a second deenergization of track relay A2TR. If relay A2TR thereafter picks up relay A2TPR will again be energized but relays A2TPRA and A2TPRC will continue to remain energized to reflect two actuations of track relay A2TR.

It will now be assumed that track relay CTR becomes released thereby momentarily energizing CTPRA opening the stick circuit for relay A2TPRC. Relay A2TPRC thus releases after the expiration of its slow release period. It is to be noted that both relays CTPR and CTPRA are slow release to insure that relay CTPRA remains energized for a sufficient period to insure the release of relay A2TPRC before relay CTPRA again closes its back contact *a*.

When relay A2TPRC releases the pickup circuit for relay A2TPRB is completed at back contact *b* of relay A2TPRC and relay A2TPRB is energized and opens the stick circuit for relay A2TPRA which releases after the expiration of its slow release period. The release of relay A2TPRA again closes the pickup circuit for relay A2TPRC which picks up and again completes its stick circuit over back contact *a* of relay CTPRA. The count for the first actuation of track relay A2TR has now been cleared out of the circuits, the count for the second actuation of track relay A2TR has been transferred to relay A2TPRC to indicate as if it were the first count, and a third actuation of track relay A2TR can now be stored in track relay A2TPRA in a manner similar to the second count and indicating as a second count.

By the above description it is apparent that the relays described are employed for registering car cuts traversing track section A2T and entering the uncircuited track section between the exit end of track section A2T and the entrance end of track section CT, and for registering the car cuts out of said uncircuited section when the cuts enter track section CT. As previously mentioned the uncircuited track section, in the present example of our invention, must be of a maximum length that at least one set of wheels and axle of a first cut enters track section CT before the last set of wheels and axle of a following cut vacates track section A2T. This maximum length includes the distance of the minimum spacing between cuts of cars, which spacing is employed to insure that the wheels and axles of two cuts of cars will not occupy a track circuited track section at the same time. However, by adding additional relays to the counting chain system comprising the A2TPR relays the aforementioned uncircuited track section may be made as long as desired, commensurate with the number of car cuts the counting system is adapted to accommodate. For each additional cut the counting chain is adapted to accommodate, another group of three TAC relays must also be added.

Referring further to FIG. 5C, relay A1TAC has a pickup circuit which includes conductor 1P11, front contact *h* of track relay A2TR, and thence extends through the winding of relay A1TAC to battery terminal N. Conductor 1P11 connects to terminal 11 of storage panel 1P and relay A1TAC is, therefore, energized whenever relay A2TR is energized and the binary code 100, 101, 110, or 111 is established by the A relay in one of the panels 4P, 5P, 6P, or 7P being energized, thus supplying energy from battery terminal B to the conductor leading to said terminal 11. Relay A1TAC is provided with a stick circuit extending from terminal B of the battery over back contact *g* of track relay A2TR, front contact *a* of relay A1TAC, and through the winding of relay A1TAC to battery terminal N. The slow release feature of relay A1TAC insures that the relay will remain picked up, upon the opening of front contact *h* of relay A2TR, for a sufficient period of time to permit back contact *g* of relay A2TR to close and establish the stick circuit.

Relay A2TAC has a pickup circuit which includes conductor 1P12, front contact *k* of track relay A2TR, and thence extends through the winding of relay A2TAC to battery terminal N. Conductor 1P12 connects to terminal 12 of storage panel 1P and relay A2TAC is, therefore, energized whenever relay A2TR is energized and the binary code 010, 011, 110, or 111 is established by the A relay in one of the panels 2P, 3P, 6P, or 7P being energized thus supplying energy from battery terminal B to the conductor leading to said terminal 12. The stick circuit for relay A2TAC extends from battery terminal B over said back contact *g* of relay A2TR, front contact *a* of relay A2TAC, and through the winding of relay A2TAC to battery terminal N. The slow release feature of relay A2TAC operates in a similar manner to that described for relay A1TAC.

Relay A3TAC has a pickup circuit which includes conductor 1P13, front contact *l* of track relay A2TR, and thence extends through the winding of relay A3TAC to battery terminal N. Conductor 1P13 connects to terminal 13 of storage panel 1P and relay A3TAC is energized whenever relay A2TR is energized and the binary code 001, 011, 101, or 111 is established by the A relay in one of the panels 1P, 3P, 5P, or 7P being energized thus supplying energy from terminal B of the battery to the conductor leading to said terminal 13. The stick circuit for relay A3TAC includes said back contact *g* of relay A2TR and front contact *a* of relay A3TAC, and the slow release feature of relay A3TAC also insures that it will bridge the transfer period from the time of opening of front contact *l* of relay A2TR to the closing of back contact *g* of relay A2TR.

Relay B1TAC in FIG. 5C has a pickup circuit which extends from battery terminal B over the front point of contact *c* of relay A2TPRA, front contact *b* of relay A1TAC, and through the winding of relay B1TAC to battery terminal N. Relay B1TAC has a stick circuit extending from battery terminal B over back contact *c* of relay A2TPRC, front contact *a* of relay B1TAC, and through the winding of relay B1TAC to battery terminal N. Relay B1TAC is thus energized whenever relays A2TPRA and A1TAC are energized and once so energized is maintained energized so long as relay A2TPRC remains released.

Relay B2TAC has a pickup circuit extending from terminal B of the battery over the front point of contact *d* of relay A2TPRA, front contact *b* of relay A2TAC, and through the winding of relay B2TAC to battery terminal N. Relay B2TAC has a stick circuit extending from terminal B of the battery over said back contact *c* of relay A2TPRC, front contact *a* of relay B2TAC, and through the winding of the relay to battery terminal N. Relay B2TAC is, therefore, energized when relay A2TPRA is energized and relay A2TAC is energized, and once so energized is maintained so as long as relay A2TPRC remains released.

Relay B3TAC has a pickup circuit extending from battery terminal B over the front point of contact *e* of relay A2TPRA, front contact *b* of relay A3TAC, and through the winding of relay B3TAC to battery terminal N. Relay B3TAC is provided with a stick circuit extending from battery terminal B over said back contact *c* of relay A2TPRC, front contact *a* of relay B3TAC and through the winding of relay B3TAC to battery terminal N. Relay B3TAC is, therefore, energized whenever relay A2TPRA is energized and relay A3TAC is energized, and once so energized, is maintained so as long as relay A2TPRC remains deenergized.

Relay C1TAC in FIG. 5C has a pickup circuit extending from terminal B of the battery over the back point of contact $c$ of relay A2TPRA, front contact $b$ of relay B1TAC, front contact $d$ of relay A2TPRC, and through the winding of relay C1TAC to battery terminal N. Relay C1TAC has a stick circuit extending from terminal B of the battery over back contact $b$ of relay CTPRA, front contact $a$ of relay C1TAC, and through the winding of relay C1TAC to battery terminal N. Relay C1TAC is thus energized whenever relay A2TPRA is deenergized, relay B1TAC is energized, and relay A2TPRC is energized. When once energized relay A2TPRC is maintained energized so long as relay CTPRA remains released.

Relay C2TAC has a pickup circuit extending from terminal B of the battery over the back point of contact $d$ of relay A2TPRA, front contact $b$ of relay B2TAC, front contact $e$ of relay A2TPRC, and through the winding of relay C2TAC to battery terminal N. Relay C2TAC is thus energized whenever relay A2TPRA is released, relay B2TAC is energized, and relay A2TPRC is energized. Relay C2TAC has a stick circuit extending from terminal B of the battery over said back contact $b$ of relay CTPRA, front contact $a$ of relay C2TAC, and through the winding of relay C2TAC to battery terminal N. Relay C2TAC when once energized is thus maintained so as long as relay CTPRA remains released.

Relay C3TAC is provided with a pickup circuit extending from battery terminal B over the back point of contact $e$ of relay A2TPRA, front contact $b$ of relay B3TAC, front contact $f$ of relay A2TPRC, and through the winding of relay C3TAC to battery terminal N. Relay C3TAC is, therefore, energized whenever relay A2TPRA is released and relays B3TAC and A2TPRC are energized. Relay C3TAC has a stick circuit extending from battery terminal B over said back contact $b$ of relay CTPRA, front contact $a$ of relay C3TAC, and through the winding of relay C3TAC to battery terminal N. Relay C3TAC is, therefore, maintained energized when once energized, so long as relay CTPRA remains released.

A fourth group of binary code storage relays D1TAC, D2TAC, and D3TAC, and a fifth group of binary code storage relays E1TAC, E2TAC, and E3TAC are shown in FIG. 5D. Each of these groups of relays operate to store the bits of the binary codes in a manner similar to the TAC relays described above.

Relay D1TAC has a pickup circuit extending from battery terminal B over the front point of contact $r$ of track relay CTR, front contact $b$ of relay C1TAC, conductor 172, and through the winding of relay D1TAC to battery terminal N. Relay D1TAC has a stick circuit extending from battery terminal B over the back point of contact $r$ of relay CTR, conductor 173, front contact $a$ of relay D1TAC, and through the winding of relay D1TAC to battery terminal N. Relay D1TAC is thus energized when relay CTR is energized and relay C1TAC is energized, and once so energized is maintained so when relay CTR releases. The slow release feature of relay D1TAC insures that the relay will bridge the transfer period from the opening of the front point of contact $r$ of relay CTR to the closing of the back point of that contact.

Relay D2TAC is provided with a pickup circuit extending from battery terminal B over front contact $s$ of relay CTR, front contact $b$ of relay C2TAC, conductor 174, and through the winding of relay D2TAC to battery terminal N. Relay D2TAC has a stick circuit extending from terminal B of the battery over said back point of contact $r$ of relay CTR, conductor 173, front contact $a$ of relay D2TAC, and through the winding of relay D2TAC to battery terminal N. Relay D2TAC is, therefore, energized whenever relays CTR and C2TAC are energized, and once so energized is maintained so when relay CTR releases. The slow release feature of relay D2TAC also insures that the relay will bridge the transfer period of the contacts of relay CTR.

Relay D3TAC has a pickup circuit which extends from battery terminal B over front contact $t$ of relay CTR, front contact $b$ of relay C3TAC, conductor 175, and through the winding of relay D3TAC to battery terminal N. The stick circuit for relay D3TAC extends from battery terminal B over said back point of contact $r$ of relay CTR, conductor 173, front contact $a$ of relay D3TAC, and through the winding of relay D3TAC to battery terminal N. Relay D3TAC is thus energized whenever relays CTR and C3TAC are energized, and once so energized is maintained so when relay CTR releases. The slow release feature of relay D3TAC provides for the bridging by relay D3TAC of the transfer period of the contacts of relay CTR.

Relay E1TAC has a pickup circuit extending from terminal B of the battery over the front point of contact $f$ of track relay MR1TR, front contact $b$ of relay D1TAC, and through the winding of relay E1TAC to battery terminal N. The stick circuit for relay E1TAC extends from battery terminal B over the back point of contact $f$ of relay MR1TR, front contact $a$ of relay E1TAC, and through the winding of relay E1TAC to battery terminal N. Relay E1TAC is thus energized whenever relays MR1TR and D1TAC are energized, and once so energized is maintained energized when relay MR1TR releases. The slow release feature of relay E1TAC insures that the relay bridges the transfer period of contact $f$ of relay MR1TR.

Relay E2TAC has a pickup circuit extending from terminal B of the battery over front contact $g$ of relay MR1TR, front contact $b$ of relay D2TAC, and through the winding of relay E2TAC to battery terminal N. Relay E2TAC has a stick circuit extending from battery terminal B over said back point of contact $f$ of relay MR1TR, front contact $a$ of relay E2TAC, and through the winding of relay E2TAC to battery terminal N. Relay E2TAC is, therefore, energized when relays MR1TR and D2TAC are energized, and once so energized is maintained so when relay MR1TR releases. The purpose of the slow release feature of relay E2TAC is now believed to be obvious in view of the previous description.

Relay E3TAC has a pickup circuit extending from battery terminal B over the front point of contact $h$ of relay MR1TR, front contact $b$ of relay D3TAC, and through the winding of relay E3TAC to battery terminal N. The stick circuit for relay E3TAC extends from battery terminal B over said back point of contact $f$ of relay MR1TR, front contact $a$ of relay E3TAC, and through the winding of relay E3TAC to battery terminal N. Thus, relay E3TAC is energized whenever relays MR1TR and D3TAC are energized, and once energized is maintained so when relay MR1TR releases. The purpose of the slow release feature of relay E3TAC is also now believed obvious.

There is shown in FIG. 2E a sixth group of TAC or binary code storage relays designated F1TAC, F2TAC, and F3TAC. These relays are associated with track section MR2T in a manner similar to that in which the D–TAC relays are associated with track section CT and the E–TAC relays are associated with track section MR1T.

Relay F1TAC has a pickup circuit extending from terminal B of the battery (FIG. 5D) over the front point of contact $d$ of track relay MR2TR, front contact $b$ of relay E1TAC, conductor 177, and through the winding of the relay to battery terminal N. Relay F1TAC has a stick circuit extending from battery terminal B over the back point of contact $d$ of relay MR2TR, conductor 176, front contact $a$ of relay F1TAC, and through the winding of relay F1TAC to battery terminal N. Relay F1TAC is thus energized when relays MR2TR and E1TAC are energized, and once so energized is maintained so when relay MR2TR releases.

Relay F2TAC has a pickup circuit extending from battery terminal B (FIG. 5D) over front contact *e* of relay MR2TR, front contact *b* of relay E2TAC, conductor 178, and through the winding of relay F2TAC to battery terminal N. Relay F2TAC has a stick circuit extending from conductor 176 over front contact *a* of relay F2TAC and through the winding of relay F2TAC to battery terminal N. Relay F2TAC is thus energized when relays MR2TR and E2TAC are energized, and is maintained energized when relay MR2TR thereafter releases.

Relay F3TAC has a pickup circuit extending from battery terminal B over front contact *f* of relay MR2TR, front contact *b* of relay E3TAC, conductor 179, and through the winding of relay F3TAC to battery terminal N. The stick circuit for relay F3TAC extends from said conductor 176 over front contact *a* of relay F3TAC and through the winding of relay F3TAC to battery terminal N. Relay F3TAC is thus energized when relays MR2TR and E3TAC are energized, and once so energized is maintained so when relay MR2TR thereafter releases.

A seventh group of binary code storage relays designated G1TAC, G2TAC, G3TAC are also shown in FIG. 2E. These relays are associated with track section 1–4T in a manner similar to that relays F-TAC are associated with track section MR2T.

A pickup circuit for relay G1TAC extends from battery terminal B over the front point of contact *g* of track relay 1–4TR, front contact *b* of relay F1TAC, and through the winding of relay G1TAC to battery terminal N. A stick circuit for relay G1TAC extends from battery terminal B over the back point of contact *g* of relay 1–4TR, front contact *a* of relay G1TAC, and through the winding of relay G1TAC to battery terminal N. Relay G1TAC is, therefore, energized whenever relays 1–4TR and F1TAC are energized. When once energized relay G1TAC is maintained energized when relay 1–4TR releases.

Relay G2TAC's pickup circuit extends from battery terminal B over front contact *h* of relay 1–4TR, front contact *b* of relay F2TAC, and through the winding of relay G2TAC to battery terminal N. The stick circuit for relay G2TAC extends from battery terminal B over said back point of contact *g* of relay 1–4TR, front contact *a* of relay G2TAC, and through the winding of relay G2TAC to battery terminal N. Relay G2TAC is thus energized when relays 1–4TR and F2TAC are energized. When once so energized relay G2TAC is maintained so when relay 1–4TR releases.

A pickup circuit for relay G3TAC extends from terminal B of the battery over front contact *k* of relay 1–4TR, front contact *b* of relay F3TAC, and through the winding of relay G3TAC to battery terminal N. A stick circuit for relay G3TAC extends from battery terminal B over said back point of contact *g* of relay 1–4TR, front contact *a* of relay G3TAC, and through the winding of relay G3TAC to battery terminal N. Therefore, relay G3TAC is energized whenever relays 1–4TR and F3TAC are energized, and once energized is maintained so when relay 1–4TR releases. It is to be noted that the G-TAC relays and the F-TAC relays are all slow release so that the relays can bridge the transfer time of contacts *g* of relay 1–4TR and *d* of relay MR2TR, respectively, from the front points to be back points of said contacts.

Since the track sections beyond track section 1–4T in both the routes through the normal and reverse positions of the switch 1–4W consist of noncircuited sections extending to the enrance ends of track sections 1–2GT and 3–4GT, respectively, arrangements must be provided for counting the cuts into and out of the noncircuited sections, similar to the arrangement provided for the noncircuited section between track sections A2T and CT and previously described. There is, therefore, shown in FIGS. 2E and 2F, a series of control relays designated 1–4TPR, N1–4TPRA, N1–4TPRB, N1– 4TPRC, 1–2GTPR, and 1–2GTPRA; and, in FIGS. 4E and 4F a series of control relays designated R1–4TPRA, R1–4TPRB, R1–4TPRC, 3–4GTPR, and 3–4GTPRA. An additional relay designated 1–4A1 is shown in FIG. 2E. This is the switch control relay for switch 1–4W and will be described in detail later in this description. It is sufficient for present purposes to point out that relay 1–4A1 remains released when switch 1–4W is to maintain its normal position for aligning the route for a car cut, and is energized only when switch 1–4W is to be controlled to its reverse position for aligning the route for a cut. It should also be pointed out that, for the purposes of the present example of our invention, the noncircuited track section between sections 1–4T and 1–2GT and the noncircuited track section between sections 1–4T and 3–4GT are assumed to be similar in length to the noncircuited section between sections A2T and CT, and, therefore, the arrangements for counting the cuts into and out of said noncircuited sections are shown to consist of suffifficient relays to count only two cuts of cars. However, similarly to the car counting arrangement previously described, if the noncircuited sections are longer, the counting arrangements may be extended to count a greater number of cuts.

Relay 1–4TPR has a pickup circuit extending from battery terminal B over the front point of contact *f* of track relay 1–4TR and through the winding of relay 1–4TPR to battery terminal N. Relay 1–4TPR is, therefore, energized whenever relay 1–4TR is energized, and releases, following the release of relay 1–4TR, after the expiration of its slow release period.

Relay N1–4TPRA has a pickup circuit extending from terminal B of the batery over the back point of contact *f* of relay 1–4TR, front contact *a* of relay 1–4TPR, the back point of contact *b* of relay 1–4A1, and through the winding of relay N1–4TPRA to battery terminal N. Relay N1–4TPRA has a stick circuit which extends from battery terminal B over back contact *a* of relay N1–4TPRB, front contact *a* of relay N1–4TPRA, and through the winding of relay N1–4TPRA to battery terminal N. Relay N1–4TPRA is thus energized when track relay 1–4TR releases following a period of energization and relay 1–4A1 is released to control switch 1–4W to its normal position. Once energized relay N1–4TPRA is maintained energized so long as relay N1–4TPRB remains released.

Relay N1–4TPRB has a pickup circuit extending from battery terminal B over the front point of contact *b* of relay N1–4TPRA, through the winding of relay N1–4TPRB and over conductor 214 and back contact *b* of relay N1–4TPRC to battery terminal N. Relay N1–4TPRB is, therefore, energized when relay N1–4TPRA is energized and relay N1–4TPRC is released.

Relay N1–4TPRC has a pickup circuit extending from battery terminal B over the back point of contact *b* of relay N1–4TPRA, front contact *b* of relay N1–4TPRB, conductor 215, and through the winding of relay N1–4TPRC to battery terminal N. Relay N1–4TPRC is, therefore, energized whenever relay N1–4TPRA is released and relay N1–4TPRB is energized. Relay N1–4TPRC has a stick circuit extending from battery terminal B over back contact *a* of relay 1–2GTPRA, front contact *a* of relay N1–4TPRC, and through the winding of relay N1–4TPRC to battery terminal N. Relay N1–4TPRC when once energized is thus maintained energized as long as relay 1–2GTPRA remains released.

Relay 1–2GTPR has a pickup circuit extending from battery terminal B over the front point of contact *c* of track relay 1–2GTR and through the winding of relay 1–2GTPR to battery terminal N. Relay 1–2GTPR is thus energized whenever relay 1–2GTR is energized and releases, following the release of relay 1–2GTR, when its slow release period has expired.

Relay 1–2GTPRA has a pickup circuit extending from battery terminal B over the back point of contact *c* of track relay 1–2GTR, front contact *a* of relay 1–2GTPR, and through the winding of relay 1–2GTPRA to battery terminal N. Relay 1–2GTPRA is thus momentarily energized when relay 1–2GTR releases following a period of energization thereof. The slow release feature of relay 1–2GTPRA insures that the relay when once energized will remain picked up following the release of relay 1–2GTPR, for a sufficient period of time to insure the release of relay N1–4TPRC which is also slow to release.

Referring now to FIGS. 4E and 4F, relay R1–4TPRA has a pickup circuit extending from battery terminal B (FIG. 2E) over said back point of contact *f* of track relay 1–4TR, front contact *a* of relay 1–4TPR, the front point of contact *b* of relay 1–4A1, conductor 180, and through the winding of relay R1–4TPRA to battery terminal N. Relay R1–4TPRA is thus eregized whenever track relay 1–4TR releases following a period of energization and relay 1–4A1 is energized to control switch 1–4W to its reverse position for aligning the route for a car cut. Relay R1–4TPRA has a stick circuit extending from battery terminal B over back contact *a* of relay R1–4TPRB, front contact *a* of relay R1–4TPRA, and through the winding of relay R1–4TPRA to battery terminal N. Relay R1–4TPRA is thus maintained energized, when once energized, so long as relay R1–4TPRB remains released.

Relay R1–4TPRB has a pickup circuit extending from battery terminal B over the front point of contact *b* of relay R1–4TPRA, through the winding of relay R1–4TPRB, and over conductor 227 and back contact *b* of relay R1–4TPRC to battery terminal N. Relay R1–4TPRB is thus energized whenever relay R1–4TPRA is energized and relay R1–4TPRC is released.

Relay R1–4TPRC has a pickup circuit extending from battery terminal B over the back point of contact *b* of relay R1–4TPRA, front contact *b* of relay R1–4TPRB, conductor 226 and through the winding of relay R1–4TPRC to battery terminal N. Relay R1–4TPRC has a stick circuit extending from terminal B of the battery over back contact *a* of relay 3–4GTPRA, front contact *a* of relay R1–4TPRC, and through the winding of relay R1–4TPRC to battery terminal N. Relay R1–4TPRC is thus energized whenever relay R1–4TPRA is released, and relay R1–4TPRB is energized and, once so energized, is maintained so as long as relay 3–4GTPRA remains released.

The pickup circuit for relay 3–4GTPR may be traced from terminal B of the battery over the front point of contact *a* of track relay 3–4GTR and through the winding of relay 3–4GTPR to battery terminal N. Relay 3–4GTPR is thus energized whenever relay 3–4GTR is energized and releases, following the release of relay 3–4GTR, after the expiration of the time period provided by the slow release feature of the relay.

Relay 3–4GTPRA has a pickup circuit extending from battery terminal B over the back point of contact *c* of relay 3–4GTR, front contact *a* of relay 3–4GTPR, and through the winding of relay 3–4GTPRA to battery terminal N. Relay 3–4GTPRA is thus momentarily energized whenever track relay 3–4GTR releases following a period of energization thereof. The slow release feature of relay 3–4GTPRA assures that the relay when once energized will remain picked up for a sufficient period of time following the release of relay 3–4GTPR to insure the release of relay R1–4TPRC which is also slow to release.

The N1–4TPR– and the R1–4TPR– relays just described operate to count car cuts in a manner similar to that previously pointed out for the A2TPR– relays, except that the relays N1–4TPR– or R1–4TPR– are selected to perform the count accordingly as switch 1–4W is controlled to its normal or reverse position, respectively, as indicated by the deenergized or energized condition of relay 1–4A1.

There is shown in FIGS. 2F and 2G three groups of three TAC or binary code storage relays in each group, and in FIGS. 4F and 4G three groups of three TAC or binary code storage relays in each group. The relays in the first group in FIGS. 2F and 2G are designated NH1TAC, NH2TAC, and NH3TAC; the relays in the second group in FIGS. 2F and 2G are designated NK1TAC, NK2TAC, and NK3TAC. Relays NL1TAC, NL2TAC, and NL3TAC are included in the third group of relays in said figures. In FIGS. 4F and 4G the first group of three relays are designated RH1TAC, RH2TAC, and RH3TAC; the second group of three relays are designated RK1TAC, RK2TAC, and RK3TAC; and the third group of relays are designated RL1TAC, RL2TAC, and RL3TAC. These groups of relays are employed for temporarily storing the binary codes identifying the storage panels and the similarity between each of these groups of relays and the groups of TAC code storage relays previously described is believed obvious.

Relay NH1TAC has a pickup circuit extending from battery terminal B over the front point of contact *c* of relay N1–4TPRA, front contact *b* of relay G1TAC, conductor 216, and through the winding of relay NH1TAC to battery terminal N. Relay NH1TAC has a stick circuit extending from battery terminal B over back contact *c* of relay N1–4TPRC, front contact *a* of relay NH1TAC, and through the winding of relay NH1TAC to battery terminal N. Relay NH1TAC is thus energized whenever relays N1–4TPRA and G1TAC are energized, and once energized is maintained so as long as relay N1–4TPRC remains released.

Relay NH2TAC has a pickup circuit extending from terminal B of the battery over the front point of contact *d* of relay N1–4TPRA, front contact *b* of relay G2TAC, conductor 218, and through the winding of relay NH2TAC to battery terminal N. Relay NH2TAC is provided with a stick circuit extending from terminal B of the battery over said back contact *c* of relay N1–4TPRC, front contact *a* of relay NH2TAC, and through the winding of the relay to battery terminal N. Relay NH2TAC is thus energized whenever relays N1–4TPRA and G2TAC are energized, and once energized is maintained so as long as relay N1–4TPRC remains released.

Relay NH3TAC is provided with a pickup circuit extending from terminal B of the battery over the front point of contact *e* of relay N1–4TPRA, front contact *b* of relay G3TAC, conductor 220, and through the winding of relay NH3TAC to terminal N of the battery. Relay NH3TAC is provided with a stick circuit extending from terminal B of the battery over said back contact *c* of relay N1–4TPRC, front contact *a* of relay NH3TAC and through the winding of relay NH3TAC to battery terminal N. Relay NH3TAC is, therefore, energized whenever relays N1–4TPRA and G3TAC are energized, and when once energized is maintained so as long as relay N1–4TPRC remains released.

Relay NK1TAC has a pickup circuit extending from battery terminal B over the back point of contact *c* of relay N1–4TPRA, conductor 217, front contact *b* of relay NH1TAC, front contact *d* of relay N1–4TPRC, and through the winding of relay NK1TAC to battery terminal N. Relay NK1TAC is thus energized whenever relay N1–4TPRA is released, relay NH1TAC is energized, and relay N1–4TPRC is energized.

Relay NK2TAC has a pickup circuit extending from terminal B of the battery over the back point of contact *d* of relay N1–4TPRA, conductor 219, front contact *b* of relay NH2TAC, front contact *e* of relay N1–4TPRC, and through the winding of relay NK2TAC to battery termminal N. Relay NK2TAC is thus energized whenever relay N1–4TPRA is released, and relays NH2TAC and N1–4TPRC are energized.

Relay NK3TAC has a pickup circuit extending from battery terminal B over the back point of contact e of relay N1–4TPRA, conductor 221, front contact b of relay NH3TAC, front contact f of relay N1–4TPRC, and through the winding of relay NK3TAC to battery terminal N. Relay NK3TAC is thus energized whenever relay N1–4TPRA is released, and relays NH3TAC and N1–4TPRC are energized.

Relays NK1TAC, NK2TAC, and NK3TAC are each provided with a stick circuit which extends from terminal B of the battery over back contact b of relay 1–2GTPRA and thence in multiple over front contact a of each relay and through the winding of the respective relay to battery terminal N. Each of the relays is thus maintained energized, when once energized, so long as relay 1–2GTPRA remains released.

Relay NL1TAC has a pickup circuit extending from battery terminal B over the front point of contact d of relay 1–2GTR, front contact b of relay NK1TAC, conductor 222, and through the winding of relay NL1TAC to battery terminal N. Relay NL1TAC is, therefore, energized whenever relays 1–2GTR and NK1TAC are energized.

Relay NL2TAC has a pickup circuit extending from battery terminal B over front contact e of relay 1–2GTR, front contact b of relay NK2TAC, conductor 224, and through the winding of relay NL2TAC to battery terminal N. Relay NL2TAC is, therefore, energized whenever relays 1–2GTR and NK2TAC are energized.

Relay NL3TAC has a pickup circuit extending from battery terminal B over front contact f of relay 1–2GTR, front contact b of relay NK3TAC, conductor 225, and through the winding of relay NL3TAC to battery terminal N. Relay NL3TAC is thus energized whenever relays 1–2GTR and NK3TAC are energized.

Relays NL1TAC, NL2TAC, and NL3TAC are each provided with a stick circuit extending from battery terminal B over the back point of contact d of relay 1–2GTR, conductor 223, and thence in multiple over front contact a of each relay and through the winding of the respective relay to battery terminal N. Each of the relays in thus maintained energized, when once energized and relay 1–2GTR thereafter releases as long as relay 1–2GTR remains released.

Relay RH1TAC (FIG. 4F) has a pickup circuit extending from battery terminal B over the front point of contact c of relay R1–4TPRA, front contact c of relay G1TAC, conductor 228, and through the winding of relay RH1TAC to battery terminal N. Relay RH1TAC is thus energized when relays R1–4TPRA and G1TAC are energized.

Relay RH2TAC has a pickup circuit extending from battery terminal B over the front point of contact d of relay R1–4TPRA, front contact c of relay G2TAC, conductor 230, and through the winding of relay RH2TAC to battery terminal N. Relay RH2TAC is thus energized whenever relays R1–4TPRA and G2TAC are energized.

Relay RH3TAC has a pickup circuit extending from battery terminal B over the front point of contact e of relay R1–4TPRA, front contact c of relay G3TAC, conductor 232, and through the winding of relay RH3TAC to battery terminal N. Thus relay RH3TAC is energized when relays R1–4TPRA and G3TAC are energized.

Relays RH1TAC, RH2TAC, and RH3TAC are each provided with a stick circuit extending from battery terminal B over the back contact c of relay R1–4TPRC, and thence in multiple over front contact a of each relay and through the winding of the respective relay to battery terminal N. Thus, each relay is maintained energized, when once energized, so long as relay R1–4TPRC remains released.

Relay RK1TAC has a pickup circuit extending from battery terminal B over the back point of contact c of relay R1–4TPRA, conductor 229, front contact b of relay RH1TAC, front contact d of relay R1–4TPRC, and through the winding of relay RK1TAC to battery terminal N. Relay RK1TAC is thus energized whenever relay R1–4TPRA is released, and relays RH1TAC and R1–4TPRC are energized.

Relay RK2TAC has a pickup circuit extending from battery terminal B over the back point of contact d of relay R1–4TPRA, conductor 231, front contact b of relay RH2TAC, front contact e of relay R1–4TPRC, and through the winding of relay RK2TAC to battery terminal N. Relay RK2TAC is thus energized whenever relay R1–4TPRA is released, and relays RH2TAC and R1–4TPRC are energized.

Relay RK3TAC has a pickup circuit extending from battery terminal B over the back point of contact e of relay R1–4TPRA, conductor 233, front contact b of relay RH3TAC, front contact f of relay R1–4TPRC, and through the winding of relay RK3TAC to battery terminal N. Relay RK3TAC is thus energized whenever relay R1–4TPRA is released, and relays RH3TAC and R1–4TPRC are energized.

Relays RK1TAC, RK2TAC, and RK3TAC are each provided with a stick circuit which extends from battery terminal B over back contact b of relay 3–4GTPRA, and thence in multiple over front contact a of each relay and through the winding of the respective relay to battery terminal N. Thus each relay is maintained energized, when once energized, so long as relay 3–4GTPRA remains released.

Relay RL1TAC (FIG. 4G) has a pickup circuit extending from battery terminal B over the front point of contact d of relay 3–4GTR, front contact b of relay RK1TAC, conductor 234, and through the winding of relay RL1TAC to battery terminal N. Relay RL1TAC is thus energized whenever relays 3–4GTR and RK1TAC are energized.

Relay RL2TAC has a pickup circuit extending from battery terminal B over front contact e of relay 3–4GTR, front contact b of relay RK2TAC, conductor 236, and through the winding of relay RL2TAC to battery terminal N. Relay RL2TAC is thus energized whenever relays 3–4GTR and RK2TAC are energized.

Relay RL3TAC has a pickup circuit extending from battery terminal B over front contact f of relay 3–4GTR, front contact b of relay RK3TAC, conductor 237, and through the winding of relay RL3TAC to battery terminal N. Relay RL3TAC is thus energized whenever relays 3–4GTR and RK3TAC are energized.

Relays RL1TAC, RL2TAC, and RL3TAC are each provided with a stick circuit which extends from battery terminal B over the back point of contact d of relay 3–4GTR, conductor 235 and thence in multiple over front contact a of each relay and through the winding of the respective relay to battery terminal N. Thus each relay is maintained energized, when once energized and relay 3–4GTR thereafter releases, so long as relay 3–4GTR remains released.

In order that the transfer of the binary codes from one group of TAC relays to another as cuts of cars proceed to their destined storage tracks need not be described in detail in conjunction with the information "read-outs" from the storage panels and the computations performed by the apparatus of our invention, the operation of the TAC relays and their controlling relays will be described at this point as a first car cut and a second closely following car cut proceed through the yard to their destined storage tracks. It will be assumed that the first car cut is the first to enter the yard after a period of cessation of humping operations in the yard and, therefore, no preceding cuts are in the area between the hump and the storage tracks. The second car cut will be assumed to be following the first cut with the minimum permissive spacing. Each cut will be further assumed to be a single car cut, and the first cut will be assumed to be destined for storage track 1 and the second cut for storage track 3. There being no storages in the storage panels at this time panel 1P, identified by the binary code 001, is the first empty panel and will be selected for the first cut, and panel 2P identified by the binary code 010 will be selected for the second cut. For purposes of simplification of this portion of the description, the first and second cuts will be referred to as cut 1 and cut 2, respectively.

When cut 1 enters track section A1T, selecting panel 1P, relay A of that panel supplies energy from battery terminal B to terminal 13 on panel 1P (FIG. 2A). This energy flows over conductor 1P13 and over front contact *l* of track relay A2TR (FIG. 5C) to energize relay A3TAC. No further action takes place at this time. When cut 1 enters track section A2T relay A2TR will release opening its front contact *l* and closing its back contact *g* to complete the stick circuit for relay A3TAC. The slow release feature of relay A3TAC insures the relay bridging the transfer from the front to the back contacts of relay A2TR. The release of relay A2TR also closes the back point of contact *f* of that relay and the previously described pickup circuit for relay A2TPRA is momentarily completed before the release of slow release relay A2TPR due to its de-energization by the opening of the front point of contact *f* of relay A2TR. Relay A2TPRA thus picks up temporarily and closes its stick circuit. However that stick circuit is almost immediately opened as the picking up of relay A2TPRA energizes relay A2TPRB. Relay A2TPRA will therefore remain picked up only for the slow release period of relay A2TPR and its own slow release period.

The picking up of relay A2TPRA also closess at the front point of its contact *e* the pickup circuit for relay B3TAC which picks up and temporarily completes its stick circuit. When relay A2TPRA thereafter releases, following the expiration of the slow release period of relay A2TPR and its own slow release period, relay A2TPRC will be energized over the back input of contact *b* of relay A2TPRA and front contact *b* of relay A2TPRB, and when fully picked up completes its stick circuit including back contact *a* of relay CTPRA. The release of relay A2TPRA and the picking up of relay A2TPRC closes the pickup circuit for relay C3TAC which picks up to complete its stick circuit including back contact *b* of relay CTPRA. The picking up of relay A2TPRC also opens the stick circuit for relay B3TAC which drops out after the expiration of its slow release period. The TAC or binary code 001 is now stored in each of the A and C groups of TAC relays, the 1 and 2 relays of these groups as well as of the B group having remained released. The retained storage of the binary code in the A group of TAC relays is incidental since the storage will be destroyed when cut 1 vacates track section A2T.

Since all the track relays in the yard (except relay A2TR) are energized, there being, as previously mentioned, no cuts preceding cut 1, the TAC code 001 continues to progress from one TAC relay group to the next, each preceding group also retaining the code since cut 1 is still occupying track sections A1T and A2T. The energization of relay C3TAC completes the pickup circuit for relay D3TAC, the energization of relay D3TAC completes the pickup circuit for relay E3TAC. Relays F3TAC and G3TAC are each also energized in turn in a similar manner. The binary code 001 is now stored in all the groups of TAC relays A through G, except group B, but is not transferred further until cut 1 enters track section 1–4T.

When cut 1 vacates track section A1T relay 1H in panel 1P is energized and relay 1A is released to de-energize terminal 13 of Panel 1P. Cut 2 may now enter track section A1T and, in so doing, selects panel 2P for its storages. The energization of the A relay in panel 2P connects to terminal 12 only of that panel (FIG. 4A) terminal B of the battery for the binary code identity 010. Terminal 12 of panel 2P connects to terminal 33 of panel 1P which in turn connects to terminal 12 of panel 1P. Conductor 1P12 is connected to terminal 12 of panel 1P and extends to front contact *k* of relay A2TR. However, no energy flows through this circuit at this time because track relay A2TR is released due to the continued occupancy of track section A2T by cut 1. When cut 2 vacates track section A2T and relay A2TR again is energized the stick circuit for relay A3TAC will be interrupted and that relay will release. When relay A2TR closes its front contact *k*, relay A2TAC will be energized and the A group of TAC storage relays now stores the 010 code identity for panel 2P.

When cut 2 enters track section A2T the pickup circuit for relay A2TAC will be interrupted but its stick circuit will be closed, the slow release feature of relay A2TAC serving to bridge the transfer of relay A2TR from its front to its back contacts. At the same time relay A2TPRA will be energized in the same manner as previously described and will complete its stick circuit. The picking up of relay A2TPRA will not complete the pickup circuit for relay A2TPRB as that circuit is open at the open back contact *b* of relay A2TPRC. Relay A2TPRA will thus remain energized at this time over its stick circuit. The picking up of relay A2TPRA will close the pickup circuit for relay B2TAC which will, therefore, become picked up. This pickup circuit remains closed at this time. The A and B groups of TAC relays now store the 010 binary code identity for panel 2P, while the C group of TAC relays continues to store the 001 binary code identity for panel 1P.

As previously set forth the uncircuited track section between track sections A2T and CT is assumed, for the purposes of the present example of our invention, to be of such maximum length that cut 1 must enter track section CT before cut 2 completely vacates track section A2T. Therefore, after cut 2 vacates track section A1T, a third cut can enter track section A1T and select a storage panel but since cut 2 still occupies track section A2T the A group of TAC relays will not be disturbed by the energization of the A relay in the panel selected for the third cut. The code identity for the third panel cannot be transferred to the TAC relays until cut 2 vacates track section A2T.

When cut 1 enters track section CT, relay CTPRA is temporarily energized opening its back contacts for a sufficient period of time to deenergize relay C3TAC and also A2TPRC. The C group of TAC relays is now prepared to receive the binary code identity 010 for cut 2. The release of relay A2TPRC closes over its back contact *c* the stick circuit for relay B2TAC and also, over its back contact *b*, the pickup circuit for relay A2TPRB. The picking up of relay A2TPRB releases relay A2TPRA which closes the back point of its contact *b* thus again picking up relay A2TPRC which agains completes its stick circuit, relay CTPRA having again released by this time. The closure of the back point of contact *d* of relay A2TPRA and the front contact *e* of relay A2TPRC closes the pickup circuit for relay C2TAC which becomes picked up to store the code 010. Relay C2TAC is maintained picked up over back contact *b* of relay CTPRA. Relay B2TAC drops out after the expiration of its slow release period due to the stick circuit for the relay being open at back contact *c* of relay A2TPRC. The binary code 010 is now stored in the A and C groups of TAC relays but, similarly to cut 1, the storage in the A group is incidental and will be destroyed when cut 2 vacates track section A2T.

The entrance of cut 1 into track section CT opens at front contact *t* of relay CTR the pickup circuit for relay D3TAC but completes at the back point of contact *r* of relay CTR the stick circuit for relay D3TAC. Thus, relay D3TAC remains picked up at this time. When cut 1 enters track section MR1T the pickup circuit for relay E3TAC is interrupted at the front point of contact *h* of relay MR1TR, but the back point of contact *f* of relay MR1TR completes the stick circuit for relay E3TAC and relay E3TAC remains picked up at this time.

When cut 1 vacates section CTR the stick circuit for relay D3TAC will be opened at the back point of contact r of relay CTR and that relay will drop out after the expiration of its slow release period. The closing of front contact s of relay CTR, at this time, energizes relay D2TAC and relays D2TAC and D3TAC may both be picked up momentarily until the slow release period of relay D3TAC expires. However, after the expiration of the slow release period of D3TAC expires that relay will release and the D group of TAC relays will now store the binary code 010 for cut 2. Relay C2TAC remains energized at this time to also store the code 010 for cut 2.

When cut 2 vacates track section A2T the binary code 010 stored for the cut in the A group of TAC relays is destroyed, as previously explained. Cut 1 having now vacated track section CT, cut 2 enters that track section, temporarily energizing relay CTPRA and releasing relay C2TAC. The D group of TAC relays is now the only group storing the code 010 for cut 2, the E group still being employed for storing the code 001 for cut 1.

The entrance of cut 1 into track section MR2T opens the pickup circuit for relay F3TAC but also completes the stick circuit for relay F3TAC including the back point of contact d of relay MR2TR. The vacating of track section MR1T by cut 1 opens the stick circuit for relay E3TAC and also permits relay E2TAC to become energized over the front point contact g of relay MR1TR. Relay E3TAC subsequently releases and the E group of TAC relays now stores the binary code 010 for cut 2. The entrance of cut 2 into track section MR1T opens the pickup circuit for relay E2TAC but establishes the stick circuit for that relay so that the relay remains energized. The vacating of track section CT by cut 2 opens the stick circuit for relay D2TAC which thereupon releases after the expiration of its slow release period. The E group of relays only now stores the binary code 010 for cut 2.

Switch 1-4W must be controlled to its reverse position for aligning the routes for cuts destined for storage tracks 3 or 4, prior to the entry of such cuts into track section 1-4T. As previously mentioned relay 1-4A1 in FIG. 2E controls switch 1-4W to its normal or reverse positions accordingly as relay 1-4A1 is released or picked up, respectively. The circuits for controlling relay 1-4A1 will be described in detail hereinafter but, for purposes of this portion of the description, it is pointed out that relay 1-4A1 is energized over circuits including a combination of contacts of the F group of TAC relays whenever relay 1-4A1 is to be energized for a reverse switch control. Cut 1 being destined for storage track 1, relay 1-4A1 remains deenergized at this time.

When cut 1 enters track 1-4T relay N1-4TPRA is energized over its previously described pickup circuit including the back point of contact c of relay 1-4TR. The closing of the front point of contact b of relay N1-4TPRA energizes relay N1-4TPRB. When relay N1-4TPRA thereafter releases, closing the back point of its contact b, relay N1-4TPRC is energized completing its stick circuit including back contact a of relay 1-2GTPRA. Relay N1-4TPRB subsequently releases. The energization of relay N1-4TPRA as described above closes the pickup circuit for relay NH3TAC which is also then energized. When relay N1-4TPRA releases, as described above, the pickup circuit for relay NK3TAC is closed and that relay picks up and completes its stick circuit including back contact b of relay 1-2GTPRA. Relay NH3TAC subsequently releases, its stick circuit being open at back contact c of relay N1-4TPRC at this time. The picking up of relay NK3TAC closes at front contact b of that relay the pickup circuit for relay NL3TAC which also picks up. Thus, the F, G, NK and NL groups of TAC binary code storage relays store the binary code 001 for cut 1 at this time. When cut 1 vacates track section MR2T and relay MR2TR consequently picks up, the stick circuit for relay F3TAC is interrupted to release that relay. The picking up of relay MR2TR also closes at front contact e of that relay the pickup circuit for relay F2TAC. The F group of TAC relays now stores the binary code 010 for cut 2, and when cut 2 enters track section MR2T, the stick circuit for relay F2TAC is closed.

The energization of relay F2TAC to store the binary code 010 for cut 2 also changes the combination of contacts of the F group of TAC relays in the control circuits for relay 1-4A1, and, cut 2 being destined for storage track 3, relay 1-4A1 will now be energized in a manner to be described in more detail later in this description.

When cut 1 vacates track section 1-4T, relay G3TAC is released due to the opening of its stick circuit at the back point of contact g of relay 1-4TR. However, relay G2TAC will be energized at this time to store the code 010 for cut 2, since the pickup circuit for relay G2TAC closes at front contact h of relay 1-4TR. Cut 2 now vacates track section MR1T, the stick circuit for relay E2TAC is interrupted, and relay E2TAC releases. Relays NK3TAC and NL3TAC now store the binary code 001 for cut 1, and relays F2TAC and G2TAC now store the binary code 010 for cut 2.

Cut 2 now enters track section 1-4T, releasing relay 1-4TR and energizing relay R1-4TPRA (FIG. 4E) over the front point of contact b of relay 1-4A1. Relays R1-4TPRB and R1-4TPRC operate at this time in a manner similar to that described for relay N1-4TPRB and N1-4TPRC when cut 1 entered track section 1-4T, and, therefore, a detailed description of the operation of relays R1-4TPRB and R1-4TPRC at this time is not believed necessary. The energization of relay R1-4TPRA closes the pickup circuit for relay RH2TAC and, when relay R1-4TPRA subsequently releases, relays RK2TAC and RL2TAC are energized in sequence. Relays F2TAC, G2TAC, RK2TAC, and RL2TAC now store the binary code 010 for cut 2. When cut 2 vacates track section MR2T, relay F2TAC will be released, and when cut 2 vacates track section 1-4T relay G2TAC will be released. Relays RK2TAC and RL2TAC only will now store the binary code for cut 2.

When cut 1 enters track section 1-2GT in the route to its storage track relay NK3TAC will be released due to the opening of back contact b of relay 1-2GTPRA. Similarly, when cut 2 enters track section 34GT relay RK2TAC will be released due to the opening of back contact b of relay 3-4GTPRA. Relays NL3TAC and RL2TAC will be released when cut 1 and cut 2, respectively, vacate track sections 1-2GT and 3-4GT, respectively.

By the above description the manner in which each TAC binary code is transferred along with or ahead of its associated car cut is believed readily understood. It is to be noted that the code storage for a preceding cut is cancelled out of each group of TAC relays before that group of relays is required for storing the binary code for a following cut, and that the binary code for the preceding cut is transferred to at least one other group of TAC relays before the cancellation of that code in the preceding group of TAC relays is effected.

The apparatus of our invention employed for deriving the desired leaving speed for each cut of cars leaving the master retarder and for controlling the first and second sections of the master retarder in accordance with the desired leaving speed computation for each cut is shown in FIGS. 1C, 1D, 2C, and 2D of the drawings. This apparatus includes a plurality of relays which are controlled by the track relays CTR, MR1TR, and MR2TR and which will be first described so that the operation of the remainder of the apparatus will be more readily understood. These relays are shown in FIGS. 1C and 1D and are designated MR1TPR, MR1TSR, MR1TSPR, MR1TPSRA, MR1TPSRB, MR2TPR, and MR2TPSR.

Relay MR1TPR is a slow release repeater relay of track relay MR1TR and has a pickup circuit extending from battery terminal B over the front point of contact $c$ of relay MR1TR and through the winding of relay MR1TPR to battery terminal N. Relay MR1TPR is therefore energized whenever relay MR1TR is energized and releases, subsequent to the release of relay MR1TR, when the effect of its slow release feature has expired.

Relay MR1TSR has a pickup circuit which extends from terminal B of the battery over back contact $a$ of relay MR1TR, front contact $a$ of relay CTR, and through the winding of relay MR1TSR to battery terminal N. Relay MR1TSR has a stick circuit extending from terminal B of the battery over said back contact $a$ of relay MR1TR, front contact $a$ of relay MR1TSR, and through the winding of relay MR1TSR to battery terminal N. Relay MR1TSR is thus energized whenever relay MR1TR is released and relay CTR is energized, and once energized is maintained so as long as relay MR1TR remains released.

Relay MR1TSPR has a first pickup circuit extending from terminal B of the battery over front contact $b$ of relay MR1TR and through the winding of relay MR1TSPR to battery terminal N. Relay MR1TSPR has a second pickup circuit extending from battery terminal B over front contact $b$ of relay MR1TSR and through the winding of relay MR1TSPR to battery terminal N. Relay MR1TSPR is therefore energized when relay MR1TR is energized or when relay MR1TSR is energized.

Relay MR1TPSRA has a pickup circuit extending from battery terminal B over the back point of contact $c$ of relay MR1TR, front contact $a$ of relay MR1TPR, conductor 120, back contact $b$ of relay MR1TPSRB, conductor 121, and through the winding of relay MR1TPSRA to battery terminal N. Relay MR1TPSRA has a stick circuit extending from battery terminal B over back contact $c$ of relay MR1TPSRB, conductor 122, front contact $a$ of relay MR1TPSRA, and through the winding of relay MR1TPSRA to battery terminal N. Relay MR1TPSRA is thus energized whenever relay MR1TR is released, relay MR1TPR is picked up and relay MR1TPSRB is released, and once energized is maintained energized as long as relay MR1TPSRB remains released.

Relay MR1TPSRB has a pickup circuit extending from battery terminal B over said front point of contact $c$ of relay MR1TR, front contact $b$ of relay MR1TPSRA, conductor 118, and through the winding of relay MR1TPSRB to battery terminal N. Relay MR1TPSRB has a stick circuit extending from battery terminal B over front contact $b$ of relay MR1TPR, conductor 119, front contact $a$ of relay MR1TPSRB, and through the winding of relay MR1TPSRB to battery terminal N. Relay MR1TPSRB is thus energized whenever relays MR1TR and MR1TPSRA are energized, and once energized is maintained so as long as relay MR1TPR is picked up.

Relay MR2TPR has a pickup circuit extending from battery terminal B over the front point of contact $a$ of relay MR2TR, conductor 115, front contact $c$ of relay MR1TPSRA, conductor 116, and through the winding of relay MR2TPR to battery terminal N. Relay MR2TPR is thus energized whenever relays MR2TR and MR1TPRSA are both energized.

Relay MR2TPSR has a pickup circuit extending from battery terminal B over the back point of contact $a$ of relay MR2TR, front contact $a$ of relay MR2TPR, and through the winding of relay MR2TPSR to battery terminal N. Relay MR2TPSR has a stick circuit extending from battery terminal B over said back point of contact $a$ of relay MR2TR, front contact $a$ of relay MR2TPSR, and through the winding of relay MR2TPSR to battery terminal N. Relay MR2TPSR is thus energized whenever relay MR2TR is released and relay MR2TPR is picked up, and once so energized is maintained so as long as relay MR2TR remains released.

We will now describe the operation of said relays MR— as several single car cuts move through the track sections MR1T and MR2T. When a first single car cut, termed hereinafter in this portion of the description cut 1, enters track section MR1T relays MR1TSPR and MR1TPR will be deenergized and will release after the expiration of the delay provided by their slow release features. The closing of the back point of contact $c$ of relay MR1TR will momentarily close the pickup circuit, including front contact $a$ of relay MR1TPR, for relay MR1TPSRA which will then become picked up to close its stick circuit including back contact $c$ of relay MR1TPSRB.

When cut 1 vacates track section CT relay MR1TSR will be energized and will close its stick circuit. The picking up of relay MR1TSR will again energize relay MR1TSPR which will then remain energized as long as relay MR1TSR is energized which will be until cut 1 vacates track section MR1T.

The energization of relay MR1TPSRA as described above also closes the pickup circuit for relay MR2TPR which then becomes picked up closing its front contact $a$ in the pickup circuit for relay MR2TPSR. When cut 1 enters track section MR2T, relay MR2TPR will be deenergized but due to its slow release feature will maintain its front contact $a$ closed for a sufficient period of time to permit relay MR2TPSR to become picked up. Relay MR2TPSR once so picked up will remain so as long as track section MR2TR is occupied.

When cut 1 vacates track section MR1T, relay MR1TSR will release, the second pickup circuit for relay MR1TSPR will be closed to maintain that relay picked up, and relay MR1TPR will again be energized over the front point of contact $c$ of relay MR1TR. The closure of said front point of contact $c$ of relay MR1TR will also close the pickup circuit for relay MR1TPSRB which will become picked up and complete its stick circuit including front contact $b$ of relay MR1TPR. The picking up of relay MR1TPSRB will open the stick circuit for relay MR1TPSRA and that relay will release. Relay MR1TPSRB will remain picked up over its stick circuit until relay MR1TPR is again released by a second cut, termed cut 2, entering track section MR1T. However, the entry of cut 2 into track section MR1T will not energize relay MR1TPSRA as its pickup circuit will be open at the back point of contact $b$ of relay MR1TPSRB, and relay MR1TPSRB will remain picked up, and maintain the pickup circuit for relay MR1TPSRA open, until contact $b$ of relay MR1TPR opens. When MR1TPR releases the pickup circuit for relay MR1TPSRA will be opened at the open front contact $a$ of relay MR1TPR before back contact $b$ of relay MR1TPSRB closes to complete the circuit.

Assuming now that four single car cuts, termed cuts 1, 2, 3, and 4, are to traverse track sections CT and MR1T, the operation of relays MR1TPSRA and MR1TPSRB will be described.

When cut 1 traverses track section CT, both relays MR1TPSRA and MR1TPSRB will remain deenergized. When cut 1 enters track section MR1T, relay MR1TPSRA will become picked up. When that cut vacates track section MR1T, relay MR1TPSB will become picked up and thereafter relay MR1TPSRA will release. Therefore, at some time while cut 2 is traversing section CT, both relays MR1TPSRA and MR1TPSRB will be in the picked up position. It will be noted that relay MR1TPSRB will remain picked up under the above described conditions, regardless of the distance of the spacing between cuts 1 and 2, said spacing being at least equal to or greater than the aforesaid minimum spacing between cuts.

When cut 2 enters track section MR1T, relay MR1TPSRB will release and relay MR1TPSRA will remain released as previously pointed out. Thus when cut 3 traverses track section CT, regardless of the distance of the spacing between cuts 2 and 3 said spacing being at least equal to or greater than the aforesaid minimum spacing between cuts, relays MR1TPSRB and MR1TPSRA are released and will remain so, in a manner similar to that for cut 1, until cut 3 enters track section MR1T. The entrance of cut 3 into track section MR1T will energize relay MR1TPSRA and the vacating of section MR1T will energize relay MR1TPSRB thereafter releasing relay MR1TPSRA, the relays thus operating in a manner similar to that for cut 1. Relay MR1TPSRB will remain up when cut 4 traverses track section CT and, therefore, the operation of that relay and relay MR1TPSRA will be similar to that for cut 2. It is thus apparent that relays MR1TPSRA and MR1TPSRB operate in a different manner for each successive cut, operating in a similar manner for each alternate cut. The utility of this arrangement in separately controlling two separate retarder sections MR1S and MR2S of the master retarder will be set forth later in the description.

Referring further to FIG. 1C, there is shown a radar velocity meter RVM2 having an associated antenna RA2 and which operates to produce a signal voltage representative of the velocity of each cut traversing track section CT in a manner similar to that described for velocity meter RVM1 and its associated antenna RA1 shown in FIG. 1B. The signal voltage thus produced is supplied from output terminal $b$ of meter RVM2 over the front point of contact $a$ of relay MR1TSPR and back contact $b$ of relay CTR and over conductors P36–2 and P36–1 connected in series to the input terminal $a$ of a bias unit BU4 including a 100-volt battery designated BU4B.

The input voltage supplied to input terminal $a$ of bias unit BU4 is adjusted by the output from the negative terminal of battery BU4B to produce a resultant negative voltage representative of the velocity of a cut traversing track section CT, in a similar manner that bias unit 1BU3 in FIG. 2A produces a resultant signal voltage representative of the velocity of a cut traversing track sections A1T and A2T. However, a potentiometer BU4P is employed in unit BU4 to adjust the resultant negative voltage, produced by adjusting the input voltage to unit BU4 by the output from the negative terminal of battery BU4B, to provide the following multiplication function. Since the equation for the master computer employs the product of K and V3, in order to preclude the necessity of supplying an additional amplifier or other means to perform the multiplication function of the voltages representing K and V3, potentiometer BU4P is employed to perform this function. It is apparent that potentiometer BU4P cannot be adjusted to produce a resultant voltage greater in a negative direction than minus 100 volts and, since it is conceivable that the product of K and V3 may be a value requiring such a greater resultant voltage, potentiometer BU4P is adjusted so that unit BU4 will produce an output voltage representing $\frac{1}{10}$ of KV3. The adjustment for potentiometer BU4P is designated in FIG. 2D as $K/10$. The increase of the KV3 voltage to its full unit value, by a multiplication function, is performed by an X10 D.C. summing amplifier X10SA, to be hereinafter described, in which the inputs thereto are amplified tenfold. The output from the wiper of the potentiometer BU4P is supplied to an output terminal $b$ on bias unit BU4 and then flows over conductor 128, front contact $d$ of relay MR1TSPR, back contact $c$ of relay CTR and over conductor 129 and through resistor 280 to an input terminal $a$ on said amplifier X10SA.

It is to be noted that the output from velocity meter RVM2 is supplied to bias unit BU4 while track section CT only is occupied by a cut, the input circuit to input terminal $a$ of the bias unit being interrupted at the front point of contact $a$ of relay MR1TSPR when the cut enters track section MR1T. However, when a first cut vacates track section CT relay MR1TSR and consequently relay MR1TSPR are energized and a second cut entering track section CT will again close the circuit to input terminal $a$ of bias unit BU4. The circuit from output terminal $b$ of unit BU4 to the input terminal $a$ of amplifier X10SA is controlled in a similar manner by front contact $d$ of relay MR1TSPR and back contact $c$ of relay CTR.

A battery designated VMB (FIG. 2D) is employed to supply to the input terminal $a$ of X10 summing amplifier X10SA a positive voltage representing the constant $V4m$ added to the product of the constants K and $V3m$ in the equation for the master computer. The positive terminal of batter VMB is connected to a potentiometer designated VMP which is adjusted to produce at its wiper contact a positive voltage representating a value of 10% of $V4m+KV3m$ since the output from terminal $b$ of bias unit BU4 represents 10% of $KV_3$ and since the resultant voltage supplied to terminal $a$ of amplifier X10SA will be multiplied tenfold by that amplifier.

The energy appearing at the wiper contact of potentiometer VMP flows over a circuit including conductor 130, front contact $e$ of relay MR1TSPR, back contact $d$ of relay CTR, and over conductor 131 and resistor 281 to input terminal $a$ of amplifier X10SA. At said terminal $a$ the voltages from bias unit BU4, and battery VMB and potentiometer VMP, are combined to produce a resultant voltage equal to $V4m+KV3m-KV3$ divided by 10. Referring to the formula for computing the leaving speed from the master retarder these terms will be readily recognized. The circuit for supplying energy from battery VMB and potentiometer VMP to input terminal $a$ of amplifier X10SA is controlled by said contacts $d$ and $e$ of relays CTR and MR1TSPR, respectively, in a manner similarly to the circuits to input terminal $a$ of unit BU4 and from output terminal $b$ of said unit.

To give an example of the output provided by amplifier X10SA, voltages are substituted for the elements representing speed in the previously assumed set of conditions employing the equation $V4=V4m+KV3m-KV3$ as follows:

The output from velocity meter RVM2, for the car having a velocity of 9 m.p.h. when entering the master retarder, is positive 64 volts. This voltage is supplied to bias unit BU4 where it is biased by 100 volt battery BU4B to produce a resultant voltage of negative 36 volts which is supplied to the resistance portion of potentiometer BU4P. As previously pointed out, since the element employed in the above equation is KV3, potentiometer BU4P is set to adjust the negative 36 volts supplied thereto by an additional factor of $K/10$, K being the constant having a 2.5 value. The output from bias unit BU4 is, therefore, a voltage of negative 36 volts multiplied by 2.5/10, equaling negative 9 volts which represents the negative KV3 of the above equation divided by 10.

Since a value of 36 volts is employed as representing a speed of 9 m.p.h., then V4m, which it will be remembered in the above assumed set of conditions as being a speed of 11 m.p.h., will be represented by a value of 44 volts. Similarly V3m will be represented by a value of 40 volts and KV3m in the above equation will, therefore, equal 40 volts multiplied by 2.5 or 100 volts.

The value of $V4m+KV3m$, therefore, equals 144 volts. However, since the value of KV3 to be supplied in the above equation is $\frac{1}{10}$ of KV3 or 9 volts, $\frac{1}{10}$ of 144 volts or 14.4 volts should be used as the value of $V4m+KV3m$ in the equation, and battery VMB is selected and potentiometer VMP is set to supply to the input terminal $a$ of amplifier X10SA a value of 14.4 volts. The total input to amplifier X10SA is 14.4 volts minus 9 volts which equals 5.4 volts representing $V4/10$. The amplifier is, therefore, employed to multiply its input voltage to adjust the voltage to the true value of V4. The output from the amplifier is thus 5.4 volts multiplied by 10, or 54 volts, representing a speed of 13.5 m.p.h. (54/4).

The electronic storage units designated MR1–ESUA and MR1–ESUB, associated with the first section of the master retarder, are shown in FIGS. 1D and 2D, respectively. Two electronic storage units designated MR2–ESUA and MR2–ESUB, associated with the second section of the master retarder, are also shown in said drawings. Each of these units is similar to unit 1V1–ESU shown in FIG. 3A and previously described and reference is made to the description of unit 1V1–ESU for a detailed explanation of the operation of such units. It is sufficient for this portion of the description to point out that each of these units is adapted to store a signal voltage when the MR– control relay in each respective unit is released and such a voltage is supplied to an input terminal $a$ on the unit. When the MR control relay in each unit is energized, the voltage signal supplied thereto is made final and is made available for a read-out at terminal $c$ of each respective unit. The control relays in the units MR1–ESUA, MR1–ESUB, MR2–ESUA and MR2–ESUB are designated MR1HA, MR1HB, MR2HA and MR2HB, respectively. The MR– relay in each unit is energized when energy from terminal B of the battery is supplied to a terminal $b$ on the unit in a manner described below.

Relay MR1HA in unit MR1–ESUA has a pickup circuit extending from terminal B of the battery over back contact $d$ of relay MR1TR, front contact $d$ of relay MR1TPSRA, conductor 123, terminal $b$ of unit MR1–ESUA, and through the winding of relay MR1HA to battery terminal N. Relay MR1HA is thus energized whenever relay MR1TR is released and relay MR1TPSRA is picked up.

Relay MR1HB in unit MR1–ESUB has a pickup circuit extending from battery terminal B over said back contact $d$ of relay MR1TR, back contact $e$ of relay MR1TPSRA, conductor 125, terminal $b$ of unit MR1–ESUB, and through the winding of relay MR1HB to battery terminal N. Relay MR1HB is thus energized whenever relays MR1TR and MR1TPSRA are released.

Relay MR2HA in unit MR2–ESUA has a pickup circuit extending from terminal B of the battery over back contact $b$ of relay MR2TR, the front point of contact $b$ of relay MR2STPSR, terminal $b$ of unit MR2–ESUA, and through the winding of relay MR2HA to battery terminal N. Relay MR2HA is thus energized whenever relay MR2TR is released and relay MR2TPSR is energized.

Relay MR2HB in unit MR2–ESUB has a pickup circuit extending from battery terminal B over said back contact $b$ of relay MR2TR, the back point of contact $b$ of relay MR2TPSR, conductor 169, terminal $b$ of unit MR2–ESUB, and through the winding of relay MR2HB to battery terminal N. Relay MR2HB is, therefore, energized whenever relays MR2TR and MR2TPSR are released.

Input terminal $a$ on storage unit MR1–ESUA has an input circuit extending from an output terminal $c$ of amplifier X10SA, and over the back point of contact $d$ of relay MR1TPSRB to said terminal $a$. The output from said amplifier is thus supplied to said terminal $a$ whenever relay MR1TPSRB is released.

Input terminal $a$ on storage unit MR1–ESUB has two input circuits, the first extending from said output terminal $c$ on amplifier X10SA, conductor 127, the front point of contact $f$ of relay MR1TPSRA, and over conductor 126 to said terminal $a$; and the second extending from said output terminal $c$ over the front point of contact $d$ of relay MR1TPSRB to said input terminal $a$. The output from said amplifier is thus supplied to said terminal $a$ of unit MR1–ESUB whenever relay MR1TPSRA or relay MR1TPSRB is energized.

Input terminal $a$ of unit MR2–ESUA has an input circuit extending from output terminal $c$ of unit MR1–ESUA to said input terminal $a$. Thus, the output supplied to terminal $c$ of unit MR1–ESUA, whenever control relay MR1HA is energized, is supplied to input terminal $a$ of unit MR2–ESUA.

Input terminal $a$ of unit MR2–ESUB has input circuit extending from output terminal $c$ of unit MR1–ESUB to said input terminal $a$. Thus, the output supplied to terminal $c$ on unit MR1–ESUB, whenever control relay MR1HB is energized, is supplied to input terminal $a$ on unit MR2–ESUB.

The output from terminal $c$ of unit MR1–ESUA is also supplied through a rectifier REA and over conductor 154 to input terminal $a$ of a speed control unit designated MR1SCU and hereinafter described. Similarly the output from terminal $c$ of unit MR1–ESUB is also supplied to said input terminal $a$ on unit MR1SCU through a rectifier REB. Rectifier REA prevents the output from unit MR1–ESUB from reaching input terminal $a$ on unit MR2–ESUA, and rectifier REB prevents the output from unit MR1–ESUA from reaching input terminal $a$ on unit MR1–ESUB. The outputs from terminals $c$ on units MR2–ESUA and MR2–ESUB is supplied to input terminal $a$ of a second speed control unit designated MR2SCU and hereinafter described.

It will be expedient to describe at this point the controls for the operation of the apparatus used to derive and store the leaving speeds for three successive car cuts traversing track sections CT, MR1T and MR2T. These cuts will be termed cuts 1, 2, and 3, as in the previous descriptions.

When cut 1 enters track section CT the back contacts $b$, $c$, and $d$ of relay CTR close the input circuits to summing amplifier X10SA which in turn supplies from its output terminal $c$ over the back point of contact $d$ of relay MR1TPSRB to input terminal $a$ of storage unit MR1–ESUA, a voltage signal representative of the desired leaving speed of cut 1 from the master retarder. This voltage signal continues until the cut enters track section MR1TR and the circuits for deriving and supplying the signal to unit MR1–ESUA are interrupted at the open front contacts $a$, $d$, and $e$ of relay MR1TSPR. The release of relay MR1TR also closes at the back point of its contact $c$ the energizing circuit for relay MR1TPSRA which thus becomes picked up. The picking up of relay MR1TPSRA completes at its front contact $d$ the pickup circuit for relay MR1HA including back contact $d$ of relay MR1TR. The picking up of relay MR1HA makes the voltage signal supplied to unit MR1–ESUA final and supplies it to output terminal $c$ of the unit from where it in turn is supplied to input terminals $a$ of storage unit MR2–ESUA and speed control unit MR1SCU. Unit MR2–ESUA stores the voltage signal until required for control of the second section of the master retarder and unit MR1SCU employs the signal for control of the first section of the master retarder in a manner hereinafter described.

When cut 1 vacates track section CT relay MR1TSPR will again pick up and back contacts $b$, $c$, and $d$ of relay CTR will open. The circuits for deriving the signal voltage representing the desired leaving speed of cuts from the master retarder are now in the condition existing before cut 1 entered track section CT. However, as previously described, relay MR1TPSRA is energized and will remain so as long as cut 1 occupies track section MR1T. Therefore, if cut 2 enters track section CT at this time the computed leaving speed voltage signal for that cut will be supplied over front contact $f$ of relay MR1TPSRA to input terminal $a$ of storage unit MR1–ESUB to be stored in that unit. The voltage signal is also supplied to input terminal $a$ of storage unit MR1–ESUA at this time but the control relay MR1HA is also energized and unit MR1–ESUA cannot, therefore, store the signal.

When cut 1 vacates track section MR1T, relay MR1TR will close its front contact $c$ to energize relay MR1TPSRB. Relay MR1TPSRA will subsequently release but the input circuit to storage unit MR1–ESUB will be previously closed at the front point of contact *d* of relay MR1TPSRB. Unit MR1–ESUB will, therefore, continue to store the signal voltage for cut 2. The opening of back contact *d* of relay MR1TR prior to the release of relay MR1TPSRA will prevent relay MR1HB from picking up to interrupt the signal voltage to unit MR1–ESUB and supply it to speed control until MR1SCU prematurely.

When cut 1 enters track section MR2T, relay

MR2TPSR will pick up closing the front point of its contact *b*, thereby energizing relay MR2HA to make the voltage signal supplied to unit MR2–ESAU final and supply it to speed control unit MR2SCU for control of the second section of the master retarder and, thereby, the speed of cut 1. This control will be hereinafter described.

When cut 2 enters track section MR1T back contact *d* of relay MR1TR will close the pickup circuit for MR1HB which will pick up to make the leaving speed signal voltage for cut 2 final and supply it to speed control unit MR1SCU for control of cut 2 in the first section of the master retarder. The signal voltage is also supplied to storage unit MR2–ESUB for storage at this time.

When cut 1 vacates track section MR2T relay

MR2TPSR will release in turn releasing relay MR2HA in storage unit MR2–ESAU. The picking up of relay MR2TR does not reenergize relay MR2TPR as its pickup circuit remains open at front contact *c* of relay MR1TPSRA. Now when cut 2 enters track section MR2T, relay

MR2TPSR will remain released since its pickup circuit remains open at front contact *a* of relay MR2TPR. The closure of back contact *b* of relay MR2TR will, therefore, energize relay MR2HB, to make the signal voltage supplied to that unit final and supply it to speed control unit MR2SCU for control of cut 2 in the second section of the master retarder.

Since relays MR1TPSRA and MR1TPSRB remain released for cut 2, when cut 3 enters track section CT the apparatus will operate as described for cut 1, storage units MR1–ESUA and MR2–ESUA being employed for storing the signal voltages representing the desired leaving speed for the cut. When a fourth cut enters track section CT, relays MR1TPSRA or MR1TPSRB or both being energized by the pasage of cut 3, the apparatus will operate as for cut 2, storage units MR1–ESUB and MR2–ESUB again being utilized. It is apparent, therefore, that the pairs of associated storage units are employed alternately as cuts traverse track sections CT, MR1T, and MR2T. Such an arrangement is necessary in order that one storage unit can be providing a signal voltage for control of one section of the master retarder in accordance with the desired leaving speed for a car cut traversing that retarder section, while the other storage unit for that section is storing a signal voltage for a following car cut.

Radar velocity meters RVM3 and RVM4 and their associated antennas RA3 and RA4, respectively, in FIG. 1D operate to supply from output terminals *b* on meters RVM3 and RVM4 to input terminals *b* on speed control units MR1SCU and MR2SCU, respectively, a voltage signal representative of the speed of cuts in the first and second sections, respectively, of the master retarder.

The details of the speed control units MR1SCU and MR2SCU in FIG. 2D, as well as units 1–2SCU and 3–4SCU in FIGS. 1F and 1G respectively, form no part of our present invention, but for purposes of this description the units may be considered to be identical to the apparatus disclosed and claimed in copending application for Letters Patent of the United State, Serial No. 676,732, filed August 7, 1957, by Richard D. Campbell and James A. Cook, Jr., for Control Circuits, which application is assigned to the assignee of the subject case. It is sufficient for purposes of the present description to point out, for example, that relays 1BSCR and 1ASCR in speed control unit MR1SCU correspond to relays designated 114 and 128, respectively, shown in FIG. 2 of said copending application. The input to terminal *a* of unit MR1SCU corresponds to the preselected velocity signal supplied to resistor 12 in FIG. 2 of said application, and the input to terminal *b* of unit MR1SCU corresponds to the radar signal supplied to resistor 11 in said FIG. 2. Contact *a* of relay 1BSCR in FIG. 2D of the subject application corresponds to contact *a* of relay 114 in FIG. 2 of the Campbell et al. application, while contact *a* of relay 1ASCR in said FIG. 2D of the subject application corresponds to contact *a* of relay 128 in FIG. 2 of Campbell et al. It will be noted that energy is supplied from terminal B of the battery to output terminals *e* and *f* of unit MR1SCU over said contacts *a* of relays 1BSCR and 1ASCR in a manner identical to that in which energy is supplied from the positive terminal of source 130, in FIG. 2 of said copending application, to the windings 29 and 30 of intake valves 21 and exhaust valves 31, respectively, in said FIG. 2. It is believed sufficient for purpose of the present description to point out that relays 1ASCR and 1BSCR are both released when the unit MR1SCU is not operating, when there is no cut in the area viewed by radar antenna RA3, when a cut traversing the first section of the master retarder has a speed below the selected speed as represented by the voltage signal supplied to terminal *a* of the unit, or when the combined voltage signals supplied to terminals *a* and *b* indicate a need for less braking. When the voltage signals supplied to terminals *a* and *b* of unit MR1SCU indicate that the cut in the first section of the master retarder is being properly retarded, relay 1ASCR is picked up and relay 1BSCR is released. When the combined voltage signals supplied to said terminals *a* and *b* indicate the need for further braking of a cut traversing the first section of the master retarder, both relays 1BSCR and 1ASCR are picked up. Thus, it appears that energy from battery terminal B is supplied to terminal *f* on said speed control unit whenever relay 1ASCR is released. This circuit extends from said battery terminal over the back point of contact *a* of relay 1ASCR to said terminal *f*. Energy from battery terminal B is supplied to terminal *e* on unit MR1SCU when relays 1ASCR and 2BSCR are picked up. This circuit extends from battery terminal B over the front point of contact *a* of relay 1ASCR and front contact *a* of relay 1BSCR to said terminal *e*. Relays 2ASCR and 2BSCR in unit MR2SCU operate in a manner similar to that just described for relays 1ASCR and 1BSCR to supply energy from battery terminal B over contacts *a* on relays 2ASCR and 2BSCR to output terminals *e* and *f* on said unit MR2SCU, and no further description of this unit is believed necessary. Reference is made to said copending application Serial No. 676,732 for a more detailed description of the internal apparatus in speed control units MR1SCU and MR2SCU.

Referring further to FIG. 1D, there is shown retarder pressure control unit designated R1PC employed for controlling the braking pressure in the first section of the master retarder, and retarder pressure control unit designated R2PC employed for controlling the braking pressure in the second section of the master retarder. Similar sets of apparatus or units designated R1–2PC and R3–4PC and shown in FIGS. 1F and 1G, respectively, are employed for controlling the braking force of the group retarders 1–2GR and 3–4GR, respectively.

Pressure control unit R1PC is shown as having a plurality of input terminals designated *a* through *e*, each connected to a conductor. The details of the pressure control units employed in the present example of our invention form no part of our invention but, for the purpose of making the present description complete, the units may be considered to be identical to that disclosed and claimed in copending applicaton for Letters Patent of the United States, Serial No. 718,312, filed February 28, 1958, by Richard D. Campbell and Joseph M. Berill for Speed Control System, which application is assigned to the assignee of the subject application and has matured into Patent No. 2,998,515, issued August 29, 1961. For this reason the conductors connected to said terminals *a* through *e* on unit R1PC are identified as conductors 59, 58, 48, 52, and 57, respectively, to indicate the identical conductors and terminals shown for the retarder pressure control unit in FIG. 1*b* of said copending application. It is sufficient for the purposes of the present description to point out that conductors 59 and 58 in FIG. 1*b* of Patent No. 2,998,515 (connected to terminals *a* and *b*, respectively, in FIG. 1D of the present case) are employed for controlling control magnets for exhaust valves for exhausting fluid pressure supplied from manifold 104 to the retarder actuating cylinders 100 and 101 shown in said FIG. 1*b* of the copending application. Conductors 48, 52, and 57 in said FIG. 1*b* of the prior patent (connected to terminals *c*, *d*, and *e*, respectively of unit R1PC in the present case) are employed for controlling control magnets for intake valves for increasing the fluid pressure supplied from manifold 104 to said retarder actuating cylinders 100 and 101 in said FIG. 1*b* of Patent No. 2,998,515. Referring to FIG. 1D of the present case, it may then be said that, similar to the arrangment of said reference patent, the supplying of energy from terminal B of the battery to terminals *a* and *b* of unit R1PC operates to reduce the braking pressure exerted by the first section of the master retarder. The supplying of energy from terminal B of the battery to terminal *c* only of unit R1PC causes fluid pressure to be supplied to the operating cylinders of the first master retarder section at a slow quickly established rate. The supplying of energy from battery terminal B to terminal *d* only of unit R1PC causes fluid pressure to be supplied to said operating cylinders at a medium relatively rapid rate, and when energy is supplied to terminals *d* and *e* on unit R1PC, fluid pressure is supplied to the operating cylinders of the first master retarder section at a very rapid rate. Reference is made to said Patent No. 2,998,515 for a more detailed description of the operation of retarder pressure control unit R1PC. Pressure control unit R2PC employed for controlling the braking pressure exerted by the second section of the master retarder is identical in construction to unit R1PC and also has a plurality of input terminals *a* through *e* which may be energized in a manner similar to the input terminals on unit R1PC to cause the unit R2PC to adjust the braking force exerted by the second master retarder section. No detailed description of the operation of unit R2PC is believed necessary.

Relays MR1HPR and MR1LPR, and relays MR2HPR and MR2LPR in FIG. 2D of the drawings are repeater relays employed for repeating the weight classification for each cut of cars traversing the first and second sections, respectively, of the master retarder. The circuits for control of these repeater relays will be discussed in detail hereinafter, but for the purpose of the present portion of this description, it is pointed out that relay MR1LPR only is energized when the weight classification for a cut of cars traversing the first section of the master retarder is a light weight classification, relay MR1HPR only is energized when said cut has a heavy weight classification, and both relays MR1HPR and MR1LPR are energized when the weight classification of said cut is of the medium weight classification. Relays MR2LPR and MR2HPR operate in a similar manner for cuts of cars traversing the second section of the master retarder.

Terminals *a* and *b* of retarder pressure control unit R1PC have an energizing circuit extending from battery terminal B over the back point of contact *a* of relay 1ASCR in speed control unit MR1SCU, output terminal *f* on unit MR1SCU, and thence over conductor 161 to said terminals *a* and *b*. Terminal *c* of unit R1PC has an energizing circuit extending from battery terminal B over the front point of contact *a* of relay 1ASCR in unit MR1SCU, front contact *a* of relay 1BSCR in unit MR1SCU, terminal *e* on unit MR1SCU, the back point of contact *a* of relay MR1HPR, front contact *b* of relay MR1LPR, and thence over conductor 164 to said terminal *c*. Terminal *d* of unit R1PC has a first energizing circuit extending from terminal *e* on unit MR1SCU over the front point of contact *a* of relay MR1HPR, the front point of contact *a* of relay MR1LPR, and thence over conductor 162 to said terminal *d*. Terminal *d* of unit R1PC has a second energizing circuit extending from said terminal *e* on unit MR1SCU, the said front point of contact *a* of relay MR1HPR, the back point of contact *a* of relay MR1LPR, rectifier MRE1, employed to prevent sneak circuits, and thence over said conductor 162 to said terminal *d*. Terminal *e* of unit R1PC has an energizing circuit extending from said terminal *e* on unit MR1SCU, said front point of contact *a* of relay MR1HPR, said back point of contact *a* of relay MR1LPR, and thence over conductor 163 to said terminal *e*.

Terminals *a* and *b* of retarder pressure control unit R2PC have an energizing circuit extending from terminal B of the battery over the back point of contact *a* of relay 2ASCR in speed control unit MR2SCU, terminal *f* on unit MR2SCU and over conductor 165 to said terminals *a* and *b*. Terminal *c* of unit R2PC has an energizing circuit extending from battery terminal B over the front point of contact *a* of relay 2ASCR, front contact *a* of relay 2BSCR, terminal *e* on speed control unit MR2SCU, back point of contact *a* of relay MR2HPR, front contact *b* of relay MR2LPR, and thence over conductor 168 to said terminal *c*. Terminal *d* on unit R2PC has a first energizing circuit extending from said terminal *e* on unit MR2SCU, the front point of contact *a* of relay MR2HPR, the front point of contact *a* of relay MR2LPR, and thence over conductor 166 to said terminal *d*. Terminal *d* on unit R2PC has a second energizing circuit extending from said terminal *e* on unit MR2SCU, said front point of contact *a* of relay MR2HPR, the back point of contact *a* of relay MR2LPR, rectifier MRE2, provided to prevent sneak circuits, and over said conductor 166 to said terminal *d*. Terminal *e* on unit R2PC has an energizing circuit extending from said terminal *e* on unit MR2SCU, said front point of contact *a* of relay MR2HPR, said back point of contact *a* of relay MR2LPR, and thence over conductor 167 to said terminal *e* on unit R2PC.

It is, thus, apparent that when relays 1ASCR and 1BSCR in unit MR1SCU are both energized to increase the braking force exerted by the first section of the master retarder on a car cut traversing that section, the braking force is increased at a relatively slow rate when the cut is classified as a light weight cut, is increased at a medium relatively rapid rate when the cut is classified as a medium weight cut, and is increased at a very rapid rate when the cut is classified as a heavy weight cut. Similarly when relays 2ASCR and 2BSCR in unit MR2SCU are both energized to increase the braking force exerted by the second section of the master retarder on a car cut traversing that section, the braking force is increased at a relatively slow rate when the cut is classified as a light weight cut, is increased at a relatively more rapid rate when the cut is of medium weight, and is increased at a very rapid rate when the cut is classified as a heavy weight cut.

There is shown in FIG. 2C a plurality of four track fullness units, one for each storage track in the classification yard. In actual practice a much greater number of such units would be employed due to the number of storage tracks in such yards but, only four storage tracks being illustrated in the present example of our invention, only four such units are required. The internal arrangement of the track fullness units are identical and therefore, only the details of the track 1 unit are shown, the units for tracks 2, 3, and 4 being shown in block diagram form.

Referring to the track 1 track fullness unit, the unit has a control terminal *a* which is connected in the unit to the windings of an electric motor which may be the motor of a servomechanism but is here shown as an electric meter type motor. Such motors are well known and the armatures thereof rotate at a rate of speed which is proportional to the value of a voltage supplied to its windings. The armature of the motor is mechanically connected through a reduction gear arrangement and a differential to the wiper of a potentiometer designated TFU1P so that the wiper of the potentiometer is moved to the right as shown in the drawing a predetermined distance on the resistance element of the potentiometer for each revolution of the motor armature. The wiper of the potentiometer is connected to a terminal *c* on the unit and one terminal of the resistance element of the potentiometer is connected to another terminal *d* on said unit. The other terminal of the resistance element is connected to ground. A manual reset is mechanically connected to the differential so that the wiper of potentiometer TFU1P may be reset to its zero or left hand position when the cars in a storage track are all removed, the storage track then having full car capacity and the next cut being destined for that track having maximum distance to travel. By this arrangement a signal voltage supplied to terminal *d* of the track fullness unit, in a manner to be hereinafter described, is supplied over potentiometer TFU1P to terminal *c* on the track fullness unit. This signal voltage supplied to terminal *c* is gradually reduced in value as the wiper of the potentiometer is moved to the right by the motor of the unit or, in other words, as the motor is driven as described below by cuts of cars, destined for storage track 1, traversing track section MR1T. The track fullness units for tracks 2, 3, and 4 are each also shown having a control terminal *a* and signal input and output terminals *d* and *c*, respectively, and operate in a manner similar to that described for the track fullness unit for track 1.

When a cut of cars enters track section MR1T, relay MR1TSPR (FIG. 1C) releases and closes its back contact *b* which supplies the signal voltage from the output terminal *b* of radar velocity meter RVM3 (FIG. 1D) over conductors 152 and 117 to the input terminal *a* of a bias unit BU2 (FIG. 1C). A battery BU2B in said bias unit supplies a negative bias of 100 volts to the signal voltage supplied to the input terminal *a* of the bias unit, producing a resultant negative voltage which increases in a negative direction as the speed of the cut entering track section MR1T increases, since the output signal from velocity meter RVM3 constitutes a positive voltage which decreases as the speed of said cut increases. The said resultant negative voltage is supplied from output terminal *b* on the bias unit to an input terminal *a* on a multivibrator unit designated MVU.

The multivibrator unit MVU is employed to convert the direct current supplied to said terminal *a* of the unit to an alternating current which is then supplied to an output terminal *b* on the unit. Such apparatus or multivibrators employed for the conversion of a direct current to alternating current are well known in the art, and, for purposes of this description, the unit may be considered to consist of the apparatus disclosed and claimed in United States Patent No. 2,352,299 issued June 27, 1944, to Alec Harvey Bennett Walker for Apparatus for the Conversion or Inversion of Direct Electric Current to Alternating Current. The similarity between the designated components of unit MVU and those shown in the single drawing figure of said patent will be readily apparent by reference to said patent. The output from the winding T2 of transformer T in unit MVU is supplied between said output terminal *b* on the unit and a grounded terminal, these two terminals corresponding to terminals L1 and L2 shown in the drawing of said patent.

The signal voltage from the output terminal *b* of velocity meter RVM3 is supplied to input terminal *a* on bias unit BU2 only while relay MR1TSPR is released and, since this relay is released when a cut enters track section MR1T and remains released only until relay MR1TSR becomes picked up by said cut vacating track section CT, the signal voltage from velocity meter RVM3 and supplied to bias unit BU2 is indicative of the length of the cut and, when adjusted in said bias unit, may be said to be proportional to the length of the cut. For example, assuming for purposes of simplicity a cut of the length of 88 feet moving at a speed of 12 m.p.h. through both track sections CT and MR1T, the output from velocity meter RVM3 will be a positive voltage of the value of 52 volts which will be supplied to bias unit BU2 for a period of 5 seconds (the length of time required for the cut to vacate track section CT after entering track section MR1T). If the 88 foot cut is moving at a speed of 6 m.p.h. it will require 10 seconds for the cut to vacate track section CT after entering section MR1T, and the output from velocity meter RVM3 will be a positive voltage of the value 76 volts supplied to bias unit BU2 for a period of 10 seconds. As further examples, a cut of the length of 44 feet moving at 6 m.p.h. will require 5 seconds to vacate track section CT after entering track section MR1T, and the output from velocity meter RVM3 will be a positive voltage of the value of 76 volts supplied to bias unit BU2 for a period of 5 seconds. A cut of the length of 132 feet moving at 18 m.p.h. will require 5 seconds to vacate track section CT after entering track section MR1T, and the output from meter RVM3 will be a positive voltage of 28 volts supplied to bias unit BU2 for a period of 5 seconds. When the voltages are biased in bias unit BU2 by the energy supplied from the negative terminal of the 100 volt battery BU2B, the positive voltages of 52 volts, 76 volts, 76 volts, and 28 volts will cause negative outputs from the bias units of 48 volts, 24 volts, 24 volts, and 72 volts, respectively, for periods of 5 seconds, 10 seconds, 5 seconds, and 5 seconds, respectively. By converting these values into volt-seconds the outputs from bias unit BU2 may be said to be 240 volt-seconds, 240 volt-seconds, 120 volt-seconds, and 360 volt-seconds, representing cut lengths of 88 feet, 88 feet, 44 feet, and 132 feet, respectively. It may then be said that each voltage supplied to the input terminal of unit MVU is a negative voltage of a value which when multiplied by the number of seconds the voltage is so supplied produces a resultant total voltage proportional to the length of a cut passing the juncture of track sections CT and MR1T. It is immaterial that such voltages are negative voltages since they are converted in unit MVU to alternating current voltages.

The outputs from terminal *b* of unit MVU are supplied over back contact *c* of relay MR1TSPR to control terminal *a* of the proper ones of the track fullness units, selected in a manner to be hereinafter described, and the electric meter type motor in each selected unit is driven at a speed in proportion to the value of voltage supplied thereto and for a length of time equal to the duration of the respective voltage. Thus input voltages supplied to terminal *a* of the track fullness unit for track 1, for example, will drive the motor in that unit and consequently the wiper of potentiometer TFU1P a distance, representing a cut length of 88 feet, when said voltage is 48 volts for a duration of 5 seconds or when the voltage is 24 volts for a duration of ten seconds, the speed of said motor being proportional to the value of the voltage. As previously pointed out one of the many well known types of servo-mechanisms could be employed in a similar manner for driving the wiper of potentiometer TFU1P.

The computer apparatus employed for making the group retarder leaving speed computations is shown in FIGS. 3C, 3D, 4C, and 4D, and is comprised of first and second D.C. inverting amplifiers designated VCA and RCA (FIG. 3C), a curved track rolling resistance non-inverting D.C. summing amplifier designated RCSA (FIG. 3D), a tangent track rolling resistance non-inverting D.C. amplifier designated RTSA (FIG. 4D), a total summing inverting D.C. amplifier designated TSA (FIG. 4D), and a square root summing non-inverting D.C. amplifier designated SQRSA (FIG. 4D). Employed in conjunction with amplifier RCA is a battery designated G2TB (FIG. 3C) and an associated potentiometer designated G2TP used to provide an input to amplifier RCA in accordance with the grade in the curved track section between the entrance end of track section A2T and the exit end of track section CT. A plurality of potentiometers designated TK1B1, TK2B1, TK3B1, and TK4B1 (FIG. 3C) are employed in conjunction with amplifier RCSA to adjust the input to that amplifier from amplifier RCA in accordance with a first curved track correlation factor for the curves in the tracks leading to storage tracks 1, 2, 3 and 4 respectively. Also employed in conjunction with amplifier RCSA is a battery designated C1B (FIG. 4C) and a plurality of potentiometers designated TK1C1, TK2C1, TK3C1, and TK4C1 used to provide an input to amplifier RCSA in accordance with a second curved track correlation factor for the curves in the track leads to storage tracks 1, 2, 3, and 4, respectively. Battery G6–7B and potentiometers TK1G6–7, TK2G6–7, TK3G6–7, and TK4G6–7 (FIG. 4C) are employed in conjunction with amplifier RCSA to provide an input thereto in accordance with the grades in the curved portion of the track leads to each of the storage tracks 1, 2, 3, and 4, respectively.

An input to amplifier RTSA (FIG. 4D) is provided, as described hereinafter, by a battery G7B and potentiometers TK1G7, TK2G7, TK3G7, and TK4G7 (FIG. 4C) in accordance with the grade in the respective storage tracks 1, 2, 3, and 4; and the output from amplifier RTSA is supplied, as hereinafter described, through the potentiometer in each respective track fullness unit, 1, 2, 3, or 4 employed for adjusting said output in accordance with the distance to coupling in the storage tracks 1, 2, 3, and 4, respectively, to the input terminal of total summing amplifier TSA (FIG. 4D). Also employed in conjunction with amplifier TSA is a plurality of potentiometers designated TK1D6–7, TK2D6–7, TK3D6–7, and TK4D6–7 (FIG. 4C) whereby the output from amplifier RCSA is adjusted in accordance with the length of the curved portion in each of the leads to tracks 1 through 4, respectively, before being supplied to the input terminal of amplifier TSA.

Battery V8B and potentiometer V8P in FIG. 4C are used for providing an input to amplifier TSA in accordance with the square of the desired speed V8 for each cut of cars at its point of coupling in its respective storage track. The output from amplifier TSA represents $V6^2$ or the square of the voltage signal which represents the leaving speed V6 for each cut from its respective group retarder which will permit the cut to travel to coupling in its respective storage track and couple with the preceding cars therein at said desired coupling speed. This output is supplied through a resistor 250 to a suitable square root taking device here shown as a summing amplifier SQRSA having multiple feedback paths and the outputs of which are the signal voltages representing velocities V6, which voltages are employed for controlling the braking force exerted by the group retarders.

Amplifier SQRSA has a linear feedback path comprising a resistor 260, a first non-linear feedback path comprising a resistor 251 in series with a diode 252 and a battery 253, a second non-linear feedback path comprising a resistor 254 in series with a diode 255 and a battery 256, and a third non-linear feedback path including a resistor 257 in series with a diode 258 and a battery 259. Each of the diodes 252, 255, and 258 are initially biased against conduction by batteries 253, 256, and 259, respectively. As the input potential increases, the biasing potentials will be successively overcome, and additional degenerative feedback is supplied. The biased values for the diodes are so selected that the output curve for the amplifier is a stepwise approximation to the square root of the input. Such devices are well known in the art and the circuit will accordingly not be described in detail. Moreover, this circuit is not essential in the practice of our invention, since any other suitable square root computer could be employed.

Each signal voltage representing a velocity V6 is stored in the storage panel 1P through 7P associated with the cut for which the signal was derived until required for control of the respective cut when traversing the group retarder in the route to the storage track for the cut. This operation will become more apparent as the description proceeds.

Relays WS1P and WS2P, the control windings of which are shown in FIG. 3C and contacts of which are shown in FIGS. 2C, 3C and 4C, are switch control storage repeater relays which are controlled by the –WS1 and –WS2 relays, respectively, in the central storage panels. Relays WS1P and WS2P are employed to control the selection of the proper track fullness units and the previously mentioned potentiometers in FIGS. 3C and 4C used for supplying correlation factors for the tangent track rolling resistance, the curved track rolling resistance, and the final leaving speed V3 computations.

In order to keep the description of the control of relays WS1P and WS2P at a minimum two typical examples of their control will be described, their controls in other instances being obvious from these examples. It will be remembered that the operation of the TAC relays was described in relation to a first car cut, designated cut 1, and a second closely following car cut, designated cut 2, proceeding to their respective storage tracks. Storage panel 1P, identified by the binary code 001, was selected for cut 1, and storage panel 2P, identified by the binary code 010, was selected for cut 2. These cuts 1 and 2 will, therefore, also be employed for the present portion of this description but will now be assumed to be destined for storage tracks 3 and 4, respectively.

Since cut 1 is destined for storage track 3, as previously pointed out, switch control storage relays 1WS1 and 1WS2 in storage panel 1P (FIG. 4A) will be energized and de-energized respectively, to store controls for controlling the first and second switches in the route for cut 1 to their reverse and normal positons, respectively, to align the route to storage track 3. Similarly, relays 2WS1 and 2WS2 (not shown) in storage panel 2P will both be energized to store controls for reversing the first and second switches and thereby aligning the route to storage track 4 for cut 2. Referring to FIG. 4A, it will be seen that the energization of relay 1WS1 connects terminal B of the battery to terminal 39 of panel 1P over front contact b of relay 1WS1. However, no energy is supplied to terminal 20 of panel 1P at this time since relay 1WS2 remains released. Similarly, energy will be supplied to both terminals 39 and 20 of panel 1P, when that panel is selected for cut 2, since both relays 2WS1 and 2WS2 in panel 2P are energized at that time.

As previously described when cut 1 enters track section A2T the TAC relays for the binary code 001 identifying panel 1P become energized, including relay D3TAC of the D group of TAC relays. The energization of relay D3TAC closes at front contact p of that relay (FIG. 7D) the pickup circuit for relay WS1P. This circuit extends from terminal 39 of panel 1P over conductor 1P39 (FIGS. 4A, 5A, 6A, 7A, 7B, 7C, 8C, 9C, 9D, 8D, 7D), conductor 1P39–1 (FIG. 7D), front contact p of relay D3TAC, the back point of contact n of relay D2TAC, the back point of contact t of relay D1TAC, conductor P39–1 (FIGS. 7D, 6D, 5D, 5C, 4C, 3C), and through the winding of relay WS1P to battery terminal N. Relay WS1P is, therefore, energized at this time. The energization of relay D3TAC also prepares at front contact u of that relay (FIG. 8D) a pickup circuit for relay WS2P, but this circuit is not completed at this time because, as stated above, no energy is supplied to terminal 20 of panel 1P, which terminal connects to said front contact u at this time over conductors 1P20 and 1P20–1. The energization of relay WS1P only selects the potentiometers (FIGS. 3C and 4C) and the proper track fullness unit associated with storage track 3. This will be described in more detail later.

As also previously described, when cut 1 vacates track section CT, relay D3TAC releases and relay D2TAC becomes picked up to reflect the binary code 010 identifying panel 2P for cut 2, which it will be remembered is following cut 1 at the permissive minimum distance. The release of relay D3TAC opens the above traced pickup circuit for relay WS1P. However, at this time a second pickup circuit for relay WS1P and a pickup circuit for relay WS2P are completed. The pickup circuit for relay WS1P extends from terminal 39 of panel 2P (FIG. 4A), conductor 2P39 (FIGS. 4A, 5A, 6A, 7A, 7B, 7C, 8C, 9C, 9D, 8D, 7D), conductor 2P39–1 (FIG. 7D), the back point of contact $n$ of relay D3TAC, the front point of contact $n$ of relay D2TAC, the back point of contact $t$ of relay D1TAC, conductor P39–1 (FIGS. 7D, 6D, 5D, 5C, 4C, 3C), and through the winding of relay WS1P to battery terminal N. The pickup circuit for relay WS2P extends from terminal 20 of panel 2P (FIG. 4A), conductor 2P20 (FIGS. 4A, 5A, 6A, 7A, 7B, 7C, 8C, 9C, 9D, 8D), conductor 2P20–1 (FIG. 8D), the back point of contact $t$ of relay D3TAC, the front point of contact $r$ of relay D2TAC, the back point of contact $u$ of relay D1TAC, conductor P20–1 (FIGS. 8D, 7D, 6D, 5D, 5C, 4C, 3C), and through the winding of relay WS2P to battery terminal N. The energization of relays WS1P and WS2P selects the potentiometers (FIGS. 3C and 4C) and the proper track fullness unit associated with storage track 4. This selection operation will become apparent as the description proceeds.

From the above brief detailed description of the controls of relays WS1P and WS2P, it is believed that the control of these relays over combinations of contacts of the D–TAC relays for cuts having their storages in panels 3P through 7P will be readily apparent and, therefore, for the purpose of maintaining this description at a minimum no further examples of the control of relays WS1P and WS2P will be given. However, switch control relay 1–4A1 (FIG. 1E) for controlling switch 1–4W, and switch control relays 1–2A1 and 3–4A1 (FIG. 1G) for controlling switches 1–2W and 3–4W, respectively, being controlled in a manner similar to relays WS1P and WS2P, several examples of the control of these switch control relays will now be given.

As previously set forth, the WS1 relays in the storage panels store the switch controls for the first switch in any route and the WS2 relays in the panels store the switch controls for the second switch in any route. Thus, the WS1 relays store controls for switch 1–4W, and the WS2 relays store controls for switches 1–2W and 3–4W. Again, referring to the above cuts 1 and 2 for the purpose of the present examples, when the binary code 001 identifying storage panel 1P for cut 1 is transferred to the F group of TAC relays, a pickup circuit for relay 1–4A1 is closed. This circuit extends from conductor 1P39 (FIG. 7D) over conductor 1P39–2 (FIGS. 7D, 7E, 6E, 5E, 4E, 3E, 2E), the back point of contact $d$ of relay F1TAC (FIG. 2E), the back point of contact $c$ of relay F2TAC, the front point of contact $c$ of relay F3TAC, and through the winding of relay 1–4A1 to battery terminal N. Relay 1–4A1 is, thus, energized at this time. When cut 1 enters track section 1–4T the 001 binary code is transferred through the groups of TAC relays to the RL group of TAC relays (FIG. 4G) in the manner previously described, and relay RL3TAC only is energized. The picking up of relay RL3TAC prepares a pickup circuit for relay 3–4A1 which may be traced from conductor 1P20 (FIG. 8D) over conductor 1P20–2 (FIGS. 8D, 7D, 7E, 6F, 6G, 5G), conductor 1P20–3 (FIGS. 5G, 4G), the back point of contact $c$ of relay RL1TAC, the back point of contact $b$ of relay RL2TAC, the front point of contact of relay RL3TAC, conductor P20–3 (FIGS. 4G, 3G, 2G, 1G), and to the winding of relay 3–4A1. However, relay 3–4A1 does not pick up at this time since conductor 1P20 was not energized, relay 1WS2 in panel 1P remaining released, and therefore switch 3–4W remains in its normal position as will be more fully described later in this description.

When the binary code 010 for cut 2 is transferred to the F group of TAC relays (FIG. 2E) relay F2TAC only is picked up and another pickup circuit for relay 1–4A1 is completed. This circuit extends from conductor 2P39 (FIG. 7D), conductor 2P39–2 (FIGS. 7D, 7E, 6E, 5E, 4E, 3E, 2E), the back point of contact $e$ of relay F1TAC, the front point of contact $d$ of relay F2TAC, the back point of contact $c$ of relay F3TAC, and through the winding of relay 1–4A1 to battery terminal N. Relay 1–4A1 is, therefore, now energized to control switch 1–4W to its reverse position as will be described.

When the binary code 010 for cut 2 is transferred to the RL group of TAC relays, relay RL2TAC (FIG. 4G) only is energized and closes a pickup circuit for relay 3–4A1. This circuit extends from conductor 2P20 (FIG. 8D) over conductor 2P20–2 (FIGS. 8D, 7D, 7E, 6E, 6F, 6G, 5G), conductor 2P20–3 (FIGS. 5G, 4G), the back point of contact $d$ of relay RL1TAC, the front point of contact $c$ of relay RL2TAC, the back point of contact $b$ of relay RL3TAC, conductor P20–3 (FIGS. 4G, 3G, 2G, 1G), and through the winding of relay 3–4A1 to battery terminal N. Relay 3–4A1 is energized at this time to control switch 3–4W to its reverse position to align the route to track 4 for cut 2.

In view of the above description of the manner in which the control circuits for relays 1–4A1 and 3–4A1 are connected to the proper storage panels for cuts 1 and 2, it is believed that similar connections to panels 3P through 7P will be readily apparent and no further detailing of the switch control relay control circuits is necessary.

Referring to FIG. 1E, there is shown in dotted line block form a switch movement and control circuits therefor designated 1–4WC for controlling the movements of switch 1–4W. This switch control arrangement forms no part of our present invention and for purposes of the present description may be considered to be similar to that described and shown in Letters Patent of the United States, No. 2,863,992, issued December 9, 1958, to J. R. George et al. for Automatic Control of Railway Classification Yard Track Switches. Reference is made to the lower right hand side of FIG. 2a of said patent for a detailed drawing of the switch control arrangement. In FIG. 1e of the present application, contacts $b$, $c$, and $d$ of relay 1–4TR correspond to contacts $b$, $c$, and $d$ of relay 1–9TR in said FIG. 2a of the patent and contacts $b$ and $c$ of relay 1–4WP in FIG. 1E correspond to contacts $b$ and $c$ of relay 1–9WP in the patent FIG. 2a. The terminals $a$ and $b$ of 1–4WC in the present FIG. 1E are switch control terminals connected to the movable portions of contacts $b$ and $c$ of relay 1–4WP, respectively, in a similar manner that the front and back contact points of contact $b$ of relay 1–9A1 are connected, respectively, to contacts $b$ and $c$ of relay 1–9WP in said FIG. 2a.

It is sufficient for the purpose of the present description to point out that switch 1–4W is controlled to its normal or reverse position according as energy from terminal B of the battery is supplied to terminal $b$ or $a$, respectively, of 1–4WC, in a manner similar to that in which switch 1–9SW in said George et al. patent is controlled to its normal or reverse position when energy is supplied to said contact $c$ or $b$ respectively, of relay 1–9WP. The circuits for supplying energy to terminal $b$ or $c$ of 1–4WC are controlled by relay 1–4A1. The circuit to terminal $b$ of 1–4WC extends from terminal B of the battery over the back point of contact $a$ of relay 1–4A1 to said terminal $b$, and the circuit to terminal $a$ of 1–4WC extends from terminal B of the battery over the front point of contact $a$ of relay 1–4A1 to said terminal $a$. It is thus apparent that switch 1–4W is controlled to its normal or reverse position according as relay 1–4A1 is released or picked-up. For a more detailed description of the operation of the switch movement and its control circuits reference is made to the above cited Patent No. 2,863,992.

There is shown in FIG. 1G in dotted line block form switch control movements and control circuits 1–2WC and 3–4WC for switches 1–2W and 3–4W, respectively. These movements are each indicated as having control terminals *a* and *b*, similarly to switch movement 1–4WC in said FIG. 1E, and each respective switch is controlled to its normal or reverse position according as energy is supplied to terminals *b* or *a* respectively, of the associated movement. Energy is supplied to terminal *b* of 1–2WC by a circuit extending from terminal B of the battery over the back point of contact *a* of relay 1–2A1 to said terminal *b*, and energy is supplied to terminal *a* of 1–2WC by a circuit extending from terminal B of the battery over the front point of contact *a* of relay 1–2A1 to said terminal *a*. Similarly, the control circuits for movement 3–4WC extend from terminal B of the battery over the back point of contact *a* of relay 3–3A1 to terminal *b* of 3–4WC, and from terminal B of the battery over the front point of contact *a* of relay 3–4A1 to terminal *a* of 3–4WC. Thus, switch 1–2W is controlled to its normal or reverse position according as its switch control relay 1–2A1 is de-energized or energized, respectively, and switch 3–4W is controlled to its normal or reverse position according as its switch control relay 3–4A1 is deenergized or energized, respectively.

The apparatus associated with the group retarders 1–2GR and 3–4GR and for controlling the retardation pressure thereof in accordance with the desired leaving speed for each cut of cars traversing each group retarder is shown in FIGS. 1F and 1G. As previously pointed out each group retarder is shown as comprising only a single retarder section, and, therefore, only one set of apparatus is required for each group retarder. However, it is to be understood that in actual practice each group retarder may comprise two or more retarder sections, similarly to the master retarder, and in such cases a set of retarder control apparatus may be provided for each retarder section so that each section can be independently controlled.

The apparatus associated with retarder 1–2GR comprises a radar velocity meter RVM5 and associated antenna RA5, a speed control unit 1–2SCU, a retardation pressure control unit R1–2PC, and two weight repeater relays 1–2GHPR and 1–2GLPR. The track relay 1–2GTR for the track section 1–2GT in which the group retarder is located is utilized for control of certain of the functions of the apparatus. The apparatus associated with retarder 3–4GR comprises a radar velocity meter RVM6 and associated antenna RA6, a speed control unit 3–4SCU, a retarder pressure control unit R3–4PC, and two weight repeater relays 3–4GHPR and 3–4GLPR. Track relay 3–4GTR for the track section 3–4GT associated with retarder 3–4GR is utilized for control of certain of the functions of the apparatus for control of retarder 3–4GR. As is apparent the apparatus associated with each group retarder is similar and both sets of apparatus are similar to the apparatus employed for control of a section of the master retarder. For the purpose of this description it is, therefore, necessary to describe in any detail only the arrangement of the apparatus associated with one of the group retarders, and the apparatus associated with retarder 1–2GR will be so described.

Speed control unit 1–2SCU (FIG. 1F) is shown as having two input terminals *a* and *b* and two output terminals *e* and *f*, and as including two control relays 1–2BSCR and 1–2ASCR. These terminals and relays correspond to the similar terminals and relays previously described for speed control unit MR1SCU, and the unit operates in a similar manner. The input to terminal *a* of unit 1–2SCU is the V6 desired leaving speed signal derived in the computer track section CT ahead of the master retarder and stored in a central storage panel for each car cut. The readout of each of these signals and the circuits for supplying them to said terminal *a* will be described below. The input signals to terminal *b* of unit 1–2SCU are supplied from an output terminal *b* on radar velocity meter RVM5. This meter and its associated antenna RA5 connected to input terminal *a* of the meter, operate to generate voltage signals representative of the speed of car cuts traversing track section 1–2GT, in a manner similar to antenna RA3 and meter RVM3 associated with speed control unit MR1SCU for the first master retarder section. The input circuit to unit 1–2SCU may be traced from terminal *b* of meter RVM5 over back contact *a* of track relay 1–2GTR to input terminal *b* on unit 1–2SCU.

Relays 1–2BSCR ant 1–2ASCR in unit 1–2SCU control the supply of energy from terminal B of the battery to output terminals *e* and *f* of unit 1–2SCU. Similarly to relays 1ASCR and 1BSCR in unit MR1SCU, relays 1–2ASCR and 1–2BSCR are both released when unit 1–2SCU is not operating, when there is not cut in the area view by radar antenna RA5, when a cut traversing track section 1–2GT has a speed below the selected speed as represented by the V6 voltage signal supplied to terminal *a* of the unit, or when the combined signals supplied to terminals *a* and *b* indicate a need for less braking. When the voltage signals supplied to terminals *a* and *b* of unit 1–2SCU indicate that a car cut in retarder 1–2GR is being properly retarded, relay 1–2ASCR is picked up and realy 1–2BSCR is released. When the combined voltage signals indicate the need for further braking both relays are picked up. Thus, energy from battery terminal B is supplied to terminal *f* of unit 1–2SCU over the back point of contact *a* of relay 1–2ASCR whenever that relay is released, and energy from battery terminal B is supplied to terminal *e* on unit 1–2SCU whenever relays 1–2ASCR and 1–2BSCR are both picked up, this circuit extending over the front point of contact *a* of relay 1–2ASCR in series with front contact *a* of relay 1–2BSCR to said terminal *e*. Reference may be had to the afore-cited copending application Serial No. 676,732, cited in connection with unit MR1SCU, if a more detailed description of the speed control unit 1–2SCU is desired.

Retarder pressure control unit R1–2PC previously mentioned, has a plurality of input terminals *a* through *e* similar to unit R1PC associated with the first section of the master retarder, and unit R1–2PC operates in a manner identical to unit R1PC. That is, the supplying of energy from terminal B of the battery to terminals *a* and *b* of unit R1–2PC operates to reduce the breaking pressure exerted by retarder 1–2GR. The supplying of energy from terminal B of the battery to terminal *c* only causes fluid pressure to be supplied to the operating cylinders of the group retarder 1–2GR at a slow quickly established rate. When energy is supplied to terminal *d* only of unit R1–2PC fluid pressure is supplied to said operating cylinders at a medium relatively rapid rate. When energy is supplied from terminal B of the battery to terminals *d* and *e* on unit R1–2PC, fluid pressure is supplied to the operating cylinders of retarder 1–2GR at a very rapid rate. For a more detailed description of the operation of unit R1–2PC reference is made to Patent No. 2,998,515, cited in connection with pressure control unit R1PC for the first section of the master retarder.

Relays 1–2GHPR and 1–GLPR in FIG. 1F are repeater relays employed for repeating the weight classification for each cut of cars traversing retarder 1–2GR. The circuits for controlling these relays will be discussed hereinafter and for the purpose of the present part of this description it is sufficient to point out that relay 1–2GLPR only is energized when a car cut classified as light is traversing retarder 1–2GR, relay 1–2GHPR only is energized when a car cut classified as heavy is traversing 1–2GR, and both relays are energized when the weight of the cut traversing the retarder is of medium weight classification.

Terminals $a$ and $b$ of retarder pressure control unit R1–2PC have an energizing circuit extending from terminal B of the battery over the back point of contact $a$ of relay 1–2ASCR, output terminal $f$ of unit 1–2SCU to said terminals $a$ and $b$ of unit R1–2PC. Terminal $c$ of unit R1–2PC has an energizing circuit extending from battery terminal B over the front point of contact $a$ of relay 1–2ASCR, front contact $a$ of relay 1–2BSCR, terminal $e$ on unit 1–2SCU, the back point of contact $a$ of relay 1–2-GHPR, front contact $b$ of relay 1–2GLPR to said terminal $c$ of unit R1–2PC. Terminal $d$ of unit R1–2PC has a first energizing circuit extending from terminal $e$ on unit 1–2SCU, over the front point of contact $a$ of relay 1–2GHPR, the front point of contact $a$ of relay 1–2GLPR, and thence to said terminal $d$ of unit R1–2PC. Terminal $d$ of unit R1–2PC has a second energizing circuit extending from terminal $e$ on unit 1–2SCU, the front point of contact $a$ of relay 1–2GHPR, the back point of contact $a$ of relay 1–GLPR, rectifier 1–2RE, employed to prevent sneak circuits, and thence to said terminal $d$ of unit R1–2PC. Terminal $e$ of unit R1–2PC has an energizing circuit extending from terminal $e$ on unit 1–2SCU, the front point of contact $a$ of relay 1–2GHPR, the back point of contact $a$ of relay 1–2GLPR, and thence to said terminal $e$ of unit R1–2PC. It is thus apparent that when relays 1–2ASCR and 1–2BSCR in unit 1–2SCU are both energized to increase the braking force exerted by retarder 1–2GR on a car cut traversing that retarder, such braking force is increased at a relatively slow rate when the cut is classified as a light weight cut, is increased at a medium relatively rapid rate when the cut is classified as a medium weight cut, and is increased at a very rapid rate when the cut is classified as a heavy weight cut.

The previously mentioned apparatus associated with retarder 3–4GR is similar to that just described for retarder 1–2GR. It is, therefore, sufficient to point out that radar velocity meter RVM6 and antenna RA6 connected to input terminal $a$ of the meter, operate to supply, from output terminal $b$ of the meter over back contact $a$ of track relay 3–4GTR to input terminal $b$ of unit 3–4SCU, a signal representative of the velocity of a car cut traversing track section 3–4GT. This signal is compared in unit 3–4SCU with the V6 velocity signal, supplied as hereinafter discussed to input terminal $a$ of that unit, and relays 3–4ASCR and 3–4BSCR operate in a manner similar to relays 1–2ASCR and 1–2BSCR to connect terminal B of the battery to output terminals $e$ and $f$ on unit 3–4SCU and thence to terminals $a$ through $e$ on unit R3–4PC. Contacts $a$ of relay 3–4GHPR and $a$ and $b$ of relay 3–4GLPR, and rectifier 3–4RE operate to select terminals $c$ through $e$ of unit R3–4PC to which energy is to be supplied, in a manner identical to that in which similar contacts of relays 1–2GHPR and 1–2GLPR, and rectifier 1–2RE associated with unit R1–2PC operate to select terminals $c$ through $e$ of unit R1–2PC. This arrangement is believed obvious in view of the previous description of the apparatus associated with retarder 1–2GR.

Referring generally to the drawings comprising the schematic wiring diagram of one embodiment of our invention, it is readily apparent that numerous circuit trees comprising contacts of the TAC relays are employed in our invention for controlling the read-ins and read-outs of parameters, representing information, to and from the central storage panels 1P through 7P. It is also apparent that to describe in detail each of the circuits controlled by said TAC relay contacts would be somewhat repetitious, would render this description extremely voluminous, and would add little to a clear understanding of our invention. It is, therefore, deemed expedient to describe in a general manner the circuits controlled by the TAC relay contacts, and then to describe in detail an operational example of the circuits for one cut of cars proceeding from the hump to storage track in the yard. This will provide a ready understanding of the circuit trees controlled by the TAC relay contacts, without a detailed tracing of each of the circuits of such trees.

Referring, therefore, to FIGS. 5D, 6D, 7D, and 8D, there is shown a plurality of circuit trees over contacts of the D group of TAC relays. The circuits including contacts $c$, $d$, $e$, and $f$ of relay D1TAC, contacts $c$, and $d$ of relay D2TAC, and contact $c$ of relay D3TAC (all in FIG. 5D) control the read-outs, from terminals 16 of storage panels 1P through 7P, of the signal voltages representing the square of the velocities V3 adjusted for the grade in the curved track rolling resistance measuring section. These signal voltages are supplied to the input terminal of amplifier VCA (FIG. 3C), previously discussed.

The circuits including contacts $g$, $h$, $k$, and $l$ of relay D1TAC, contacts $e$ and $f$ of relay D2TAC, and contact $d$ of relay D3TAC (all in FIG. 6D) control the read-in, to terminals 36 of panels 1P through 7P, of the signal voltage outputs from velocity meter RVM2 (FIG. 1C) during the period each car cut occupies computer track section CT. These signal voltages represent velocities V3 before the squaring and adjusting functions previously set forth.

Contact $m$ of relay D1TAC, contacts $g$ and $h$ of relay D2TAC, and contacts $e$, $f$, $g$, and $h$, of relay D3TAC (all in FIG. 7D) control the read-outs, from terminals 21 of panels 1P through 7P, of the "yes-no" bits of information for car cuts. These "yes-no" information bits are supplied to the control winding of relay YNPR in FIG. 3D.

Contacts $n$, $p$, $r$, and $s$, of relay D1TAC, $k$ and $l$ of relay D2TAC, and contact $k$ of relay D3TAC (all in FIG. 7D) control the read-outs, from terminals 15 of panels 1P through 7P, of the signal voltages representing the square of the velocities V2 adjusted for the grade in the curved track rolling resistance measuring section. These signal voltages are supplied to the input terminal of amplifier RCA (FIG. 3C).

Contact $t$ of relay D1TAC, contacts $m$ and $n$ of relay D2TAC, and contacts $l$, $m$, $n$, and $p$ of relay D3TAC (all in FIG. 7D) control the read-outs from terminals 39 of panels 1P through 7P, of the switch control storage information bits, for the first switch in each of the routes through the yard. These bits of information are supplied to relay WS1P (FIG. 3C). Examples of these read-outs have been previously set forth.

Contact $u$ of relay D1TAC, contacts $p$ and $r$ of relay D2TAC, and contacts $r$, $s$, $t$, and $u$ of relay D3TAC (all in FIG. 8D) control the read-outs, from terminals 20 of panels 1P through 7P, of the switch control storage information bits for the second switches in each of the routes through the yard. These bits of information are supplied to relay WS2P (FIG. 3C). Examples of these read-outs have also been previously set forth.

The circuits including contact $v$ of relay D1TAC, contacts $s$ and $t$ of relay D2TAC, and contacts $v$, $w$, $x$, and $y$ of relay D3TAC (all in FIG. 8D) control the read-ins, to terminals 37 of panels 1P through 7P, of the signal voltages representing velocities V6 or the desired leaving speeds for car cuts when leaving the group retarders. These signal voltages are supplied from the output terminal $c$ of amplifier SQRSA (FIG. 4D).

The circuits including contacts $w$, $x$, $y$, and $z$ of relay D1TAC, contacts $u$ and $v$ of relay D2TAC, and contact $z$ of relay D3TAC (all in FIG. 8D) control the read-outs, from terminals 35 of panels 1P through 7P, of the signal voltages representing the tangent track rolling resistance $Rt$. These signal voltages are supplied to the input terminal of amplifier RTSA (FIG. 4D).

A plurality of circuit trees over contacts of the E group of TAC relays is shown in FIGS. 5D and 6D. The first of these trees including contacts $c$, $d$, $e$, and $f$ of relay E1TAC, contacts $c$ and $d$ of relay E2TAC, and contact $c$ of relay E3TAC (all in FIG. 5D) controls the read-outs from terminals 19 of panels 1P through 7P, of the heavy weight classification bits of information. These bits of information are supplied to relay MR1HPR (FIG. 2D).

Contact g of relay E1TAC, contacts e and f of relay E2TAC, and contacts d, e, f, and g of relay E3TAC (all in FIG. 6D) control the read-outs, from terminals 38 of panels 1P through 7P, of the light weight classification bits of information. These bits of information are supplied to relay MR1LPR (FIG. 2D).

Contacts h, k, l, and m of relay E1TAC, contacts g and h of relay E2TAC, and contact h of relay E3TAC (all in FIG. 6D) control the read-ins, to terminals 18 of panels 1P through 7P, of bits of information indicating that the voltage signals representing the V6 velocities have been made final. These bits of information are supplied by connecting energy from terminal B of the battery over the back point of contact h of track relay MR1TR (FIG. 5D) to the circuits, including said contacts of the E group of TAC relays, to terminals 18 of panels 1P through 7P, and these circuits serve to energize the −V3HS relays in the proper panels.

A plurality of circuit trees over contacts of the F group of TAC relays is shown in FIGS. 2E and 4E. The first of these trees controls the read-outs, from terminals 39 of panels 1P through 7P, of the switch control storage bits of information for controlling switch 1–4W to its desired position. This circuit tree therefore, connects to the control winding of relay 1–4A1 and includes contacts c, d, e, and f of relay F1TAC, contacts c and d of relay F2TAC, and contact c of relay F3TAC (all in FIG. 2E). Examples of these read-outs have previously been discussed.

Contacts g, h, k, and l of relay F1TAC, contacts e and f of relay F2TAC, and contact d of relay F3TAC (all in FIG. 4E) control the read-outs, from terminals 19 of panels 1P through 7P, of the heavy weight classification bits of information supplied to the control winding of relay MR2HPR (FIG. 2D).

Contact m of relay F1TAC, contacts g and h of relay F2TAC, and contacts e, f, g, and h of relay F3TAC (all in FIG. 4E) control the read-outs from terminals 38 of panels 1P through 7P, of the light weight classification bits of information supplied to the control winding of relay MR2LPR (FIG. 2D).

FIGS. 2G and 3G show a plurality of circuit trees controlled by contacts of the NL group of TAC relays. The first circuit tree of this plurality comprises contacts b, c, d, and e of relay NL1TAC, contacts b and c of relay NL2TAC, and contact b of relay NL3TAC (all in FIG. 3G). This tree controls the read-outs, from terminals 20 of panels 1P through 7P, for control of switch control relay 1–2A1 (FIG. 1G).

Contact f of relay NL1TAC, contacts d and e of relay NL2TAC, and contacts c, d, e, and f of relay NL3TAC control the cancellations of storage panels 1P through 7P as selected panels for car cuts destined for storage tracks 1 or 2. These cancellation circuits extend from terminal B of the battery over front contact a of a slow release relay 1–2TPRA, to be described, and thence over the circuit tree, including said contacts of the NL group of TAC relays, to terminals 14 of the storage panels 1P through 7P.

It should be pointed out at this time that a cancellation circuit to terminal 14 of a storage panel should be completed only for a sufficient length of time to insure the picking up of the −RO relay in the storage panel. This will effect the cancellation of the storages remaining in the panel and will make the panel available for another car cut as soon as the −RO relay in the panel releases. Therefore, the arrangement of repeater relays 1–2TPR and 1–2TPRA, which repeat the operation of track relay 1–2TR, has been provided as shown in FIG. 2G. The pickup circuit for slow release relay 1–2TPR extends from terminal B of the battery over the front point of contact a of relay 1–2TR and through the winding of relay 1–2TPR to battery terminal N. Relay 1–2TPRA has a pickup circuit which extends from terminal B of the battery over the back point of contact a of relay 1–2TR, front contact a of relay 1–2TPR, and through the winding of relay 1–2TPRA to battery terminal N. It is thus apparent that, whenever track relay 1–2TR is released, relay 1–2TPRA becomes picked up and, once so picked up, will remain picked up until the slow release periods of both relays 1–2TPR and 1–2TPRA have expired. This delay time will insure the pickup of the the slow-pickup −RO relay in the panel which is to be cancelled. The arrangement also insures that a first car cut occupying track section 1–2T cannot effect a premature cancellation for a following car cut, since relay 1–2TPRA will be energized only once for each cut traversing track section 1–2T and then for only a sufficient period of time to insure the pickup of the −RO relay in the storage panel for the first cut. A similar pair of relays designated 3–4TPR and 3–4TPRA are shown in FIG. 4G and are associated with track relay 3–4TR to provide operation for track section 3–4T similar to that just described. The operation of these relays is believed obvious from the description of relays 1–2TPR and 1–2TPRA and no detailed description of the operation of relays 3–4TPR and 3–4TPRA is necessary.

Returning to FIG. 3G, contact g of relay NL1TAC, contacts f and g of relay NL2TAC, and contacts g, h, k, and l of relay NL3TAC, control the read-outs, from terminals 17 of panels 1P through 7P, of the signal voltages representing velocities V6 or the desired leaving speeds of cuts of cars when leaving group retarder 1–2GR. These signal voltages are supplied over back contact b of track relay 1–2GTR (FIG. 1F) to input terminal a of speed control unit 1–2SCU (FIG. 1F).

Contacts h, k, l, and m of relay NL1TAC, contacts h and k of relay NL2TAC, and contact m of relay NL3TAC (all in FIG. 3G) control the read-outs, from terminals 38 of panels 1P through 7P, of the light weight classification information bits supplied to relay 1–2GLPR (FIG. 1F), previously discussed. Similarly, contacts n, p, r, and s of relay NL1TAC, contacts l and m of relay NL2TAC, and contact n of relay NL3TAC control the read-outs, from terminal 19 of panels 1P through 7P, of the heavy weight classification information bits supplied to relay 1–2GHPR (FIG. 1F).

A plurality of circuit trees controlled by the RL group of TAC relays are shown in FIGS. 4G, 5G, and 6G. The first of these circuit trees (FIG. 4G) comprises contacts b, c, d, and e of relay RL1TAC, contacts b and c of relay RL2TAC, and contact b of relay RL3TAC. This circuit tree controls the readouts, from terminals 20 of panels 1P through 7P, for control of switch control relay 3–4A1 (FIG. 1G).

The circuit tree including contact f of relay RL1TAC, contacts d and e of relay RL2TAC, and contacts c, d, e, and f of relay RL3TAC (all in FIG. 5G) controls the cancellations of storage panels 1P through 7P as selected panels for car cuts destined for storage tracks 3 or 4. These cancellation circuits extend from terminal B of the battery over a front contact a of slow release relay 3–4TPRA, previously discussed, and thence over the circuit tree, including said contacts of the RL group of TAC relays, to terminals 14 of these storage panels 1P through 7P. Contacts g, h, k, and l of relay RL1TAC, contacts f and g of relay RL2TAC, and contact g of relay RL3TAC (all in FIG. 5G) control the read-outs from terminals 17 of panels 1P through 7P, of the signal voltages representing velocities V6 or the desired leaving speeds of car cuts when leaving group retarder 3–4GR. These signal voltages are supplied over back contact b of track relay 3–4GTR (FIG. 1F) to input terminal a of speed control unit 3–4SCU (FIG. 1G).

Contact m of relay RL1TAC, contacts h and k of relay RL2TAC, and contacts h, k, l, and m of relay RL3TAC (all in FIG. 6G) control the read-outs from terminals 38 of panels 1P through 7P, of the light weight classification bits of information supplied to relay 3–4GLPR (FIG. 1G), previously discussed. Similarly, contact n of relay RL1TAC, contacts l and m of relay RL2TAC, and contacts n, p, r, and s of relay RL3TAC (all in FIG. 6G) control the read-outs, from terminal 19 of panels 1P through 7P, of the heavy weight classification information bits supplied to relay 3–4GHPR (FIG. 1G).

All of the circuit trees having been generally described, the operation of the apparatus of our invention, including an example of the operation of each of the circuit trees in controlling circuits for the handling of bits of information in the system, will be described for a single car cut proceeding from the hump to a storage track in the yard.

Referring to FIGS. 1B, 2A, 2B, 3A, and 4A, when the car cut enters track section A1T, light responsive relay PCR and track relay A1TR are both released. The release of track relay A1TR closes at the back point of its contact d the previously described panel selection circuit to terminal l of storage panel 1P including conductor 1P–1. Assuming that there are no preceding car cuts in the yard at this time, relay 1A in storage panel 1P is energized over said circuit to select that panel for the cut. The release of track relay A1TR also closes, at back contacts a and e of that relay, the pickup circuits for relays 1–4ASDR and relay R1, respectively. The picking up of relay 1–ASDR completes the pickup circuit for the proper CR relay as in the previously cited Patent No. 2,863,992 and, assuming the car cut to be destined for storage track 4, relay 1–4A4CR picks up and closes its front contacts a and b. This action connects terminal B of the battery to conductors 1P–3 and 1P–4, and switch control storage relays 1WS1 and 1WS2 in storage panel 1P are both energized over the circuits including front contacts h and k of relay 1A. The energization of relay R1, as in the previously described weight classification apparatus of cited Patent No. 2,819,682, energizes the proper ones of the weight classification relays RH1 and RL1 and, assuming the cut to be a heavy weight cut, relay RH1 only is energized at this time. The energization of relay RH1 closes over its front contact a the circuit to terminal 6 of panel 1P, including conductor 1P–6, and relay 1RHS in panel 1P becomes energized over the circuit extending from said terminal 6 and including front contact f of relay 1A in panel 1P.

Relay PCR and its control circuit are so arranged that relay PCR will release and open its front contact a before back contact c of relay A1TR becomes closed. Therefore, the circuit to terminal 7 of panel 1P and including further front contact c of relay A2TR and conductor 1P–7 will not be completed at this time. This circuit is the pickup circuit for the "yes-no" relay 1YN which indicates whether the cut is a single car cut, and this determination has not yet been made at this point in the operation.

While the car cut traverses track section A1T, radar velocity meter RVM1 and its associated antenna RA1 are operating to supply to differentiator DIF a signal representing the velocity of the cut in track section A1T. This signal is differentiated by the differentiator DIF and supplied to input terminal c of wheel inertia correction unit WICU over the back point of contact b of relay RL1 and front contact c of relay RH1. The signal supplied to said terminal c of unit WICU is corrected by potentiometer H within the unit in accordance with the wheel inertia correction for a heavy weight classification cut and is then supplied over the back point of contact c of relay RL1 and the front point of contact d of relay RH1 to input terminal a of bias unit BU1. Bias unit BU1 operates, as previously described, to correct the signal so supplied thereto in accordance with the grade in track section A1T and to render the output from the bias unit a positive voltage signal representative of the tangent track rolling resistance Rt for the cut. This voltage signal is continuously supplied to storage unit 1RT–ESU in panel 1P during the time the car cut traverses track section A1T only. This circuit includes output terminal b of bias unit BU1, conductor 1P–8, terminal 8 of panel 1P, front contact e of relay 1A in panel 1P and input terminal a of unit 1RT–ESU.

Since the car cut is a single car cut, the rear end of the cut will enter track section A1T before the front wheels and axle of the cut enters track section A2T, and, therefore, relay PCR will again become picked-up before track relay A2TR releases. This operation will complete the pickup circuit for relay 1YN, extending from terminal 7 of panel 1P and including front contact n of relay 1A. Thus, relay 1YN will become picked-up to indicate that the cut consists of only a single car length.

The energization of relay 1A as set forth above closes, at front contact b of that relay, the previously described circuit for supplying energy to terminal 13 of panel 1P from terminal B of the battery, and the binary code 001 for identifying storage panel 1P is thus established and transferred to the A group of TAC relays over conductor 1P–13, as previously described.

No other operation of the apparatus takes place during the traversal of track section A1T only by the car cut. When, however, the front wheels and axle of the cut enters track section A2T, thereby releasing track relay A2TR, the following operations of the apparatus takes place:

The closing of back contact e of relay A2TR closes the pickup circuit for relay 1RTH in storage unit 1RT–ESU and relay 1RTH becomes picked-up to make the signal voltage, representing the tangent track rolling resistance and stored in said unit, final. This circuit includes back contact c of relay A2TSR, conductor 1P–10, terminal 10 of panel 1P, front contact m of relay 1A, and terminal b of storage unit 1RT–ESU.

The closing of back contact b of relay A2TR closes the circuit from output terminal b of velocity meter RVM1 to terminal 9 of panel 1P, including conductor 1P–9, and the output signal generated by the meter and its associated antenna is now supplied to input terminal a of bias unit 1BU3 in panel 1P, over front contact d of relay 1A. The signal is conducted through the bias unit 1BU3, the squaring apparatus unit 1SQAU, and potentiometer 1PGP, and thence over front contact l of relay 1A to input terminal a of storage unit 1V1–ESU for storage therein. The above units and potentiometer act in the manner previously described to adjust the signal supplied thereto, and further detailed description of their operation is not now necessary.

The opening of contact c of relay A2TR interrupts the pickup circuit for relay 1YN, described above, but that relay is maintained picked-up at this time by its stick circuit including front contact p of relay 1A.

No further operation of the apparatus takes place at this time.

When the last pairs of wheels and axle of the cut vacates track section A1T, relay A1TR again becomes picked-up and relays 1–4ASDR, 1–4A4CR, R1 and RH1 are de-energized. The closing of front contact b of relay A1TR completes the previously described pickup circuit for relay A2TSR including back contact a of relay A2TR and that relay picks up and completes its stick circuit. The closing of the front point of contact d of relay A1TR closes the pickup circuit for relay 1H in panel 1P and that relay picks up closing the pickup circuit for relay 1HA in panel 1P. The picking up of relay 1HA releases relay 1A and the previously described control circuits for the storage units and relays in panel 1P are thereby interrupted. However, the picking-up of relay 1H previously completed the stick circuits for the energized storage relays, and these relays therefore remain energized. The picking-up of relay 1H also energizes relay 1V1H in storage unit 1V1–ESU and the signal stored in that unit is made final prior to the interruption of the input circuit to the unit by the opening of front contact l of relay 1A.

The picking up of relay A2TSR following the lapse of its slow-pickup delay period also interrupts the input circuit to storage unit 1V1–ESU. This method of control is to insure that a read-in of a signal to a storage unit –V1–ESU in a storage panel for a following car cut does not occur due to the first car cut occupying track section A2T.

It will be remembered that the occupancy of track section A2T by the car cut operates to transfer the binary code 001 from the A group of TAC relays to following groups of TAC relays, and such TAC relays will operate to transfer such code along with or ahead of the car cut. The detailing of the operation of the TAC relays as the cut progresses through the yard is, therefore, not necessary in conjunction with the present part of this description.

When the car cut vacates track section A2T, relay A2TR will again pick up, relay A2TSR will release and the apparatus, with the exception of the relays and units in storage panel 1P storing the bits of information pertaining to the cut, is then in the condition existing before the entrance of the cut into track section A1T.

The cut proceeds through the uncircuited stretch of track between track sections A2T and CT and enters track section CT (FIG. 1C) which is termed the computer track section. Radar velocity meter RVM2 and its associated antenna RA2 operate to generate a voltage signal representative of the velocity of the cut and supplies this signal, during the period the cut occupies track section CT only, over a circuit to bias unit 1BU3, the squaring apparatus unit 1SQAU, and potentiometer 1PGP located in storage panel 1P. This circuit extends from output terminal b of meter RVM2 over front contact a of relay MR1TSPR, back contact b of track relay CTR, conductor P36–2 (FIGS. 1C and 2C), conductor P36 (FIGS. 2C, 2D, 3D, 4D, 5D, 6D), the front point of contact d of relay D3TAC, the back point of contact e of relay D2TAC, the back point of contact h of relay D3TAC (all in FIG. 6D), conductor 1P36 (FIGS. 6D, 6C, 6B, 5B, 4B, 3B, 3A), terminal 36 of panel 1P (FIG. 3A), and conductors 103 and 101 to input terminal a of bias unit 1BU3. This signal voltage after being adjusted by said bias unit, squaring apparatus 1SQAU, and potentiometer 1PGP, is supplied to terminal 16 of panel 1P over conductors 109 and 111. From said terminal 16 the adjusted signal voltage is supplied to input terminal a of amplifier VCA (FIG. 3C), previously described, by a circuit including conductor 1P16 (FIGS. 3A, 3B, 4B, 5B, 5C, 5D), the back point of contact d of relay D1TAC, the back point of contact c of relay D2TAC, the front point of contact c of relay D3TAC (all in FIG. 5D), conductor P16 (FIGS. 5D, 4D, 3D, 3C), back contact e of relay CTR, front contact f of relay MR1TSPR (both in FIG. 3C) to said input terminal a of amplifier VCA.

At the same time the output from storage unit 1V1–ESU is supplied to input terminal a of amplifier RCA (FIG. 3C). This circuit extends from the output terminal of said storage unit to terminal 15 of panel 1P (FIG. 3A), conductor 1P15 (FIGS. 3A, 3B, 4B, 5B, 6B, 6C, 6D, 7D), the back point of contact p of relay D1TAC, the back point of contact k of relay D2TAC, the front point of contact k of relay D3TAC (all in FIG. 7D), conductor P15 (FIGS. 7D, 6D, 5D, 4D, 3D, 3C), 7C, 8C, 9C, 9D, 8D, 7D), front contact h of relay MR1TSPR (both in FIG. 3C), resistor 271, to said input terminal of amplifier RCA.

Relay YNPR (FIG. 3D) is energized at this time by a circuit extending from terminal B of the battery over froint contact b of relay 1YN (FIG. 4A), terminal 21 of panel 1P, conductor 1P21 (FIGS. 4A, 5A, 6A, 7A, 7B, 7C, 8C, 9C, 9D, 8D, 7D) front contact h of relay D3TAC, the back point of contact h of relay D2TAC, the back point of contact m of relay D1TAC (all in FIG. 7D), conductor P21 (FIGS. 7D, 6D, 5D, 4D, 3D), and thence through the winding of relay YNPR to battery terminal N.

The voltage signal stored in storage unit 1RT–ESU (FIG. 3A) is supplied at this time to the input terminal a of amplifier RTSA, previously described. This circuit extends from the output terminal of said storage unit to terminal 35 of panel 1P, conductor 1P35 (FIGS. 3A, 3B, 4B, 5B, 6B, 6C, 6D, 7D, 8D), the back point of contuct x of relay D1TAC, the back point of contact u of relay D2TAC, the front point of contact z of relay D3TAC (all in FIG. 8D), conductor P35 (FIGS. 8D, 7D, 6D, 5D, 4D), the front point of contact b of relay YNPR (FIG. 4D), conductor P35–1 (FIGS. 4D, 3D), front contact r of relay MR1TSPR, back contact n of relay CTR (both in FIG. 4C), conductor P35–2 (FIGS. 4C and 4D), and thence through resistor 262 to said input terminal of amplifier RTSA.

Since the car cut is assumed to be destined to storage track 4, relays WS1P and WS2P (FIG. 3C) are both energized at this time. The circuit for energizing relay WS1P extends from terminal B of the battery over the front point of contact b of relay 1WS1 (FIG. 4A), terminal 39 of panel 1P, conductor 1P39 (FIGS. 4A, 5A, 6A, 7A, 7B, 7C, 8C, 9C, 9D, 8D, 7D), conductor 1P39–1 (FIG. 7D), front contact p of relay D3TAC, the back point of contact n of relay D2TAC, the back point of contact t of relay D1TAC (all in FIG. 7D), conductor P39–1 (FIGS. 7D, 6D, 5D, 5C, 4C, 3C), and through the winding of relay WS1P to battery terminal N. The circuit for energizing relay WS2P extends from terminal B of the battery over the front point of contact b of relay 1WS2 (FIG. 4A), terminal 20 of panel 1P, conductor 1P20 (FIGS. 4A, 5A, 6A, 7A, 7B, 7C, 8C, 9C, 9D, 8D), conductor 1P20–1 (FIG. 8D), front contact u of relay D3TAC, the back point of contact r of relay D2TAC, the back point of contact u of relay D1TAC (all in FIG. 8D), conductor P20–1 (FIGS. 8D, 7D, 6D, 5D, 5C, 4C, 3C), and through the winding of relay WS2P to battery terminal N.

The above-mentioned signal voltage supplied to input terminal a of inverting amplifier VCA is supplied from the output terminal c of that amplifier through resistor 270 to the input terminal a of amplifier RCA along with the signal voltage supplied to that input terminal from storage unit 1V1–ESU. In addition there is supplied, to input terminal a of amplifier RCA from battery G2TB, a voltage representative of the grade in the curved track section extending from the entrance end of track section A2T to the exit end of track section CT. The circuit for supplying this voltage extends from the positive terminal of battery G2TB through potentiometer G2TP, back contact g of relay CTR, front contact h of relay MR1TSPR, and through resistor 272 to input terminal a of amplifier RCA. The output from amplifier RCA is supplied to input terminal a of amplifier RCSA, previously described, by a circuit extending from output terminal c of amplifier RCA, conductor 141 (FIGS. 3C and 3D), the front point of contact a of relay YNPR, conductor 142 (FIGS. 3D and 3C), front contact k of relay MR1TSPR, back contact h of relay CTR, the front point of contact s of relay WS1P, the front point of contact m of relay WS2P, potentiometer TK4B1 employed for adjusting the signal in accordance with a first curved track correlation factor for storage track 4, the front point of contact c of relay WS1P, the front point of contact b of relay WS2P (all in FIG. 3C), conductor 144 (FIGS. 3C and 3D), resistor 273, and thence to input terminal a of amplifier RCSA. If relay WS1P is energized and relay WS2P is released because a car cut is destined for storage track 3 rather than track 4, the circuit just described extends from said back contact h of relay CTR over the front point of contact s of relay WS1P, the back point of contact m of relay WS2P, potentiometer TK3B1, employed for adjusting the signal in accordance with a first curved track correlation factor for storage track 3, the front point of contact d of relay WS1P, the back point of contact b of relay WS2P, and thence over said conductor 144 to amplifier RCSA. Similarly, potentiometer TK2B1 is selected over the back points of contacts *s* and *c* of relay WS1P and the front points of contacts *n* and *b* of relay WS2P if a cut is destined for storage track 2, and potentiometer TK1B1 is selected over the back points of contacts *s* and *d* of relay WS1P and the back points of contacts *n* and *b* of relay WS2P if a cut is destined for storage track 1. Potentiometers TK2B1 and TK1B1 are employed for adjusting the signal in accordance with a first curved track correlation factor for tracks 2 and 1, respectively, when a car cut is destined to one of those storage tracks rather than storage track 4.

There is also supplied to input terminal *a* of amplifier RCSA from battery C1B (FIG. 4C) a value of voltage representing a second curved track correlation factor. When the car cut is destined for storage track 4, as in the example under discussion, this circuit extends from the negative terminal of battery C1B over the front point of contact *t* of relay WS1P, the front point of contact *p* of relay WS2P, potentiometer TK4C1, the front point of contact *e* of relay WS1P, the front point of contact *c* of relay WS2P, back contact *k* of relay CTR, front contact *l* of relay MR1TSPR (all in FIG. 4C), conductor 145 (FIGS. 4C, 3C, and 3D), resistor 274, and thence to a terminal *a* of amplifier RCSA. When a car cut is destined for storage track 1, the negative terminal of battery C1B is connected to said back contact *k* of relay CTR by a circuit including the back point of contact *t* of relay WS1P, the back point of contact *r* of relay WS2P, potentiometer TK1C1, the back point of contact *f* of relay WS1P, the back point of contact *c* of relay WS2P, and thence to said back contact *k* of relay CTR. When a cut is destined for storage track 2, the circuit extends from the negative terminal of battery C1B over the back point of contact *t* of relay WS1P, the front point of contact *r* of relay WS2P, potentiometer TK2C1, the back point of contact *e* of relay WS1P, and thence over the front point of contact *c* of relay WS2P to said back contact *k* of relay CTR. When a cut is to proceed to storage track 3, the circuit extends from the negative terminal of battery C1B over the front point of contact *t* of relay WS1P, the back point of contact *p* of relay WS2P, potentiometer TK3C1, the front point of contact *f* of relay WS1P, the back point of contact *c* of relay WS2P, and thence to said back contact *k* of relay CTR.

A third group of circuits is employed for supplying an additional input to input terminal *a* of amplifier RCSA from an additional battery G6–7B. These circuits provide an input to amplifier RCSA in accordance with the grades in the curved portions of each respective track lead from the exit ends of the group retarders to the respective storage track. For the car cut under discussion and destined for storage track 4 this input circuit to terminal *a* of amplifier RCSA extends from the positive terminal of the battery G6–7B (FIG. 4C), over the front point of contact *u* of relay WS1P, the front point of contact *s* of relay WS2P, potentiometer TK4G6–7, the front point of contact *g* of relay WS1P, the front point of contact *d* of relay WS2P, back contact *u* of relay CTR, front contact *m* of relay MR1TSPR (all in FIG. 4C), conductor 146 (FIGS. 4C, 3C, 3D), resistor 275, and thence to input terminal *a* of amplifier RCSA. When a car cut is destined for storage track 1, the circuit from the positive terminal of battery G6–7B extends over the back point of contact *u* of relay WS1P, the back point of contact *t* of relay WS2P, potentiometer TK1G6–7, the back point of contact *h* of relay WS1P, the back point of contact *d* of relay WS2P, and thence to said back contact *u* of relay CTR. When a car cut is destined for storage track 2, the circuit from the positive terminal of battery G6–7B extends over the back point of contact *u* of relay WS1P, the front point of contact *t* of relay WS2P, potentiometer TK2G6–7, the back point of contact *g* of relay WS1P, the front point of contact *d* of relay WS2P, and thence to said back contact *u* of relay CTR. For a cut destined for storage track 3, the circuit extends from the positive terminal of battery G6–7B, the front point of contact *u* of relay WS1P, the back point of contact *s* of relay WS2P, potentiometer TK3G6–7, the front point of contact *h* of relay WS1P, the back point of contact *d* of relay WS2P, and thence to said back contact *u* of relay CTR.

In addition to the above-described input provided at this time to amplifier RTSA, a second input is provided thereto from a battery G7B (FIG. 4C). This battery is employed to provide an input to amplifier RTSA in accordance with the grades in the tangent or straight track portions of each respective track lead from the ends of the curved track portions beyond the exit ends of the group retarders to the ends of such grades. For the car cut under discussion, that is, destined for storage track 4, the circuit for providing such an input to amplifier RTSA extends from the negative terminal of battery G7B over the front point of contact *w* of relay WS1P, the front point of contact *w* of relay WS2P, potentiometer TK4G7, the front point of contact *m* of relay WS1P, the front point of contact *f* of relay WS2P, back contact *m* of relay CTR, front contact *p* of relay MR1TSPR (all in FIG. 4C), conductor 150 (FIGS. 4C, 4D), resistor 261, and thence to input terminal *a* of amplifier RTSA. When a car cut is destined for storage track 1, the circuit extends from the negative terminal of battery G7B over the back point of contact *w* of relay WS1P, the back point of contact *x* of relay WS2P, potentiometer TK1G7, the back point of contact *n* of relay WS1P, the back point of contact *f* of relay WS2P, and thence to said back contact *m* of relay CTR. For a cut preceeding to storage track 2, this circuit extends from the negative terminal of battery G7B over the back point of contact *w* of relay WS1P, the front point of contact *x* of relay WS2P, potentiometer TK2G7, the back point of contact *m* of relay WS1P, the front point of contact *f* of relay WS2P, and thence to back contact *m* of relay CTR. If a car is destined for storage track 3, the circuit extends from the negative terminal of battery G7B over the front point of contact *w* of relay WS1P, the back point of contact *w* of relay WS2P, potentiometer TK3G7, the front point of contact *n* of relay WS1P, the back point of contact *f* of relay WS2P, and thence to back contact *m* of relay CTR.

The output from amplifier RTSA is supplied to input terminal *a* of amplifier TSA over a plurality of selection circuits. For a car cut destined for storage track 1, the circuit extends from output terminal *c* of amplifier RTSA over conductor 140 (FIGS. 4D, 3D, 3C), the back point of contact *r* of relay WS1P, the back point of contact 1 of relay WS2P (FIG. 3C), conductor 139 (FIGS. 3C, 2C), terminal *d* of the track fullness unit for storage track 1, potentiometer TFU1P in said unit, terminal *c* of said unit (all in FIG. 2C), conductor 135 (FIGS. 2C, 3C), the back point of contact *b* of relay WS1P, the back point of contact *a* of relay WS2P (FIG. 3C), conductor 143 (FIGS. 3C, 3D, 4D), and through resistor 264 to input terminal *a* of amplifier TSA (FIG. 4D). For the car cut under discussion, destined for storage track 4, the circuit extends from said conductor 140 over the front point of contact *r* of relay WS1P, the front point of contact *k* of relay WS2P (both in FIG. 3C), conductor 136 (FIGS. 3C, 2C), terminal *d* of the track fullness unit for storage track 4 (FIG. 2C), from where the circuit extends internally in the unit over a potentiometer, similar to above-mentioned potentiometer TFU1P, to terminal *c* on the unit, conductor 132 (FIGS. 2C, 3C), the front point of contact *a* of relay WS1P, the front point of contact *a* of relay WS2P (both in FIGS. 3C), and thence to conductor 143 leading to above-mentioned resistor 264 and input terminal *a* of amplifier TSA. The track fullness units for storage tracks 2 and 3 also each include a potentiometer similar to potentiometer TFU1P in the unit for storage track 1. Terminals *c* and *d* of each of these units also provide for a circuit through the respective potentiometer similar to terminals c and d of the unit for storage track 1. Thus, for a cut of cars destined for storage track 2, the circuit from said conductor 140 extends over the back point of contact r of relay WS1P, the front point of contact l of relay WS2P (FIG. 3C), conductor 138, terminal d on the track fullness unit for track 2, and through the potentiometer in that unit to terminal c of the unit, conductor 134, the back point of contact a of relay WS1P, the front point of contact a of relay WS2P, and thence to said conductor 143. For a cut of cars destined for storage track 3, the circuit extends from conductor 140 over the front point of contact r of relay WS1P, the back point of contact k of relay WS2P, conductor 137, terminal d of the track fullness unit for storage track 3, and over said potentiometer in that unit to terminal c of the unit, conductor 133, the front point of contact b of relay WS1P, the back point of contact a of relay WS2P, and thence to said conductor 143.

Amplifier TSA has a second input circuit extending from the negative terminal of a battery V8B in FIG. 4C over potentiometer V8P, back contact l of relay CTR, front contact n of relay MR1TSPR (all in FIG. 4C), conductor 148 (FIGS. 4C, 4D), resistor 265, and thence to input terminal a of amplifier TSA. This circuit operates to supply to amplifier TSA from battery V8B a signal voltage representative of the square of the desired coupling speed for cuts of cars in their respective storage tracks, as previously described.

The output from amplifier RCSA is also supplied to the input of amplifier TSA and, for the cut under discussion and destined for storage track 4, this circuit extends from output terminal c of amplifier RCSA (FIG. 3D) over conductor 147 (FIGS. 3D, 3C, 4C), the front point of contact v of relay WS1P, the front point of u of relay WS2P, potentiometer TK4D6–7, the front point of contact k of relay WS1P, the front point of contact e of relay WS2P (all in FIG. 4C), conductor 149 (FIGS. 4C, 4D), resistor 266, and thence to input terminal a of amplifier TSA. This circuit is for adjusting the output from amplifier RCSA, in accordance with the distance from the end of the respective group retarder to the end of the curved track in the lead to storage track 4, before such output is supplied to amplifier TSA. Similar circuits are also provided for cuts destined for storage tracks 1, 2, or 3. For a cut destined for storage track 1, the circuit extends from said conductor 147 over the back point of contact v of relay WS1P, the back point of contact v of relay WS2P, potentiometer TK1D6–7, the back point of contact l of relay WS1P, the back point of contact e of relay WS2P (all in FIG. 4C), and thence to said conductor 149, resistor 266, and input terminal a of amplifier TSA. For a cut destined for storage track 2, the circuit extends from said conductor 147 over the back point of contact v of relay WS1P, the front point of contact v of relay WS2P, potentiometer TK2D6–7, the back point of contact k of relay WS1P, the front point of contact e of relay WS2P, and thence to said conductor 149. For a car cut proceeding to storage track 3, the circuit extends from conductor 147 over the front point of contact v of relay WS1P, the back point of contact u of relay WS2P, potentiometer TK3D6–7, the front point of contact l of relay WS1P, the back point of contact e of relay WS2P, and thence to conductor 149.

The output from output terminal c of amplifier TSA is supplied through resistor 250 to input terminal a of square root summing amplifier SQRSA (FIG. 4D), previously described. The output from this amplifier is a signal voltage representative of the desired leaving speed V6 for the cut of cars when leaving the group retarder in its route to its destined storage track 4. This signal voltage is to be employed for controlling the braking force of the group retarder while the cut is traversing the retarder and, therefore, the signal is stored in storage panel 1P for the cut until the signal is required for such control. The circuit for so storing the voltage signal extends at this time from output terminal c of amplifier SQRSA, conductor P37 (FIGS. 4D, 5D, 6D, 7D, 8D), the back point of contact v of relay D1TAC, the back point of contact t of relay D2TAC, front contact y of relay D3TAC (all in FIG. 8D), conductor 1P37 (FIGS. 8D, 8C, 7C, 7B, 6B, 5B, 4B, 3B, 3A), terminal 37 of panel 1P, and the input terminal a of storage unit 1V3–ESU in panel 1P.

This input to storage unit 1V3–ESU continues as long as the cut traverses the computer track section CT. However, when the cut enters track section MR1T, relay MR1TSPR (FIG. 1C) is released, as previously described, and all the inputs to amplifiers VCA, RCA, RCSA, RTSA, TSA and SQRSA are cut off. At the same time relays 1V3HS in panel 1P, and consequently relay 1V3H in storage unit 1V3–ESU, are energized to make the signal voltage representing V6 and stored in unit 1V3–ESU final. The circuit for energizing relay 1V3HS extends at this time from battery terminal B over the back point of contact h of relay MR1TR (FIG. 5D) conductor P18 (FIGS. 5D, 6D), the front point of contact h of relay E3TAC, the back point of contact g of relay E2TAC, the back point of contact k of relay E1TAC (all in FIG. 6D), conductor 1P18 (FIGS. 6D, 6C, 6B, 5B, 4B, 3B, 3A), terminal 18 of panel 1P, and thence through the winding of relay 1V3HS to battery terminal N. Relay 1V3HS is thus energized completing its previously described stick circuit. The picking-up of relay 1V3HS closes the previously described pick-up circuit for relay 1V3H in unit 1V3–ESU, and that relay picks up as stated previously.

The circuits and apparatus, and operation thereof, for cuts traversing the master retarder have previously been described in detail and no further description thereof is necessary at this time except to trace the pickup circuits for relays MR1HPR and MR2HPR in FIG. 2D. Relay MR1HPR has, at this time, a pickup circuit extending from terminal B of the battery over the front point of contact b of relay 1RHS (FIG. 3A), terminal 19 of panel 1P, conductor 1P19 (FIGS. 3A, 3B, 4B, 5B, 6B, 6C, 6D), conductor 1P19–1 (FIG. 6D, 5D), the back point of contact d of relay E1TAC, the back point of contact c of relay E2TAC, the front point of contact c of relay E3TAC (all in FIG. 5D), conductor P19–1 (FIGS. 5D, 4D, 3D, 2D), and thence through the winding of relay MR1HPR to battery terminal N. Relay MR2HPR has, at this time, a pickup circuit extending from said conductor 1P19 in FIG. 6D over conductor 1P19–2 (FIGS. 6D, 6E), conductor 1P19–3 (FIGS. 6E, 5E, 4E), the back point of contact h of relay F1TAC, the back point of contact e of relay F2TAC, the front point of contact d of relay F3TAC (all in FIG. 4E), conductor P19–3 (FIGS. 4E, 4D, 3D, 2D), and thence through the winding of relay MR2HPR to battery terminal N. It may thus be seen that relays MR1HPR and MR2HPR are picked-up at this time to control the first and second sections of the master retarder, respectively, in the manner previously described for a heavy weight cut, that is, the car cut under discussion.

When the binary code 001 is transferred to the F group of TAC relays, relay 1–4A1 (FIG. 2E) is energized to effect a control, as previously described to cause switch 1–4W to move to its reverse position to align the route to storage track 4 for the cut under discussion. The circuit for energizing relay 1–4A1, at this time, extends from terminal B of the battery over front contact b of relay 1WS1 in panel 1P (FIG. 4A), terminal 39 of panel 1P, conductor 1P39 (FIGS. 4A, 5A, 6A, 7A, 7B, 7C, 8C, 9C, 9D, 8D, 7D), conductor 1P39–2 (FIGS. 7D, 7E, 6E, 5E, 4E, 3E, 2E), the back point of contact d of relay F1TAC, the back point of contact c of relay F2TAC, the front point of contact c of relay F3TAC, and thence through the winding of relay 3–4GHPR to battery terminal N (FIG. 2E). The pick-up of contact a of relay 1–4A1

(FIG. 1E) closes over the front point of that contact of the previously described circuit for connecting terminal B of the battery to terminal *a* of switch control unit 1–4WC, and switch 1–4W is thereby controlled to its reverse position.

The car cut proceeds through track sections MR1T, MR2T, 1–4T, switch 1–4W in its reverse position, the uncircuited stretch of track between track section 1–4T and 3–4GT (FIGS. 1C, 1D, 1E, 1F), and enters track section 3–4GT. However, prior to the arrival of the cut at this point, relay 3–4GHPR (FIG. 1G) is energized to prepare for control of group retarder 3–4GR in the manner described for a car cut of a heavy weight classification. Also relay 3–4A1 in FIG. 1G is energized to control switch 3–4W to its reverse position. The circuit for energizing relay 3–4GHPR at this time, extends from terminal B of the battery over front contact *b* of relay 1RHS in FIG. 3A to terminal 19 of panel 1P, conductor 1P19 (FIGS. 3A, 3B, 4B, 5B, 6B, 6C, 6D), conductor 1P19–2 (FIGS. 6D, 6E), conductor 1P19–4 (FIGS. 6E, 6F, 6G), conductor 1P19–5, front contact *s* of relay RL3TAC, the back point of contact *m* of relay RL2TAC, the back point of contact *n* of relay RL3TAC (all in FIG. 6G), conductor P19–5 (FIGS. 6G, 5G, 4G, 3G, 2G, 1G), and thence through the winding of relay 3–4GHPR to battery terminal N. The circuit for energizing relay 3–4A1 at this time extends from terminal B of the battery over front contact *b* of relay 1WS2 in panel 1P to terminal 20 of panel 1P (all in FIG. 4A), conductor 1P20 (FIGS. 4A, 5A, 6A, 7A, 7B, 7C, 8C, 9C, 9D, 8D), conductor 1P20–2 (FIGS. 8D, 7D, 7E, 6E, 6F, 6G, 5G), conductor 1P20–3 (FIGS. 5G, 4G), the back point of contact *c* of relay RL1TAC, the back point of contact *b* of relay RL2TAC, the front point of contact *b* of relay RL3TAC (all in FIG. 4G), conductor P20–3 (FIGS. 4G, 3G, 2G, 1G), and through the winding of relay 3–4A1 to battery terminal N. The picking-up of relay 3–4A1 closes at front contact *a* of that relay the energizing circuit from battery terminal B of terminal *a* of switch control unit 3–4WC, and switch 3–4W is thus controlled to its reverse position to align the route to storage track 4 for the car cut.

When the cut enters track section 3–4GT, relay 3–4GTR releases and closes, at the back point of its contact *a*, the circuit between output terminal *b* of radar velocity meter RVM6 and input terminal *b* of speed control unit 3–4SCU (FIGS. 1F and 1G). The release of relay 3–4GTR also closes, at the back point of its contact *b*, the read-out circuit for transferring the signal voltage, representing the desired leaving speed V6 for the car cut when leaving group retarder 3–4GR. This circuit extends from terminal 17 of panel 1P (FIG. 3A) over conductor 1P17 (FIGS. 3A, 3B, 4B, 5B, 6B, 6C, 6D, 6E, 6F, 6G, 5G), conductor 1P17–1, the back point of contact *h* of relay RL1TAC, the back point of contact *f* of relay RL2TAC, the front point of contact *g* of relay RL3TAC (all in FIG. 5G), conductor P17–1 (FIGS. 5G, 4G, 3G, 2G, 1G, 1F), and thence over said back contact *b* of relay 3–4GTR to input terminal *a* of speed control unit 3–4SCU in FIG. 1G. Speed control unit 3–4SCU operates as previously described to control the speed of the car cut as it traverses group retarder 3–4GR.

The car cut enters track section 3–4T and proceeds through switch 3–4W in its reverse position to its selected storage track 4. However, when track relay 3–4TR is released by the entrance of the car cut into track section 3–4T, relay 3–4TPRA (FIG. 4G) is temporarily energized as previously discussed. The energization of relay 3–4TPRA closes a cancellation circuit for storage panel 1P. This circuit extends from terminal B of the battery over front contact *a* of relay 3–4TPRA, conductor P14–1 (FIGS. 4G, 5G), the back point of contact *f* of relay RL1TAC, the back point of contact *e* of relay RL2TAC, front contact *f* of relay RL3TAC, conductor 1P14–1 (all in FIG. 5G), conductor 1P14 (FIGS. 5G, 6G, 6F, 6E, 7E, 7D, 8D, 9D, 9C, 8C, 7C, 7B, 7A, 6A, 5A, 4A, 3A, 2A), terminal 14 of panel 1P (FIG. 2A), and thence through the winding of cancellation relay 1RO in panel 1P to terminal N of the battery. Relay 1RO becomes picked-up, opening its back contact *b* and releasing relay 1H which in turn releases relay 1HA. The release of relay 1H opens the stick circuits for relays 1RHS, 1WS1, 1WS2, 1V3HS, and 1YN, and the control circuits for relays 1V1H and 1RTH, and these relays release. The release of relay 1V3HS opens the control circuit for relay 1V3H and that relay releases. All of the storages in panel 1P are thus cancelled. Relay 3–4TPRA subsequently releases, thereby releasing relay 1RO, and storage panel 1P is returned to its normal vacant condition and is available for storing bits of information for another car cut.

Referring again to FIGS. 3D and 4D, battery RCAB and potentiometer RCAP in FIG. 3D, and battery RTAB and potentiometer RTAP in FIG. 4D, are employed, respectively, to substitute fixed values for curved track rolling resistance and straight track rolling resistance, respectively, when relay YNPR is not energized, that is, when a car cut for which a V6 computation is being made consists of more than a single car. Under such conditions the input to amplifier RCSA through one of the previously described potentiometers TK1B1 through TK4B1 extends from the negative terminal of battery RCAB through potentiometer RCAP, the back point of contact *a* of relay YNPR, conductor 142, and thence over one of the circuits previously described to conductor 144, resistor 273, and input terminal *a* of amplifier RCSA. The input to amplifier RTSA through resistor 262, under such conditions, extends from the positive terminal of battery RTAB through potentiometer RTAP, the back point of contact *b* of relay YNPR, conductor P35–1, and thence over the circuit previously described to conductor P35–2, resistor 262, and input terminal *a* of amplifier RTSA.

From the foregoing description it is apparent that, with the arrangement of apparatus of our invention as shown in the drawings of this application, a novel arrangement for deriving parameters or bits of information pertaining to each cut of railway cars entering a classification yard is provided. Furthermore, an economic advantage may be obtained by employing our invention since but one leaving speed computer or set of group retarder leaving speed computation apparatus may be used for an entire yard.

While we have shown and described only one form of apparatus embodying our invention, it should be understood that various changes and modifications may be made therein within the scope of the appended claims without departing from the spirit and scope of our invention.

Having thus described our invention, what we claim is:

1. In a gravity type railway car classification yard including a master retarder and a group retarder in the routes to the classification tracks in the yard, the combination comprising, means in advance of the master retarder for deriving a first signal representing straight track rolling resistance of each car cut entering the yard, means in advance of the master retarder for deriving a second signal representing the curved track rolling resistance of each car cut entering the yard, means controlled by the first and second signals for a car cut for deriving a third signal representing the proper leaving speed of the cut from the group retarder in the route to the classification track for the cut in order that the cut will proceed to coupling with the preceeding cars in that track below a preselected speed, means for storing said third signal, means controlled by said second signal means for controlling said master retarder to retard all cuts to arrive at equal time spacing at the respective group retarders, means for reading out said third signal when the cut traverses said group retarder, and means controlled by the read-out signal for controlling the braking force exerted by said group retarder on said car cut whereby the coupling speed of the cut is below said preselected speed.

2. In a hump type railway car classification yard including a plurality of routes each through a single master retarder and one of a plurality of group retarders, the combination comprising, a straight track section and a curved track section in approach to the master retarder, means controlled by the traversal of a car cut of said straight track section for deriving a first signal representing the straight track rolling resistance of the cut, means conrolled by the traversal by said car cut of said curved track section for deriving a second signal representing the curved track rolling resistance of the cut, a master retarder leaving speed computer, means controlled by the traversal of said cut of said curved track section for controlling said computer to derive a third signal representing the proper leaving speed of the cut from the master retarder for the cut to arrive at its respective group retarder a predetermined time after leaving the hump, means controlled by said third signal for controlling the retardation force of the master retarder in accordance with said third signal, a single group retarder leaving speed computer for all of said group retarders; means for supplying to said group computer said first and second signals and correlation factors selected in accordance with the characteristics of the route to the classification track for said cut and in accordance with the distance to go in that track, said group computer deriving a fourth signal in accordance with the signals and factors supplied thereto and representing the desired leaving speed for the cut from its respective group retarder, means for storing said fourth signal, means controlled by the entrance of the cut into its respective group retarder for reading out of said storage means said fourth signal, and means controlled by said read-out fourth signal for controlling the braking force of said group retarder so that said cut proceeds to coupling in its respective classification track at or below a predetermined speed.

3. In a hump type railway car classification yard including a master retarder and at least one group retarder; means for deriving a master retarder leaving speed for each cut of cars entering the master retarder in accordance with the equation $V4=V4m+K(V3m-V3)$ where V4 is the desired derived leaving speed, $V4m$ is an average of minimum and maximum velocities of cuts of cars when leaving the master retarder, $V3m$ is an average of minimum and maximum velocities of cuts of cars when entering the master retarder, $V3$ is the measured velocity of the cut of cars when entering the master retarder and K is the difference between the maximum and minimum velocities of cuts of cars when leaving the master retarder divided by the difference between the maximum and minimum velocities of cuts of cars when entering the master retarder; and means controlled by each said derived leaving speed for adjusting the retardation exerted by the master retarder on the cut of cars for which the speed is derived so that each cut will consume approximately the same time interval prior to arrival at its respective group retarder.

4. In a hump type railway car classification yard including a master retarder and a group retarder, a master retarder computer for deriving a leaving speed for each car cut from the master retarder that will cause approximately equal time spacing between the arrival of all car cuts at the group retarder, the computer fulfilling the equation $V4=V4m+K(V3m-V3)$ wherein V4 is the desired derived leaving speed for a car cut, $V4m$ is an average of minimum and maximum velocities of car cuts when leaving the master retarder, $V3m$ is an average of minimum and maximum velocities of car cuts when entering the master retarder, $V3$ is the measured velocity of the car when entering the master retarder, and K is the difference between the maximum and minimum velocities of car cuts when leaving the master retarder divided by the difference between the maximum and minimum velocities of car cuts when entering the master retarder.

5. Control appratus for a master retarder beyond a hump and a group retarder beyond the master retarder in a classification yard having a tangent stretch and a curved stretch of track between the hump and the master retarder, comprising, in combination, first means associated with the tangent stretch for measuring the rolling resistance of each cut thereon, second means associated with the curved stretch for measuring the rolling resistance of each cut thereon, third means controlled in accordance with the destination assigned to each cut for determining the nature and extent of the route to be traversed by the cut following the group retarder, first computing means controlled by said first, second and third means for determining a leaving speed for each cut from the group retarder to cause it to reach its assigned destination at a predetermined speed, second computing means controlled by the speed of each cut approaching the master retarder for determining a leaving speed for each cut from the master retarder to cause it to take a predetermined length of time to travel between the hump and the group rearder, storage means for storing signals corresponding to said group retarder leaving speeds, means actuated by said second computing means for controlling the master retarder in accordance with said master retarder leaving speeds, and means controlled by said storage means for controlling the group retarder in accordance with said group retarder leaving speeds.

6. A car retarder control system for a master retarder located between a hump and at least one group retarder, comprising, in combination, measuring means for deriving signals in accordance with the speeds of cars approaching the master retarder, computing means adjusted in accordance with the predetermined performance of cars of maximum and minimum rolling resistance in said master retarder when said maximum rolling resistance car is not retarded and said minimum rolling resistance car is retarded sufficiently to travel from the hump to a selected point at the group retarder in the same time interval as the maximum rolling resistance car, said computing means controlled by said speed signals for computing the speed at which each car should leave the master retarder in order to travel between the hump and said selected point in the same interval as the maximum rolling resistance car, and means controlled by said computing means for actuating the master retarder to reduce the speed of each car to its computed leaving speed.

References Cited by the Examiner
UNITED STATES PATENTS 3,054,893    9/1962    Dasburg    246—182

FOREIGN PATENTS 208,415    10/1955    Australia.
601,508    8/1934    Germany.
746,443    3/1956    Great Britain.
753,069    7/1956    Great Britain.
921,845    1/1947    France.

OTHER REFERENCES

A thesis prepared by Wilhelm Koth and titled: "Die Laufzielsteuerung in der Ablanfdynamik," Germany, 151 pages.

ARTHUR A. LA POINT, *Primary Examiner.*

JAMES S. SHANK, LEO QUACKENBUSH,
*Examiners.*